(12) United States Patent
Saito et al.

(10) Patent No.: US 6,182,807 B1
(45) Date of Patent: Feb. 6, 2001

(54) DEVICE AND METHOD FOR SUPPLYING POWER TO A VEHICLE, SEMI-CONDUCTOR CIRCUIT DEVICE FOR USE IN THE SAME AND COLLECTIVE WIRING DEVICE FOR A VEHICLE OR AN AUTOMOBILE

(75) Inventors: Hiroyuki Saito, Hitachinaka; Tatsuya Yoshida, Urizura-machi; Shinichi Sakamoto, Mito; Mitsuru Koni, Hitachinaka; Kiyoshi Horibe, Hitachi, all of (JP)

(73) Assignees: Hitachi, Ltd., Tokyo; Hitachi Car Engineering Co., Ltd., Ibaraki, both of (JP)

( * ) Notice: Under 35 U.S.C. 154(b), the term of this patent shall be extended for 0 days.

(21) Appl. No.: 08/894,285

(22) PCT Filed: Feb. 21, 1996

(86) PCT No.: PCT/JP96/00386

§ 371 Date: Aug. 21, 1997

§ 102(e) Date: Aug. 21, 1997

(87) PCT Pub. No.: WO96/26570

PCT Pub. Date: Aug. 29, 1996

(30) Foreign Application Priority Data

Feb. 21, 1995 (JP) .................................................. 7-032647
Sep. 5, 1995 (JP) .................................................. 7-228238

(51) Int. Cl.[7] ............................................................ B60L 9/00
(52) U.S. Cl. ................................................................ 191/2
(58) Field of Search .................................. 191/2, 3, 4, 6; 323/282, 283, 285

(56) References Cited

U.S. PATENT DOCUMENTS

| 4,376,909 | * | 3/1983 | Tagami et al. ......................... 315/82 |
| 4,771,382 | | 9/1988 | Shiono et al. . |
| 4,855,896 | | 8/1989 | Oho et al. . |
| 4,931,697 | * | 6/1990 | Nakajima ............................... 315/77 |
| 5,113,410 | | 5/1992 | Hamano et al. . |
| 5,438,506 | | 8/1995 | Oho et al. . |
| 5,811,884 | * | 9/1998 | Matuoka et al. .................... 307/10.1 |
| 5,828,192 | * | 10/1998 | Kawaguchi et al. ................. 318/139 |

* cited by examiner

*Primary Examiner*—Matthew Nguyen
(74) *Attorney, Agent, or Firm*—Evenson, McKeown, Edwards & Lenahan, PLLC

(57) ABSTRACT

A power supply line is wired in a loop from a battery power supply, and a power supply relay circuit is installed intermediately of the power supply line such that power is supplied from the power supply relay circuit to an electric load connected to a terminal unit of an intensive wiring line. By this arrangement, not only wires for control signals but also wires for power supply can be reduced. The terminal unit may serve also as the power supply relay circuit.

3 Claims, 98 Drawing Sheets

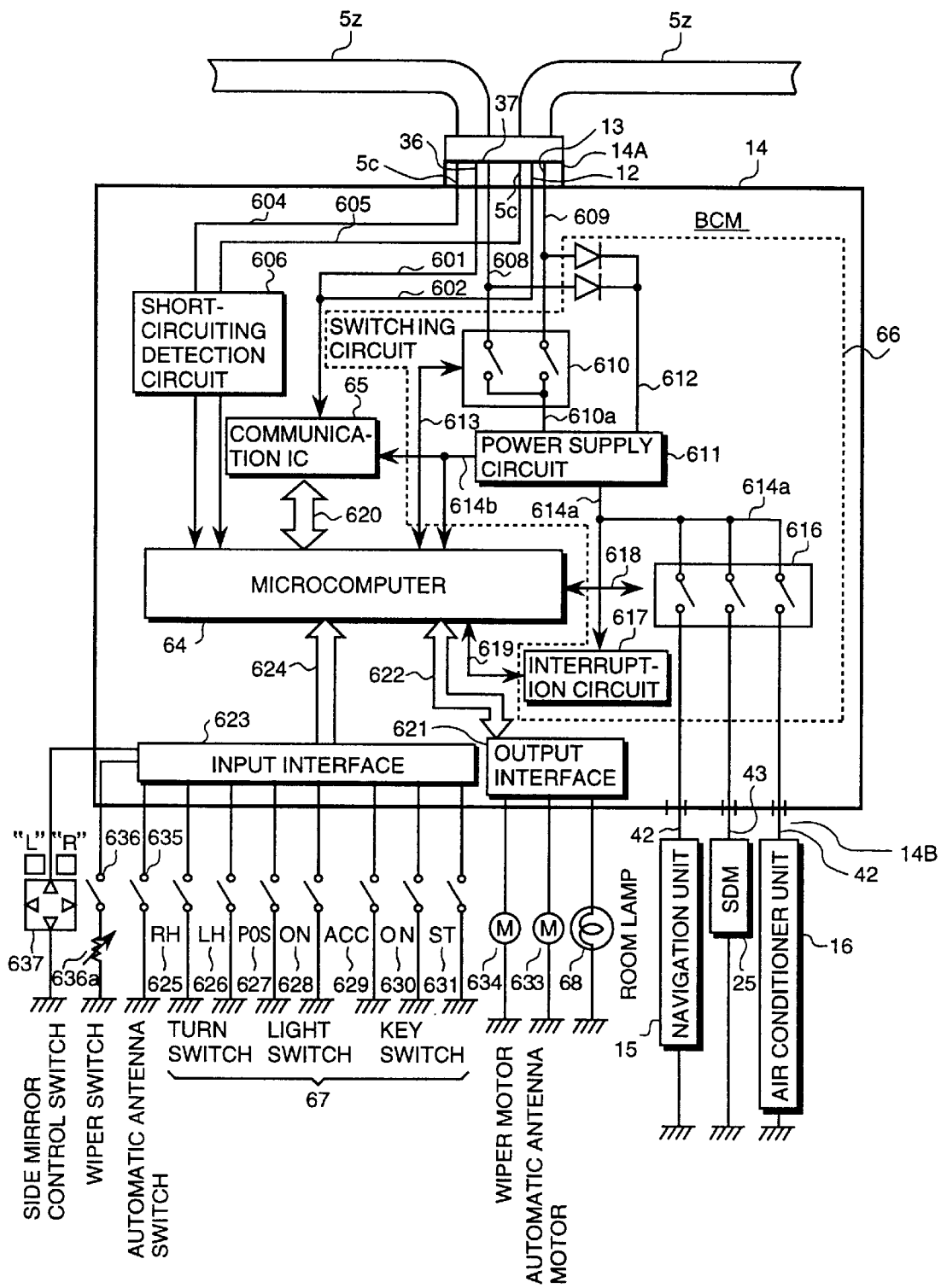

FIG. 24

| Module | | | | | | | | | | | | | | | | |
|---|---|---|---|---|---|---|---|---|---|---|---|---|---|---|---|---|
| BCM | 15 | KEY SW ACC | KEY SW ON | KEY SW ST | LIGHT SW POS | LIGHT SW ON | TURN SW RH | TURN SW LH | 7 | LAMP DIAGNOSIS1 | LAMP DIAGNOSIS2 | — | — | — | — | 0 |
| FIM | 15 | CL DIAGNOSIS1 | CL DIAGNOSIS2 | TRN-L DIAGNOSIS1 | TRN-L DIAGNOSIS2 | TRN-R DIAGNOSIS1 | TRN-R DIAGNOSIS2 | HL DIAGNOSIS1 | 7 | HL DIAGNOSIS2 | HORN DIAGNOSIS1 | HORN DIAGNOSIS2 | SHORT-CIRCUITING DETECTION(1) | SHORT-CIRCUITING DETECTION(2) | | 0 |
| DDM | 15 | P/W UP | P/W DN | DOOR LK | DOOR UL | — | — | — | 7 | P/W(1) DIAGNOSIS1 | P/W(1) DIAGNOSIS2 | P/W(2) DIAGNOSIS1 | P/W(2) DIAGNOSIS2 | DOOR(1) DIAGNOSIS1 | DOOR(1) DIAGNOSIS2 | DOOR(2) DIAGNOSIS1 | DOOR(2) DIAGNOSIS2 | SHORT-CIRCUITING DETECTION | 0 |
| PDM | 15 | P/W UP | P/W DN | DOOR LOCK DETECTION | — | — | — | — | 7 | P/W(1) DIAGNOSIS1 | P/W(1) DIAGNOSIS2 | P/W(2) DIAGNOSIS1 | P/W(2) DIAGNOSIS2 | DOOR(1) DIAGNOSIS1 | DOOR(1) DIAGNOSIS2 | DOOR(2) DIAGNOSIS1 | DOOR(2) DIAGNOSIS2 | SHORT-CIRCUITING DETECTION | 0 |
| DSM | 15 | SLIDE FORWARD | SLIDE BACKWARD | RECLINING FORWARD | RECLINING BACKWARD | — | — | — | 7 | SLIDE(1) DIAGNOSIS1 | SLIDE(1) DIAGNOSIS2 | SLIDE(2) DIAGNOSIS1 | SLIDE(2) DIAGNOSIS2 | RECLINING(1) DIAGNOSIS1 | RECLINING(1) DIAGNOSIS2 | RECLINING(2) DIAGNOSIS1 | RECLINING(2) DIAGNOSIS2 | SHORT-CIRCUITING DETECTION | 0 |
| IPM | 15 | TRUNK OPEN | BRAKE SW | PARKING SW | TRN-R DIAGNOSIS1 | TRN-R DIAGNOSIS2 | TRN-L DIAGNOSIS1 | TRN-L DIAGNOSIS2 | 7 | BRAKE DIAGNOSIS | CL DIAGNOSIS | HD DIAGNOSIS | — | — | — | — | 0 |
| RIM | 15 | CL DIAGNOSIS1 | CL DIAGNOSIS2 | TRN-L DIAGNOSIS1 | TRN-L DIAGNOSIS2 | TRN-R DIAGNOSIS1 | TRN-R DIAGNOSIS2 | STOP DIAGNOSIS1 | 7 | STOP DIAGNOSIS2 | TRUNK DIAGNOSIS1 | TRUNK DIAGNOSIS2 | SHORT-CIRCUITING DETECTION(1) | SHORT-CIRCUITING DETECTION(2) | | | 0 |

FIG.25

| | | | | | | | | | | | | | | | | |
|---|---|---|---|---|---|---|---|---|---|---|---|---|---|---|---|---|
| BCM | 15 | — | — | — | — | — | — | — | — | LAMP OUTPUT | INTERRUPTION OUTPUT | POWER SUPPLY SWITCHING(1) | POWER SUPPLY SWITCHING(2) | SWITCH SWITCHING(1) | SWITCH SWITCHING(2) | 0 |
| FIM | 15 | — | — | — | — | — | — | CL OUTPUT | TRN-L OUTPUT | TRN-R OUTPUT | HL OUTPUT | HORN OUTPUT | INTERRUPTION OUTPUT | POWER SUPPLY SWITCHING(1) | POWER SUPPLY SWITCHING(2) | SWITCH SWITCHING(1) | SWITCH SWITCHING(2) | 0 |
| DDM | 15 | — | — | — | — | — | — | — | — | P/W UP | P/W DN | DOOR LK | DOOR UL | INTERRUPTION OUTPUT | — | — | — | — | 0 |
| PDM | 15 | — | — | — | — | — | — | — | — | P/W UP | P/W DN | DOOR LK | DOOR UL | INTERRUPTION OUTPUT | — | — | — | — | 0 |
| DSM | 15 | — | — | — | — | — | — | — | — | SLIDE FORWARD | SLIDE BACKWARD | RECLINING FORWARD | RECLINING BACKWARD | INTERRUPTION OUTPUT | — | — | — | — | 0 |
| IPM | 15 | HD LAMP | CL LAMP | BRAKE LAMP | TRN-R LAMP | TRN-L LAMP | AIR BACK ALARM | ABS ALARM | ENGINE ALARM | — | — | — | — | INTERRUPTION OUTPUT | HARNESS TROUBLE | DISCONNECTION OCCURRENCE | SHORT-CIRCUITING OCCURRENCE | 0 |
| RIM | 15 | CL OUTPUT | TRN-L OUTPUT | TRN-R OUTPUT | STOP OUTPUT | TRUNK OUTPUT | — | — | — | — | — | — | — | INTERRUPTION OUTPUT | POWER SUPPLY SWITCHING(1) | POWER SUPPLY SWITCHING(2) | — | 0 |

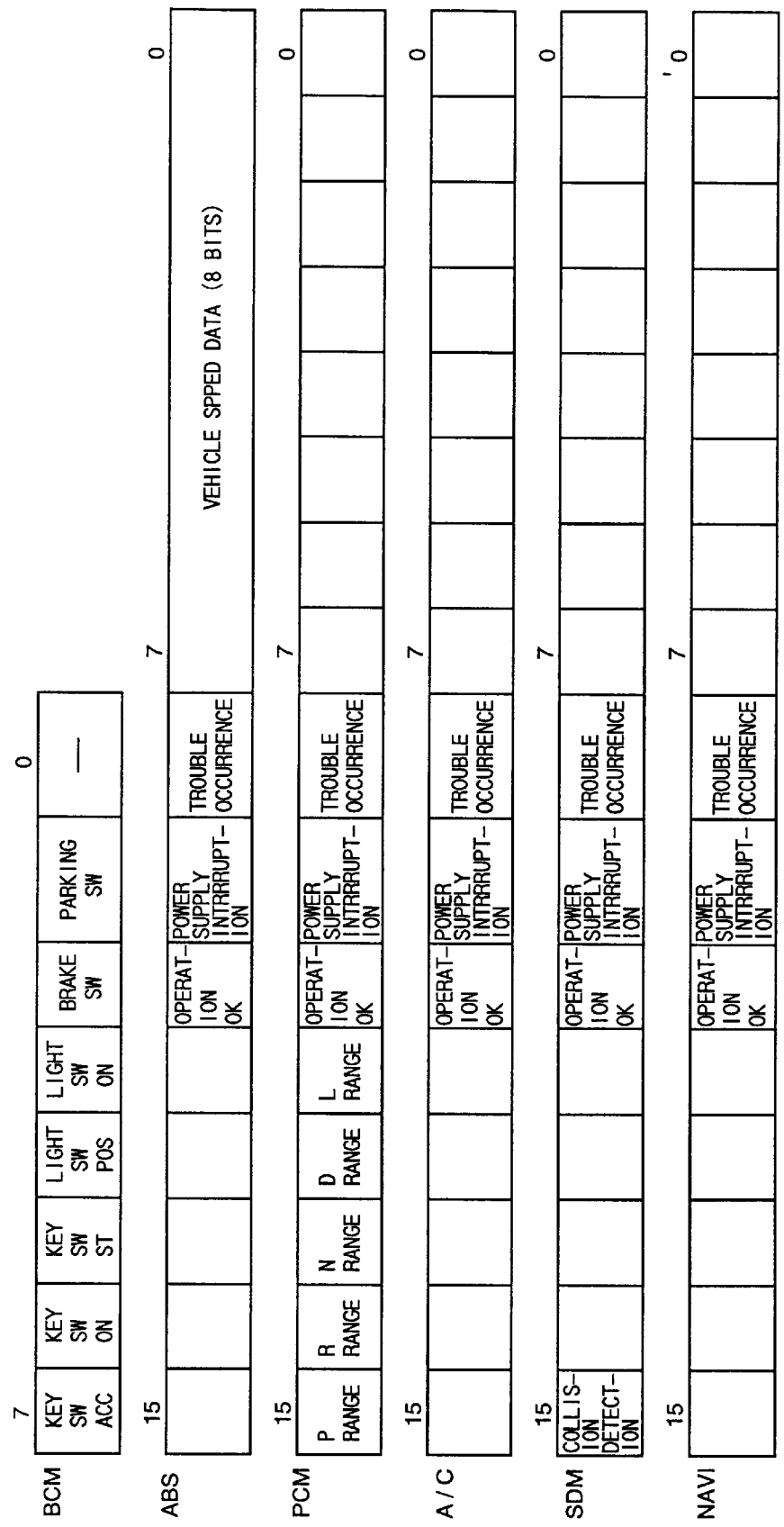

FIG.43

1. INTIALIZATION : DIRECTION SETTING OF INPUT/OUTPUT PORTS

| S O F | HEADER | RECEIVE ADDRESS | TRANSMIT ADDRESS | INTIALI- ZATION ID | INPUT/OUTPUT DIRECTION DATA | CRC | E O D |
|---|---|---|---|---|---|---|---|

2. ORDINARY TRANSMISSION : DIGITAL INPUT/OUTPUT DATA TRANSFER

| S O F | HEADER | RECEIVE ADDRESS | TRANSMIT ADDRESS | ORDINARY ID | INPUT/OUTPUT DATA | CRC | E O D |
|---|---|---|---|---|---|---|---|

3. DIAGNOSIS REQUEST : SAEJ1979 DIAGNOSIS REQUEST MESSAGE

| S O F | HEADER | RECEIVE ADDRESS | TRANSMIT ADDRESS | DIAGNOSIS REQUEST ID | CRC | E O D |
|---|---|---|---|---|---|---|

4. DIAGNOSIS RESPONSE : SAEJ1979 DIAGNOSIS REQUEST MESSAGE

| S O F | HEADER | RECEIVE ADDRESS | TRANSMIT ADDRESS | DIAGNOSIS REQUEST ID | DIAGNOSIS REQUEST DATA | CRC | E O D |
|---|---|---|---|---|---|---|---|

5. DATA TRANSMISSION REQUEST : MESSAGE FOR REQUESTING DATA POSSESSED BY ANOTHER NODE

| S O F | HEADER | RECEIVE ADDRESS | TRANSMIT ADDRESS | DATA REQUWSE ID | CRC | E O D |
|---|---|---|---|---|---|---|

6. SLEEP START :

| S O F | HEADER | RECEIVE ADDRESS | TRANSMIT ADDRESS | SLEEP ID | CRC | E O D |
|---|---|---|---|---|---|---|

T = TRANSMISSION
R = RECEPTION

| TRANSFER DATA | IDLE | SOF | HEADER | RECEIVE ADDRESS | TRANSMIT ADDRESS | DIGITAL | CRC | EOD | IFS | IDLE | SOF |
|---|---|---|---|---|---|---|---|---|---|---|---|
| STAGE OUTPUT | 0 | SOF | DATA | DATA | DATA | DATA | DATA | EOD | IFS | 0 | SOF |
| SELECTION REGISTER | 0 | 0 | H | RA | TA | I/O | CRC | 0 | 0 | 0 | 0 |
| BIT COUNTER | 0 | 0 | 0 1 2 3 4 5 6 7 | 0 1 2 3 4 5 6 7 | 0 1 2 3 4 5 6 7 | 0 1 2 3 4 5 6 7 × 4 | 0 1 2 3 4 5 6 7 | 0 | 0 | 0 | 0 |

| TRANSFER DATA | IDLE | SOF | HEADER | RECEIVE ADDRESS | TRANSMIT ADDRESS | DIGITAL I/O DATA | CRC | EOD | IFS | IDLE | SOF |
|---|---|---|---|---|---|---|---|---|---|---|---|
| STAGE COUNTER | 0 | 1 | 2 | 2 | 2 | 2 | 2 | 3 | 4 | 0 | 1 |
| BYTE COUNTER | 0 | 0 | 1 | 2 | 3 | 4~7 | 8 | 0 | 0 | 0 | 0 |
| BIT COUNTER | 0 | 0 | 0 1 2 3 4 5 6 7 0 1 2 3 4 5 6 7 0 1 2 3 4 5 6 7 | | | 0 1 2 3 4 5 6 7 ×4 | 0 1 2 3 4 5 6 7 | 0 | 0 | 0 | 0 |

| RECEIVE DATA | IDLE | SOF | HEADER | TRANSMIT ADDRESS | RECEIVE ADDRESS | DIGITAL | CRC | EOD | IFS | IDLE | SOF |
|---|---|---|---|---|---|---|---|---|---|---|---|
| STAGE OUTPUT | 0 | SOF | DATA | DATA | DATA | DATA | DATA | EOD | IFS | 0 | SOF |
| SELECTION REGISTER | 0 | 0 | H | TA | RA | I/O | CRC | 0 | 0 | 0 | 0 |
| BIT COUNTER | 0 | 0 | 0 1 2 3 4 5 6 7 | 0 1 2 3 4 5 6 7 | 0 1 2 3 4 5 6 7 | 0 1 2 3 4 5 6 7 × 4 | 0 1 2 3 4 5 6 7 | 0 | 0 | 0 | 0 |

DEVICE AND METHOD FOR SUPPLYING POWER TO A VEHICLE, SEMI-CONDUCTOR CIRCUIT DEVICE FOR USE IN THE SAME AND COLLECTIVE WIRING DEVICE FOR A VEHICLE OR AN AUTOMOBILE

TECHNICAL FIELD

This invention relates to a power supplying apparatus and method for a plurality of electric loads remote from a power supply, and also to a semiconductor circuit apparatus and an intensive wiring apparatus for transmission of control information for supplying power to use with the power supplying apparatus and method.

BACKGROUND ART

In a conventional power supplying apparatus for a vehicle, a power supply carried on the vehicle and each of several electric loads are connected to each other by a long power supply line with a fuse interposed therein. When a power supply line is short-circuited, the fuse is blown to disconnect the electric load from the power supply.

In control of electric loads of a conventional vehicle, a so-called multiplexing wiring system is known wherein controllers for individually controlling a plurality of electric loads are integrated into a smaller number of controllers having a communication function and a calculation function so that control signals for the electric loads are calculated by the smaller number of controllers and the control signals are transmitted to terminal equipment connected by communication lines to control several electric loads connected to each of the terminal equipment (refer to, for example, U.S. Pat. Nos. 4,771,382, 5,113,410, 4,855,896 and 5,438,506).

However, power supply lines are usually wired from a power supply directly to individual electric loads or to driving circuits for the electric loads, and the number of power supply lines is equal to or larger than the number of electric loads. Thus, and the floor or the inside of the body of a vehicle is full of wiring lines.

Accordingly, basically it is a principle object of the present invention to provide a novel power supplying apparatus for a vehicle. More specifically, it is an object of the present invention to reduce power supply lines of a power supplying apparatus for a vehicle. It is another object of the present invention to eliminate a fuse. It is a further object of the present invention to provide a novel power supplying method. It is a still further object of the present invention to provide a novel semiconductor circuit apparatus for use for in supplying power. It is a yet further object of the present invention to provide a novel intensive wiring apparatus integrated with a power supply control system. It is a yet further object of the present invention to provide a novel power supplying apparatus for a particular electric load of an automobile. It is a yet further object of the present invention to provide a novel apparatus for detecting short-circuits in a power supply line. The objects recited above are solved by different solutions disclosed hereinbelow or in the appended claims.

DISCLOSURE OF INVENTION

According to a first aspect of the present invention, since two power supply lines are led out from one of the poles of a power supply such that power can be supplied from both power supply lines to electric loads, a novel power supplying apparatus wherein, even if one of the lines is short-circuited, supply of power can be maintained from the other line can be provided.

According to another aspect of the present invention, since an electric switching apparatus for controlling the connection and disconnection between a power supply line and an electric load is provided in a relay circuit arranged between the power supply line and the electric line such that, when the power supply line is short-circuited, the switching apparatus is operated to disconnect the electric load from the circuit, a fuse can be eliminated.

According to a further aspect of the present invention, since power transmission lines of a closed loop are formed from power supply lines connected to one of two poles of a power supply such that power can be supplied from the opposite sides of a connection point of an electric load so that, even if short-circuiting or disconnection occurs with one of the transmission lines, supply of power can be continued from the other side of the transmission line, the number of electric loads which are rendered uncontrollable by a failure of a transmission line can be reduced.

According to a still further aspect of the present invention, since a network is formed from power supply lines similar to communication lines to construct a multiplexing wiring system which can handle both control signals and power, the power supply lines are also aggregated and the number of electric wires can be reduced.

According to a yet further aspect of the present invention, since power supplying apparatus for electric loads for an air conditioner control unit, a power train control unit, a lamp control unit, a navigation unit, an anti-lock braking control unit, a window opening and closing motor control unit, a display circuit control unit for an instrument panel, a rear defogger controlling unit, a beacon control unit and so forth, are formed from a novel power supplying apparatus of the present invention, those electric loads in an automobile can be controlled with a reduced number of wiring lines.

BRIEF DESCRIPTION OF DRAWINGS

FIG. 6 is a functional block diagram of a BCM;

FIG. 24 is a drawing showing input data tables of individual units;

FIG. 25 is a drawing showing output data (transmission) tables of the individual units;

FIG. 26 is a drawing showing output data tables for an ABS, an SDM, an air conditioner control unit, a PCM and a navigation unit;

FIG. 43 is a diagram illustrating transmission data formats;

BEST MODE FOR CARRYING OUT THE INVENTION

Figure 1:
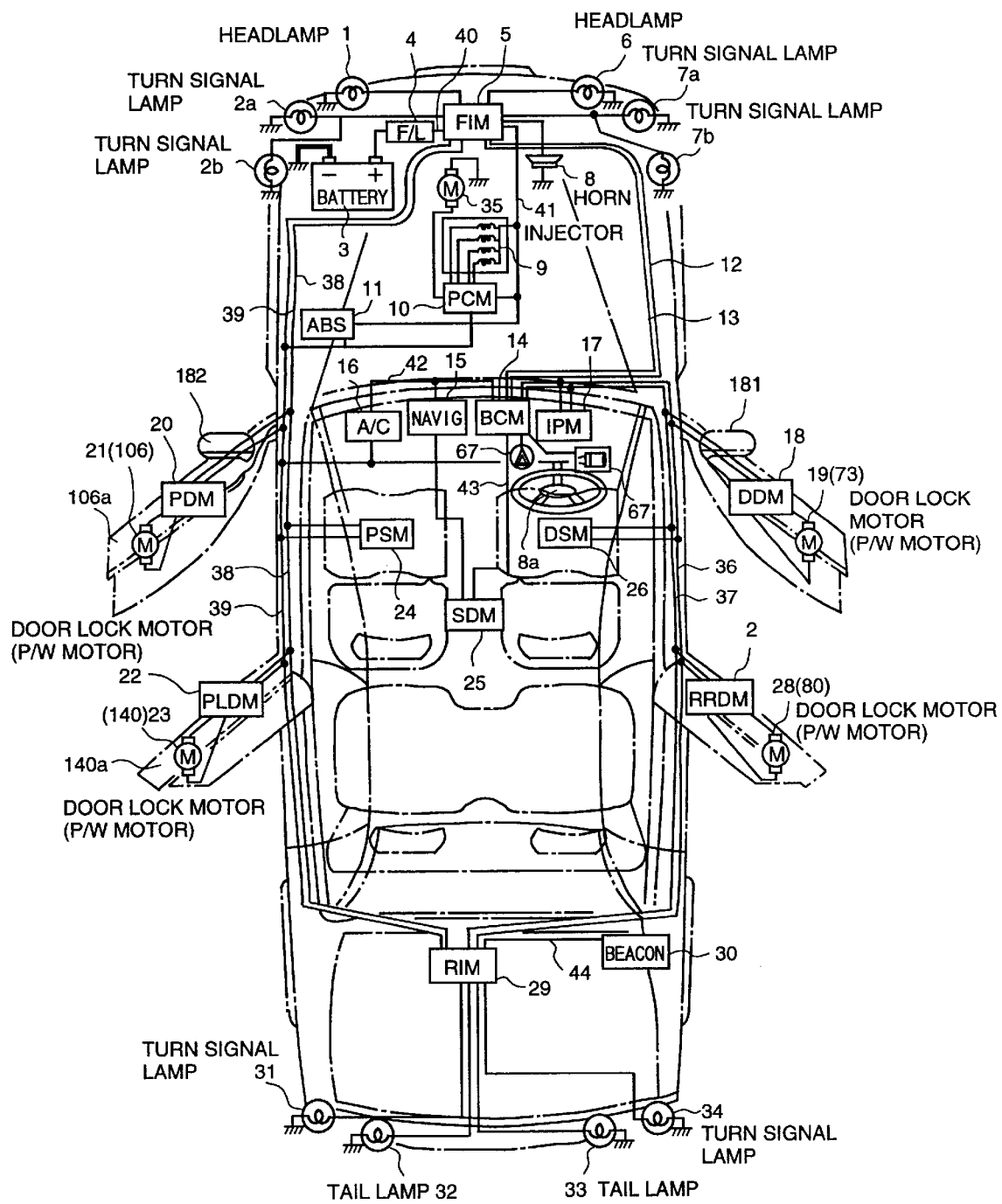
FIG. 1 is a view of an entire power supplying system for an automobile to which the present invention is applied.
Figure 2:
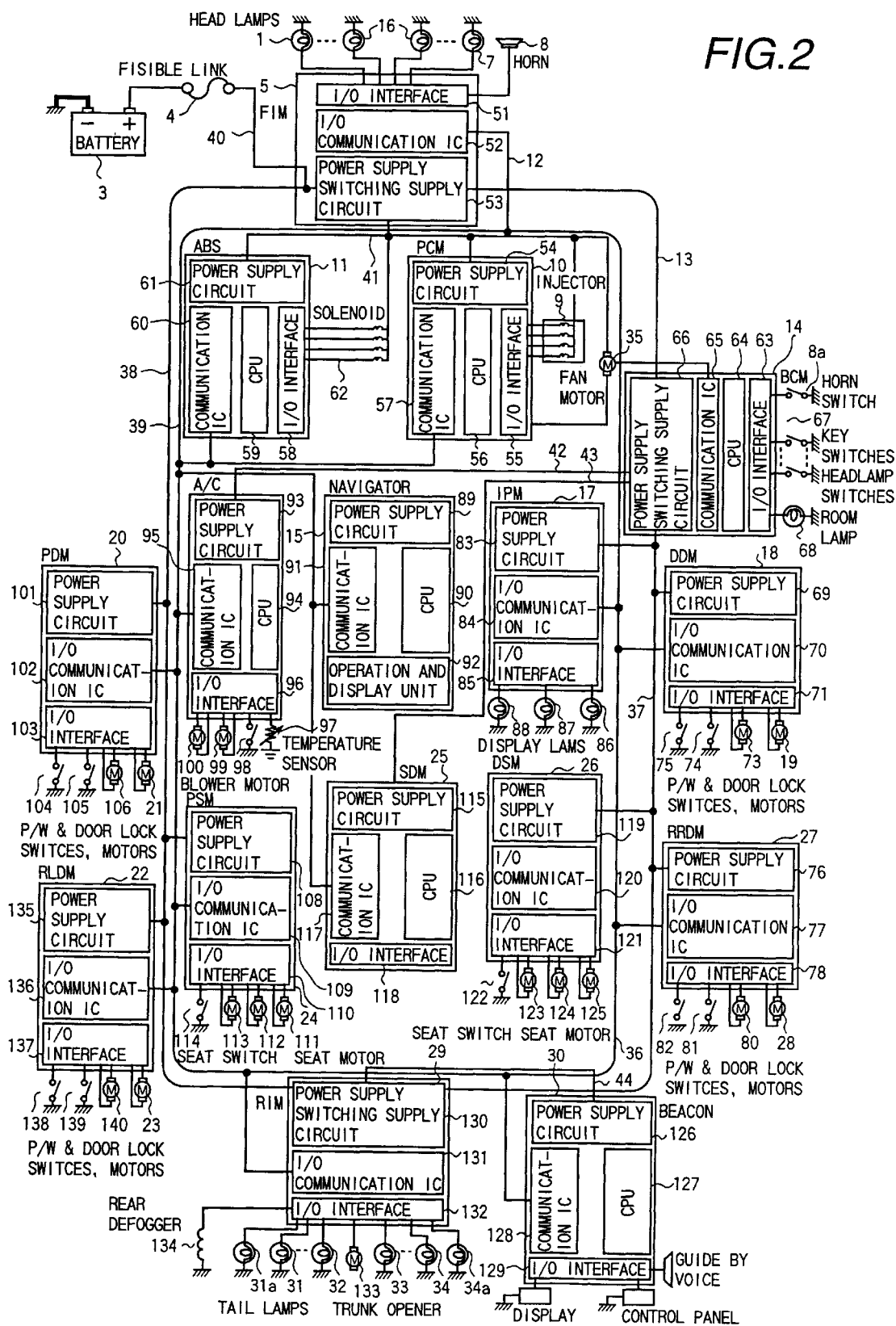
FIG. 2 is a functional block diagram of the power supplying system.

FIG. 1 is a view of an entire system for an automobile to which the present invention is applied, and FIG. 2 is a functional block diagram of the system. Reference numeral 3 denotes a battery which supplies power to the entire vehicle via a fusible link 4. Reference numeral 10 denotes a power train control module (PCM) which effects control of the fuel injection amount or the ignition timing of an engine and control of an engine transmission and is mounted in the proximity of the engine (for example, on an outer wall of an intake manifold, in the inside of a surge tank or the like) around which sensors and/or actuators are provided for controlling the engine which is an object of control. A set of actuators as electric loads, such as several sensors, for example, an air flow meter and a water temperature sensor, injectors 9 and a fan motor 35 for cooling the engine are connected to the PCM 10. Reference numeral 11 denotes an anti lock braking system (ABS) control module, which is mounted rearwardly of an engine compartment adjacent to an ABS actuator. Reference numeral 16 denotes an air conditioner (A/C) control unit which is disposed in the proximity of a dashboard on the passenger's seat adjacent A/C sensors and actuators. Reference numeral 25 denotes an air bag control module (SDM), which is mounted in the proximity of a center console. Reference numeral 15 denotes a navigation control module (NAVI), which is carried in the proximity of a display section of an instrument panel. Reference numeral 30 denotes a beacon control module (beacon), which is installed in a trunk compartment. Reference numeral 14 denotes a body control module (BCM), to which devices and/or key switches in the proximity of a steering wheel are connected and which is installed in the proximity of the dashboard. Each of the modules at least has an arithmetic processing unit (cpu) communication means (communication IC) for communicating data with the other modules. Each module is installed in the proximity of a sensor or a device such as an electric load connected to the module so that the harness length between the module and each of the devices connected to the module may be minimized. A front integrated module (FIM) 5 is disposed at front locations of the engine compartment adjacent headlamps 1 and 6 or turn signal lamps 2a, 2b, 7a and 7b and is connected so as to drive the headlamps 1 and 6, the turn signal lamps 2a, 2b, 7a and 7b, a horn 8 and so forth mounted in the proximity. An instrument panel module (IPM) 17 is a module mounted in an instrument panel meter case and drives lamps and meters in the instrument panel. A driver door module (DDM) 18, a passenger door module (PDM) 20, a rear right door module (RRDM) 27 and a rear left door module (RLDM) 22 are carried on doors on the driver's seat side, the passenger's seat side, the right side of the rear seat and the left side of the rear seat, respectively, and door lock motors 19 and 21, power window (19a, 20a) motors 73 and 106, door lock switches 74 and 105, power window switches 75 and 104, motors (not shown) for electrically driven mirrors 19b and 20b and so forth are connected to them. A driver seat module (DSM) 26 and a passenger seat module (PSM) 24 are mounted underneath the seats on the driver's seat side and the passenger's seat side, respectively, and electrically driven seat motors 111 to 113 and 123 to 125, seat switches 114 and 122 and so forth are connected to them. A rear integrated module (RIM) 29 is disposed at a front portion of the trunk compartment adjacent tail lamps 32 and 33 and turn signal lamps 31 and 34 and is connected to drive, in addition to the tail lamps 32 and 33 and the turn signal lamps 31 and 34, a trunk opener motor 133, a rear defogger 134 and so forth. The FIM 5, RIM 29, IPM 17, DDM 18, PDM 20, RRDM 27, RLDM 22, DSM 26 and PSM 24 have communication means 52, 131, 84, 70, 102, 77, 136, 120 and 109 to communicate data between different modules, and input/output interfaces 51, 132, 85, 71, 103, 78, 137, 121 and 110 to which sensors, switches and external electric loads are connected, but, in the present embodiment, do not have an arithmetic processing unit (CPU). (Naturally, they may have an arithmetic processing unit (CPU)). As multiplexed communication lines along which data are communicated between different modules, a line 12 is connected to extend from the FIM 5 to the BCM 14, and a line 36 is connected to extend from the BCM 14 to the RIM 29 while a line 39 is connected to extend from the RIM 29 to the FIM 5, and the multiplex communication lines are wired in a loop in the vehicle. The other modules, that is, the IPM 17, DDM 18, PDM 20, RRDM 28, RLDM 22, DSM 26, PSM 24, PCM 10, ABS 11, A/C 16, navigation control module 15 and SDM 25 are connected individually, branching from locations near the lines 12, 36 and line 39 arranged in the loop. In this manner, since each module is disposed in the proximity of a device connected to the module and input data and output data of any device which is not connected to the module are transmitted or received via the multiplexed communication lines, the necessity for connection of the module to a device located remotely by a wire in order to acquire data necessary for the module is eliminated, and consequently, wiring lines for signal transmission, that is, harnesses, can be reduced. A power supply line from the battery 3 is connected to the FIM 5 by a power supply line 40 via the fusible link 4, and connected by a power supply line 13 between the FIM 5 and the BCM 10, by another power supply line 37 between the BCM 10 and the RIM 29 and by a further power supply line 38 between the RIM 29 and the FIM 5, and is disposed in a loop in the vehicle compled with the multiplexed communication lines 12, 36 and 39. The IPM 17, DDM 18, PDM 20, RRDM 27, RLDM 22, DSM 26 and PSM 24 which are modules which must operate irrespective of an ON or OFF position of an ignition key switch 67 are connected branching from locations the power supply lines 13, 37 and 38 arranged in a loop so that electric power may be supplied to them. From near the FIM 5, power is supplied via a power supply line 41 to the modules, actuators and so forth of the PCM 10 and the ABS 11 mounted in the engine room. From the BCM 10, power is supplied to the A/C 16, navigation control module 15, SDM 25 and actuators and sensors mounted in the compartment by power supply lines 42 and 43. Further, from the RIM 29, power is supplied to the beacon 30 and actuators and sensors mounted in the trunk compartment by a power supply line 44. Since the power supply lines are wired in a loop in the vehicle and the modules to which power is inputted from the power supply lines wired in a loop and which supplies the power to the different modules, actuators, sensors and so forth are disposed one by one in the engine compartment, the passenger compartment and the trunk compartment (since, in the present embodiment, they are formed from the FIM, BCM and RIM, respectively), such a situation that power supply lines are wired in multiples in the vehicle is eliminated, and wire harnesses in the vehicle can be further reduced.

Figure 3:
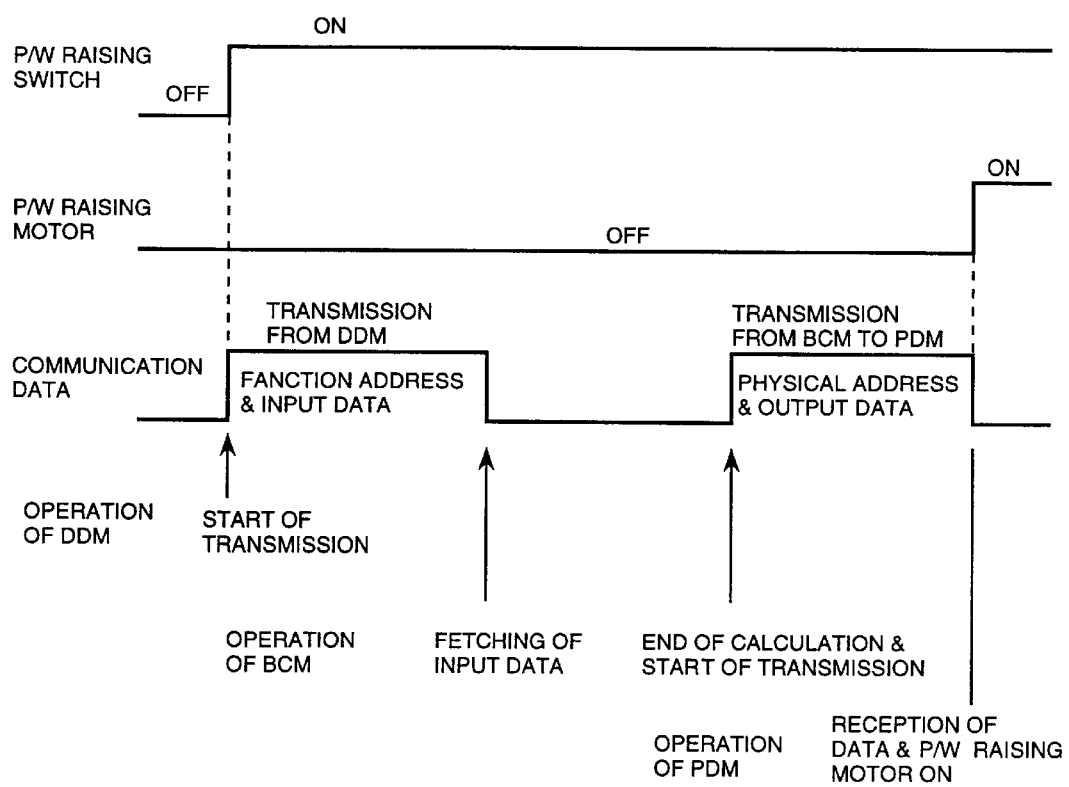
FIG. 3 is a diagram illustrating the operation of the power supplying system.

FIG. 2 is a functional block diagram of the system. The FIM 5 includes a power supply switching supply circuit 53, an I/O communication IC 52 and an I/O interface 51. A power supply line from the positive termimal of the battery 3 is connected to the power supply and switching circuit 53 via the fusible link 4, and connected also to the RIM 29 via the power supply line 38. Further, the power supply line from the battery is supplied to the BCM 14 by the power supply line 13 via the power supply and switching circuit 53, and from the power supply and switching circuit 53, power is supplied to such modules as the PCM 10 and the ABS 11, such actuators as the injectors 9 and the fan motor 35 and sensors installed in the engine compartment via the power supply line 41. The I/O communication IC 52 is connected to the communication line 12 so that it transmits and receives data to and from the other modules. The ON/OFF of the power to be supplied to the power supply line 41 is controlled by data received by the I/O communication IC 52. The I/O interface 51 is connected to the actuators for the headlamps 1, 2, 6 and 7 and the horn 8 mounted in the proximity of the FIM 5 such that those actuators are driven by signals from the I/O communication IC 52 and a signal (not illustrated in FIG. 2) inputted to the FIM 5 is transmitted to the I/O communication IC 52. The RIM 29 includes a power supply and switching circuit 130, an I/O communication IC 131 and an I/O interface 132 which are the same as those of the FIM 5. From the power supply and switching circuit 130, power is supplied also to the module of the beacon 30, actuators and sensors (not shown in FIG. 2) installed in the trunk room via the power supply line 44. The I/O communication IC 131 is connected to the communication line 36 so that it transmits and receives data to and from the other modules. The I/O interface 132 is connected to such actuators as the tail lamps 31, 32, 33 and 34, trunk opener motor 133 and rear defogger 134 mounted in the proximity of the RIM 29 such that it drives those actuators with signals from the I/O communication IC 131 and transmits a signal (not illustrated in FIG. 2) inputted to the RIM 29 to the I/O communication IC 131. The BCM 14 includes a power supply and switching circuit 66, a communication IC 65, a CPU 64 and an I/O interface 63. The power supply lines are connected by the power supply and switching circuit 66 of the BCM 14 and the power supply and switching circuits 53 and 130 of the FIM 5 and RIM 29 and is connected in a loop passing the three modules. The BCM 14 is mounted in the proximity of the driver's seat dashboard, and the switches 67 around the driver's seat such as the ignition key switch, headlamp switch, turn signal switch and hazard lamp switch, sensors, and actuators for a wiper motor (not shown), a motor for an automatic antenna and so forth are connected to the I/O interface 63. The BCM 14 manages and controls ON/OFF of power to be supplied from the power supply and switching circuits 53 and 130 of the FIM 5 and RIM 29 and all of the inputs and outputs of the FIM 5, RIM 29, DDM 18, PDM 20, RRDM 27, RLDM 22, IPM 17, DSM 26 and PSM 24 in a centralized manner. As seen in FIG. 6, from the power supply and switching circuit 66, power is supplied to the modules (in the present embodiment, the navigation control module 15, A/C 16 and SDM 25) and sensors in the compartment, a room lamp 68 and the actuators such as the wiper motor, automatic antenna motor and so forth in response to a state of the ignition key switch. The communication IC 65 is connected to the communication line 36 so that it transmits and receives data to and from the other modules. The CPU 64 fetches input data for the electric loads connected directly to the CPU 64 and data from the other modules received by the communication IC 65, performs calculation processing based on the data, outputs driving signals for the actuators connected directly to the CPU 64 in response to a result of the calculation and further transmits the result of the calculation to the other modules via the communication IC 65. The DDM 18, PDM 20, RRDM 27 and RLDM 22 are modules mounted on the doors, and include power supply circuits 69, 101, 76 and 135 and I/O communication ICs 70, 102, 77 and 136, and I/O interfaces 71, 103, 78 and 137, respectively. The power supply circuits 69, 101, 76 and 135 are configured so as to receive a supply of power from the power supply lines which are connected in a loop between the modules of the BCM 14, RIM 29 and FIM 5 and supply the power to the power supply of the modules and to the actuators and to the sensors. The I/O communication ICs 70, 102, 77 and 136 are connected to the communication lines so that they transmit and receive data to and from the other modules. The I/O interfaces 71, 103, 78 and 137 are connected to such actuators as the door lock motors and the power windows (hereinafter referred to as P/W) mounted in the individual doors such that they drive the actuators with signals from the I/O communication ICs 70, 102, 77 and 136 and transmit input signals from the P/W switches and switches regarding the door locks to the I/O communication ICs 70, 102, 77 and 136. The DSM 26 and the PSM 24 are modules mounted underneath the driver's seat and the passenger's seat, respectively, and include power supply circuits 119 and 108, I/O communication ICs 120 and 109, and I/O interfaces 121 and 110, respectively. The power supply circuits 119 and 108 are constructed so as to receive the supply of power from the power supply lines connected in a loop between the BCM 14, RIM 29 and FIM 5 and supply the power to the power supply of the modules, to actuators and to sensors. The I/O communication ICs 120 and 109 are connected to the communication lines so that they transmit and receive data to and from the other modules. The I/O interfaces 121 and 110 are connected to the actuators such as seat motors mounted in the proximities of them such that they drive the actuators with signals from the I/O communication ICs 120 and 109 and transmit inputs signals of the seat switches to the I/O communication ICs 120 and 109. The IPM 17 is a module mounted in the instrument panel meter and includes a power supply circuit 83, an I/O communication IC 84 and an I/O interface 85. The power supply circuit 83 receives supply of power from the power supply lines connected in a loop between the BCM 14, RIM 29 and FIM 5 and supply the power to the power supply of the module, to actuators and to sensors. The I/O communication IC 84 is connected to the communication lines so that it transmits and receives data to and from the other modules. The I/O interface 85 is connected to actuators of display lamps 86, 87 and 88 mounted on the instrument panel such that it drives the actuators with signals from the I/O communication IC 84 and transmits input signals from switches provided on the panel to the I/O communication IC 84. The PCM 10, ABS 11, navigation control module 15, A/C 16, SDM 25 and beacon 30 include power supply circuits 54, 61, 89, 93, 115 and 126, communication ICs 57, 60, 91, 95, 117 and 128, CPUs 56, 59, 90, 94, 116 and 127 and I/O interfaces 55, 58, 96, 118 and 129 or an operation and display unit 92. Those modules have CPUs and perform calculation processing and communication control regarding respective objects of control. The power supply circuits 54, 61, 89, 93, 115 and 126 are constructed so as to receive power supplied thereto from the BCM 14, RIM 29 and FIM 5 and supply the power to the power supply of the modules, to actuators and to sensors. The communication ICs 57, 60, 91, 95, 117 and 128 are connected to the communication line so that they transmit and receive data to and from the other modules. The I/O interfaces 55, 58, 96, 118 and 129 are connected to actuators such as fuel supplying injectors of the engine, driving solenoids for hydraulic valves for the ABS and the blower motor mounted in the proximities of them such that they drive them in accordance with calculation results of the respective CPUs and transmit input signals thereto to the CPUs 56, 59, 90, 94, 116 and 127. The I/O communication ICs built in the FIM 5, RIM 29, DDM 18, PDM 20, RRDM 27, RLDM 22, IPM 17, DSM 26 and PSM 24 have respective unique physical addresses and are each constructed such that it fetches, when an address signal same as the physical address of the I/O communication IC appears on the communication lines, a signal following the address signal, outputs the signal to the I/O interface, then outputs input data from an electric load connected to the I/O interface to the communication lines, and, if a change appears in the electric load connected to the I/O interface, then transmits a function address representing contents that "input data from an electric load to the I/O interface are transmitted" first and then outputs input data of the I/O interface to the communication line. Since the communication function is restricted in manner, a module construction which does not require a CPU can be used. A module having this I/O communication IC is generally referred to as an LCU (Local Control Unit). The communication ICs built in the BCM 14, PCM 10, ABS 11, navigation control module 15, A/C 16, SDM 25 and beacon 30 are constructed so that control of transmission and reception is performed by a CPU. In particular, also the timing at which transmission is to be started and the transmission data are controlled by a signal from the CPU, and not only reception according to the physical address peculiar to the CPU but also a function address can be discriminated by the CPU to fetch or ignore data following the function address. In the following, operation is described with reference to FIG. 3. As an example, a case wherein the P/W raising switch on the passenger's seat side mounted on the door on the driver's seat side is depressed to raise the P/W on the passenger's seat will be described. If the P/W raising switch on the passenger's seat side mounted on the door on the driver's seat is depressed, then the level of a signal of the passenger's seat P/W raising switch inputted to the DDM 18 changes from high to low. This variation in input acts as a trigger, and the I/O communication IC 70 of the DDM 18 starts transmission of all input data connected to the I/O interface 71 and outputs a signal to the communication lines. The signal outputted includes information representing transmission of the input data of the DDM 18 and the actual input data. The information outputted to the communication lines is inputted to all of the modules. However, the I/O communication IC ignores following data since the information does not present the physical address of the I/O communication IC. The CPUs of the modules in which communication ICs are built are programmed so that they individually discriminate their function addresses and the communication ICs other than that of the BCM 14 ignore following data. The BCM 14 fetches the input data of the DDM outputted from the DDM 18 and performs discrimination calculation processing based on the data. Whereas this discrimination calculation processing may be performed immediately after the data are received, in the present embodiment, it is executed after each fixed interval of time. Since the P/W motor for the passenger's seat is changed from stopping to driving based on a result of the discrimination calculation processing, the BCM 14 outputs the physical address of the PDM 20 connected to the passenger's seat P/W motor, whose output should be changed, to the communication lines and then transmits output data to all of the actuators connected to the PDM 20. Whereas the signal on the communication lines outputted from the BCM 14 is inputted to all of the modules, only the PDM 20 whose physical address coincides with the signal receives the data. The PDM 20 outputs the received data to the I/O interface 103 to drive the actuator. In this instance, since the signal of the P/W motor is ON, the P/W motor operates to raise the P/W. According to such a communication procedure as described above, the P/W of the passenger's seat can be raised by depressing the P/W raising switch on the passenger's seat side mounted on the door of the driver's seat. It is to be noted that, though not shown, where the vehicle is a four-door vehicle, four P/W rolling up switches are provided for the DDM 18 and also four P/W rolling down switches are provided. In this manner, input data to the LCU are all inputted to the BCM 14, and the BCM 14 calculates, based on the input data, control data for driving of all of the actuators connected to the LCU and transmits the control data by communication to the LCU. Since calculation processing for the control objects of the LCU is all performed by the BCM 14 in this manner, the LCU can be constructed such that it does not require a CPU which performs calculation processing. Between those modules which include a CPU, transmission and reception between the modules based on a physical address and simultaneous transmission and reception between a plurality of modules based on a functional address are performed. As an example, vehicle speed data are described. A vehicle speed sensor 1008A is connected to the PCM 10 (refer to FIG. 62) so that a vehicle speed is detected by the PCM 10. The PCM 10 outputs a functional address representing contents that vehicle speed data are outputted to the communication lines and then outputs the vehicle speed data.

Since the LCU cannot receive a functional address, it cannot fetch vehicle speed data. Each of the modules which require such vehicle speed data (in the present embodiment, the navigation control module 15, ABS 11, SDM 25, beacon 30 and BCM 14) discriminates the functional address and, if it discriminates that vehicle speed data are transmitted, receives following vehicle speed data and reflects the vehicle speed data on its respective control. In the present embodiment, the output of the LCU cannot be controlled directly from any module other than the BCM 14 which includes a CPU. All information necessary to control the LCU is inputted to the BCM 14 so that the output of the LCU is controlled by the BCM 14.

Figure 4:
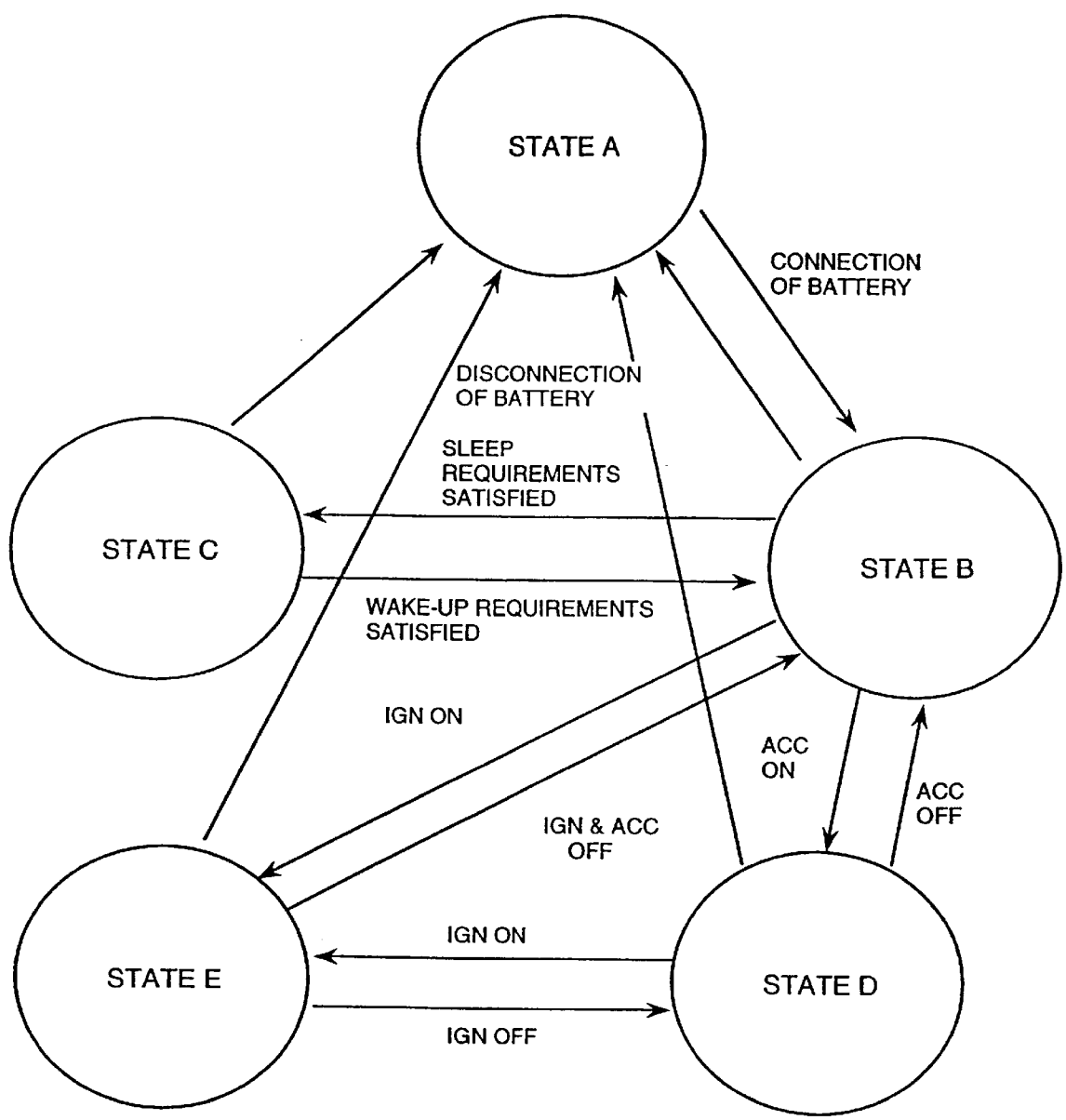
FIG. 4 is a state transition table of the operation of the power supplying system.

FIG. 4 is a state transition table of operation. The state A is a state wherein the battery is disconnected and all of the modules are unpowerwd. The state B is a state wherein those modules to which power is always supplied while the battery is connected (in the present embodiment, the BCM 14, FIM 5, RIM 29, DDM 18, PDM 20, RRDM 27, RLDM 22, IPM 17, DSM 26 and PSM 24) are operative, but power is not supplied to the other modules. The state C is a state wherein those modules to which power is supplied in the state B stand by for operation, that is, sleep. The state D is a state wherein the ignition key switch is at the accessory position (hereinafter referred to as ACC) and the modules to which power is supplied in the state B are operative and besides power is supplied to those modules to which power is supplied when the ACC is ON (the navigation control module 15, the A/C 16 and a radio and so forth which are not described in the present embodiment) so that the modules are operating. The state E is a state wherein the ignition key switch is at the ignition position (hereinafter referred to as IGN) and the modules to which power is supplied in the state B are operative and besides power is supplied to those modules to which power is supplied when the IGN is ON (in the present embodiment, the PCM 10, ABS 11, SDM 25 and beacon 30) so that they are operating. If the battery is connected in the state A, then the BCM 14, FIM 5, RIM 29, DDM 18, PDM 20, RRDM 27, RLDM 22, IPM 17, DSM 26 and PSM 24 start their operation. The I/O interfaces of the FIM 5, RIM 29, DDM 18, PDM 20, RRDM 27, RLDM 22, IPM 17, DSM 26 and PSM 24 are put into a high impedance state which is an all port initial state, and the I/O communication IC is put into a standby state. The BCM 14 transmits, after the initialization of the CPU 64, communication IC 65 and I/O interface 63, input/output directions of the I/O interfaces of all of the LCUs and initial output data to the LCUs from the communication lines to effect initialization of all of the LCUs. Thereafter, input data to all of the LCUs are received and ordinary control is entered. In this state, if some operation is performed, control corresponding to the operation (for example, door locking control) is performed. If, in this state, no operation is performed for more than a predetermined time (in the present embodiment, 30 seconds) and the state wherein all outputs are off continues, then the BCM 14 discriminates that the vehicle is in a state left as it is and executes a procedure of entering a sleep state of the state C. First, the BCM 14 outputs a sleep command at least once to the communication lines so that all of the LCUs may enter a sleep state. Each of the LCUs having received the sleep command stops an oscillation circuit of the I/O communication IC or the like to enter a sleep state. The BCM 14 thereafter puts itself into a sleep state. Consequently, the state C is established. If wake-up requirements are satisfied in the sleep state of the state C, then the system now enters the state B, in which it starts its operation. The procedure of the wake-up is such that, when an input to an LCU changes, then the communication IC of the LCU varies the potential of the communication lines, and if the variation of the communication line is detected by the communication IC of the BCM, then the communication IC generates a wake-up signal to the CPU and the CPU starts its operation to operate the communication IC. Then, a wake-up command is transmitted from the communication IC to all of the LCUs to wake up, and the communication IC starts its operation. All or the LCUs start their operation in response to the wake-up command. As an example, when the vehicle is in a state left as it is, that is, when the system is in the state C, if a driver of the vehicle inserts a key into a key cylinder of a door and unlocks the door, then the input to a door unlock detection switch connected to the DDM 18 varies, and in response to the variation, the system wakes up in the procedure described above and enters the state B in which its starts its ordinary operation. Or, according to another wake-up procedure, when an input signal connected directly to the BCM varies, then a wake-up signal for the CPU is generated in response to the signal of the variation and the CPU starts its operation to render the communication IC operative. Thereafter, the communication IC transmits a wake-up command to all of the LCUs so that they may wake up to start their operation. All of the LCUs start their operation in response to the wake-up command. Transition from the state C to the state B occurs in this manner. If the ACC is turned on when the system is in the state B, then the system enters the state D. If the ACC switch connected to the BCM 14 is switched on, then the BCM 14 starts supply of power from the power supply and switching circuit 66 to the navigation control module 15, the A/C 16, and, though not shown in FIG. 2, those modules, sensors and actuators to which power is supplied when the ACC is on such as a radio. Further, the BCM 14 transmits a control signal via the communication lines so that power may be supplied from the power supply and switching circuit 130 of the RIM 29 to, though not shown in FIG. 2, a CD changer and so forth. The RIM 29 which receives the control signal starts supply of power from the power supply and switching circuit 130. If the IGN is switched on when the system is in the state B or the state D, then the BCM 14 starts supply of power from the power supply and switching circuit 66 to the module of the SDM 25, sensors, actuators and so forth. The module to which power is supplied (in the present embodiment, the SDM 25) starts its ordinary operation after it performs initialization. Further, the BCM 14 transmits a control signal via the communication line so that power may be supplied from the power supply and switching circuits 53 and 130 of the FIM 5 and the RIM 29 to the line 41 and the line 44, respectively. The FIM 5 having received the control signal starts supply of power from the power supply and switching circuit 53 to the line 41. The modules to which power is supplied (in the present embodiment, the PCM 10 and the ABS 11) start their operation after they individually perform initialization. Similarly, the RIM 29 having received the control signal starts supply of power from the power supply and switching circuit 130 to the line 44. The module to which power is supplied (in the present embodiment, the beacon 30) starts its ordinary operation after it performs initialization. If the IGN is switched off, then transition from the state E to the state D occurs, and if the IGN is off and the ACC is off, then transition from the state E to the state B occurs. The requirement for transition from the state D to the state B is that the ACC is switched off. Transition to the state A occurs from any other state if the battery is disconnected. Since power supply of the entire vehicle is managed by control signals by multiplexed communication from the BCM 14 and modules from which power is supplied are disposed in the proximity of modules, sensors and actuators to which power is supplied in this manner, the length of the power supply lines can be made short.

In the following, the various elements of the embodiment of the present invention are described in more detail with reference to the drawings.

<Description of Composite Cable>

Figure 5:
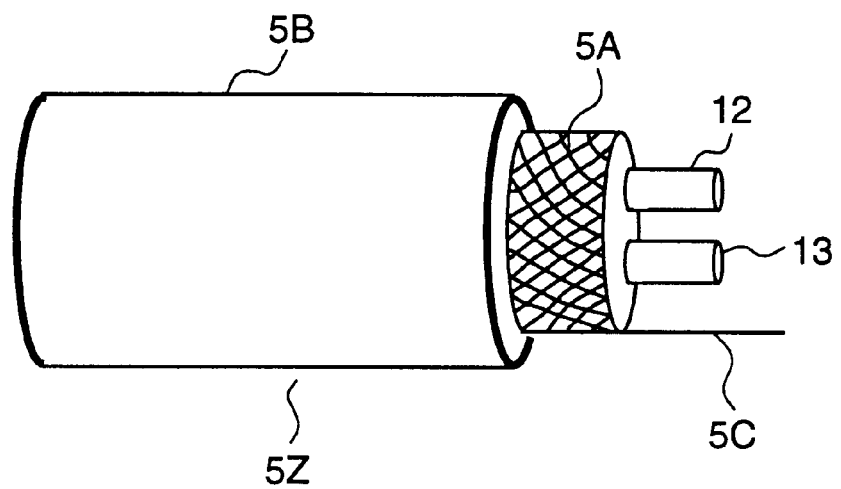
FIG. 5 is a view showing an appearance of a power supply wire for supplying power according to the present invention.

FIG. 5 is a view showing an internal construction of a power supply line and a multiplex communication line. In the present embodiment, a structure of a two core braided cable which includes a power supply line 13 (37, 38) for supplying power and a multiplex communication line 12 (36, 39) as well as a shield layer 5A which forms a short-circuiting sensor is taken. In the following description, the structure is referred to as composite multiplex communication cable 5Z. The composite multiplex communication cable 5Z is different from an ordinary shield cable in that a potential is applied to the shield layer. Since a predetermined potential is applied via a terminal 5C, if the composite multiplex communication cable 5Z is rubbed against or pinched by the vehicle body to break an insulating resin protective sheath 5B, the shield layer is first brought into contact with the vehicle body and the potential thereof drops to the ground (vehicle body ground). Therefore, by supervising the potential, a sign of occurrence of a short-circuiting accident of the power supply line can be discriminated. Further, where the shield layer is connected to the ground with a low impedance using a capacitor, there is an effect also for prevention of invasion of external noise of high frequencies or of emission of high frequency noise. Further, where the shield layer is made of a metal, since it is difficult to cut, there is an effect also for assurance of time until a short-circuiting accident of the power supply line occurs.

The composite cable is disclosed in detail in Japanese Patent Application No. 07/32647.

<Description of BCM>

FIG. 6 is a detailed block diagram of the BCM (body control module) This module is disposed in the neighborhood of the dash panel, and principally performs fetching of switches operated by a driver, supply of power to other control units installed in the proximity of the dash panel and control as a center of the power supply network using a power supply multiplex communication line which will be hereinafter described.

An actual controlling method is hereinafter described with reference to a flow chart.

The BCM 14 is connected via composite multiplex communication cables 5Z to nine modules for effecting power supply management, including the FIM (front integration module) 5 which effects power supply management of a front part of the vehicle, the DDM (driver door module) 18 which effects power supply management of the door on the driver side, the PDM (passenger door module) which effects power supply management of the door of the passenger and driver side, the RLDM (rear left door module) which effects power supply management of the rear door on the driver side, the RRDM (rear right door module) which effects power supply management of the rear door on the passenger seat side, the IPM (instrumental panel module) which effects power supply management of the meter panel of the instrument panel forwardly of the driver's seat, the RIM (rear integration module) which effects power supply management of a rear part of the vehicle, the DSM (driver's seat module) which effects power supply management of the driver's seat and the PSM (passenger seat module) which effects power supply management of the seat of the passenger's seat side. The BCM is the center which controls the modules in a concentrated manner.

Accordingly, only the BCM 14 includes a built-in microcomputer among the modules. It is to be noted that the reason why a microcomputer is built only in the BCM is that the system can be constructed at a low cost, but a microcomputer may otherwise be built in all of the modules.

The BCM 14 is connected at an input terminal 14A thereof to the composite multiplex communication cables 5Z which form a loop. Consequently, the BCM 14 is connected to the two composite multiplex communication cables 5Z, and the two communication lines 12 and 36 are logically ORed via internal communication lines 601 and 602 and inputted to the communication IC 65 so that multiplex communication is performed. The reason why the communication lines 12 and 36 are logically ORed is that it is intended to prevent disconnection or short-circuiting of one of them from having an influence on the other of them.

A potential signal of the shield line 5C is inputted to a short-circuiting detection circuit 606 via internal signal lines 604 and 605, and a state signal of the shield line 5C is inputted from the short-circuiting detection circuit 606 to the CPU 64, by which it is used for detecting trouble in the composite multiplex communication cable 5Z.

Figure 7:
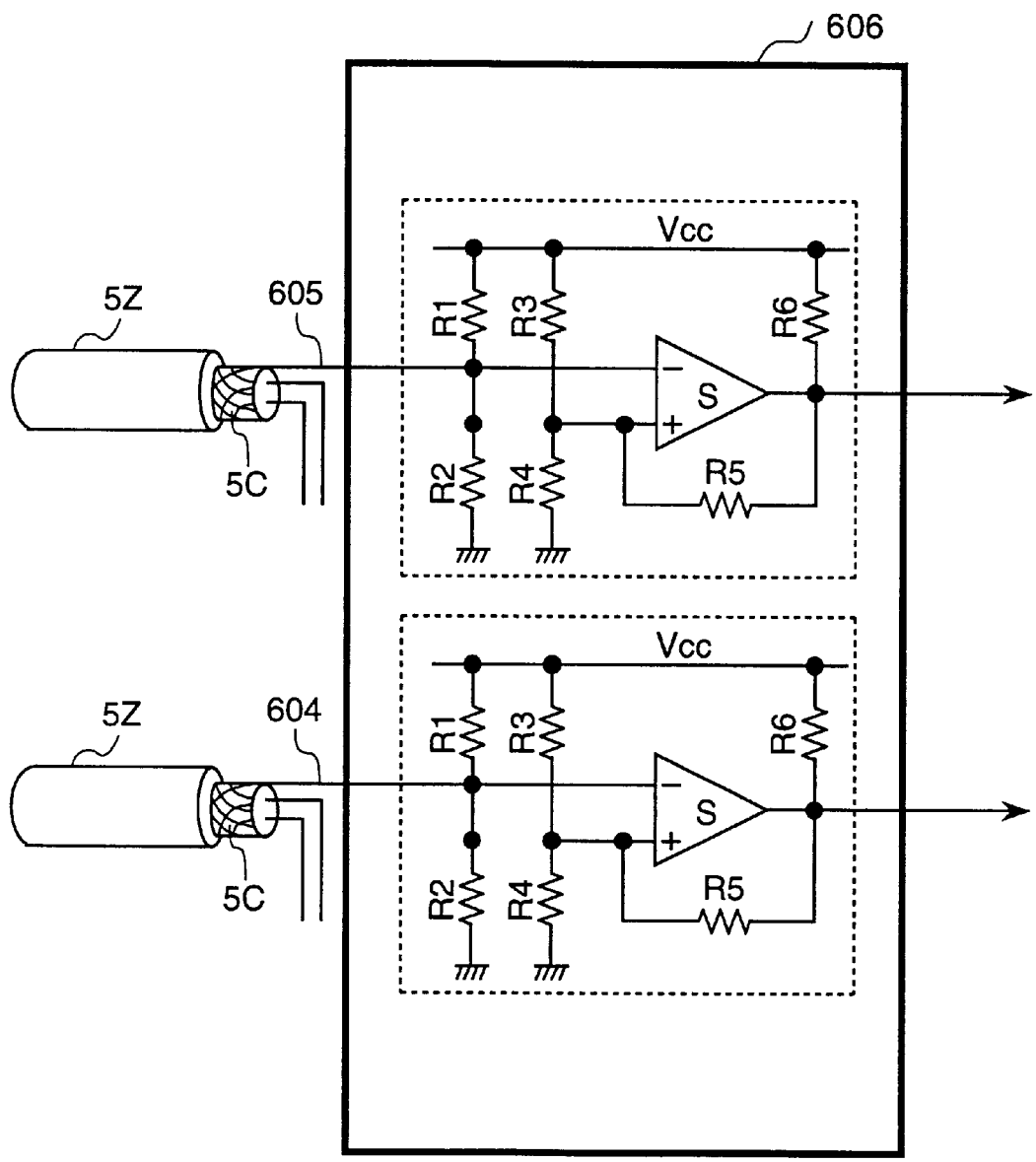
FIG. 7 is a circuit diagram of a trouble detection circuit for an electric wire.

Details of the short-circuiting detection circuit 606 are shown in FIG. 7. In the present embodiment, the short-circuiting sensor shield line 5C interposed between different modules is fixed to a potential of 2.5 V, which is equal to one half a voltage Vcc (5 V), by resistors R1 and R2. The resistor R1 serves also to restrict the electric current flow when the short-circuiting sensor is short-circuited. Reference character S denotes a comparator, and a Schmitt circuit is formed from resistors R3 to R6. The threshold level of the Schmitt circuit is set to a voltage lower than 2.5 V so that, when the potential of the short-circuiting sensor is lower than the threshold level, the comparator S may output "H". Accordingly, when the output signal of the short-circuiting detection circuit 6 is "H", the potential of the short-circuiting sensor is low. In short, this indicates that the short-circuiting sensor is in contact with an element having a low potential, and after all, this indicates that the composite multiplex communication cables are damaged and contact with the vehicle body ground.

The power supply lines are distributed by internal power supply lead-in lines 608 and 609 to a path inputted to a power supply switching circuit 610 and another path 612 logically ORed by diodes and inputted to a power supply circuit 611. The path which passes the diodes is used so that, even if switches in the inside of the power supply switching circuit 610 are completely off, supply of power to a microcomputer 607 or the communication IC 65 may not be cut off.

The power supply switching circuit 610 is controlled in accordance with a power supply switching signal 613 by the CPU 64 and is a circuit which switches to select one of the internal power supply lead-in lines 608 and 609 to be used. The power supply switching circuit 610 is provided in order that, even if one of the two power supply multiplex communication cables is damaged and put into a state wherein it fails to supply power, this may not have an influence on the other power supply multiplex communication cable. By this means, even if short-circuiting of a power supply multiplex communication cable to the vehicle body ground occurs, the damaged portion can be opened between the power supply switching circuits.

Figure 8:
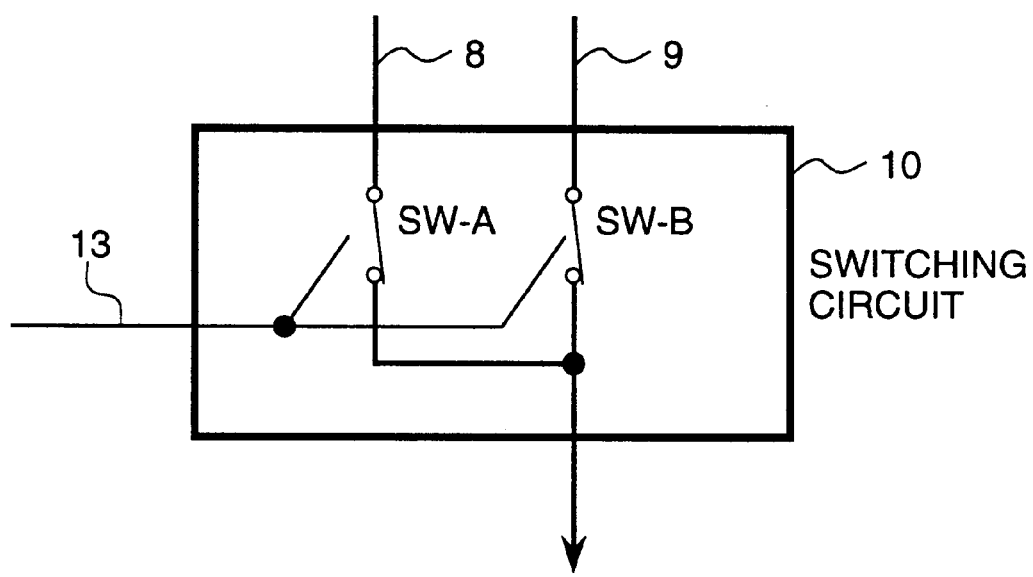
FIG. 8 is a diagrammatic view showing a construction of a switching circuit.

Situations in which power supply switching is required and states of the change-over switch are shown in FIG. 8 and Table 1.

TABLE 1

|      | Normal | Failure detected | Failure detected |
|------|--------|------------------|------------------|
| SW-A | ON     | OFF              | ON               |
| SW-B | ON     | ON               | OFF              |

Figure 9:
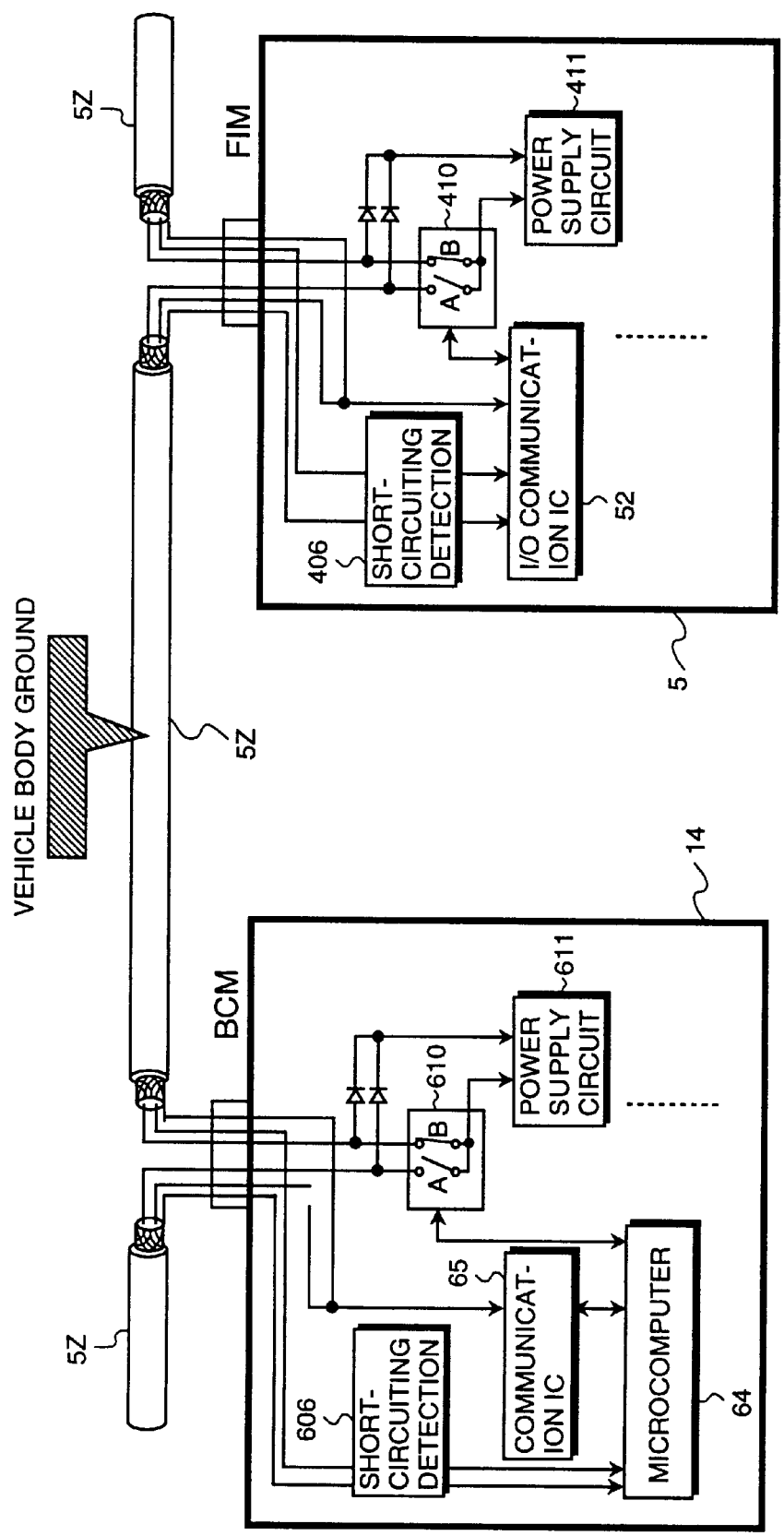
FIG. 9 is a diagram illustrating the operation for power supply switching.

Further, an actual state is described with reference to FIG. 9. In FIG. 9, in order to facilitate understandings, notice is taken of the power supply switching circuit to show it in an enlarged form. FIG. 9 illustrates a state of the power supply switching circuit when the power supply multiplex communication cable between the FIM and the BCM is short-circuited to the vehicle body ground, and the switch B on the FIM side is switched off while the switch A on the BCM side is switched on so that the circuit of the power supply line at the location at which the power supply multiplex communication cable is short-circuited to the vehicle body ground is shut-off and no current flows any more.

Figure 10:
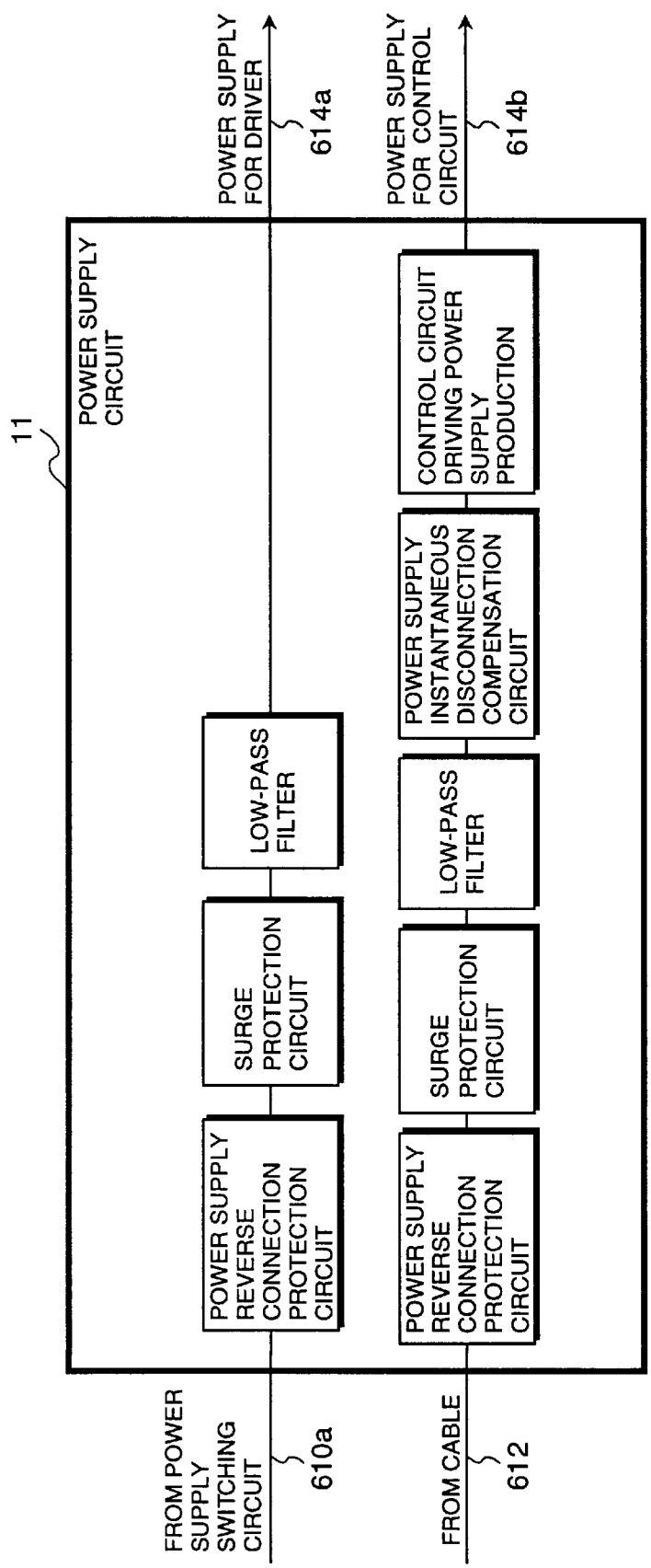
FIG. 10 is a diagram showing a construction of a power supply circuit.

A power supply circuit 411 (611) has two power supply input paths as described hereinabove, and details of the same are described with reference to FIG. 10. FIG. 10 is an internal block diagram of the power supply circuit 411 (611). The power supply circuit 411 (611) receives two inputs of power supply from a power supply switching circuit 410 (610) and a path 412 (612) described above. The internal circuit has two independent circuit constructions and includes, as common circuit blocks, a power supply reverse connection protection circuit which prevents a break of the circuitry even if the battery is mounted with the (+) terminal and the (−) terminal thereof connected reversely, a surge protection circuit for protecting the circuitry from a high voltage which is generated when a battery terminal is disconnected during driving of the vehicle or in a like case, and a low-pass filter for suppressing a sudden variation of the battery voltage. Battery power from the power supply switching circuit 410 (610) having passed through those circuits is used as a voltage source 414 (614) for driving loads connected to the individual modules which effect power supply management.

The power from the path 412 (612) thereafter passes a power instantaneous disconnection compensation circuit which prevents interruption of power supply to the control circuit even if power supply disconnection for a short time which arises from chattering of a connector or a terminal occurs and then passes a control circuit driving power production circuit in the form of a constant voltage power supply circuit which produces power for the control circuit (in the present embodiment, 5 V), and is used as driving power for the microcomputer 64, the communication IC 65 and so forth.

The power supply line 614 outputted from the power supply circuit 611 is inputted to a control unit supply power switching circuit 616 and an interruption circuit 617. The control unit supply power switching circuit 616 is a switching circuit which supplies power to the other control units connected to the BCM, and is switched on and off by a control signal line 618 of the microcomputer 64. Incidentally, each of various control units employed in current vehicles (for example, a PCM, an ABS and so forth) has, in the inside thereof, a power supply protection circuit which prevents failure of the control unit even if the battery voltage becomes an abnormal voltage. Since this circuit is similar to that of the power supply circuit 611 described hereinabove with reference to FIG. 10, if a power supply module is used to supply power to various control units as in the present invention and the power supply protection circuit is built in on the power supply side, then it is possible to omit power supply protection circuits from the control units to which power is to be supplied. In other words, if the number of various control units to which power is to be supplied is large, then the cost can be reduced as much as the power supply protection circuits can be omitted.

It is to be noted that, in the present embodiment, when an accessory ACC contact 629 of the key switch is on, power is supplied to the navigation unit 42, and further, when an ignition ON contact 630 of the key switch is switched on, supply of power to the SDM 25 and the air conditioner unit 16 is started. Reference symbol ST denotes a starter starting switch of the key switch.

The cut off circuit 617 is provided in order to cope with two situations described below.

Figure 12:
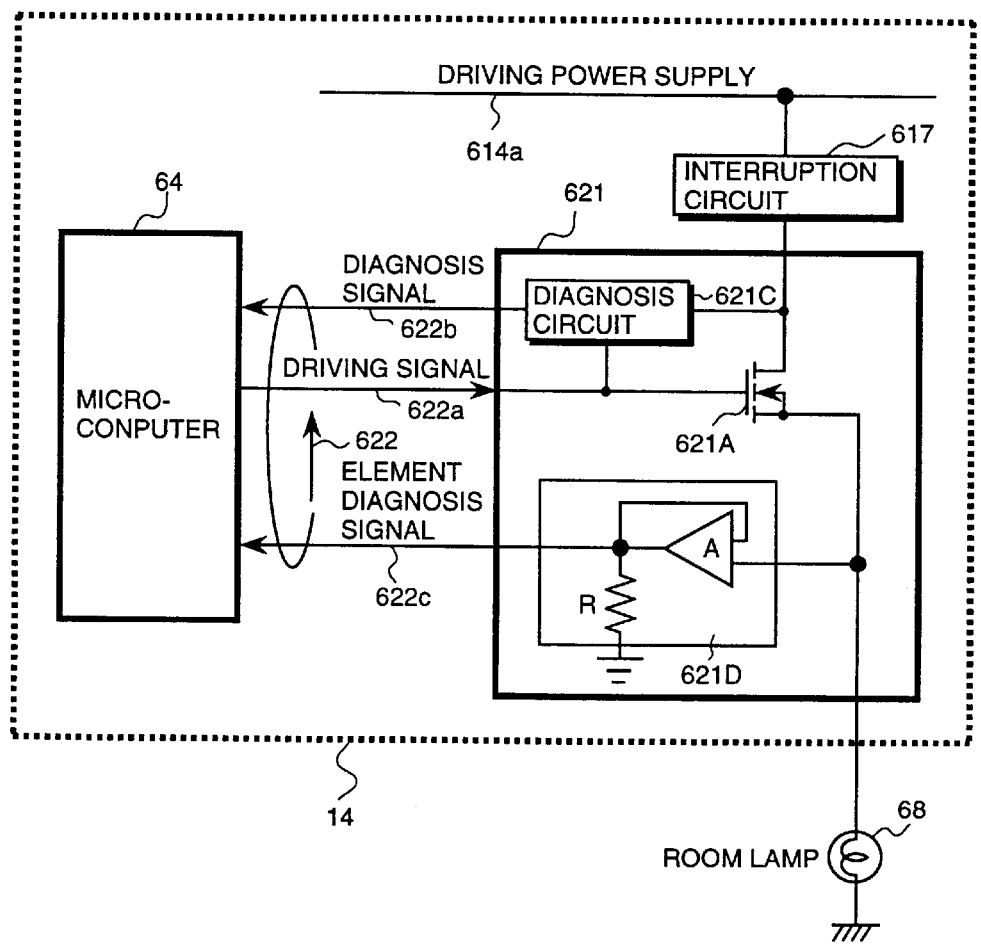
FIG. 12 is a detailed circuit diagram of an output interface.

First, the cut-off circuit 617 is used in order to reduce the current consumption of a driver 621A built in an output interface 621 when it is not used. The driver used in the present embodiment is formed from a driver called IPD (intelligent power device) as shown in FIG. 12. In this IPD, short-circuiting or disconnection of a load to be driven is diagnosed by a diagnosis circuit 621C and a result of the diagnosis is outputted to the microcomputer 64. The diagnosis circuit 621C includes a protection circuit which detects, when over-current flows through an element 621B, such over-current and controls a driving signal 622a to limit the current so that the diagnosis circuit 621C itself may not be broken. Consequently, the current consumption (dark current) when the element 621B is inoperative is higher than that of an ordinary driving element. Accordingly, use of a large number of such drivers may possibly cause exhaustion of the battery. In order to prevent this, when the driver 621A need not be driven, power to be supplied to the driver 621A is cut-off on the upstream side to prevent consumption of current.

Second, the cut-off circuit 617 is provided for protection against a failure of the driver 621A itself. In particular, when the cut-off circuit 617 supplies power to its load although a driving signal is not received from the CPU 64, while it is conventionally impossible to stop the power supply, in the present embodiment, a cut-off signal 619a from the microcomputer 64 to the cut-off circuit 617 is cut-off to cut-off power, which is to be applied to the driver, on the upstream side of the driver to stop supply of power to the load.

Figure 11:
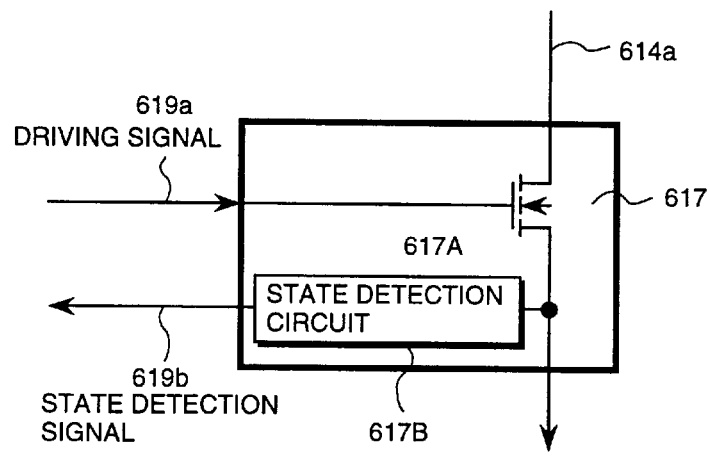
FIG. 11 is a diagram showing a construction of an interruption circuit.

A detailed construction of the cut-off circuit 617 is shown in FIG. 11. The cut/off circuit 617 includes a switching device 617A for which a semiconductor such as an FET is used, and a state detection means 621D for monitoring an on-off situation of the switching device 617A. The switching device 617A is normally on in accordance with the cut-off signal 619a from the microcomputer 64. Also when the microcomputer 64 detects a trouble of the switching device 617A from the monitor signal from the state detection means 621D, the driving signal 619a disappears and the switching device 617A is switched off. Operation of the device 617A is indicated in Table 2.

TABLE 2

| Normal | Output driver failed | Not used |
| --- | --- | --- |
| On | OFF | OFF |

The communication IC 65 is an IC for exclusive use which effects data communication with the other modules using the multiplex communication lines built in the composite multiplex communication cables. Communication of information obtained by communication or data to be transmitted is performed over a data bus 620 connected to the microcomputer 64.

The output interface 621 has a plurality of drivers 621A built therein for driving various electric load apparatus connected to the module 14, and one of the drivers is shown in FIG. 12. The output interface 621 shown includes an IPD having such a diagnosis circuit 621C as described above and a state detection circuit 621D for confirming whether or not the IPD operates normally.

A signal line set 622 connected to the microcomputer 64 includes, as shown in FIG. 12, three signals of a diagnosis signal 622b, a driving signal 622a and an device diagnosis signal 622c.

The driving signal 622a is a signal for turning the IPD on. When the driving signal 622a is "H", power of a power supply line 614a is outputted to the room lamp 32, which is an electric load, so that the lamp is lit.

The diagnosis signal 622b indicates a functional situation of the IPD and is a diagnosis signal line for notifying whether the load is in a short-circuited state or in an open (disconnected) state.

The device diagnosis signal 622c is a failure diagnosis signal for detection of a failure of the IPD device 621A itself described above.

How to detect that the room lamp 32 connected to the BCM is short-circuited or open or that the IPD device is in failure is described with reference to Table 3.

TABLE 3

| | Normal operation | Abnormal operation | | |
| --- | --- | --- | --- | --- |
| | | Element failed | Load open | Load short-circuited |
| Driving signal | H | L | L | H | L | H |
| Diagnosis signal | H | L | — | H | H | L |

TABLE 3-continued

| | Normal operation | Abnormal operation | | |
| --- | --- | --- | --- | --- |
| | | Element failed | Load open | Load short-circuited |
| Element diagnosis signal | H | L | H | L | L | L |

As described above, the IPD, the element itself, has a function of discriminating a state of a load connected thereto, and as seen in Table 3, a "load open" and a "load short-circuited" can be discriminated from the relationship between the diagnosis signal and the driving signal.

On the other hand, if the IPD element itself fails, then also the diagnosis signal cannot be relied upon, and therefore, an output signal of the IPD is monitored as an element diagnosis signal as seen in FIG. 12. An impedance converter A and a resistor R have a function of preventing an electric influence on the IPD and another function of stabilizing the signal level when the element failure diagnosis signal is opened.

This circuit monitors a voltage applied to the room lamp 32 (load) after all, and by monitoring the three signals of the driving signal, diagnosis signal and element diagnosis signal, all states indicated in Table 3 can be grasped. In Table 3, the portion indicated by "–" (dash) represents whichever one of "H" and "L" is allowed. Accordingly, if the driving signal is "H" and the diagnosis signal is "H" while the failure diagnosis signal then is "L", it is indicated that, although it is discriminated that the output state of the IPD is correct, no outputting is performed. On the other hand, when the driving signal is "L" and the failure diagnosis signal then is "H", it is indicated that no outputting is performed irrespective of the discrimination that the output state of the IPD is normal although the IPD is not driven. Further, when the driving signal is "L" and the failure diagnosis signal then is "H", outputting of the IPD is performed although the IPD is not driven.

In this instance, since both of the two cases are in abnormal states, it may be determined that the IPD is in failure. Then, when such a situation is entered, a secondary accident can be prevented by notifying to a driver of the vehicle or the like by sound or by an alarm lamp or the like that trouble has occurred and by switching off the switching element 617A of the cut-off circuit 617. A number of such drivers 621A equal to at least the number of electric loads connected to the output interface 621 are provided in the output interface 621.

Figure 13:
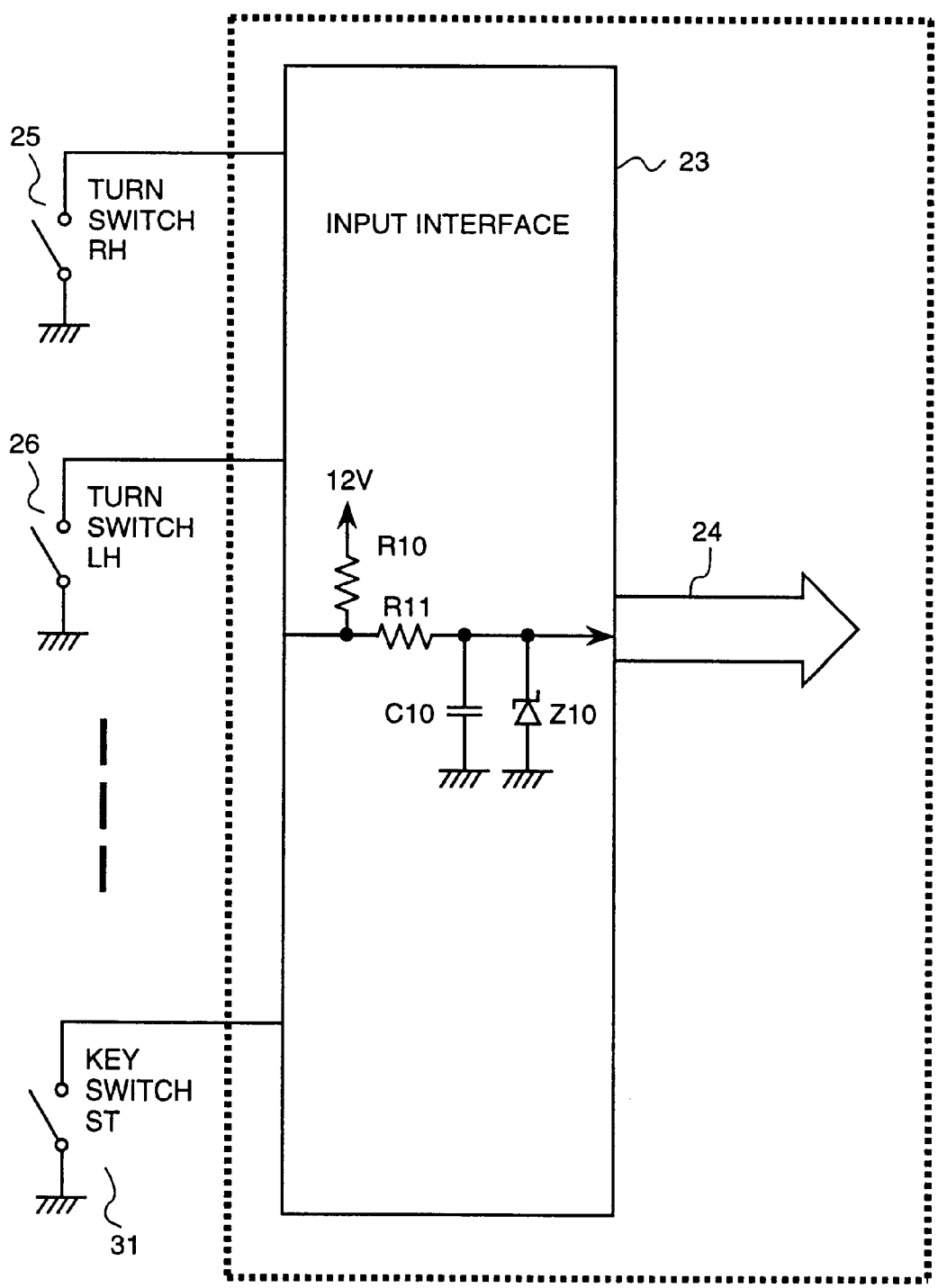
FIG. 13 is a detailed circuit diagram of an input interface.

An input interface 623 is an aggregate of waveform shaping circuits for discriminating which one of the switches 25 to 31 connected to the BCM is on. The internal circuit of the input interface 623 is shown in FIG. 13. The reason why only one circuit is shown in FIG. 13 is that the other circuits are omitted because all of the circuits are the same, and actually, a number of same circuits equal to the number of switches are built in the input interface 623. Each of the switches is pulled up to a battery voltage (power supply line 14) by a resistor R10, and thereafter, it passes a low-pass filter formed from a resistor R11 and a capacitor C10 and the high voltage side is clamped by a Zener diode Z10. In short, when the switch is off, "H" is outputted, but when the switch is on, "L" is outputted. Those signals are inputted to the microcomputer 64 via an input signal line 624.

It is to be noted that switches connected to the input interface 623 of the BCM include two switches for generation of left and right signals for turn switches to be used for declaration of turning to the right and the left, two light switches for lighting side marker lamps and headlamps, and three switches of the accessory ACC switch 629, the ignition power supply switch 630 and a switch 631 for turning on the engine starter motor, which are controlled by the key switch. In the embodiment, an automatic antenna motor 633 and a wiper motor 634 are further connected to the output interface 621 of the BCM.

An automatic antenna switch 635, a wiper switch 636, a speed changing resistor 636*a* and side view mirror control switch 637 are connected to the input interface 623.

Since power supply lines are wired in a loop in the vehicle and control units such as a BCM and an FIM for controlling electric loads are connected to intermediate portions of the power supply lines or to power supply lines branching from the power supply lines so that power is supplied from the power supply lines of the control units to terminal electric loads, there is no need of laying a plurality of power supply lines along to each control unit and there is an effect in reduction of power supply lines. Further, since they are integrated with data multiplexing wiring system, also information of a large number of operation switches can be fetched collectively, and since shorter wire harnesses to the switches can be used by transmitting the switch information by the data communication lines, saving of wires can be achieved. It is to be noted that the power supply and switching circuit 66 (indicated by dotted lines) formed between the connector section 14A of the BCM 14 and the output interface 621 and output terminal 14B can be regarded as a power supply relay circuit. Then, the BCM itself can be regarded as one of power supply relay terminals.

<Description of FIM>

Figure 14:
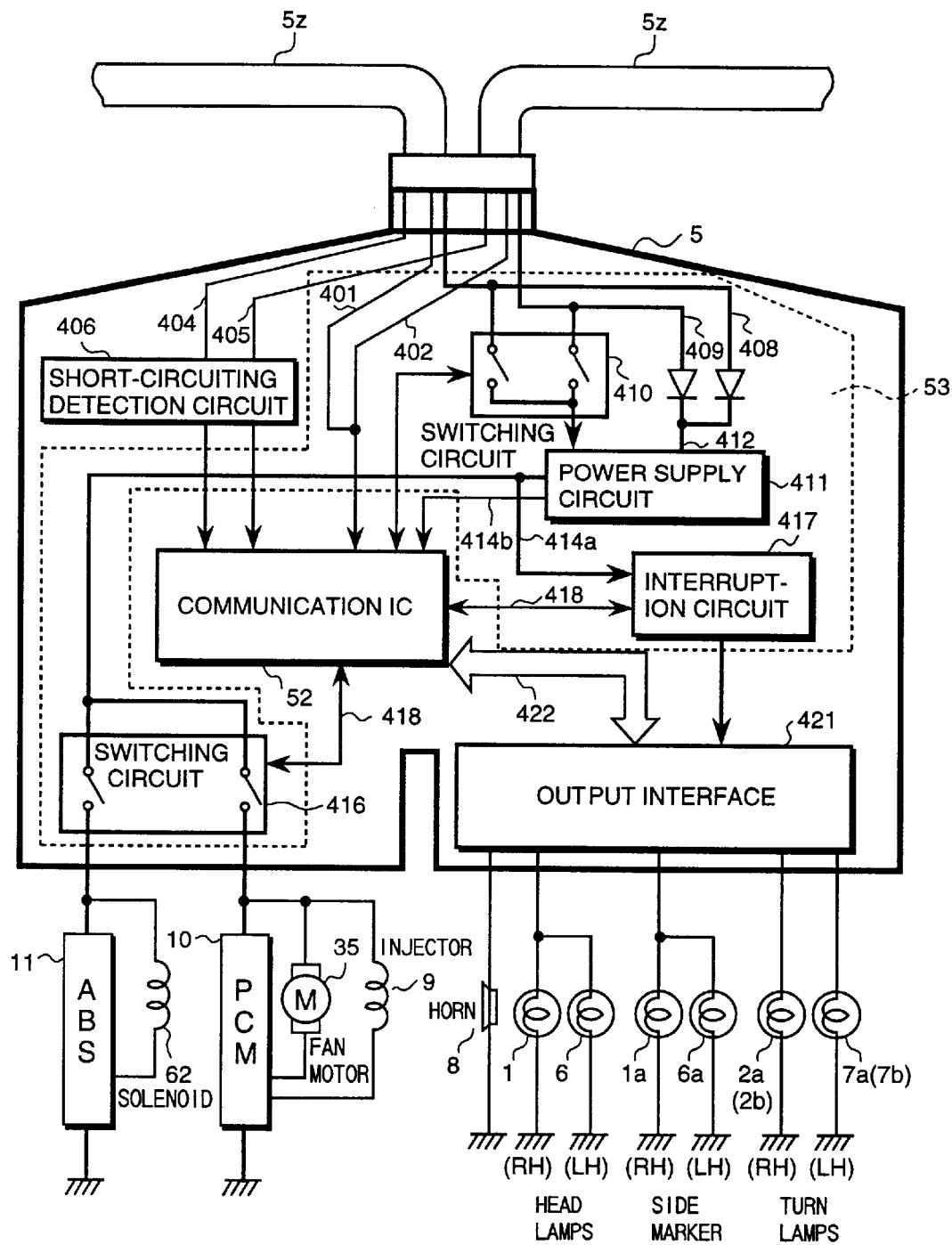
FIG. 14 is a functional block diagram of an FIM.

FIG. 14 is a block diagram of the FIM which is disposed at the front part of the vehicle and effects power supply management of the front part of the vehicle. The FIM is basically different from the BCM in that it does not include a microcomputer nor an input interface circuit and consequently in that the signals inputted to and outputted from the microcomputer in the BCM are inputted to the communication IC 52.

In the present embodiment, the FIM controls two groups including a group which effects supply of power to the ABS control unit 11 and the ABS solenoid 62 and effects supply of power to the PCM control unit 10, the fan motor 35 for an engine cooling radiator and the fuel injectors 9 to the engine, and another group which effects driving of the horn 8, headlamps 1 and 6, clearance lamps 1*a* and 6*a*, and front turn signal lamps 2*a*, 2*b*, 7*a* and 7*b*. Since the FIM does not fetch an input signal, the input interface provided in the BCM is eliminated from the FIM.

For the communication IC 65 used for the BCM and the communication IC 52 used for the FIM, communication ICs of different types are used. The former is of the type which cannot perform data communication unless it is used together with a microcomputer while the latter is of the type which can perform data communication even if it is not used together with a microcomputer. While details of the communication IC 52 of the latter are hereinafter described, if data communication is allowed without using a microcomputer in this manner, a unit of an object of communication is not necessarily required to have a microcomputer built therein, and consequently, there is merit in that reduction in cost is allowed.

A short-circuiting detection circuit 406 and a switching circuit 410, a power supply circuit 411, an cut-off circuit 417, a switching circuit 416 and an output interface 421 which form the power supply and switching circuit 53 have the same constructions as those of the BCM described above, and accordingly, a description of them is omitted. Further, details of operation are hereinafter described with reference to a flow chart.

<Description of DDM>

Figure 15:
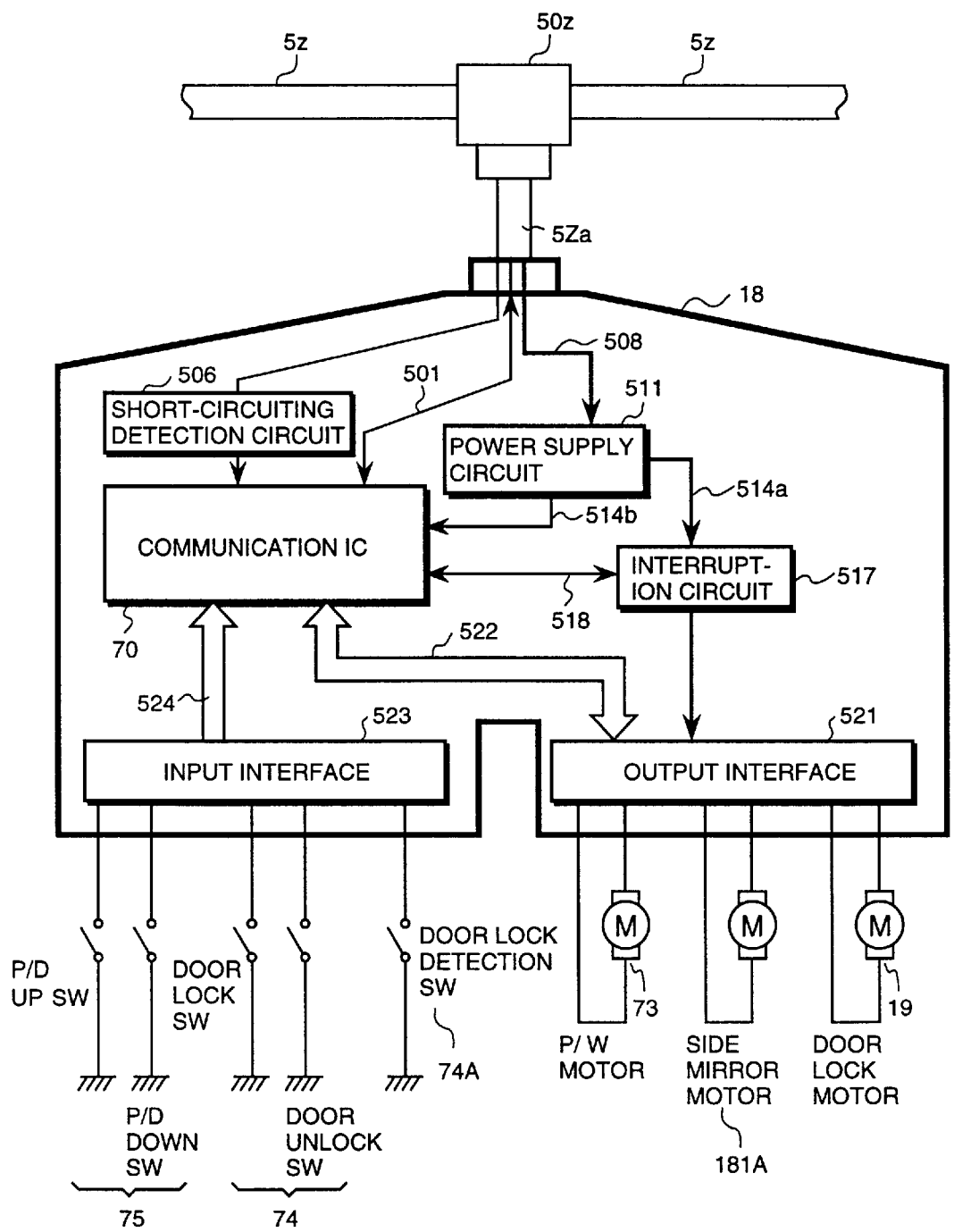
FIG. 15 is a functional block diagram of a DDM.

FIG. 15 is an internal block diagram of the DDM 18 of a power supply module built in the inside of the driver side door. The door has a movable hinge element, and it is difficult to assure a space in which a wire harness is to be wired. Therefore, the present embodiment has a construction wherein, avoiding to wire the composite multiplex communication cables in a loop, the DDM is connected to a single composite multiplex communication line 5Z*a* branched by a T-shaped branching connector 50A shown in FIG. 22. Accordingly, the DDM 18 does not adopt such a power supply switching circuit 410 or 610 as is adopted by the BCM or the FIM.

Basically, an cut-off circuit 517, an output interface 521 and an input interface 523 have similar constructions to those of the BCM or the FIM, and the DDM 18 is characterized in that a power supply circuit 511 has a simplified construction.

Figure 16:
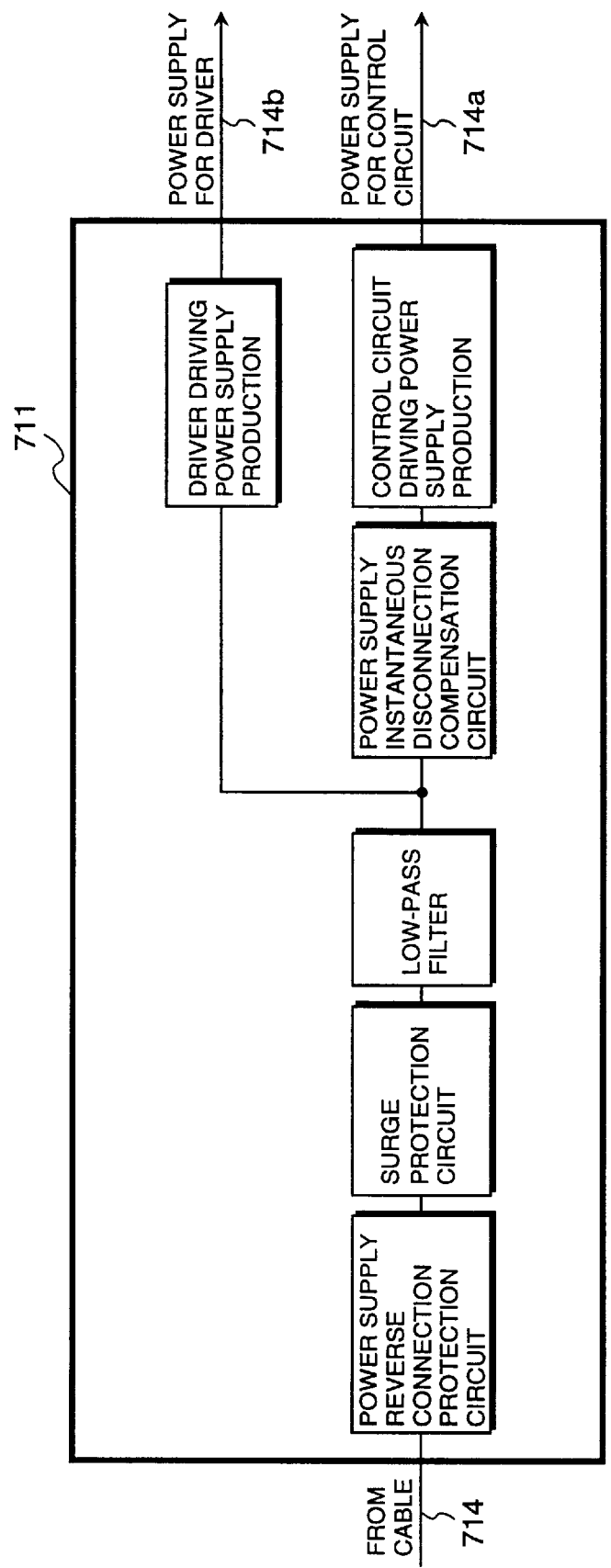
FIG. 16 is a diagram showing a construction of another power supply circuit.

Details of the power supply circuit 511 are shown in FIG. 16. Since the power supply circuit 511 does not adopt a power supply switching circuit, power supply is not cut-off completely, and consequently, the two power supply paths, which are independent of each other in the BCM, are joined together while a driver driving power supply is branched from between a low-pass filter and a instantaneous power supply disconnection compensation circuit. Since the other circuit construction itself of the power supply circuit is the same as that of FIG. 10, description of the same is omitted.

The DDM 18 principally includes a switch 75 and a motor 73 for operating the power window P/W, a switch 74 and a motor 19 for operating the door lock, and a switch 74A for detecting whether or not the door is in a locked state. Also a motor 181A for driving a side rear view mirror 181 is connected to the output interface 521. A control switch for the motor 181A is connected to the input interface 624 of the BCM. It is to be noted that switches 74 for operating the door lock are switches provided only for the driver side, and by operating this switch, all of the door locks can be operated collectively.

General operation is hereinafter described with reference to a flow chart.

<Description of PDM, RRDM and RLDM>

Figure 17:
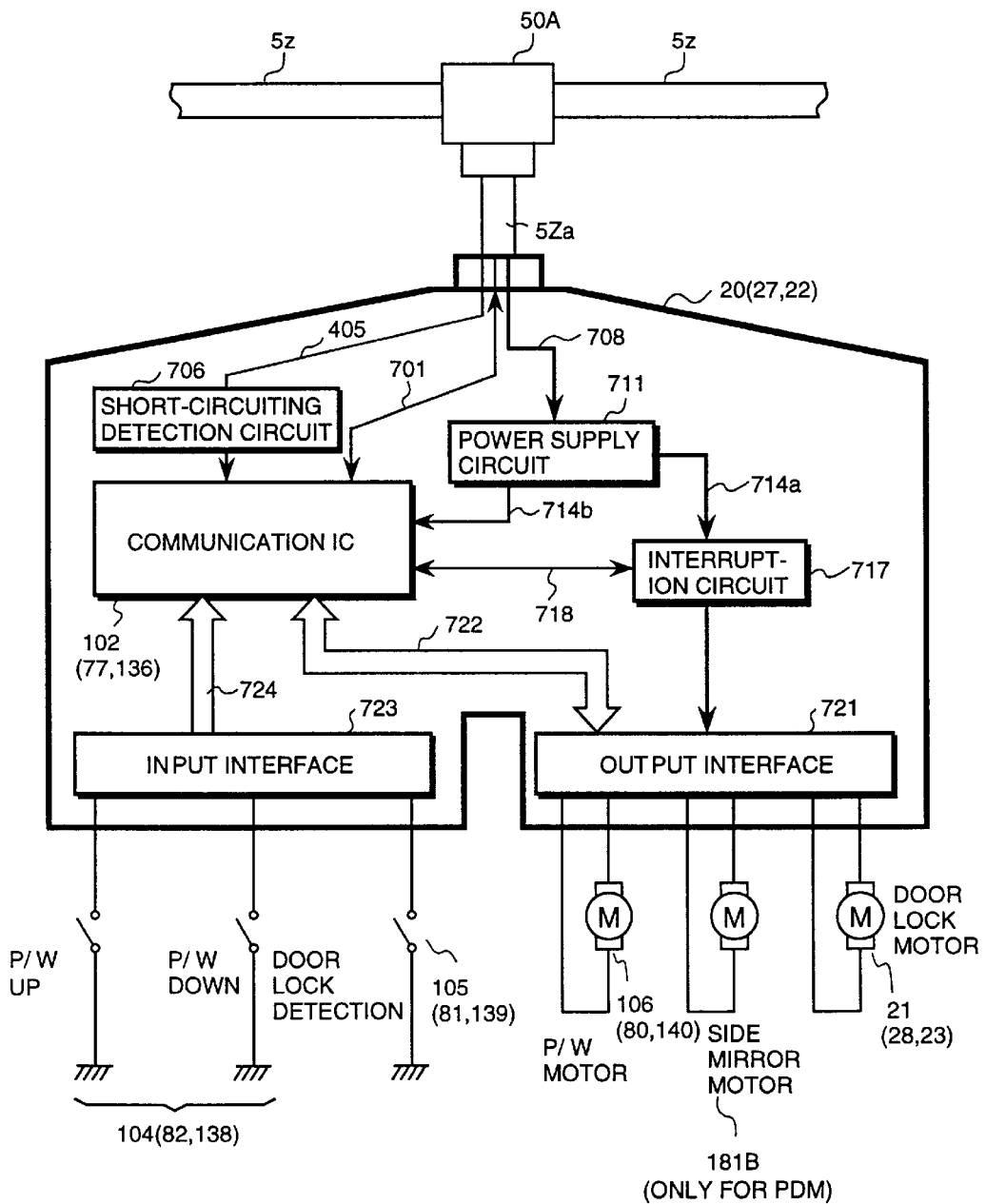
FIG. 17 is a functional block diagram of a PDM, an RRDM and an RLDM.

FIG. 17 is an internal block diagram of the power supply modules built in the insides of the doors other than the driver side door. In this instance, the power supply modules signify the PDM built in the inside of the passenger side door, the RRDM built in the inside of the rear right door and the RLDM built in the inside of the rear left door.

Those modules have basically the same construction as that of the DDM, but are different in that up and down switches 104 (82, 138) for the power window and a door lock sensor 105 (81, 139) are connected to an input interface 723 and the door lock motor 21 (28, 23) and the P/W motor 106 (80, 140) are connected to an output interface 721.

It is to be noted that an outside rear view mirror motor 181B is connected to the output interface only of the PDM.

<Description of IPM>

Figure 18:
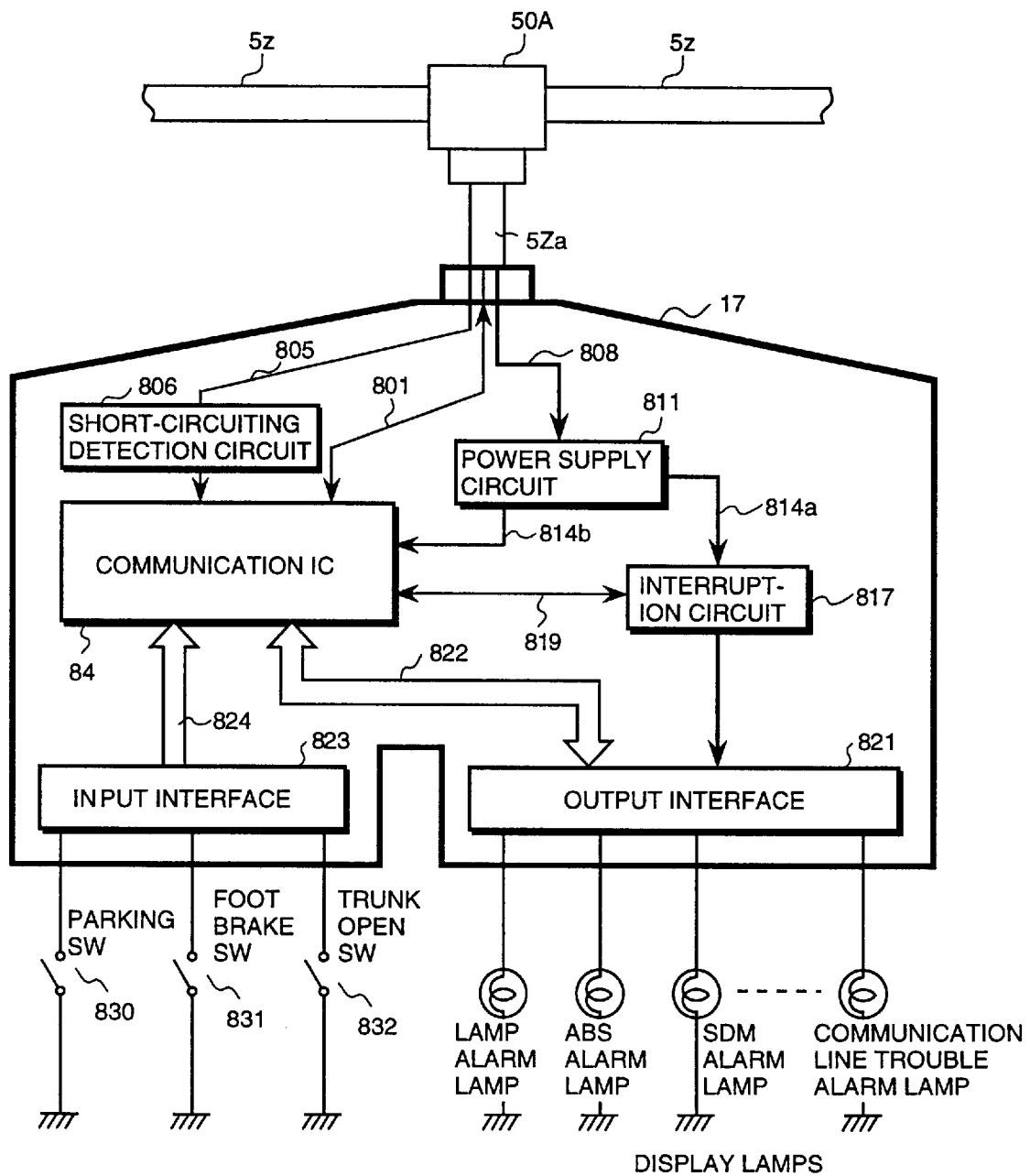
FIG. 18 is a functional block diagram of an IPM.

FIG. 18 is an internal block diagram of the IPM installed in the inside of the driver's eat meter panel. The IPM is a module which effects fetching of an input signal which cannot be inputted to the BCM and drives various display lamps and alarm lamps installed in the meter panel. In the present embodiment, a parking brake switch 830, a foot brake switch 831, a trunk open switch 832 and so forth are connected to an input interface 823, and, as display lamps and alarm lamp for headlamps, stop lamps and so forth, an SDM alarm lamp, an ABS alarm lamp, malfunction indicator lamps for the composite multiplex communication cable and so forth are connected to an output interface 821.

Also the present module has basically the same circuit construction as that of the DDM, but it is different only in the apparatus which are connected to the input interface and the output interface.

<Description of RIM>

Figure 19:
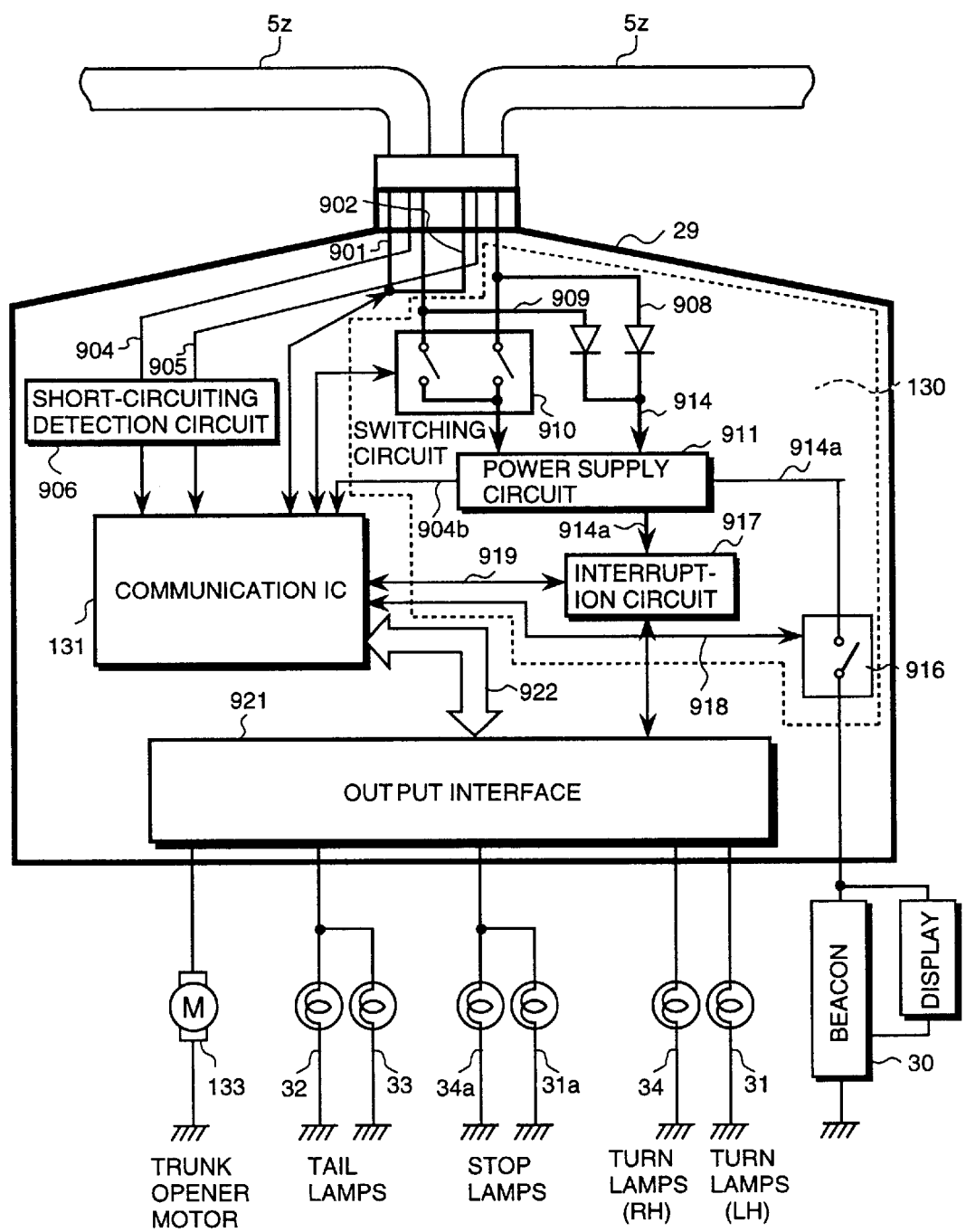
FIG. 19 is a functional block diagram of an RIM.

FIG. 19 is an internal block diagram of the RIM disposed in the rear part of the vehicle. The RIM has a construction similar to that of the FIM and is a power supply module which drives electric loads concentrated in the rear part of the vehicle.

In the present embodiment, the RIM drives a trunk opener motor 133, tail lamps 32, 33, stop lamps 31*a*, 34*a* and turn signal lamps 31, 34. Further, the beacon 30 is connected to the RIM from a power supply circuit 911 via a power supply line 914*a* and a switching circuit 916. As shown in FIG. 2, the control panel, display unit and loudspeaker for guidance by voice are connected to an I/O interface 129 of the beacon unit.

Since the constructions of the internal blocks are the same as those of the circuitry of the FIM except that no input interface is provided, a description of them is omitted.

<Description of DSM and PSM>

Figure 20:
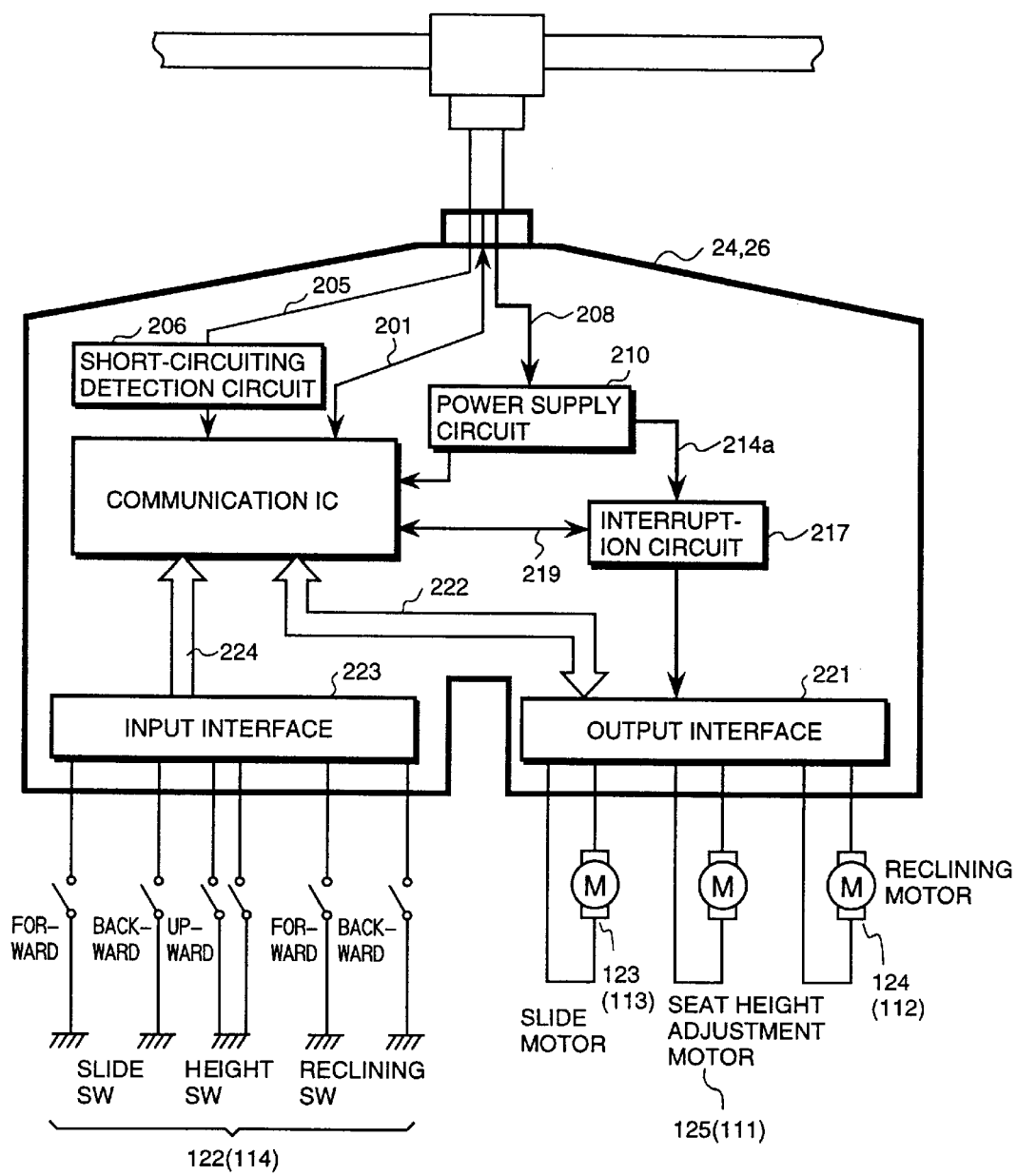
FIG. 20 is a functional block diagram of a DSM and a PSM.

FIG. 20 is an internal block diagram of the DSM and the PSM disposed in the proximities of the driver's seat and the passengers seat, respectively. Each of the DSM and the PSM employs motors in order to adjust the position of the seat (forward and backward sliding positions, forward and backward reclining positions and the height), and switches for such adjustment are provided at portions of the seat. Further, the respective switches are connected to the input interfaces of the DSM and the PSM and the respective motors are connected to the output interfaces of the DSM and the PSM.

As described above, since power supply modules connected by power supply paths are disposed together with control units to which power supply is required or disposed in the proximities of locations where electric loads to be driven are concentrated, a plurality of power supply lines to a control unit or power supply lines to electric loads can be integrated, and besides, since the lengths of the power supply lines can be made short, there is an effect in saving of power supply lines. Further, where the power supply lines are integrated with an intensive wiring system, by collectively fetching information of a large number of operation switches and sending the switch information to the data communication lines, short wire harnesses can be used also for wire harnesses to the individual switches, and consequently, saving of lines can be achieved. Further, since a semiconductor is used for a switching device for controlling power supply to an electric load to form the switching device as an intelligent switching device and besides a cut-off circuit is provided, also when the electric load is short-circuited, the device can be prevented from being broken. As a result, there is merit in that a fuse box for the vehicle and fuses for individual electric loads can be eliminated.

<Description of Connector>

Figure 21:
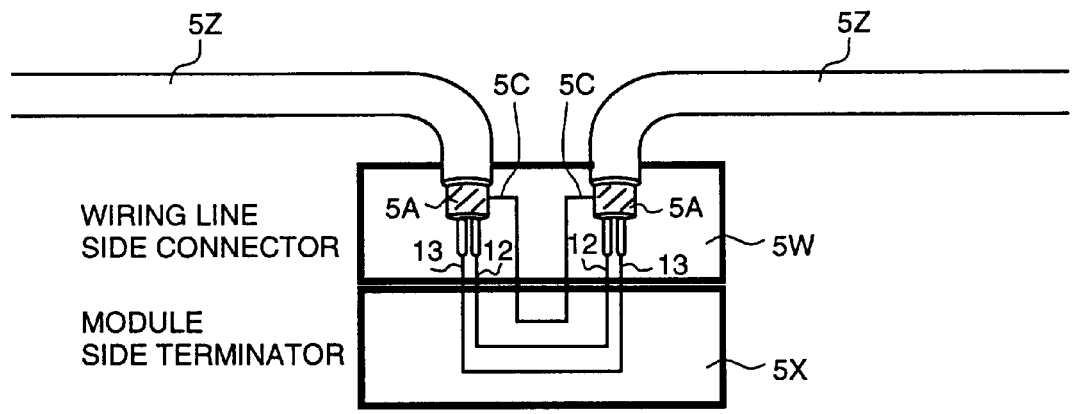
FIG. 21 is a view illustrating an extension connector.
Figure 22:
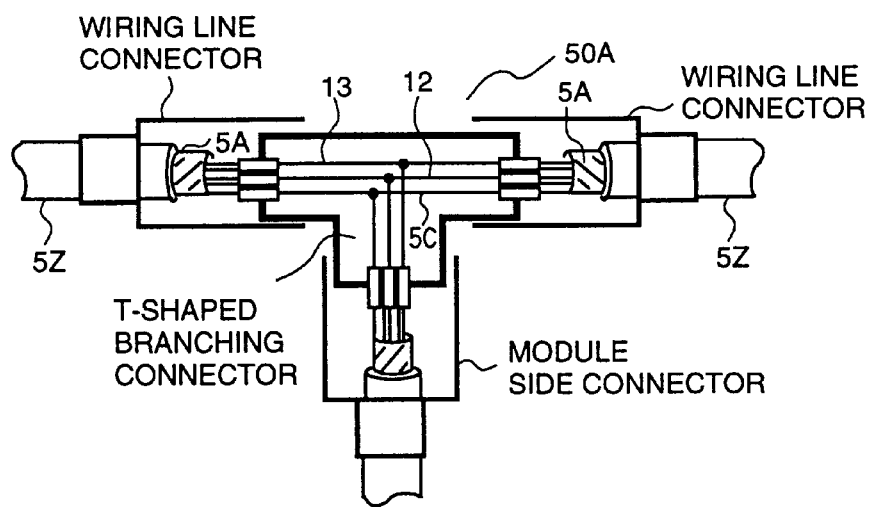
FIG. 22 is a view illustrating a T-shaped branching connector.

By the way, for such a module as the BCM or the FIM to which two composite multiplex communication cables each integrated with a power supply line are inputted, a connector 5W shown in FIG. 21 is used. In FIG. 21, when a module is to be connected to the wiring side connector 5W, a dummy connector 5X is removed, and instead, a terminator of the module is inserted to establish connection. Same reference symbols as those of FIG. 6 denote same members. For such a module as the DDM or the PDM to which one composite multiple communication line is inputted, such a branching connector as shown in FIG. 22 is used. Referring to FIG. 22, when power supply lines for a module are to be branched from the power supply lines, the power supply lines are separated and wiring connectors are connected to ends of the power lines and inserted into two terminals of the T-shaped branching connector while wiring connectors on the module side are inserted into the remaining one terminal of the T-shaped branching connector to establish connection.

<Description of Additional Module>

In the meantime, in recent years, a consumer having purchased a vehicle frequently attaches a car audio set, a navigation apparatus or a like apparatus, and if a additional terminal by which a power supply module can be added is provided in the proximity of the passenger's seat dash panel of a vehicle or in the trunk room in order to cope with such a need as just mentioned, then supply of power can be performed readily and safely.

Where two power supply multiplex communication cables are required, a dummy connector called terminator is connected to an additional connector of the type of FIG. 21 to form a loop, and when used, the terminator is removed and a connector of a power supply module of the BCM type is inserted instead. Meanwhile, where it is considered that one power supply multiplex communication cable may be used, a T-shaped branching additional terminal shown in FIG. 22 is inserted, but when not in use, a cover is attached to the module connection side terminal.

An additional module is higher in universality and can have variations in accordance with applications where it has a built-in microcomputer. For example, an additional module which itself has alarm sound or an alarm lamp, another additional module for an audio application which includes a reinforced noise filter, a further additional module which has a burglary prevention function, a still further additional module which has a function of an engine starter and so forth may be available.

Figure 23:
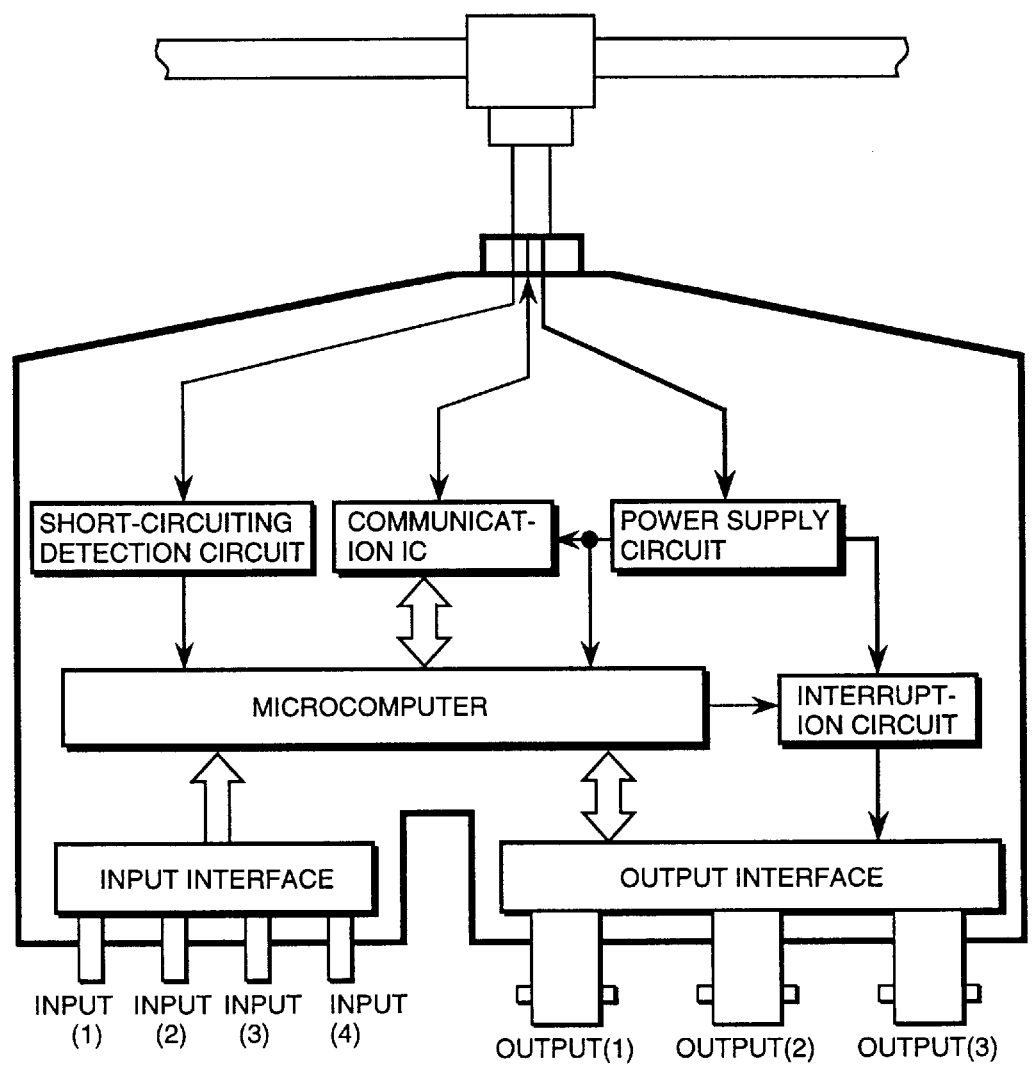
FIG. 23 is a diagram illustrating a power supply module for extension.

An internal block diagram of an additional module which includes one composite multiplex communication line is shown in FIG. 23. The additional module shown is much different from that of the DDM or the like in that it has a built-in microcomputer. Since the module for extension employs a microcomputer, it is programmed so that the microcomputer effects all control such as control of signals from input/output interfaces, signals of a short-circuiting detection circuit and an interruption circuit. Further, since the module for extension can be programmed for exclusive use therefor, finer control is possible. For example, where an additional module is supplied for an engine starter, a state of a door lock, a situation of a gear position, a starting situation of the engine and so forth can be acquired from the BCM or the PCM by data communication, and cut-off of power supply or the like when the function as an engine starter is not required can be achieved readily.

<Description of General Operation>

In the following, operation of the power supply network for a vehicle is described with reference to flow charts and so forth. First, in order to facilitate understandings, input and output information to and from the individual power supply modules are described with reference to data tables of FIGS. 24 and 26. It is to be noted that the input and output tables are formed from 4 bytes (2 bytes for the input and 2 bytes for the output) for each power supply module.

FIG. 24 shows data tables of data which are fetched as input signals by the individual power supply modules. Those tables are written in a freely readable and writable random access memory (hereinafter referred to as RAM) which is built in the microcomputer of the BCM. For example, in the case of the BCM, the table includes the position of the key switch, the position of the light switch and two kinds of diagnosis information of the room lamp, and if the ignition key switch is set to the ACC position (position for accessory power supply), then the bit 15 of the BCM of the RAM table is set (changed to "1"), but if the ignition key switch is set to the ON position, then the bit 14 of the BCM is set.

In the case of the FIM, the table includes diagnosis information inputs of the side marker lamps 1a and 6a which are lit when the light switch 67 in the BCM is positioned to the position of a POS 627 (lighting of the side marker lamps). It is to be noted that diagnosis 1 and diagnosis 2 denote the diagnosis signal and the element diagnosis signal shown in Table 3, and short-circuiting detection (1) and short-circuiting detection (2) are used to indicate distinction of one of two power supply multiplex communication cables which is inputted to the FIM.

Further, for input information for each of the ten total modules from the BCM to the RIM, 2 bytes are assured, and the microcomputer built in the BCM confirms, based on the input information, which one of the switches is operated and controls supply of power to a load to a module which makes an object of the control. Further, based on the diagnosis signals, the microcomputer confirms a load situation of each module or short-circuiting of a composite multiplex communication cable and effects alarming or control of power supply cut-off.

FIG. 25 is a list of output data tables for use for operation of the electric loads connected to the individual power supply modules and control of the power supply switching circuits, control of the cut-off circuits and control of the switching circuits. The signals set in the table are transmitted to the individual power supply modules by multiplex communication and used for operation, and similarly as in the input tables of FIG. 24, for output information of each of the ten total modules from the BCM to the RIM, 2 bytes are assured.

FIG. 26 shows tables for the other control units which effect multiplex communication separately from the power supply modules, and data communication is performed between the five units of the ABS, SDM, air conditioner unit, PCM and navigation unit and the BCM. Principally, information to be transmitted from the BCM to the units includes information of the ignition key switch, information of the light switch and information of the brake switch. As information from the units, in addition to a "power supply instruction permission signal" representing "to cut-off power supplied to the unit", an "operation OK signal" representing that preparations for operation have been made after power supply is started and a "trouble occurrence signal" for notification to a driver that some trouble has occurred with a system controlled by the unit, information unique to the unit is transmitted to the BCM.

Also those data are stored, similarly to the input and output tables described above, in the RAM built in the microcomputer of the BCM, and are used as part of control of the power supply network of the present invention.

In this manner, in the present embodiment, multiplex communication is performed between each power supply module and the BCM and between each control unit and the BCM, and the information illustrated in FIGS. 24 to 26 is communicated by the multiplex communication. While details of from where data received by the BCM have come or to where data to be transmitted by the BCM are to go are hereinafter described, each of the modules and the units has a unique name (address) applied thereto so that an object module or unit is distinguished based on the address.

Subsequently, how the functions of the present invention operate when a battery is connected to the vehicle is described in order with reference to FIG. 27.

Figure 27:
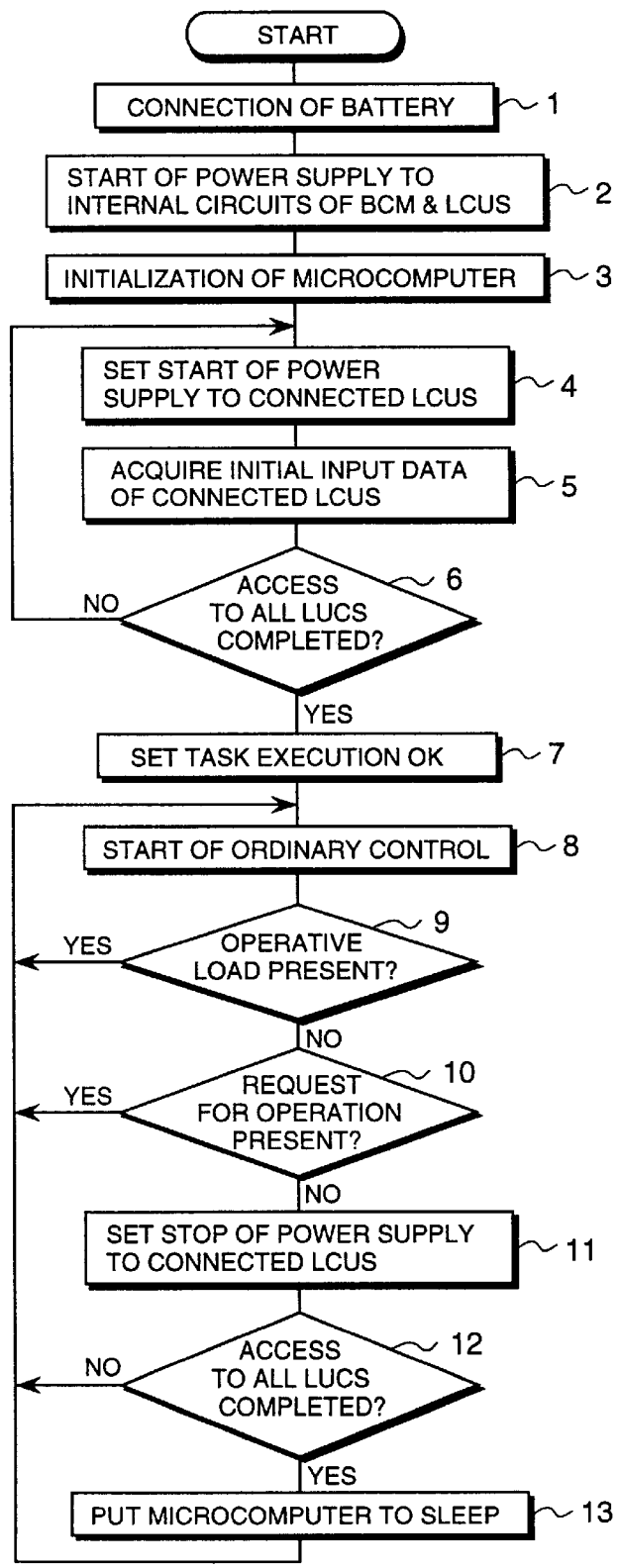
FIG. 27 is a flow chart illustrating the operation of a power supply network after connection to a battery.

FIG. 27 is a flow chart illustrating operation of the power supply network after a battery is connected. If a battery is connected first in step 1, then power is supplied, in step 2, to the communication ICs and the microcomputers which are the internal circuits of the BCM and the power supply modules (hereinafter referred to as LCUs). This power is different from the power to be used for supply of power to the electric loads and is normally supplied to the BCM and the LCUs. This power is, for example, in the BCM, the control circuit power supply 614b.

When power is supplied to the microcomputer of the BCM, initialization processing of the microcomputer is performed in step 3. Initialization processing includes processes which are necessary for any product which employs a microcomputer, and processes to set the microcomputer to enable use of the input and output ports of the microcomputer, to clear the RAM and to make preparations for use of the functions of the microcomputer. Then in step 4, preparations for transmission of initialization data to all of the LCUs connected to the BCM are performed. Here, the switch situations of the power supply switching circuits of the LCUs are all switched on to make preparations for power supply to the electric loads and connection units. In step 5, the BCM fetches a switch input situation and a trouble situation from any of the LCUs connected thereto. In step 6, the processing in steps 4 and 5 is repeated until it is completed for all of the LCUs connected to the BCM. Since initial information necessary to start control is all acquired by completion of the processing up to step 6, processing execution start completion is set in step 7. The foregoing is the content of the processing executed without fail when a battery is connected.

After step 7 is executed, ordinary control in step 8 is performed. The processes are described with reference to flow charts shown in FIG. 28 et seq.

Subsequently, processing when the power supply network is not used is described. In the present invention, when the system need not function, in short, when there is no need of supplying power, in order to minimize discharge of the battery, power supply to the electric load driving circuits of the LCUs is cut-off and the communication ICs and the communication IC 65 and the microcomputer of the BCM are put into a low current consumption mode (sleep mode). First, in step 9, it is checked based on the output tables of FIG. 25 whether or not there is an electric load which is in operation. If some electric load is outputting, then the processing returns to step 8, in which the processing is repeated. However, if no electric load is outputting, it is checked in step 10 based on the input tables of FIG. 24 whether or not some electric load is planned to operate. If some switch is on or trouble has occurred, then the processing returns to step 8 similarly. However, if no switch is on or no trouble has occurred, then in order to cut-off power supply to the electric loads of the individual LCUs, a signal for switching off a power supply switching circuit and a switch switching circuit is set to the output tables in step 11. In step 12, transmission of the set data is awaited, and after the transmission is completed, the microcomputer enters a sleep mode in step 13. It is to be noted that, if operation of some switch is performed in this state, then the microcomputer is released from the sleep mode, and the processing is repeated again beginning with step 7.

Figure 28:
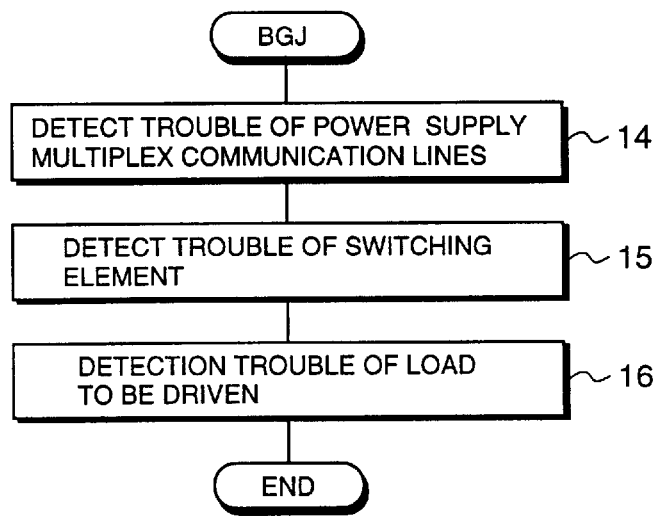
FIG. 28 is a flow chart of diagnostic processes.

<Description of FIG. 28>

In the following, the contents of the ordinary control are described. FIG. 28 is a routine of a background job processing (BGJ) which is part of the processing in step 7. This processing processes which is executed when processing which is hereinafter described is not executed, and principally executes diagnostic processes. In step 14, trouble detection processing for the power supply multiplex communication cables is performed; in step 15, trouble detection processing of the switching element of the output interface; and in step 16, trouble detection processing of a load to be driven is performed. It is to be noted that details are hereinafter described.

Figure 29:
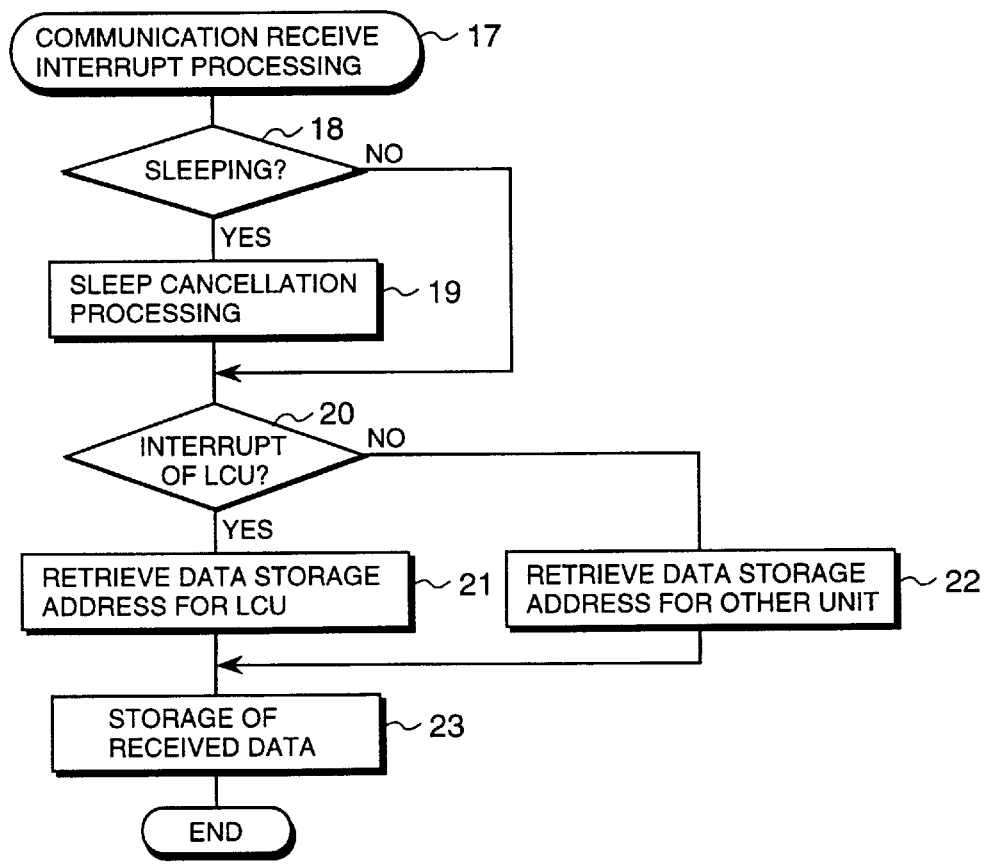
FIG. 29 is a flow chart of transmission signal interrupt processing.

<Description of FIG. 29>

FIG. 29 is a flow chart of communication receive interrupt processing for fetching data received by the communication IC 65. The fetched data here are stored into an input table described with reference to FIG. 24 or 26.

First, in step 18, it is checked whether or not the microcomputer has been in a sleep mode, and if the microcomputer has been in a sleep mode, then since this signifies that the entire system is in a low power consumption mode, sleep cancellation processing is executed in step 19. Here, a sleep cancellation signal is sent to the communication ICs 52, 70, 77, 84, 102, 109, 120, 131 and 136 of all of the nine LCUs so that processing of returning the entire system to an ordinary state is executed. If the microcomputer has been released from a sleep state, then the processing advances directly to step 20, in which it is discriminated from address information of a signal received just now from which LCU or unit the data has been received. If the data has been received from an LCU, then a data storage address of the input table of FIG. 24 is calculated in step 21. If the data has been received from a unit, then a data storage address of the unit shown in FIG. 26 is calculated similarly. Then, in step 23, the received data is stored into the object address.

In this manner, the processing of discriminating, based on an address of received data, from which module or unit the data has been received and storing the data into a corresponding table is the processing of FIG. 29 and is used also for cancellation of a sleep mode.

Figure 30:
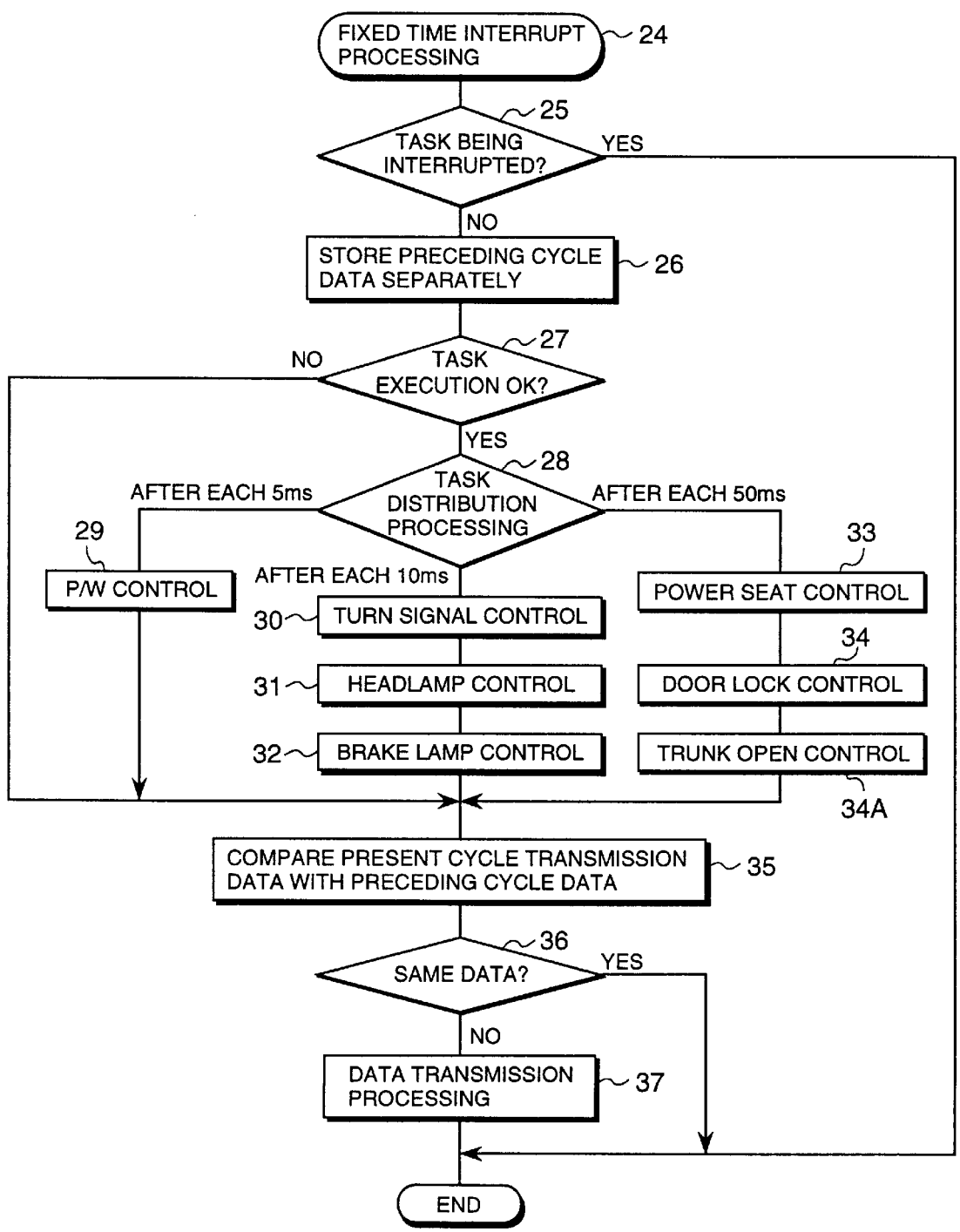
FIG. 30 is a flow chart of fixed interrupt processing.

<Description of FIG. 30>

FIG. 30 is a processing routine of fixed time interrupt processing which is started after each fixed period of time. In the present embodiment, the fixed time interrupt processing is started after each 1 ms, and almost all processing such as operation of the individual electric loads and transmission processing performed by the power supply network is executed here.

Step 25 processes for interrupting all of the functions of the power supply network and processes to be used principally in order to switch processing of the BCM to another unit (for example, the air conditioner unit). Since the process is not used in ordinary operation at all, step 26 is executed.

Step 26 processes for saving, prior to transmission, data which have been transmitted in the preceding cycle (that is, data of the transmission table of FIG. 25 at present) temporarily to another portion of the RAM. The process is provided in order to eliminate such a disadvantage that same transmission data which are transmitted several times in vain occupy the multiplex transmission lines and disable transmission of other data, and is used to transmit data only to a destination (LCU) to which the data must be transmitted.

Step 27 processes for interrupting the processing of operating an electric load and is similar to step 25. However, this step 27 is used to perform self diagnosis.

Step 28 processes determine in what priority order a number of processes should be executed, and in the present embodiment, the processes are executed by three time managements of 5 ms, 10 ms and 50 ms. Principally, those processes for which a response time after a switch is operated matters are executed after the short time interval, but those processes with which some delay does not matter in operation are executed after the long time interval.

One of the processes which is executed after each 5 ms is control of the power window (step 29), and the processes which are executed after each 10 ms include turn signal control (step 30), headlamp lighting control (step 31) and braking lamp lighting control (step 32). Further, the processes which are executed after each 50 ms include control of the driver's and passenger's power seats (step 33) and locking and unlocking control of the door locks (step 34).

In step 35, the data stored in step 26 and the data of the transmission tables set in steps 29 to 34 are compared with each other, and any LCU address with which same data are detected is removed. Only those LCU addresses in which different data are included are extracted, and the output data are transmitted at step 37 so that the object loads are rendered operative.

Figure 31:
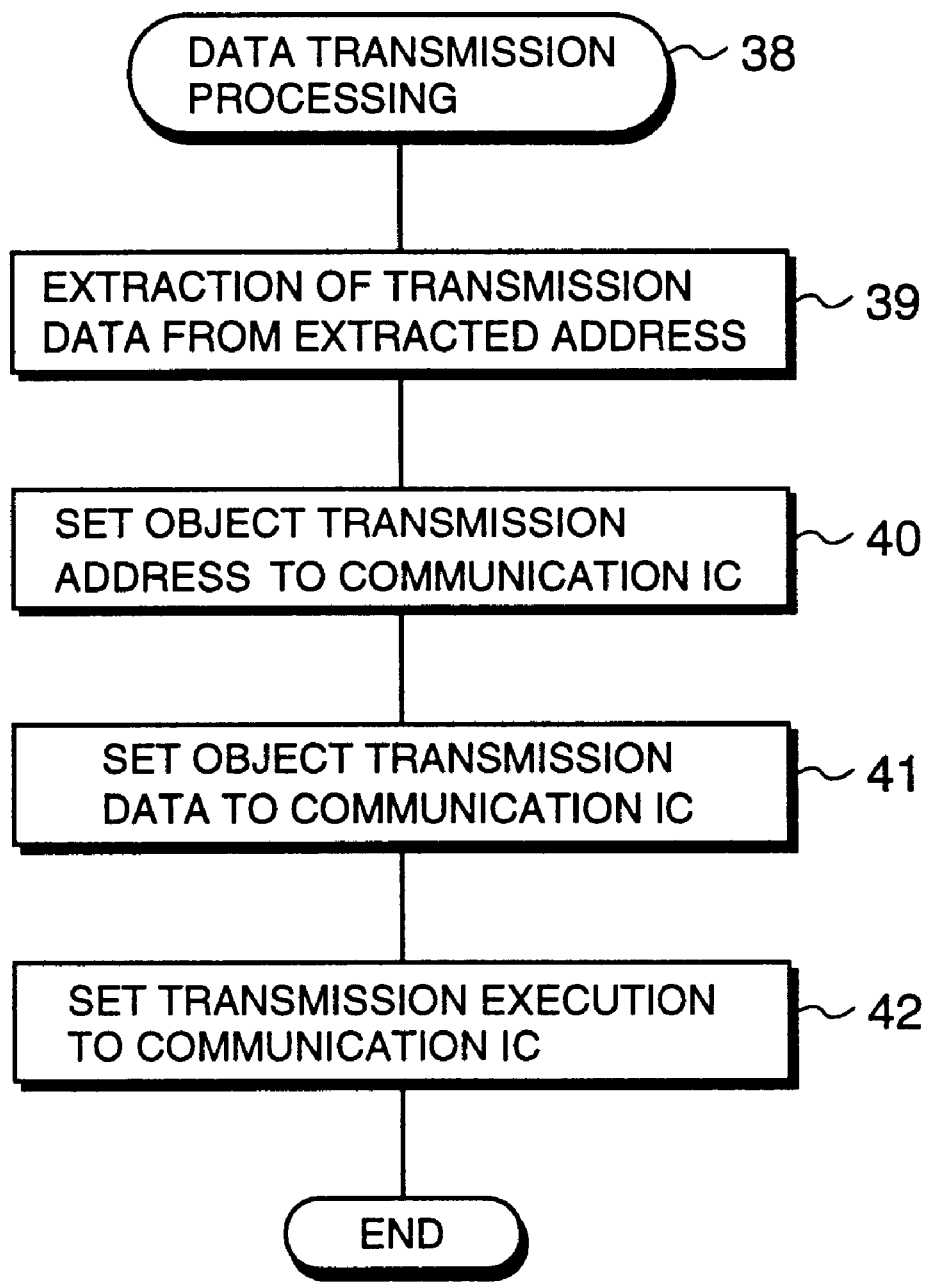
FIG. 31 is a flow chart of data transmission processing.

<Description of FIG. 31>

FIG. 31 illustrates details of the processing in step 37 of FIG. 30. In step 39, data to be transmitted are extracted from the address of the transmission table extracted by the comparison in step 35 of FIG. 30. Then in step 40, the communication destination address is set to the communication IC 65, and in step 41, the transmission data are set. Then, in step 42, execution of transmission is set so that the data are transmitted from the BCM to the object LCU.

Based on the data thus transmitted, an electric load of the LCU operates, and if the diagnosis information or a switch changes as a result of the operation of the electric load, this is transmitted as input data from the LCU to the BCM. Mutual communication is realized by repetition of the sequence of operations described above.

In the following, details of the individual contents of processing are described in order.

Figure 32:
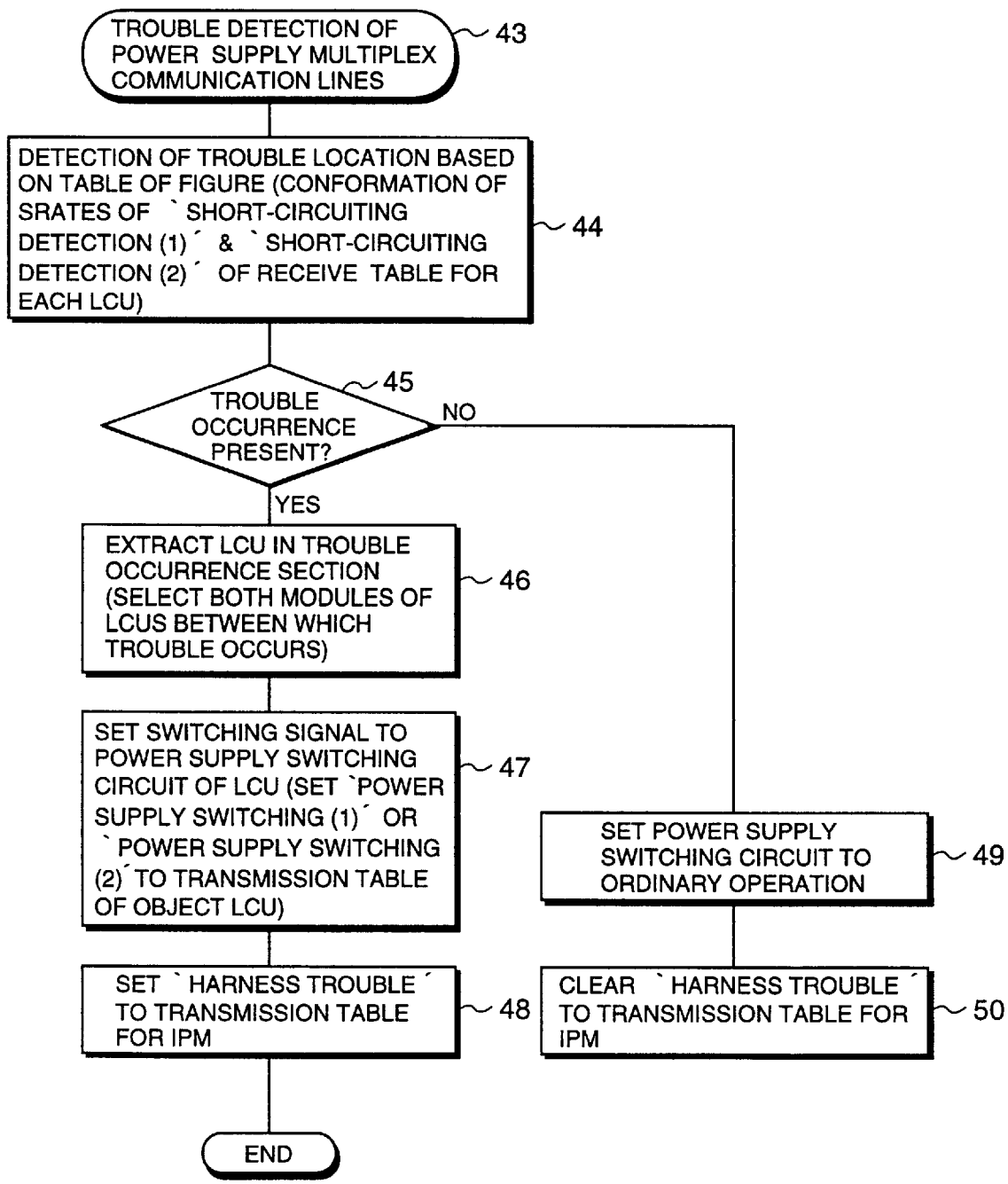
FIG. 32 is a flow chart of trouble detection for a integrated power/communication cable.

<Description of FIG. 32>

First, the trouble detection processing of the power supply multiplex communication cables in step 14 of the BGJ processing of FIG. 28 is described. FIG. 32 is a detailed flow chart of the trouble detection processing. The processes are performed for a module to which two power supply multiplex communication cables are led in, and, for another module to which one power supply multiplex communication cable is led in, only alarming is performed.

In step 44, a short-circuiting situation of the power supply multiplex communication cables is read in from the input table of FIG. 24, and in step 45, it is discriminated whether or not there is some trouble. If some trouble is detected, then preparations for transmission of a signal for operating a power supply switching circuit to a state illustrated in Table 1 to an object LCU are made in step 47. Then in step 48, in order to notify a driver of the vehicle that some trouble has occurred, the bit 2 of the transmission table of FIG. 25 for the IPM which is the "harness trouble" lamp is set to make preparations for lighting of the alarm lamp.

If no trouble is detected in step 45, then data are set to the transmission table of FIG. 25 in step 49 so that the power supply switching circuit may be returned to its ordinary state. Then, in step 50, the bit 2 of the transmission table of FIG. 25 for the IPM which is the "harness trouble" lamp is cleared to make preparations to extinguish the alarm lamp.

Figure 33:
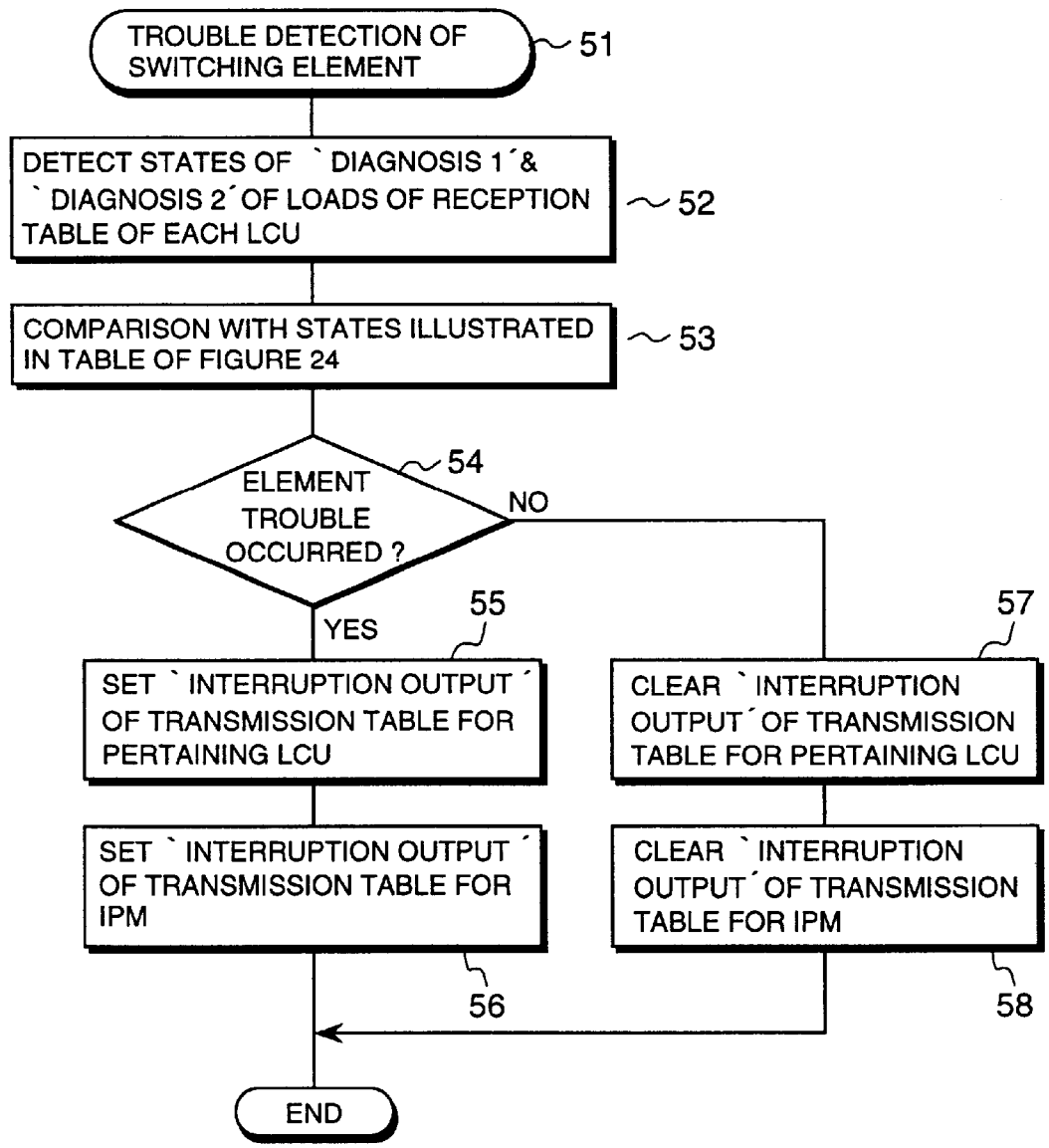
FIG. 33 is a flow chart of trouble detection for a switching element.

<Description of FIG. 33>

FIG. 33 is a detailed flow chart of step 15 of FIG. 28. Also in the processes, information of the "diagnosis 1" and the "diagnosis 2" of an electric load is read in from the input table of FIG. 24, and in step 53, the information is compared with the state indicated in Table 3 to check whether or not some trouble occurs with an element of an output interface of each of the LCUs and the units. If there is an LCU or unit which has an element with some trouble, then the "cut-off output" of the transmission table of FIG. 25 for the pertaining LCU or unit is set in step 55 to make preparations to close the cut-off circuit of the pertaining LCU or unit, and in step 56, in order to notify the driver of the trouble, the "cut-off output" of the IPM is set to make preparations to light the alarm lamp. If no trouble is detected in step 54, then the "interrupt output" of the transmission table of FIG. 25 is cleared, and in step 58, the alarm lamp of the IPM is extinguished.

Figure 34:
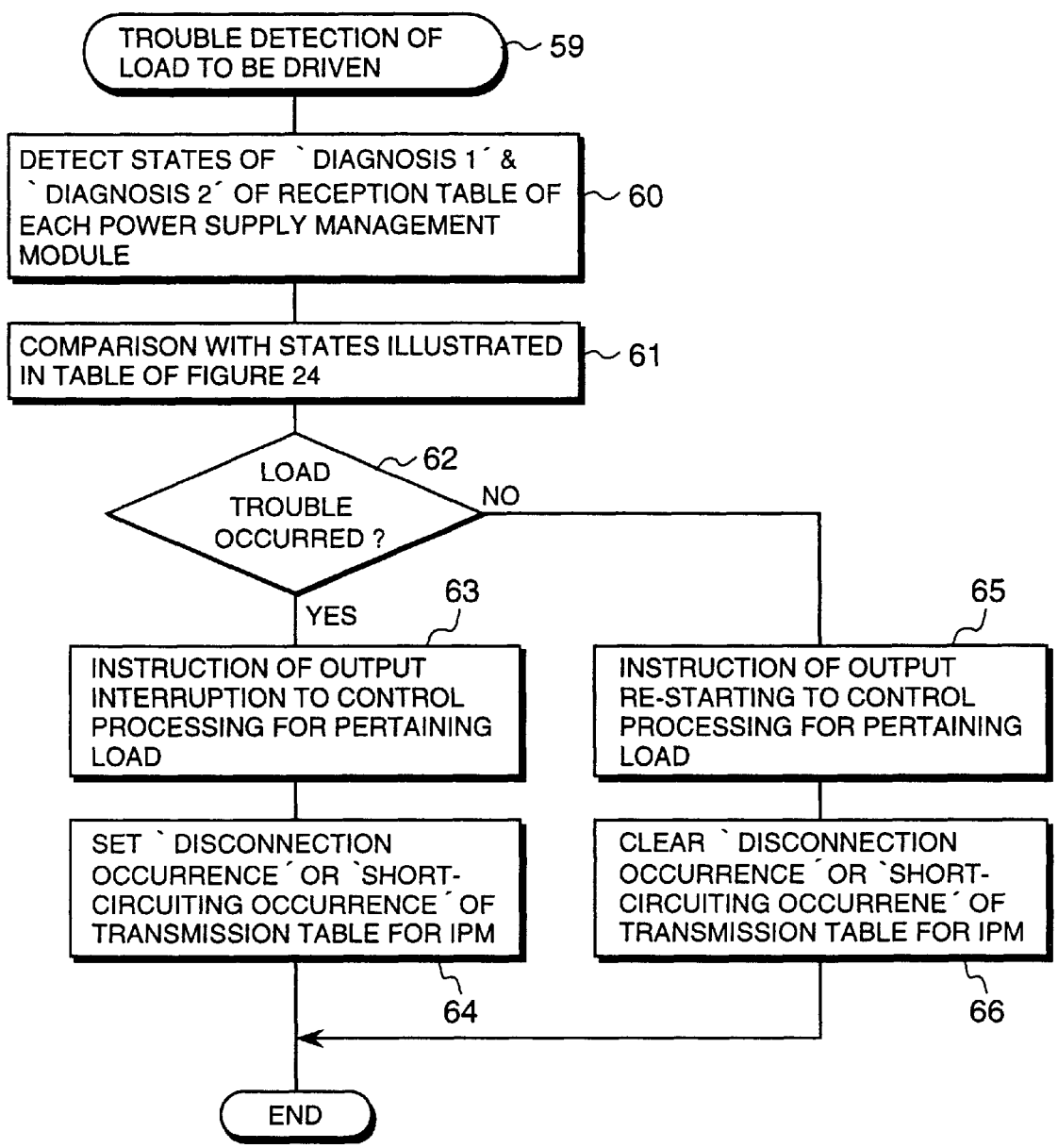
FIG. 34 illustrates trouble detection of a driven load.

<Description of FIG. 34>

FIG. 34 is a detailed flow chart of step 16 of FIG. 28. Also here, information of the "diagnosis 1" and the "diagnosis 2" of an electric load is read in from the input table of FIG. 24, and in step 61, the information is compared with the state indicated in Table 3 to check whether or not some trouble occurs with a load to be driven. If some trouble is detected in this step, then the "output cut-off" is set to the pertaining control process in step 63 to stop driving the load. Then, in step 64, it is checked whether or not the information coincides with the situation of Table 3, and in order to notify the driver of the trouble, the "disconnection occurrence" or the "short-circuiting occurrence" of the IPM is set to make preparations to light the alarm lamp. If no trouble is detected in step 62, then the "output cut-off" is cleared to the pertaining control process, and in step 66, the alarm lamp is extinguished.

Figure 35:
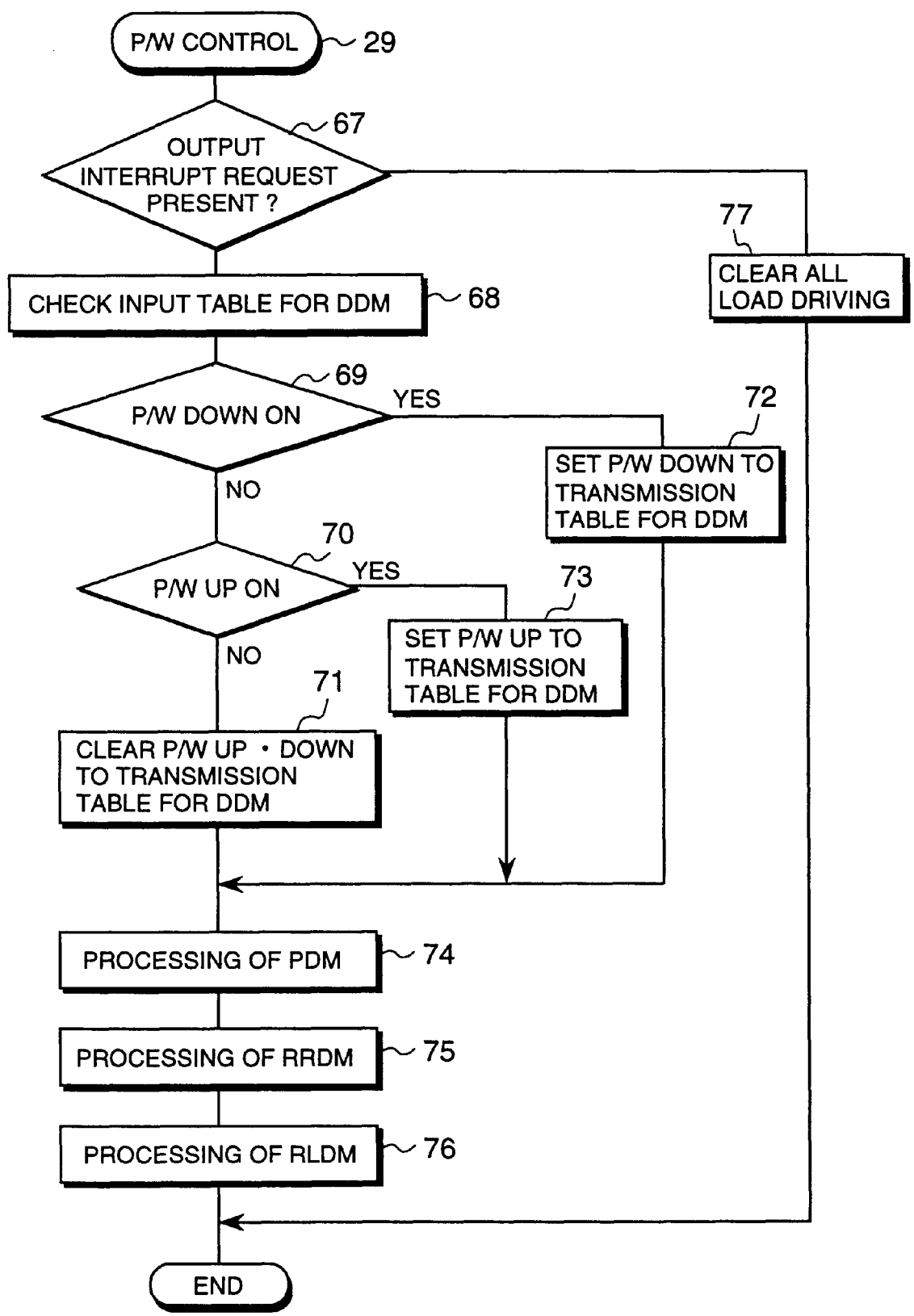
FIG. 35 is a control flow chart of a power window.

<Description of FIG. 35>

FIG. 35 is a detailed flow chart of the power window (hereinafter referred to as P/W) in step 29 of FIG. 30. In step 67, it is checked whether or not there is an output cut-off request. This is used to stop, when the "output cut-off" is set in step 63 of FIG. 34 as described above, all of the operation of the P/W in step 77. Accordingly, this is not set in ordinary operation at all.

First, contents of control of the driver's seat P/W are described. In step 68, the input table for the DDM is checked, and in step 69, it is confirmed whether or not the DOWN switch for the P/W is on. If the DOWN switch for the P/W is on, then the P/W DOWN of the transmission table for the DDM is set in step 72 to make preparations to roll down the window. If the DOWN switch of the P/W is off in step 69, then it is confirmed now in step 70 whether or not the UP switch is on. If the UP switch is on, then the UP is set now similarly to make preparations to roll up the window. If the UP switch is off also in step 70, since this signifies that no switch is operated, the portions of the transmission table for the DDM which relate to the P/W are cleared in step 71.

While steps 74, 75 and 76 represent contents of processing of the PDM of the passenger's seat, the RRDM which is the rear seat on the right side and the RLDM which is the rear seat on the left side, respectively, they are basically same as those of the DDM.

Figure 36:
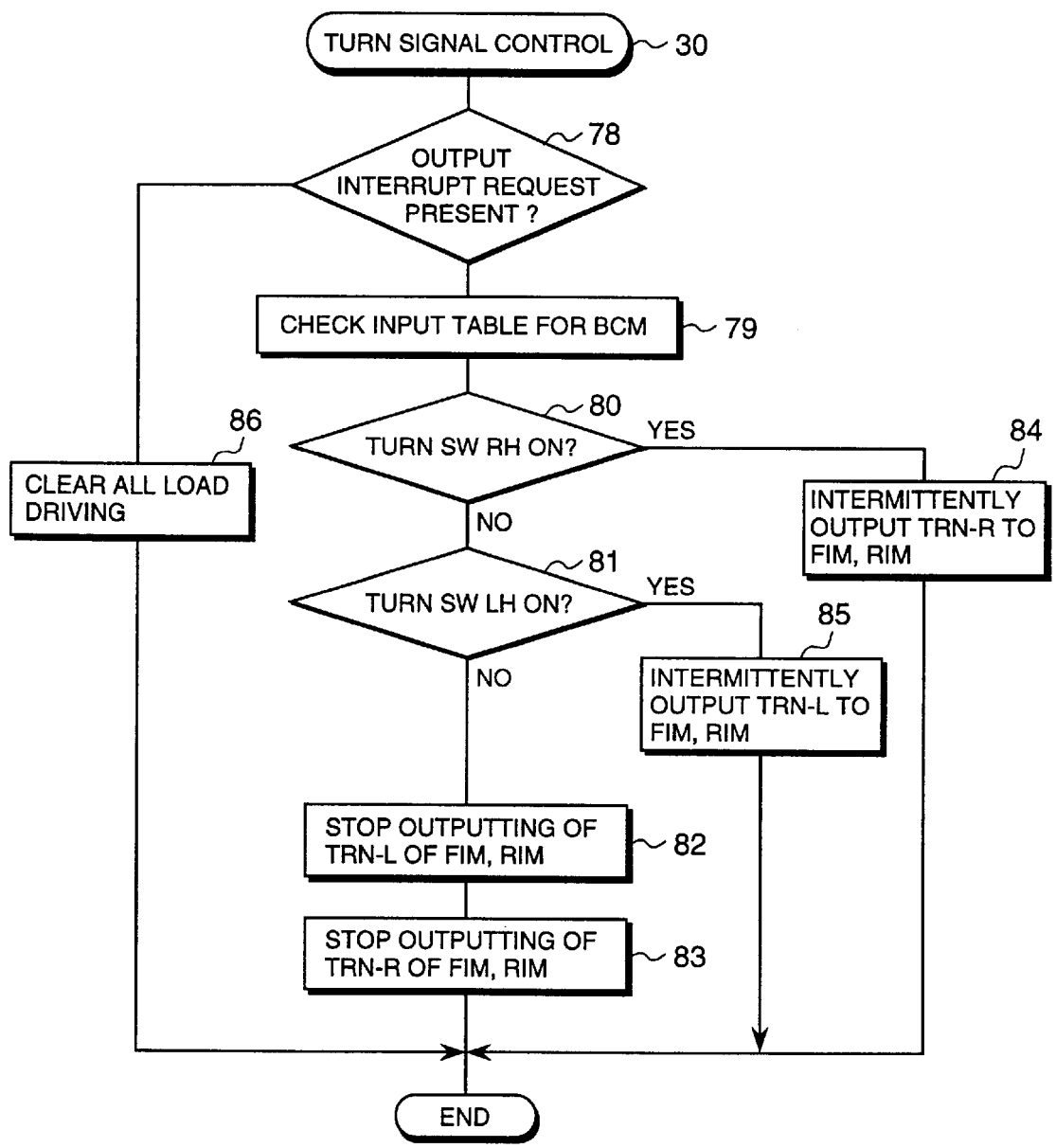
FIG. 36 is a control flow chart of a turn signal lamp.

<Description of FIG. 36>

FIG. 36 is a detailed flow chart of the turn signal control in step 30 of FIG. 30, and this control processes of lighting the turn indicator for the right or left turn.

The processing in steps 78 and 86 is used for the same object as that of the P/W control described hereinabove, and accordingly, description of the same is omitted.

First in step 79, the input table for the BCM is confirmed, and in step 80, it is checked whether or not the turn switch for the right (RH) turn is on. If the turn switch for the right (RH) turn is on, then processing for causing the right turn indicating lamp (TRN-R) connected to the FIM and the RIM to blink is performed in step 84. If the turn switch for the right (RH) turn is off, then it is checked in step 81 whether or not the turn switch for the left (LH) turn is on. If the turn switch for the left (LH) turn is on, then processing of causing the left turn indicating lamp (TRN-L) connected to the FIM and the RIM to blink is executed in step 85. If the turn switch for the left (LH) turn is off also in step 81, then since this signifies that no switch is operated, the portions of the transmission tables for the FIM and the RIM which relate to a turn signal are cleared.

Figure 37:
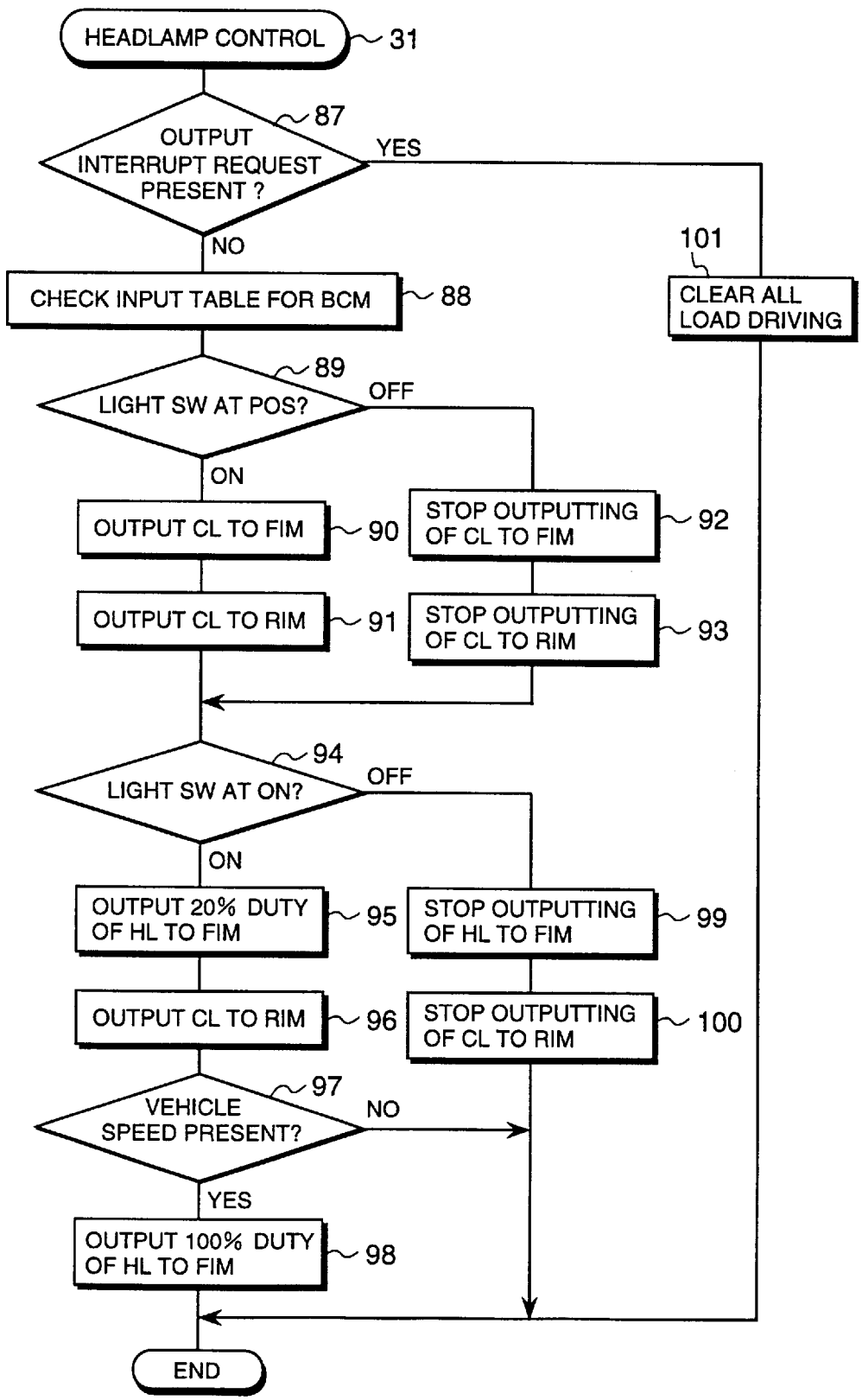
FIG. 37 is a control flow chart of a headlamp.

<Description of FIG. 37>

FIG. 37 is a detailed flow chart of the headlamp (headlamp, hereinafter referred to as HL) control in step 31 of FIG. 30, and this control involves PWM (pulse width modulation) control of the lamps for varying the brightness depending upon whether or not there is a vehicle speed.

Since the processing in steps 87 and 101 is used for the same object as that of the P/W control described above, description of the same is omitted.

This control is control of lighting the clearance lamps (side marker lamps, hereinafter referred to as CLs) when the light switch is positioned to the POS position but lighting the HLs when the light switch is positioned to the on position.

First in step 88, the input table for the BCM is checked, and in step 89, it is checked whether or not the light switch is at the POS position. If the light switch is at the POS position, then the CL output of the transmission table for the FIM is set in step 90, and the CL output of the transmission table for the RIM is set in step 91 to make preparations to light the side marker lamps. If the light switch is not at the POS position, then the CL output of the transmission table for the FIM is cleared in step 92, and the CL output of the transmission table for the RIM is cleared in step 93 to make preparations to extinguish the side marker lamps.

Then, in step 94, it is checked whether or not the light switch is at the on position. If the light switch is at the on position, then in step 96, the HL output of the transmission table for the FIM is set and data 20% which is duty information of the PWM to the communication IC 52 is set simultaneously. Then in step 97, it is checked whether or not there is a vehicle speed, and if some vehicle speed is detected, then data 100% which is duty information of the PWM to the communication IC 52 is set in step 98. If the light switch is at the off position in step 94, then the HL output of the transmission table for the FIM is cleared in step 99, and the CL output of the transmission table for the RIM is cleared in step 100 to make preparations to extinguish the headlamps and the side marker lamps.

Figure 38:
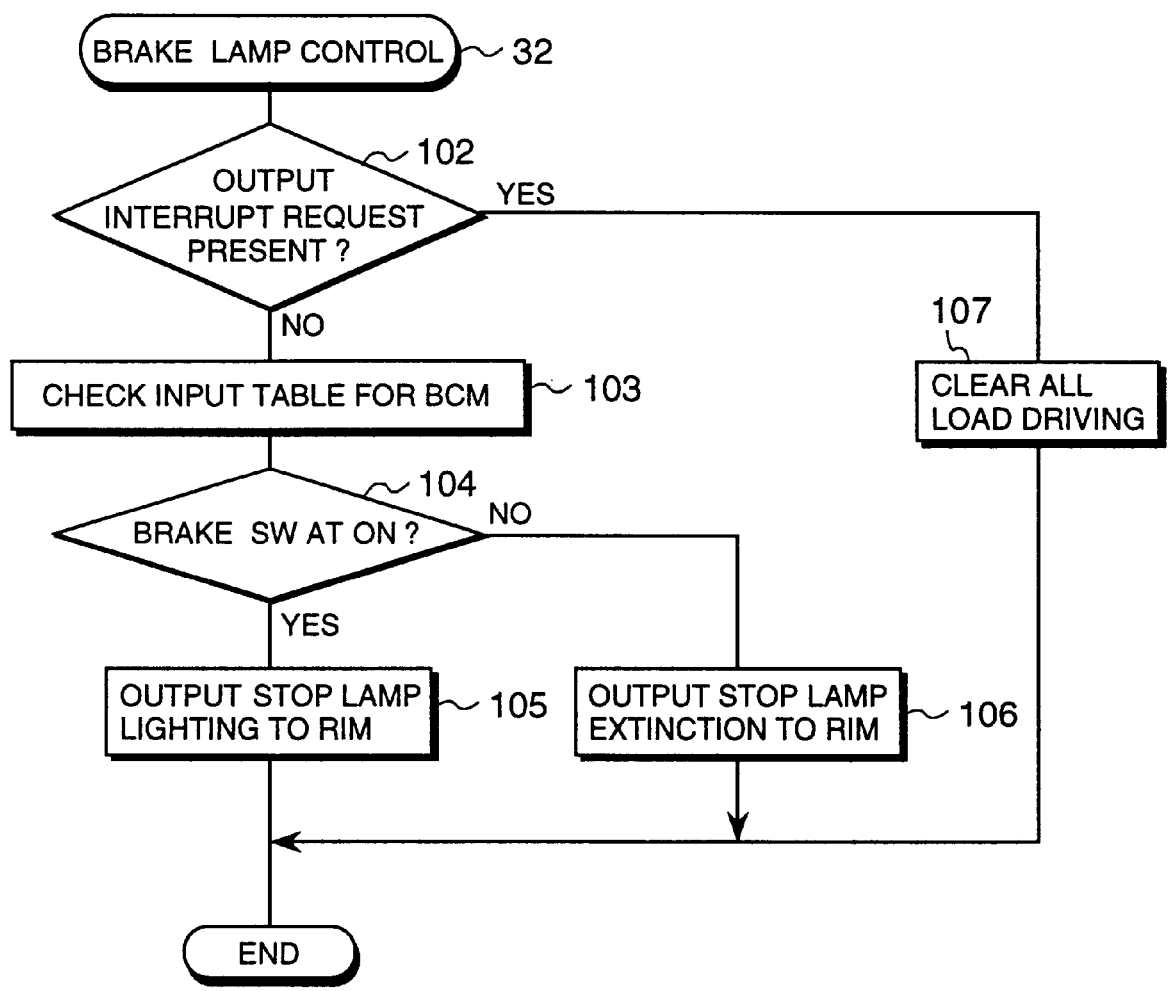
FIG. 38 is a control flow chart of a brake lamp.

<Description of FIG. 38>

FIG. 38 is a detailed flow chart of the braking lamp control for lighting the stop lamps in step 32 of FIG. 30.

Since the processing in steps 102 and 107 is used for the same object as that of the P/W control described above, description of the same is omitted.

Figure 103:
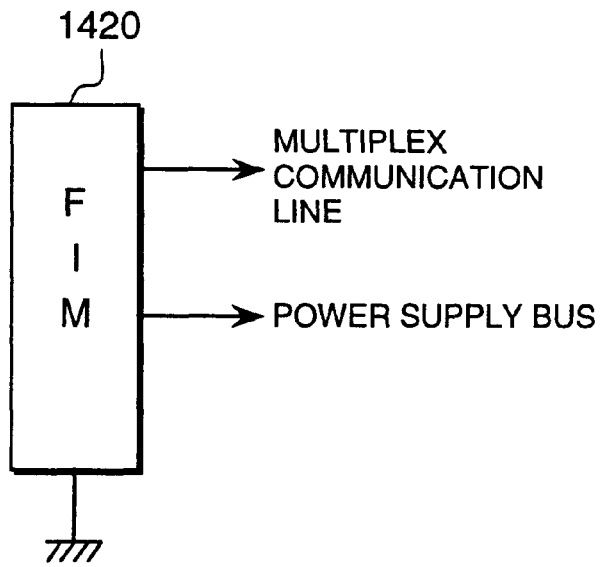
FIG. 103 is a drawing illustrating a load connection situation of an FIM.

In FIG. 103, the input table for the BCM is checked, and if the brake switch is on in step 104, then the STOP output of the transmission table for the RIM is set in step 105 to complete preparations to light the brake lamps. If the switch is off in step 104, then the STOP output of the transmission table for the RIM is cleared in step 106 to complete preparations to extinguish the brake lamps.

Figure 39:
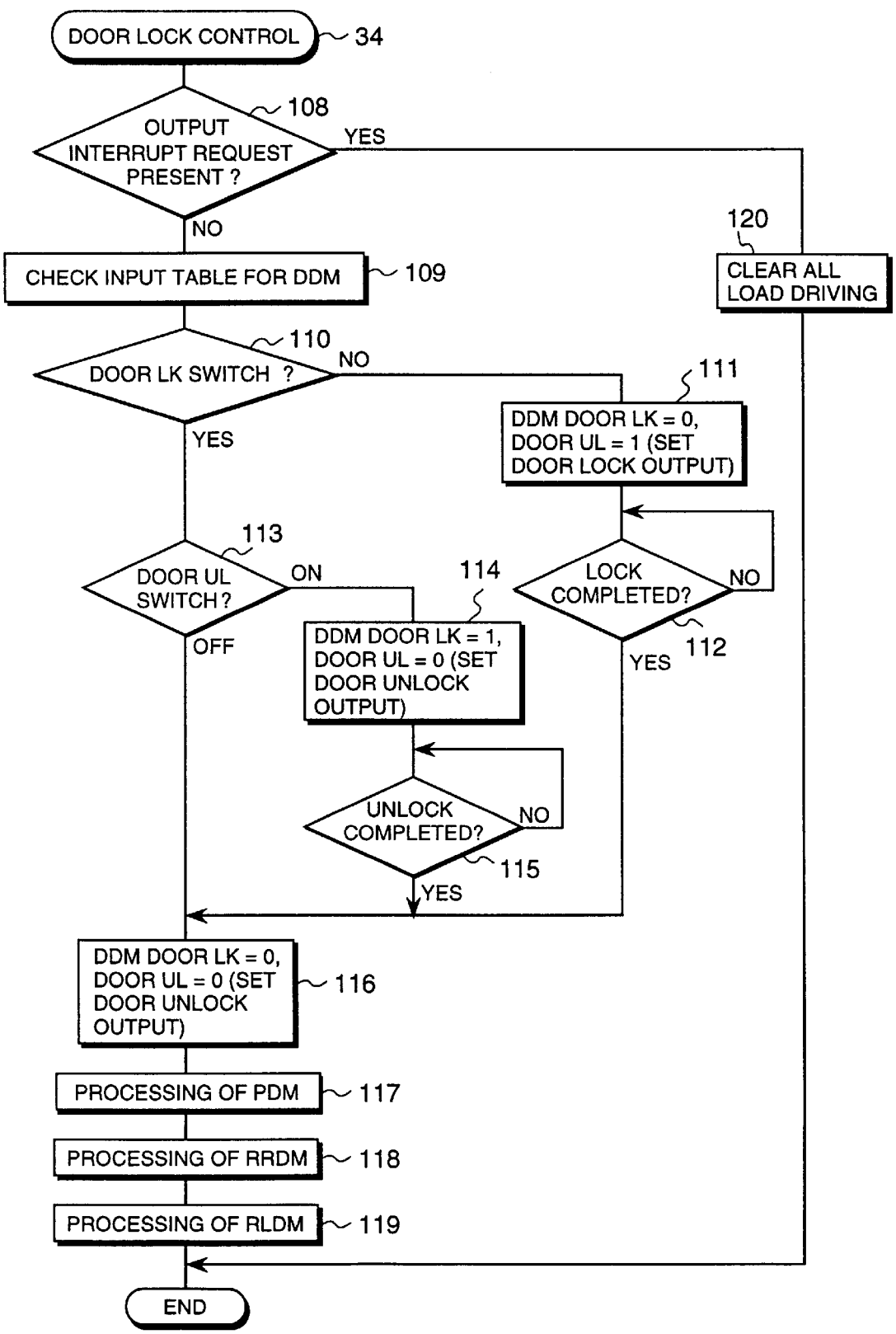
FIG. 39 is a control flow chart of a door lock.

<Description of FIG. 39>

FIG. 39 is a detailed flow chart of the control of locking or unlocking the door lock of the automobile in step 34 of FIG. 30.

Since the processing in steps 108 and 120 is used for the same object as that of the P/W control described above, description of the same is omitted.

In step 109, the input table for the DDM is checked, and first in step 110, it is checked whether or not a switch for locking the door is operated. If the switch for locking the door is operated, then the "door LK" of the transmission table for the DDM is set and the "door UL" is cleared to set the door lock output in step 111. Then in step 112, it is waited that locking of the door is completed while confirming the "door lock detection" signal of the input table. If the switch for locking the door is not operated in step 110, then it is checked in step 113 whether or not the switch for unlocking the door is operated. If the switch for unlocking the door is operated, then the "door LK" of the transmission table for the DDM is cleared and the "door LK" is set to set the door unlock output. Then, similarly in step 115, it is waited that unlocking of the door is completed while confirming the "door lock detection" signal of the input table.

If none of the two switches is operated, then the "door LK" and the "door UL" of the transmission table for the DDM are cleared to clear the door output.

Thereafter, door lock control of the passenger's seat in step 117, door lock control of the rear seat on the right side in step 118 and door lock control of the rear seat on the left side in step 119 are executed. Since the contents of the controls are same as those described above, description of the same is omitted.

Figure 40:
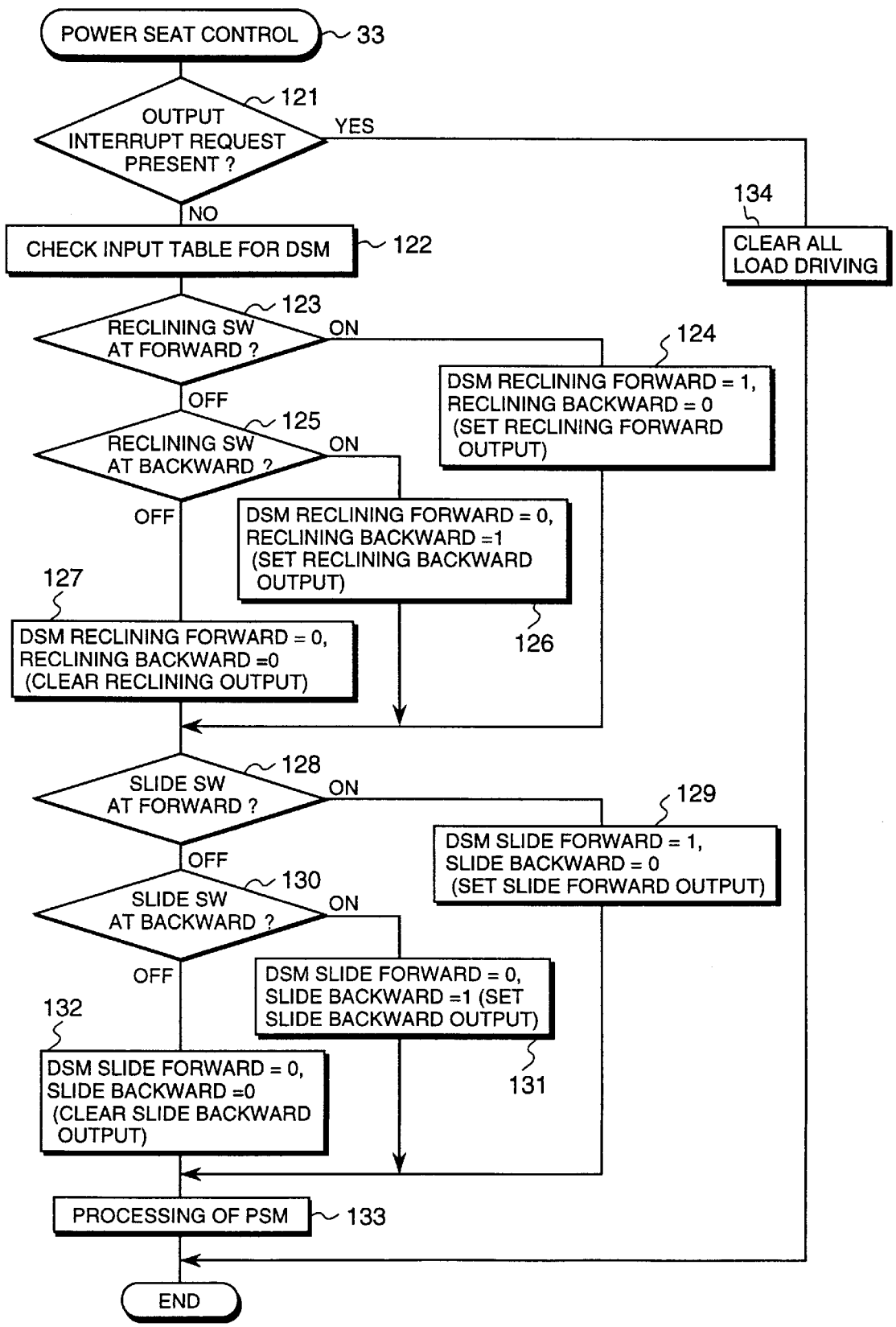
FIG. 40 is a control flow chart of a power seat.

<Description of FIG. 40>

FIG. 40 is a detailed flow chart of control for moving the reclining and sliding positions of the seats of the driver's seat and the passenger's seat in step 33 of FIG. 30.

Since the processing in steps 121 and 134 is used for the same object as that of the P/W control described above, description of the same is omitted.

First in step 122, the input table for the DSM is checked, and in step 123, it is checked whether or not the switch for moving the reclining apparatus forwardly is on. If the switch is on, then the "reclining forward" of the transmission table for the DSM is set and the s"reclining backward" is cleared in step 124 to make preparations for operation of the motor to tilt the reclining position forwardly. If the switch for moving the reclining position is not on in step 123, then it is checked in step 125 whether or not the switch for moving the reclining position backwardly is on. If the switch is on, then the "reclining forward" of the transmission table for the DSM is cleared and the "reclining backward" is set to make preparations for operation of the motor so that the reclining position may be tilted backwardly. If none of the two switches is operated, then the "reclining forward" and the "reclining backward" of the transmission table for the DSM are cleared in step 127 so that the motor for the reclining operation may be stopped.

Subsequently, a method of moving the sliding position of a seat is described.

First in step 128, it is checked whether or not the switch for moving the sliding position forwardly is on. If the switch is on, then the "slide forward" of the transmission table for the DSM is set and the "slide backward" is cleared in step 129 to make preparations for operating the motor so that the slide position may be moved forwardly. If the switch for moving the sliding position forwardly is not on in step 128, then it is checked in step 130 whether or not the switch for moving the sliding position backwardly is on. If the switch is on, then the "slide forward" of the transmission table for the DSM is cleared and the "slide backward" is set to make preparations for operating the motor so that the sliding position may be moved backwardly. If none of the two switches is operated, then the "slide forward" and the "slide backward" of the transmission table for the DMS are cleared in step 132 so that the motor for the sliding operation may be stopped.

Step 133 executes the processing in steps 122 to 132 for the passenger's seat, and since this processing is same in control, description of the same is omitted.

Figure 41:
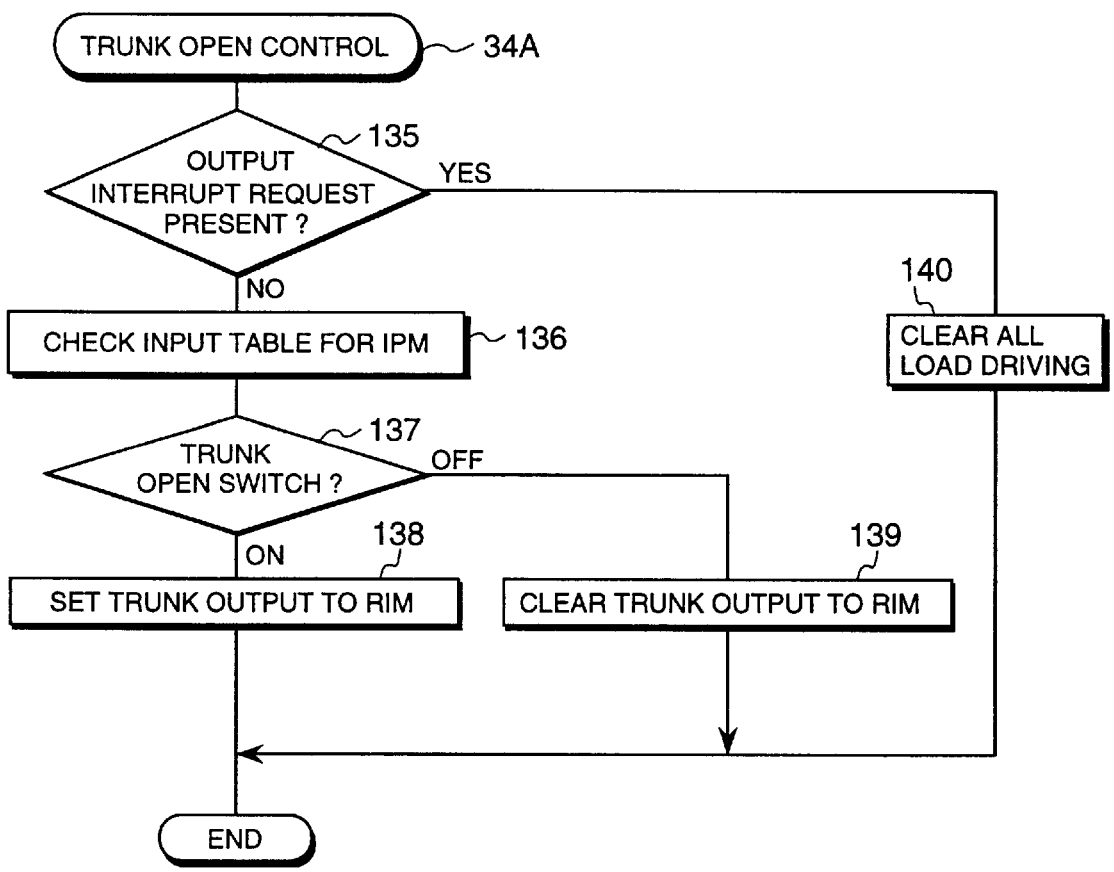
FIG. 41 is a control flow chart of trunk opening control.

<Description of FIG. 41>

FIG. 41 is a detailed flow chart of the control of unlocking the trunk in step 34A of FIG. 30.

Since the processing in steps 135 and 140 is used for the same object as that of the P/W control described hereinabove, description of the same is omitted.

First in step 136, the input table for the IPM is checked, and if the "trunk open" signal is set in step 137, then the "trunk output" of the transmission table for the RIM is set in step 138 to make preparations to supply power to the motor for unlocking the trunk. If the "trunk open" signal is not set in step 137, then the "trunk output" of the transmission table for the RIM is cleared in step 139 to make preparations to stop the power to the motor for unlocking the trunk, thereby ending the processing.

In the following, the communication control system used in the present embodiment is described in detail with reference to FIGS. 42 to 60 and Tables 4 to 10.

The I/O communication IC effects transmission of a digital input signal via a communication bus to a control module which includes a CPU. Further, the I/O communication IC effects on-off control of digital equipment via the communication bus from the control module. By the way, a plurality of I/O communication ICs are connected to the communication bus. Therefore, each of the I/O communication ICs has such functions as described below which prevent interference of data communicated between the I/O communication IC and the control module. First, the communication ICs connected to the communication bus have respective unique numbers which do not overlap with each other, and transmission data include input/output data and the unique number of the apparatus which transmits the data. Second, each of the I/O communication ICs has a communication bus supervision function to prevent collision between data from a plurality of apparatus, and effects transmission when the communication bus is not used by any other communication IC. Further, if a plurality of units start their communication, then based on priority order data included in data, that unit which exhibits the highest priority order is allowed to transmit data to the communication bus.

The I/O communication IC effects transmission in the following two cases. One of the two cases is that a digital input signal connected to it exhibits a variation, and the other is that a transmission request is received from the control module.

Further, the I/O communication IC receives data and sets the data to the output ports only when data on the transmission bus are analyzed and the data are destined for the I/O communication IC.

Figure 42:
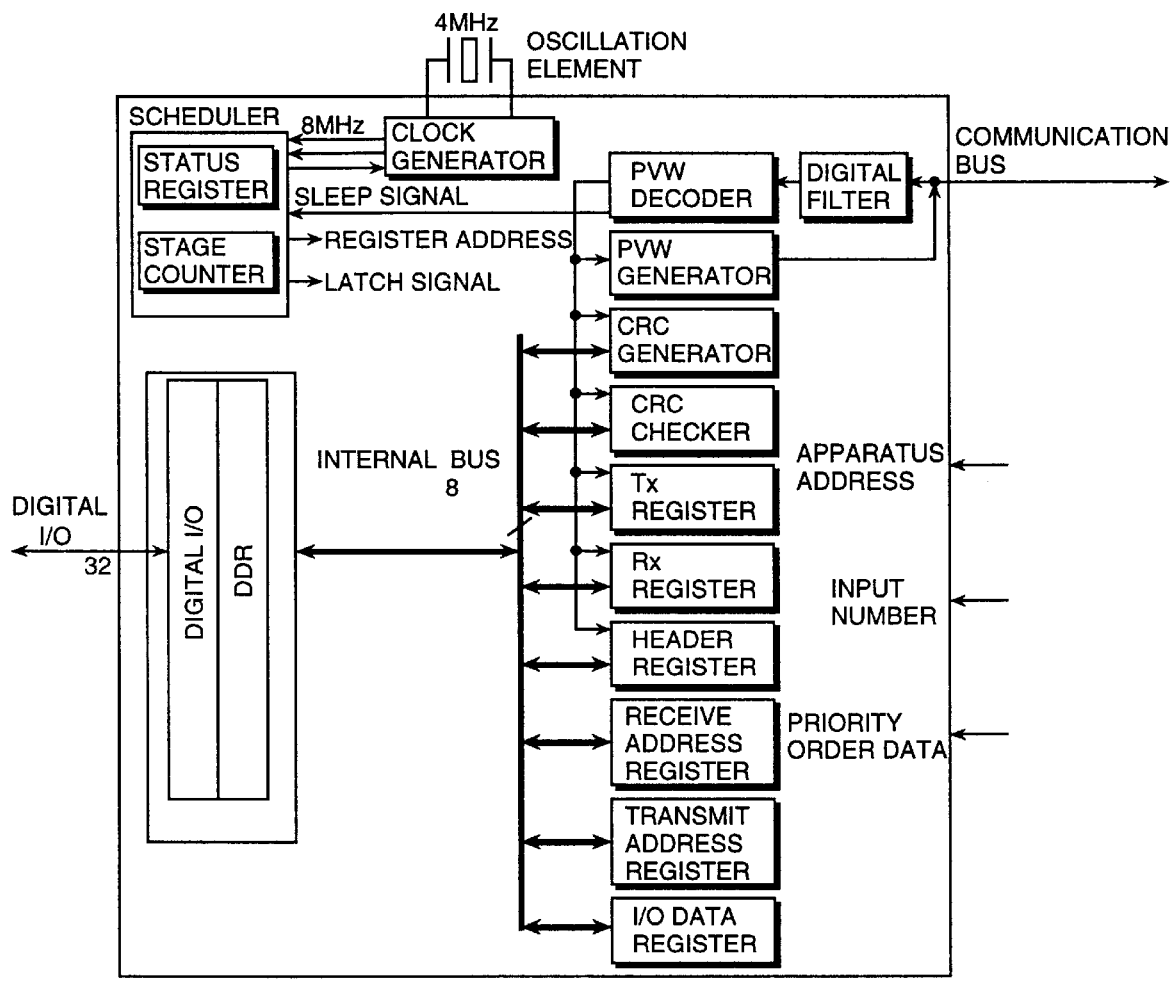
FIG. 42 is a circuit diagram showing a construction of an I/O communication IC.

A circuit construction of the I/O communication IC is shown in FIG. 42. Functions of the I/O communication IC are divided into transmission, reception and transmission-reception timing controlling functions. First, a method by which the I/O communication IC transmits an input signal is described.

In transmission, if a transmission request is received, then the I/O communication IC confirms that the communication bus is not used by any other unit and transmits digital data to the communication bus in accordance with a prescribed format. The data format includes header data, digital input data and data check data. If a transmission request is received, then an input signal is set from a digital I/O port to an I/O register. If the communication bus can be used, then data are set to a Tx register in order of the header register, receive address register, transmit address register, I/O register and CRC generator. The data set to the Tx register are inputted to a VPW generator, by which they are variable pulse width (VPW) modulated, and are then transmitted to the communication bus. The VPW modulation method is a method wherein digital data of "1" and "0" are transmitted with two different pulse widths and two different voltage levels.

According to this modulation method, when data being transmitted at present and the next bit are the same data, both of the voltage level and the pulse width are varied, but when they are different, only the voltage level is varied.

Here, in the header register, characters of following data such as priority order data of the unit are set in advance. In the receive address register, address data (the apparatus number) of another unit which is to receive data transmitted is set, and in the transmit address register, the transmission apparatus number, that is, the apparatus number of the unit, is set. The CRC generator is a circuit which performs CRC (Cyclic Redundancy Check) from the header register to the I/O register. Here, the CRC calculation is one of methods of error detection which are performed in data transmission.

In the following, a method by which the I/O communication IC receives data from the communication bus and set the data to the output port is described.

Data on the communication bus are inputted to a VPW decoder after noise components are removed therefrom by a digital filter.

The VPW decoder converts, reversely to the VPW generator, a VPW modulated signal to digital data of "1" and "0".

The digital data obtained by the conversion are inputted to an Rx register, and contents of the header register and the receive register are compared with the apparatus number and so forth of the I/O communication IC to discriminate whether or not the data on the communication bus have been destined for the I/O communication IC.

If it is discriminated that the data on the communication bus are destined for any other unit, then the following reception operation is not performed. When the data on the communication bus are destined for the I/O communication IC, the following Rx register is set to the I/O register. Then, when the OK output of the CRC check circuit becomes true, the contents of the I/O port are set to the output port. When the OK output of the CRC check circuit is false, a receive error is outputted to notify the transmission side that a receive error has occurred.

Here, the transmission and reception timing control of the communication IC is performed by a scheduler.

The scheduler is formed from a status register, a stage counter, a byte counter and so forth. The status register is a register which represents a status of the communication IC (transmitting, receiving, transmission-reception error or the like). The stage counter is a register which represents a time series state during transmission or reception.

Here, when data are to be transmitted to the communication bus, in addition to the data from the header data to the CRC data, a special signal different from a data signal (VPW signal) representative of a start and an end is added. The start signal is called SOF (Start Of Frame), and the end signal is called EOD (End Of Data).

The stage counter is a register which represents one of the states of the SOF, data, EOD and no data.

The byte counter is a counter which represents which data the transmit or receive data (from the header data to the CRC data) are.

In addition, the communication IC circuit includes a clock generator which generates a signal. Here, signal lines connected to the communication IC include, in addition to the communication bus line and the digital input/output signal line, apparatus number, priority order signal and input signal number (or output signal number) lines.

Basic operation of the communication IC has been described in outline so far. The communication IC has, in addition to the operation for ordinary transmission and reception, a sleep operation mode in which those circuits which operate in response to a clock signal are stopped to suppress the power consumption to a level substantially equal to leak currents of the semiconductor elements. Transition into the sleep mode occurs depending upon transmission data from the communication bus or when the digital signal does not exhibit a variation for more than a fixed period of time.

Transition from the sleep mode to the ordinary operation mode occurs when communication data are sent to the communication bus or when a variation occurs in the input signal.

In the following, detailed operation of the communication IC are described.

Communication ICs are divided into two kinds including an I/O communication IC and a C/U (Control Unit) communication IC. The I/O communication IC effects interfacing between a digital input/output and a communication bus, and C/U communication IC effects interfacing between a communication bus and a CPU.

Both communication ICs have apparatus addresses (apparatus numbers) which do not overlap with each other and effect data communication with each other. An example of addresses of the communication ICs connected to the communication bus is indicated in Table 4. Here, the example is shown wherein the address is indicated by 1 byte and the upper 4 bits represent an address for identification of a control function while the lower 4 bits represent a number for identification of a communication IC in the same control system.

Here, any address whose number of the lower 4 bits is 0 represents a C/U (Control Unit) communication IC. The unit whose number of this is 0 has a function which can work data of the same control system. In the other units, the bit construction of data transmitted or received and the digital input/output ports correspond in a one-by-one corresponding relationship to each other, and the units have no editing working function.

TABLE 4

Physical Address Table

| Address | Function Name |
|---------|---------------|
| 0X | All |
| 1X | PCM system |
| 2X | ABS system |
| 3X | BCM system |
| 4X | SDM system |
| 5X | A/C system |
| 6X | Navig. system |
| 7X | Beacon system |

| Address | Module Name |
|---------|-------------|
| 30 | BCM |
| 31 | PDM |
| 32 | DDM |
| 33 | RDDM |
| 34 | IPM |
| 35 | DSM |
| 36 | RIM |
| 37 | RDM |
| 38 | RLDM |
| 39 | FIM |

Input/Output Apparatus Allocation Table

| I/O # | Signal name (input) | Signal name (out put) |
|-------|---------------------|------------------------|
| | BCM(Address 30) | |
| 00 | Switch switching (2) | Switch switching (2) |
| 01 | Switch switching (1) | Switch switching (1) |
| 02 | Power supply switching (2) | Power supply switching(2) |
| 03 | Power supply switching (1) | Power supply switching (1) |
| 04 | | cut-off output |
| 05 | Lamp diagnosis 2 | Lamp output |
| 06 | Lamp diagnosis 1 | |
| 07 | | |
| 08 | | |
| 09 | Turn SW LH | |
| 10 | Turn SW RH | |
| 11 | Light SW ON | |
| 12 | Light SW 1 step | |
| 13 | Key SW ST | |
| 14 | Key SW ON | |
| 15 | Key SW ACC | |
| | BCM(Address 34) | |
| 00 | Short-circuiting detection | |
| 01 | Interrupted state | |
| 02 | | |
| 03 | | |
| 04 | | Cut-off output |
| 05 | | |
| 06 | | |
| 07 | Brake diagnosis | Short-circuiting occurrence |
| 08 | Door diagnosis | Disconnection occurrence |
| 09 | CL diagnosis | Harness trouble |
| 10 | HD diagnosis | |
| 11 | TRN-L diagnosis | TRN-L lamp |
| 12 | TRN-R diagnosis | TRN-R lamp |
| 13 | | Brake lamp |
| 14 | Brake SW | CL lamp |
| 15 | Trunk open | HD lamp |
| | BCM(Address 39) | |
| 00 | Short-circuiting detection (2) | Switch switching (2) |
| 01 | Short-circuiting detection (1) | Switch switching (1) |
| 02 | Power supply switching (2) | Power supply switching (2) |
| 03 | Power supply switching (1) | Power supply switching(1) |

TABLE 4-continued

| 04 | Interrupted state | cut-off output |
| 05 | | HORN output |
| 06 | HORN diagnosis 2 | HL output |
| 07 | HQRN diagnosis 1 | TRN-R output |
| 08 | HL diagnosis 2 | TRN-L output |
| 09 | HL diagnosis 1 | |
| 10 | TRN-R diagnosis 2 | |
| 11 | TRN-R diagnosis 1 | CL output |
| 12 | TRN-L diagnosis 2 | |
| 13 | TRN-L diagnosis 1 | |
| 14 | CL diagnosis 2 | |
| 15 | CL diagnosis 1 | |

In the address of the C/U communication IC shown in Table 4, 1x: PCM (engine control system), 2x: ABS (brake control system), 3x: BCM (body control system, 4x: SDM (Air Bag System), 5x: A/C (air conditioner), 6x: navigation system), and 7x: beacon. Meanwhile, in the address of the I/O communication IC of the BCM system, 30: BCM (Body Control Module), 31: PDM (Passenger Door Module), 32: DDM (Driver Door Module), 33: RRDM (Rear Right Door Module), 34: IPM (Instrument Panel Module), 35: DSM (Driver Seat Module), 36: RIM (Rear Integrated Module), 37: PDM (Passenger Door Module), 38: RLDM (Rear Left Door Module, and 39: FIM (Front Integration Module).

Further, an example of input signals and output device signals of the BCM (body control system) connected to the BCM, IPM and FIM is shown.

By such addressing, an outline of functions of an apparatus can be discriminated from its address, and understanding of the functions, analysis of an error and so forth can be performed readily.

Here, an example of operation when the left turn signal is turned on is described.

If the turn SW LH at 09 connected to the BCM at the address 30 is put into an on-state (when the left turn signal is turned on), then the turn SW LH processing program at 09 incorporated in the BCM is started. This processing program is transmitted from the BCM of the data at the output number 11 at the address 34 by which the TRN-L lamp is lit to the IPM, and also the output 08 of the FIM at the address 39 is transmitted from the BCM to the FIM.

In particular, if the driver operates a blinker knob on a steering column apparatus to turn on the left turn signal switch, then one of the turn signal lamps on the front face of the body blinks and also the left turn signal lamp on the instrument panel blinks.

Next, power supplying operation of the ABS and the PCM is described.

The output 00 of the communication IC of the FIM is connected to the switch switching (2), and the output 01 is connected to the switch switching (1).

Meanwhile, the switch switching (2) performs on/off control of the power supply line to the ABS, and the switch switching (1) performs on/off control of the power supply line to the PCM.

In particular, supply of power to the ABS and the PCM is performed when the output signal of the FIM is 00 and 01. Meanwhile, on/off of the output signals 00 and 01 of the FIM is performed by the BCM.

Therefore, the CPU of the BCM can perform power supply control to the ABS and the PCM grasping states of apparatus connected to the system.

Subsequently, the data format transmitted between the communication ICs is described.

FIG. 43 shows different kinds of the data format transmitted.

The transmission data format has six kinds of 1. initialization, 2. ordinary transmission, 3. diagnosis request, 4. diagnosis response, 5. data transmission request, and 6. sleep start.

Here, the common format among the formats includes the SOF, receive address, transmit address, format ID, data, CRC data and EOD.

The directions of input/output ports of a communication IC can be set arbitrarily. Therefore, the initialization format performs setting input/outputs from a CPU to an I/O communication IC by inputting to or outputting from the ports.

It is to be noted that, when power supply to a communication IC is on, the ports of the communication are set to input ports. Setting data are bit data corresponding in a one-by-one corresponding relationship to the individual ports, and "1" represents an output port, and "0" represents an input port.

Transmission data from a CPU to an I/O communication IC upon ordinary transmission are output data to the I/O ports corresponding in a one-by-one corresponding relationship to the individual ports.

Here, data to the input ports are ignored.

Meanwhile, transmission data from the I/O communication IC to the CPU are input data to the I/O communication IC, and data of the output ports are data being outputted at present.

From this, confirmation of output data can be performed.

The diagnosis request and the diagnosis response are based on the SAE1979 diagnostic message format.

The data transmission request is transmitted from the CPU to the I/O communication IC and has no part for data.

Also the sleep start is transmitted from the CPU to the I/O communication IC. If this data is received by the I/O communication IC, then the I/O communication IC stops a clock signal and enters a low power consumption mode. It is to be noted that data transmission between CPUs is different from transmission between an I/O communication IC and a CPU, and contents of data of individual bits are determined uniquely between different CPUs.

Subsequently, variation of the operation state of a communication IC is described.

Figure 44:
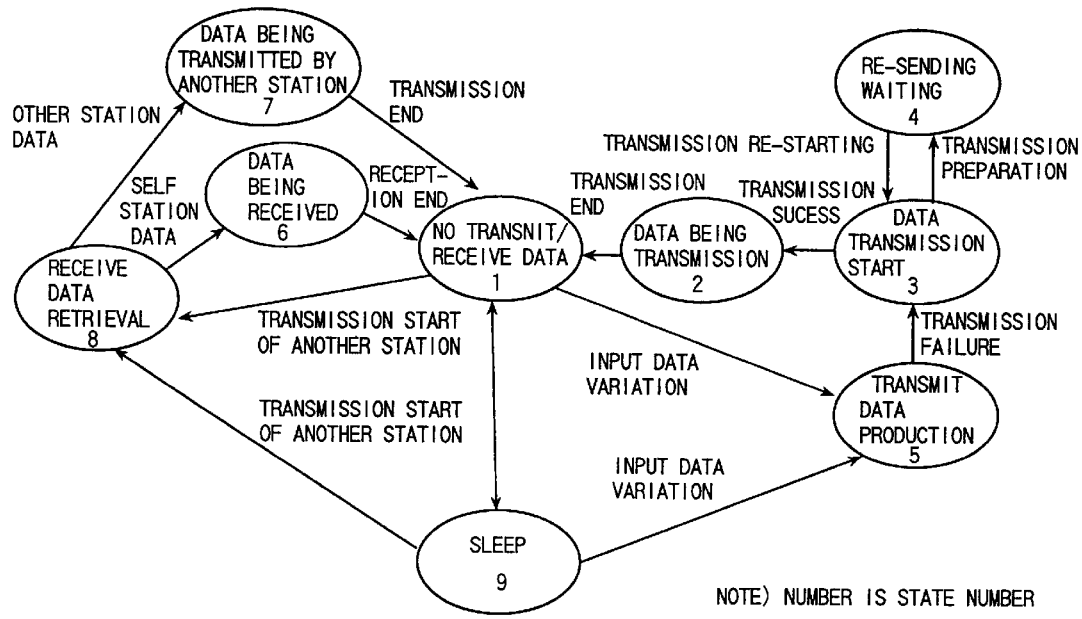
FIG. 44 is a state transition table of the communication IC.

FIG. 44 shows a state transition table of a communication IC.

The communication IC has the following 9 different states.

The states are: 1. no transmit/receive data, 2. data being transmitted, 3. start of data transmission, 4. waiting for re-sending, 5. production of transmission data, 6. data being received, 7. data transmission by the other modes, 8. retrieval of receive data, and 9. sleep.

The state 1 is a state wherein no transmission data is present on the communication bus and there is no data to be transmitted and consequently a change is waited.

If input data exhibits a variation, then the state 5 is entered and preparations for transmission are performed, and then the state 3 is entered and data transmission is started.

In the transmission, SOF header data is transmitted to the communication bus.

Here, if also another communication IC transmits simultaneously, then if the priority order data in the header data from the first-mentioned communication IC is higher than that from the second communication IC, the first communication IC continues its transmission and enters the state 2. data being transmitted.

On the contrary if the priority order data is lower, then the first-mentioned communication IC enters the state 4. waiting for re-sending. When the state of waiting for re-sending is entered, the communication IC waits until the second-mentioned communication IC completes its transmission, and repeats the transmission starting procedure.

In reception, if data appears on the communication bus, then the communication IC first receives the SOF, header data and receive address data. Then, if the receive data coincides with the address data of the communication IC itself, then the communication IC receives also following data. Then, if the result of CRC checking is OK, then the communication IC sets the received data to a predetermined port. However, if the receive address data is different from the address of the communication IC itself, the communication IC stops its receiving operation thus ignoring following data.

Here, when the receive data is the sleep start data, generation of the clock signal is stopped, and the low power consumption mode is entered.

Transition from the sleep mode to the ordinary mode is performed either when a variation occurs with the input signal or when data appears on the communication bus.

Subsequently, an example of transmission of data between the BCM, DDM and PDM is described.

Figure 45:
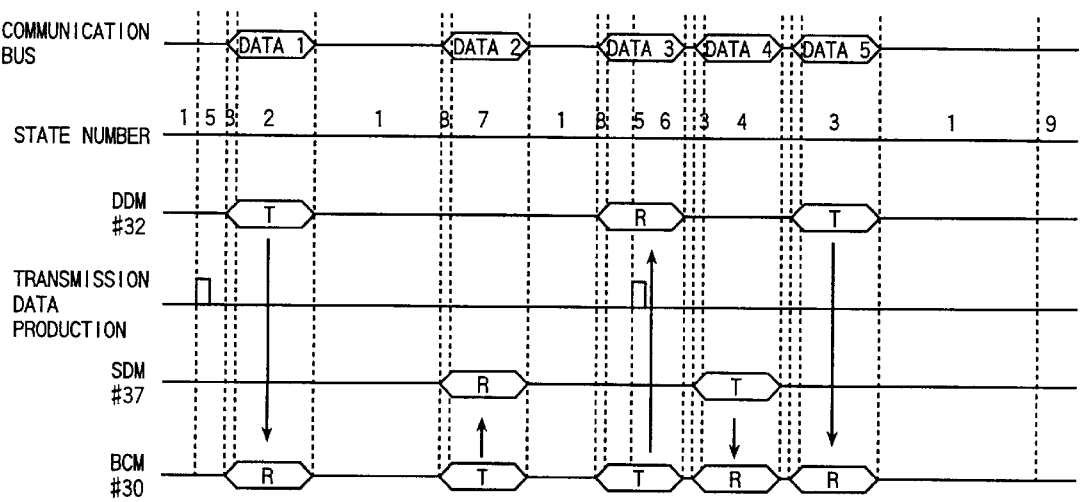
FIG. 45 is a time chart of a communication bus.

FIG. 45 is a time chart of the data transmission.

Here, the addresses of the individual units are: 30 for the BCM; 31 for the PSDM; and 32 for the DDM. The priority data are the same as the address data, and the priority order is given in a descending order of the address number.

The state numbers and the transmission data generation signal illustrated in FIG. 45 are those of the DDM. The data 1 on the communication bus is data when a transmission request is produced by the DDM and data is transmitted from the DDM to the BCM. The data 2 is data transmitted from the BCM to the PDM, and is not received by the DDM. The data 3 is data transmitted from the BCM to the DDM and received by the DDM.

When DDM transmission data is generated during the reception by the DDM or when, though not illustrated in FIG. 45, another transmission request is produced by the SDM, the DDM starts its transmission after waiting until completion of the reception of the data 3, but also the SDM starts transmission simultaneously.

If it is discriminated, after starting of the transmission, that the SDM has a higher priority during transmission of the header data, then the DDM stops its transmission and waits for re-sending.

Here, the data 4 is transmission data from the SDM to the BCM.

The data 5 is transmission data from the DDM, which is waiting for re-sending, to the BCM.

The foregoing is transmission/reception operation of data by a communication IC.

Figures 46, 47:
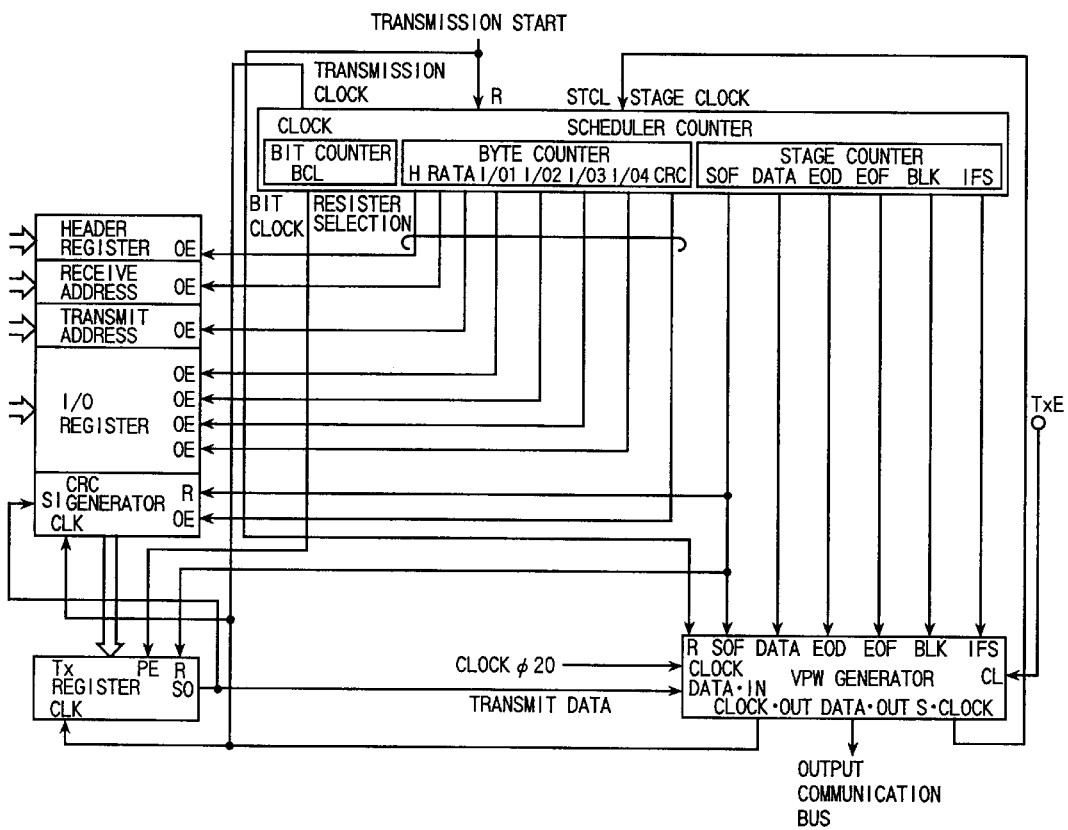
FIG. 46 is a diagram illustrating a data communication circuit.
FIG. 47 is a time chart of a transmission circuit.

FIG. 46 shows a circuit portion of an I/O communication IC which relates to transmission of data. FIG. 47 is a time chart of the circuit portion.

When the I/O communication IC is in a communication enabled state, if a transmission start signal is generated, then data is transmitted to the communication bus in accordance with a prescribed time sequence.

When the I/O communication sequence is in a communication enabled state, a communication bus busy flag of the status register is in an off state. Transmission is started when a transmission request flag of the status register changes to an on-state.

If a transmission start signal is inputted, then the stage counter, byte counter and bit counter of the schedule counter are rendered operative.

An output of the stage counter is inputted to the VPW generator. The stage counter outputs a stage clock (S •

Clock) signal, a data clock (Clock • Out) and transmission data (Data • Out) in synchronism with a clock signal φ2.

The VPW generator outputs an SOF signal, data and an EOD signal in this order.

Based on the calculated value of the byte counter, the header register, receive address register, transmission address register, I/O register and CRC generator are successively selected in this order, and the data are set to the transmission register(Tx register).

The data of the Tx register is inputted to and VPW multiplexed by the VPW generator in response to the Clock • Out signal of the VPW generator and transmitted to the communication bus.

Here, the number of bytes of the I/O register is 4 bytes as an example.

The bit clock signal for the transmission data is controlled by the bit counter. Here, the values of the header register, receive address and transmission address registers are set to initial state values from an external input signal or from some other communication IC.

Further, the data of the CRC generator are calculated with data from the headerer data to the I/O data.

Figure 53:
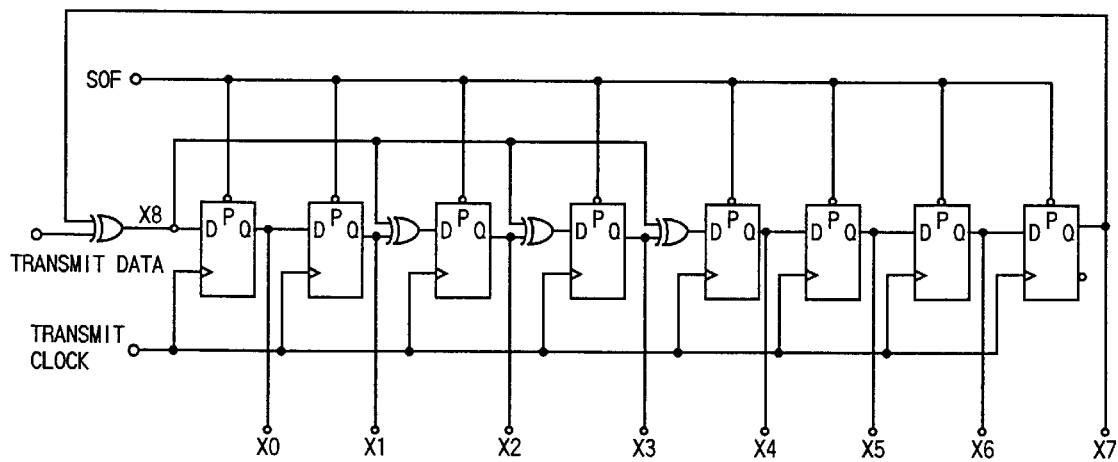
FIG. 53 is a drawing showing a circuit construction of a CRC generator.

A detailed circuit of the CRC generator is shown in FIG. 53.

TABLE 5

| Signal name | | | Pulse value | | | | | | |
|---|---|---|---|---|---|---|---|---|---|
| Symbol | | Pas- | | Set value | | | | | |
| name | Active | sive | (µs) | $2^0$ | $2^1$ | $2^2$ | $2^3$ | $2^4$ | $2^5$ |
| TV1 | "1" | "0" | 64 | 8 | 0 | 0 | 0 | 1 | 0 | 0 |
| TV2 | "0" | "1" | 128 | 16 | 0 | 0 | 0 | 0 | 1 | 0 |
| TV3 | SOF | EOD | 200 | 25 | 1 | 0 | 1 | 1 | 0 | 0 |
| TV4 | | EOF | 280 | 35 | 1 | 1 | 0 | 0 | 0 | 1 |
| TV5 | BLK | IFS | 300 | 38 | 0 | 1 | 1 | 0 | 0 | 1 |

As seen from Table 5, nine different pulse signals which are used in the present communication IC can be outputted from the VPW generator.

Subsequently, the CRC generator is described.

The CRC check codes used in the present communication IC are formed from 8 bits.

FIG. 53 is a circuit diagram showing a construction of the CRC generator, and Table 6 shows a time table of the CRC generator.

TABLE 6

| | | stage | | | | | | | | | | | | | | | | | | | | | | | | |
|---|---|---|---|---|---|---|---|---|---|---|---|---|---|---|---|---|---|---|---|---|---|---|---|---|---|---|
| Bit | Start | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | CRC |
| DATA | HEX | | | | F2 | | | | | | | | | 01 | | | | | | | 83 | | | | | 37 |
| DATA | BIN | 1 | 1 | 1 | 1 | 0 | 0 | 1 | 0 | 0 | 0 | 0 | 0 | 0 | 0 | 0 | 1 | 1 | 0 | 0 | 0 | 0 | 0 | 1 | 1 | |
| $X_8$ | 1 | 0 | 0 | 0 | 0 | 1 | 1 | 0 | 1 | 1 | 0 | 0 | 0 | 1 | 1 | 1 | 0 | 0 | 1 | 0 | 1 | 0 | 1 | | 1 | 0 |
| $X_0$ | 1 | 0 | 0 | 0 | 0 | 1 | 1 | 0 | 1 | 1 | 0 | 0 | 0 | 1 | 1 | 1 | 0 | 1 | 0 | 1 | 0 | 1 | 0 | 0 | 0 | 1 |
| $X_1$ | 1 | 1 | 0 | 0 | 0 | 0 | 1 | 1 | 0 | 1 | 1 | 0 | 0 | 0 | 1 | 1 | 1 | 0 | 1 | 0 | 1 | 0 | 1 | 0 | 0 | 1 |
| $X_2$ | 1 | 1 | | 0 | 0 | 1 | 1 | 1 | 0 | 1 | 1 | 1 | 0 | 1 | 1 | 0 | 1 | 0 | 0 | 0 | 0 | 0 | 0 | 0 | 1 | 0 |
| $X_3$ | 1 | 1 | 1 | 1 | 0 | 1 | 0 | 1 | 0 | 1 | 1 | 1 | 1 | 1 | 0 | 0 | 0 | 0 | 0 | 1 | 0 | 1 | 0 | 0 | 1 | 0 |
| $X_4$ | 1 | 1 | 1 | 1 | 1 | 1 | 0 | 0 | 0 | 1 | 1 | 1 | 0 | 0 | 1 | 0 | 1 | 0 | 1 | 1 | 1 | 1 | 0 | 0 | 0 | 1 |
| $X_5$ | 1 | 1 | 1 | 1 | 1 | 1 | 1 | 0 | 0 | 0 | 1 | 1 | 1 | 1 | 0 | 0 | 1 | 0 | 1 | 0 | 1 | 1 | 1 | 1 | 0 | 1 |
| $X_6$ | 1 | 1 | 1 | 1 | 1 | 1 | 1 | 1 | 0 | 0 | 0 | 1 | 1 | 1 | 1 | 0 | 0 | 1 | 0 | 1 | 0 | 1 | 1 | 1 | 1 | 0 |
| $X_7$ | 1 | 1 | 1 | 1 | 1 | 1 | 1 | 1 | 1 | 0 | 0 | 0 | 1 | 1 | 1 | 1 | 0 | 0 | 1 | 0 | 1 | 0 | 1 | 1 | 1 | 0 |

Figures 48, 49:
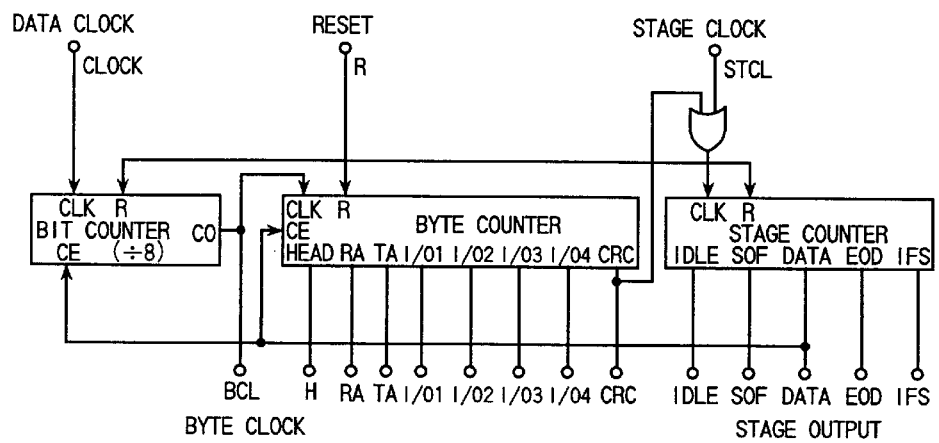
FIG. 48 is a drawing showing a circuit construction of a schedule counter.
FIG. 49 is a time chart of the schedule counter.

A circuit construction of the schedule counter is shown in FIG. 48. This circuit is formed from a bit counter, a byte counter and a stage counter.

The bit counter is a circuit which divides the frequency of the data clock signal of the VPW to ⅛.

The byte counter is a shift register which receives the bit counter as a clock signal thereto, and outputs of the byte counter are connected to select terminals of the registers in an order of transmission thereof.

The stage register is a shift register which receives the stage clock signal of the VPW generator or the CRC output as a clock signal thereto, and an output of the stage register is connected to the VPW generator. A time chart of the schedule counter described above is illustrated in FIG. 49.

Subsequently, the VPW generator is described.

Figure 50:
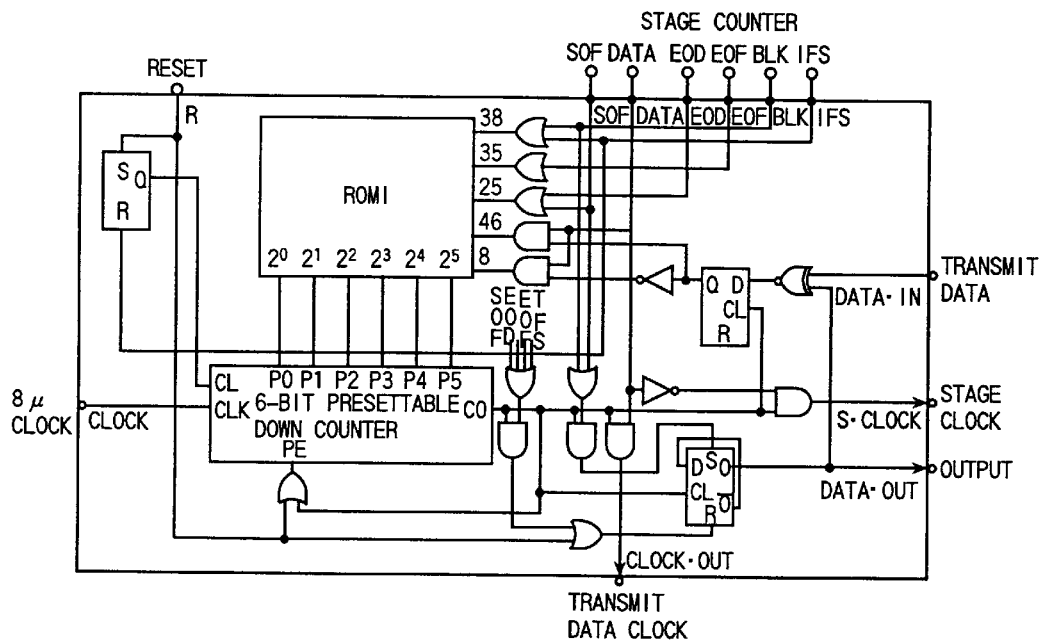
FIG. 50 is a drawing showing a circuit construction of a VPW generator.
Figure 51:
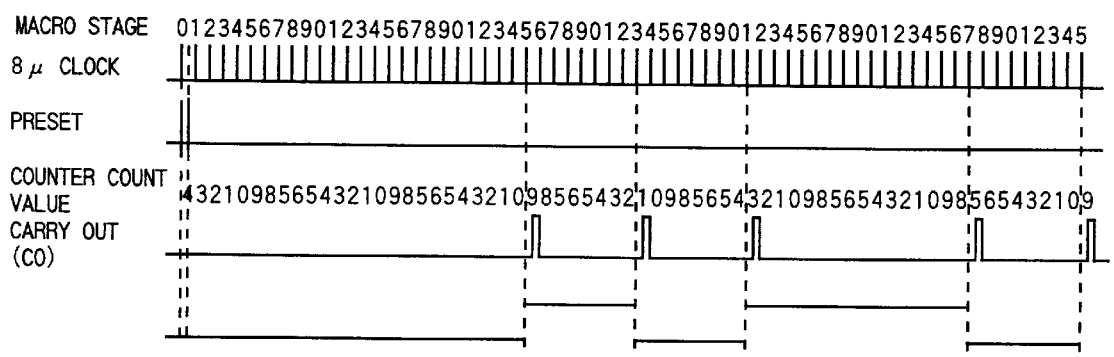
FIG. 51 is a time chart of the VPW generator.

FIG. 50 shows a circuit construction of the VPW generator, and FIG. 51 is a time chart of the VPW generator.

The VPW generator is a circuit which generates signals of several different pulse widths to be used by the different communication ICs. The pulse width to be generated is different among the SOF, data, EOD and so forth.

The pulse signal is generated by setting a suitable value to an 8-bit presettable down counter based on output data of the stage counter of the scheduler.

Figure 52:
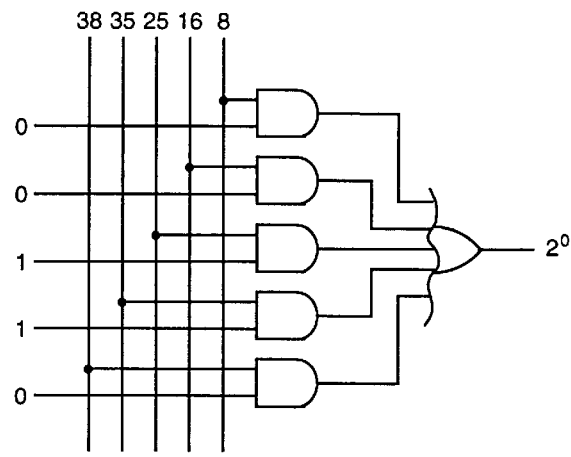
FIG. 52 is a drawing showing a circuit construction of a signal generation ROM.

FIG. 52 is a diagram showing a circuit construction of a generation ROM for one bit, and Table 5 is a setting table for the individual bits.

The CRC generator circuit is constructed such that exclusive OR circuits are provided for input terminals of the second, third and fourth bits of an 8-bit shift register and one of two input terminals of each of the exclusive OR circuits is connected to an output of the preceding stage while the other input terminal is connected to an exclusive OR circuit for an output of the seventh bit and input data.

The CRC generator circuit having the circuit construction described above can produce a CRC check code.

Table 6 represents a manner of state variations of the bits by input data and a clock signal.

The last data is transmitted to the Tx register following I/O data.

Next, Table 7 illustrates contents of the bits of the status register which effects management of the communication IC together with the schedule counter.

TABLE 7

| # | Symbol name | Bit name | Contents of bit |
|---|---|---|---|
| 0 | Buz | Bus busy flag | Data present on communication bus |
| 1 | RXR | Receive request flag | Target address data coincides with my address |

TABLE 7-continued

| # | Symbol name | Bit name | Contents of bit |
|---|---|---|---|
| 2 | TXR | Transmit request flag | I/O data varies |
| 3 | RXB | Receive busy flag | Busy with reception |
| 4 | TXB | Transmit busy flag | Busy with transmission |
| 5 | RXE | receive error | CRC error present |
| 6 | TXE | Transmit error | Transmission failed because of low priority |
| 7 | SLP | Sleep | Sleeping |

The bus busy flag exhibits an on-state when data are present on the communication bus.

The receive request flag is put into an on-state when receive address data of receive data coincides with the address of the communication IC. The transmit request flag is put into an on-state either when input data varies or when transmit request data is received.

The receive busy flag exhibits an on-state when data is being received.

The transmit busy flag exhibits an on-state when data is being transmitted.

The receive error flag exhibits an on-state when the CRC check of received data is NG.

The transmit error flag is put into an on-state when, after transmission is started, another communication IC which is higher in priority simultaneously starts communication on the communication bus.

The sleep flag is put into an on-state when sleep start data is received, and a clock signal is stopped.

Table 8 illustrates an example of data ID for identification among the different formats of data transmitted and received shown in FIG. 43.

TABLE 8

| Bits | Data ID |
|---|---|
| 0000 | Initialization |
| 0001 | Ordinary transfer |
| 0010 | Diagnosis request |
| 0011 | Diagnosis response |
| 0100 | Data transmission request |
| 0101 | Sleep start |
| 0110 | |
| 0111 | |

The foregoing is the operation of the circuit regarding transmission.

Figure 54:
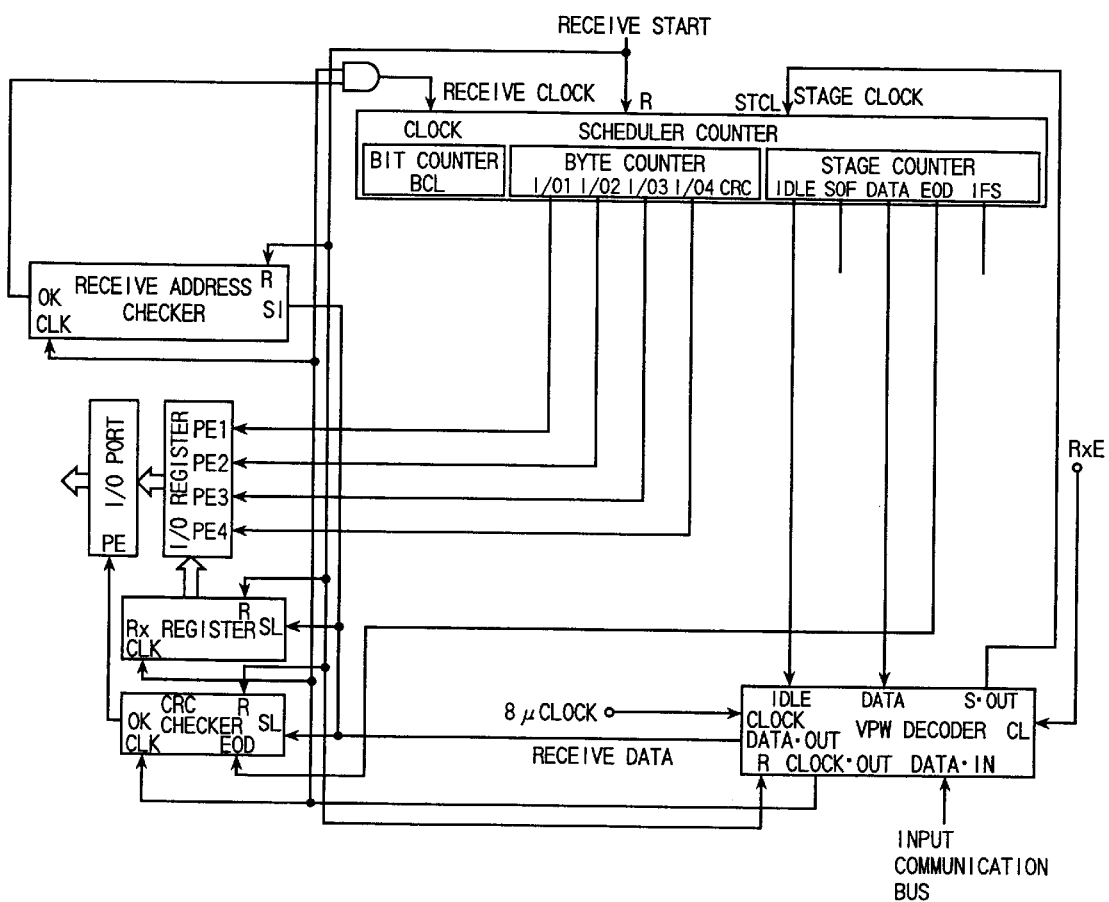
FIG. 54 is a diagram showing a construction of a data receive circuit.
Figures 55, 56:
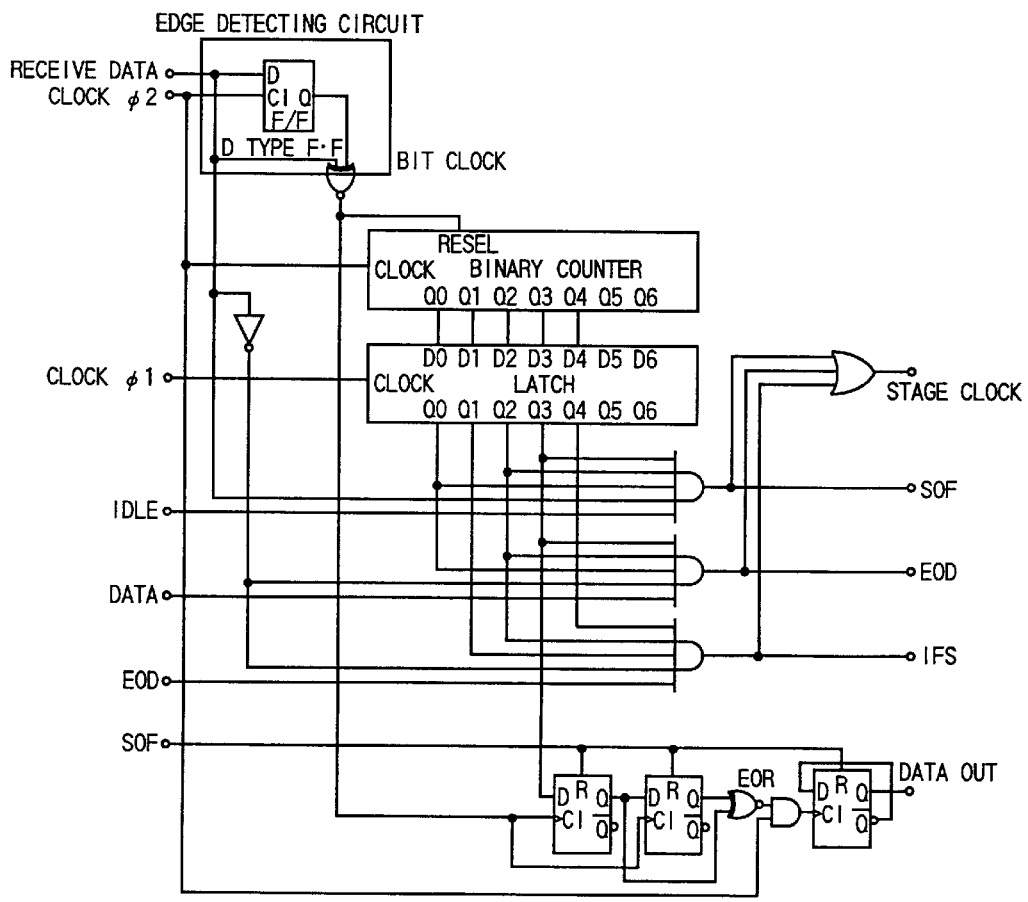
FIG. 55 is a time chart of the data receive circuit.
FIG. 56 is a drawing showing a circuit construction of a VPW decoder.

Subsequently, a circuit regarding reception is described. FIG. 54 shows a circuit construction regarding reception, and FIG. 55 shows a time chart of the circuit.

Also reception is managed by a schedule counter similarly to transmission.

If a receive start signal is inputted when reception is possible (the RXR is on), then the schedule counter and the VPW decoder are reset.

If it is discriminated by the VPW decoder that a signal on the communication bus is an SOF signal, then the bit counter and the byte counter start their operation.

The VPW decoder effects discrimination between "1" and "0" signals of a VPW modulated data signal.

Data obtained by the discrimination is inputted to a receive address checker, a CRC checker and an Rx register.

If the receive address data of the receive data is data destined for the communication IC, then the data inputted to the Rx register is transferred in units of one byte to the I/O register.

Bit discrimination in this instance is performed with VPW data. Meanwhile, byte discrimination is performed by the byte counter.

If the I/O data come to an end, then data checking is performed by the CRC checker, and when a result of the data checking is OK, the value of the I/O register is transferred to the I/O port.

If an error is detected, then the value of the I/O register is not transported to the I/O port, but the receive error flag of the status register is changed to on.

FIG. 55 is a time chart illustrating the manner described above.

Figure 57:
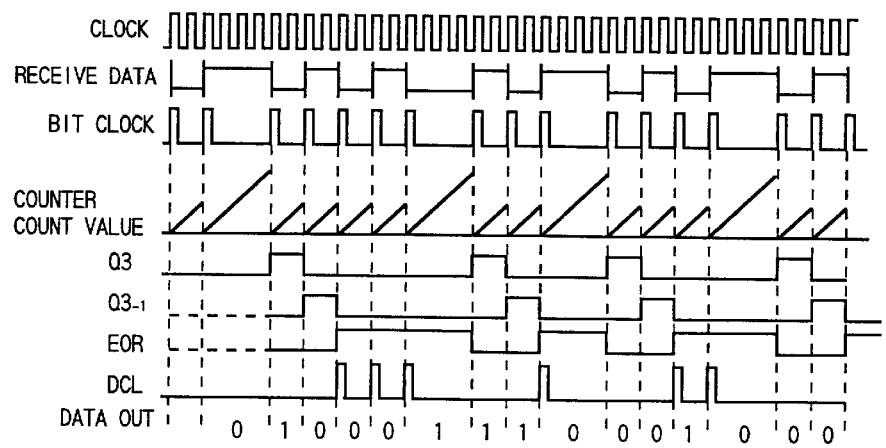
FIG. 57 is a time chart of the VPW decoder.

FIG. 56 shows a circuit construction of the VPW decoder and FIG. 57 shows a time chart of the VPW decoder.

Receive data is inputted to a D-type flip-flop in response to a clock signal $\phi 2$.

The input and the output of the flip-flop are inputted to an exclusive OR circuit to detect a variation of the receive data to produce a bit clock. The pulse width of the data is measured by a binary counter which is reset by the bit clock and counts with the clock signal $\phi 2$.

Based on the thus measured pulse width and a signal of the stage counter, the SOF, data, the EOD and the IFS are discriminated.

Discrimination of the data between "1" and "0" is performed such that, when the pulse width exhibits no variation, the preceding data of "1" or "0" is reversed, but when the pulse exhibits a variation, the value of the data is not varied.

The initial value level corresponds to the value of initial data.

Table 9 shows a truth table when the voltage level and the pulse width are classified into two values.

When the data relationships between the voltage and the time of the input signal are put in order using the following definitions:

$Tv[0]=Tv1$ $Tv[1]=Tv2$ $Vout[0]=Vlow$ $Vout[1]=Vhigh$ the following table is obtained.

TABLE 9

| Input | | Output |
|---|---|---|
| Voltage | Time | |
| 0 | 0 | 0 |
| 0 | 1 | 1 |
| 1 | 0 | 1 |
| 1 | 1 | 0 |

Figure 58:
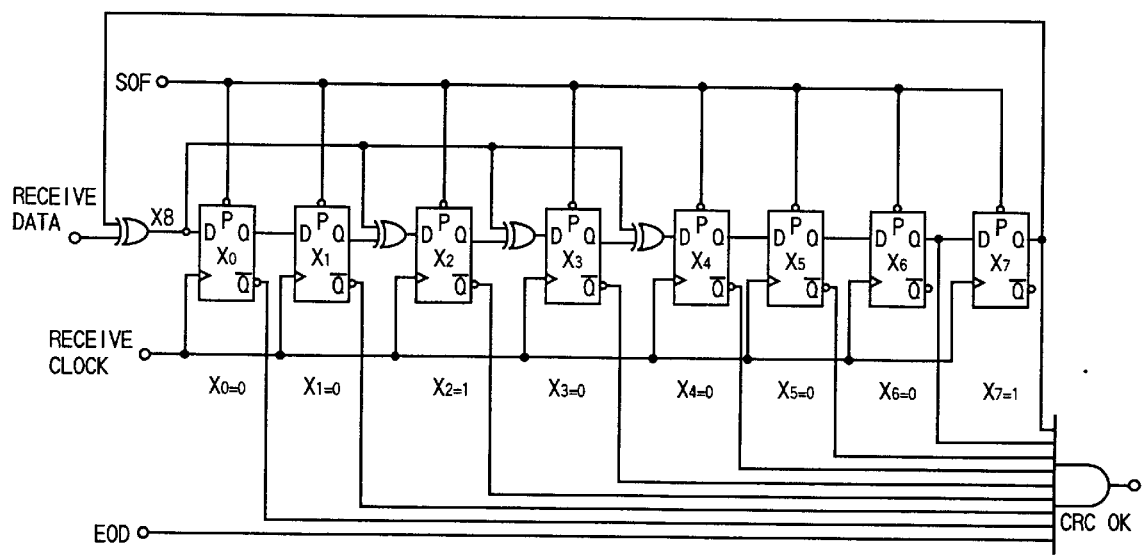
FIG. 58 is a drawing showing a circuit construction of a CRC checker.

FIG. 58 shows a circuit construction of the CRC checker and Table 10 shows a time table of the CRC checker.

TABLE 10

| Bit | Start | Stage 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| DATA | HEX | | | | F2 | | | | | | | | 01 | | | | |
| DATA | BIN | 1 | 1 | 1 | 1 | 0 | 0 | 1 | 0 | 0 | 0 | 0 | 0 | 0 | 0 | 0 | 1 |
| $X_8$ | 1 | 0 | 0 | 0 | 0 | 1 | 1 | 0 | 1 | 1 | 0 | 0 | 0 | 1 | 1 | 1 | 0 |
| $X_0$ | 1 | 0 | 0 | 0 | 0 | 1 | 1 | 0 | 1 | 1 | 0 | 0 | 0 | 1 | 1 | 1 | 0 |
| $X_1$ | 1 | 1 | 0 | 0 | 0 | 0 | 1 | 1 | 0 | 1 | 1 | 0 | 0 | 0 | 1 | 1 | 1 |
| $X_2$ | 1 | 1 | 1 | 0 | 0 | 1 | 1 | 1 | 0 | 1 | 1 | 1 | 0 | 1 | 1 | 0 | 1 |
| $X_3$ | 1 | 1 | 1 | 1 | 0 | 1 | 0 | 1 | 0 | 1 | 1 | 1 | 1 | 1 | 0 | 0 | 0 |
| $X_4$ | 1 | 1 | 1 | 1 | 1 | 1 | 0 | 0 | 0 | 1 | 1 | 1 | 1 | 0 | 0 | 1 | 0 |
| $X_5$ | 1 | 1 | 1 | 1 | 1 | 1 | 1 | 0 | 0 | 0 | 1 | 1 | 1 | 1 | 0 | 0 | 1 |
| $X_6$ | 1 | 1 | 1 | 1 | 1 | 1 | 1 | 1 | 0 | 0 | 0 | 1 | 1 | 1 | 1 | 0 | 0 |
| $X_7$ | 1 | 1 | 1 | 1 | 1 | 1 | 1 | 1 | 1 | 0 | 0 | 1 | 1 | 1 | 1 | 0 |
| EOD | 0 | 0 | 0 | 0 | 0 | 0 | 0 | 0 | 0 | 0 | 0 | 0 | 0 | 0 | 0 | 0 | 0 |
| CROCK | | 0 | 0 | 0 | 0 | 0 | 0 | 0 | 0 | 0 | 0 | 0 | 0 | 0 | 0 | 0 | 0 |

| Bit | Start | Stage 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| DATA | HEX | | | | 83 | | | | | | | | CRC = 37 | | | | |
| DATA | BIN | 1 | 0 | 0 | 0 | 0 | 0 | 1 | 1 | 0 | 0 | 1 | 1 | 0 | 1 | 1 | 1 | — |
| $X_8$ | 1 | 0 | 1 | 0 | 1 | 0 | 1 | 1 | 1 | 1 | 1 | 1 | 1 | 0 | 1 | 0 | 0 | 0 |
| $X_0$ | 1 | 1 | 0 | 1 | 0 | 1 | 0 | 0 | 0 | 1 | 1 | 1 | 1 | 0 | 1 | 0 | 0 | 0 |
| $X_1$ | 1 | 0 | 1 | 0 | 1 | 0 | 1 | 0 | 0 | 0 | 1 | 1 | 1 | 1 | 0 | 1 | 0 | 0 |
| $X_2$ | 1 | 0 | 0 | 0 | 0 | 0 | 0 | 0 | 1 | 1 | 1 | 0 | 0 | 1 | 0 | 0 | 1 | 1 |
| $X_3$ | 1 | 0 | 0 | 1 | 0 | 1 | 0 | 0 | 1 | 1 | 0 | 0 | 1 | 0 | 0 | 0 | 0 | 0 |
| $X_4$ | 1 | 1 | 0 | 1 | 1 | 1 | 1 | 0 | 0 | 0 | 0 | 1 | 1 | 1 | 1 | 0 | 0 | 0 |
| $X_5$ | 1 | 0 | 1 | 0 | 1 | 1 | 1 | 1 | 0 | 0 | 0 | 0 | 1 | 1 | 1 | 1 | 0 | 0 |
| $X_6$ | 1 | 1 | 0 | 1 | 0 | 1 | 1 | 1 | 1 | 0 | 0 | 0 | 0 | 1 | 1 | 1 | 1 | 1 |
| $X_7$ | 1 | 0 | 1 | 0 | 1 | 0 | 1 | 1 | 1 | 1 | 0 | 0 | 0 | 0 | 1 | 1 | 1 | 1 |
| EOD | 0 | 0 | 0 | 0 | 0 | 0 | 0 | 0 | 0 | 0 | 0 | 0 | 0 | 0 | 0 | 0 | 1 |
| CROCK | | 0 | 0 | 0 | 0 | 0 | 0 | 0 | 0 | 0 | 0 | 0 | 0 | 0 | 0 | 0 | 0 | 1 |
| | | | | | | | | | 37 | | | | | | | | C4 |

The CRC checker has a circuit construction wherein an AND circuit for discrimination of OK is added to a CRC generator.

The discrimination output is OK if the last data including CRC data is C4 in hexadecimal value.

Figure 59:
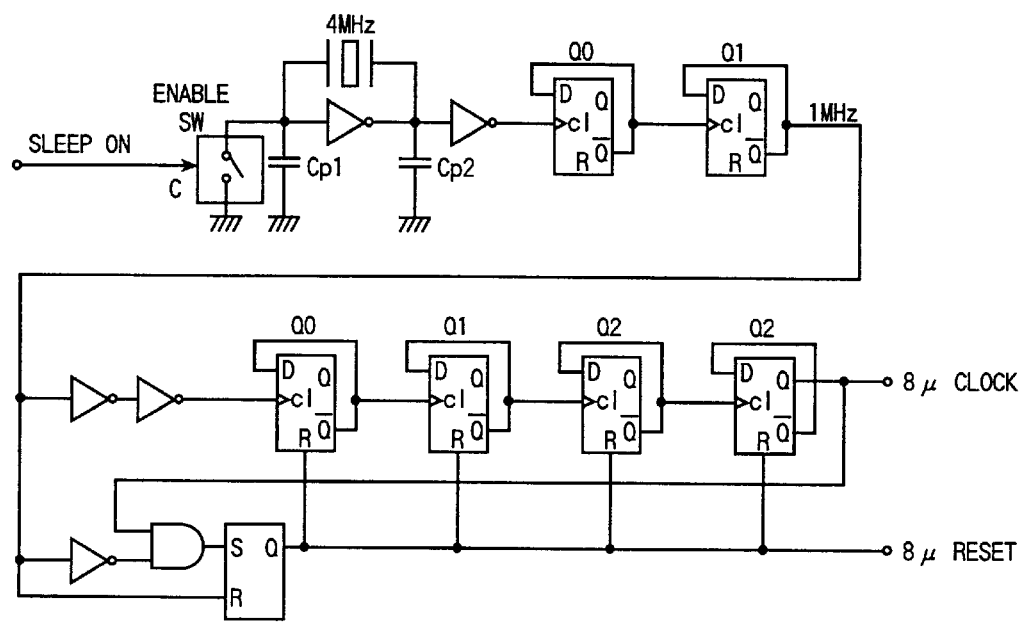
FIG. 59 is a drawing showing a circuit construction of a clock generator.
Figure 60:
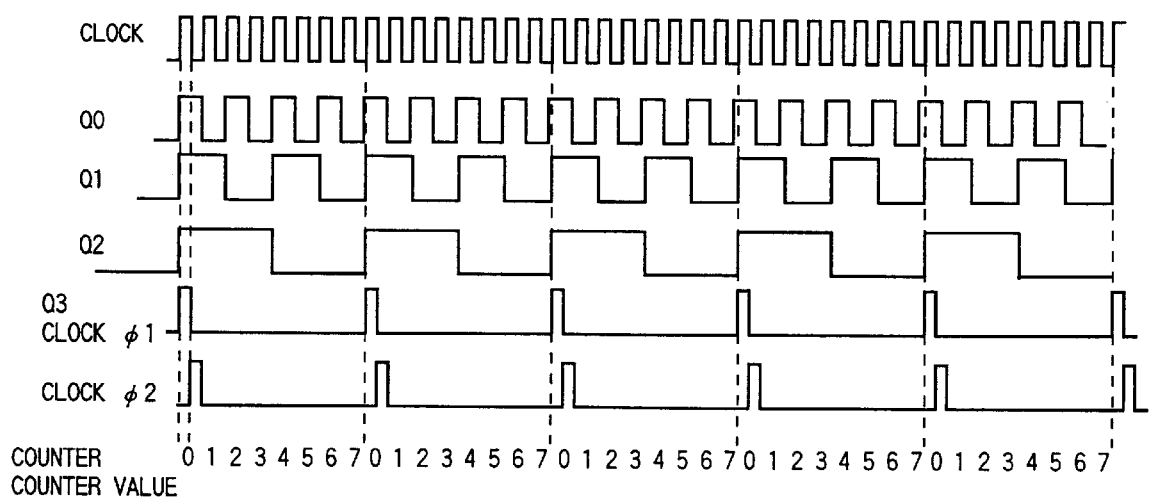
FIG. 60 is a time chart of the clock generator.

FIGS. 59 and 60 show a circuit construction and a time chart of a clock generator for generating the clock signals of the communication IC.

An oscillator having two terminals is connected to the input and output terminals of an inverter so that it may oscillate to effect waveform shaping to output clock signals $\phi 1$ and $\phi 2$ having different phases from each other.

Stopping or starting of the oscillation is performed with a sleep flag output of the stage register.

A practical example of input/output control of the power supply modules described above is described in more detail in comparison with the prior art.

Figure 61:
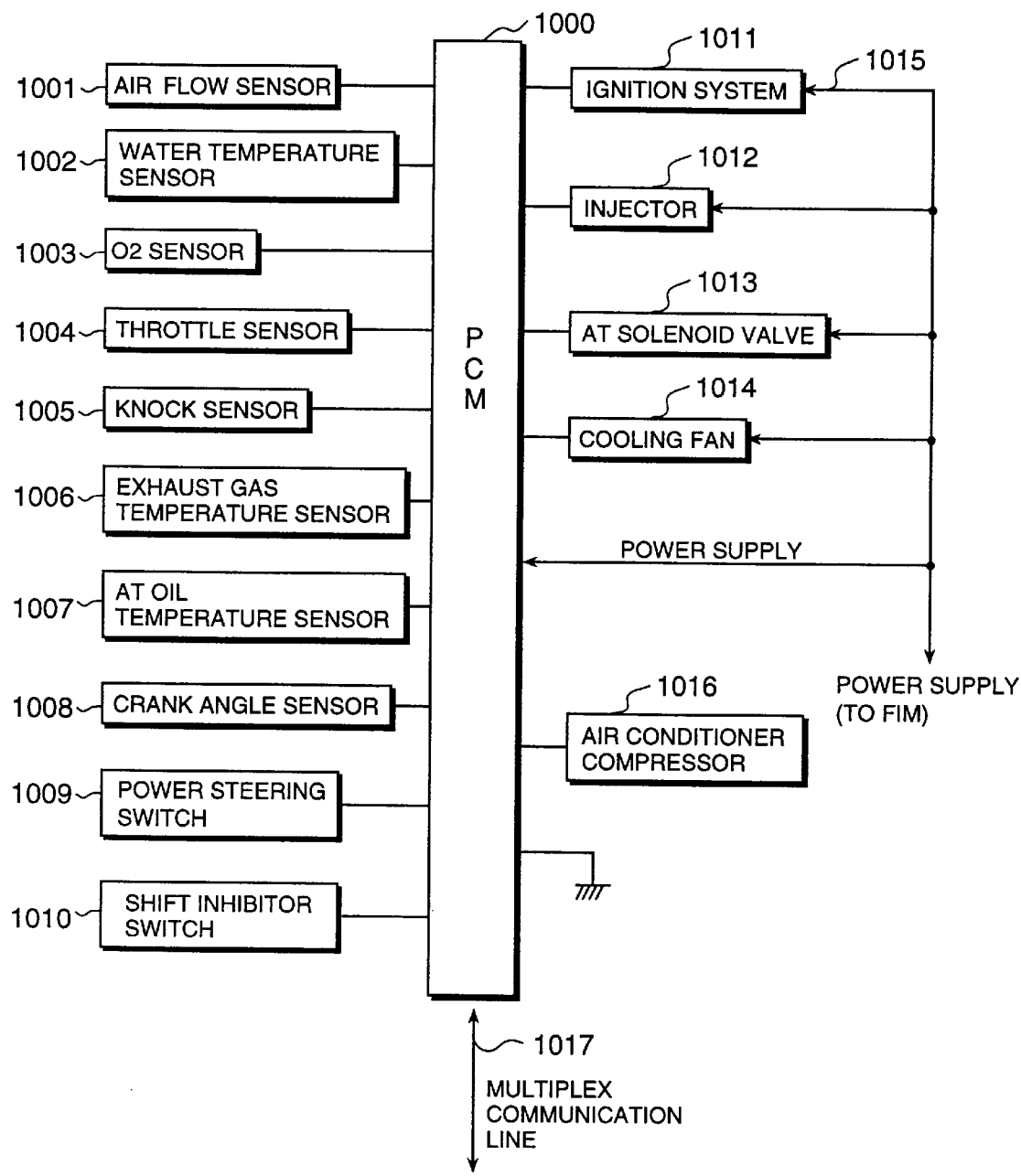
FIG. 61 is a diagram showing a system configration of a PCM.

FIG. 61 shows a system diagram of an engine and driving system controller PCM (this basically has a same construction as that of the PCM described hereinabove, but since inputs and outputs are indicated concretely in accordance with an actual example, this is described with new reference symbols applied thereto) of a vehicle to which a power supply network of the present invention is applied. A control module 1000 receives various sensor signals necessary for control of the engine and the driving system (in the present embodiment, the automatic transmission) and outputs driving signals for various actuators in accordance with a predetermined control method. An air flow sensor 1001 measures an intake air flow amount of the engine, converts it into an electric signal and outputs the electric signal. A water temperature sensor 1002 detects the temperature of the engine coolant, converts it into an electric signal and outputs the electric signal. An O2 sensor 1003 detects the concentration of oxygen in exhaust gas, converts it into an electric signal and outputs the electric signal. A knock sensor 1005 detects a knocking state of the engine, converts it into an electric signal and outputs the electric signal. An exhaust gas temperature sensor 1006 detects the temperature of a catalyzer for exhaust gas purification, converts it into an electric signal and outputs the electric signal. An A/T fluid temperature sensor 1007 detects the temperature of control fluid of the A/T (Automatic transmission), converts it into an electric signal and outputs the electric signal. A crank angle sensor 1008 detects a crank angle and outputs a pulse signal, for example, for each one degree. A vehicle speed sensor 1008A outputs a pulse signal corresponding to rotation of a wheel. A power steering switch 1009 detects a rise of the hydraulic pressure when the power steering apparatus is driven. This switch is provided to increase the idling speed of the engine when the power steering apparatus is used upon idling. A shift inhibitor switch 1010 is a switch provided corresponding to a position of a shift control lever of the A/T and detects a shift position. An ignition system 1011 includes an ignition plug and an ignition coil of the engine and ignites the ignition plug in response to an instruction of the PCM 1000. An injector 1012 is a fuel injection valve for injecting fuel in response to an instruction of the PCM 1000. An A/T solenoid valve 1013 controls the hydraulic fluid pressure of the AT in response to an instruction of the PCM 1000 to effect shift control. A cooling fan 1014 is a fan for cooling the radiator and operates in response to an instruction of the PCM 1000. An air conditioner compressor 1016 is controlled in operation in accordance with an instruction of the PCM 1000 in response to an operation state of the air conditioner and an acceleration state of the engine. A power supply line 1015 is part of the power supply network of the present invention and supplies power of the PCM itself from an FIM 1420 and supplies power to the loads 1011 to 1014 described above. A multiplex communication line 1017 is part of the power supply network similarly and is provided to effect communication between control units such as a BCM 1221.

Figure 62:
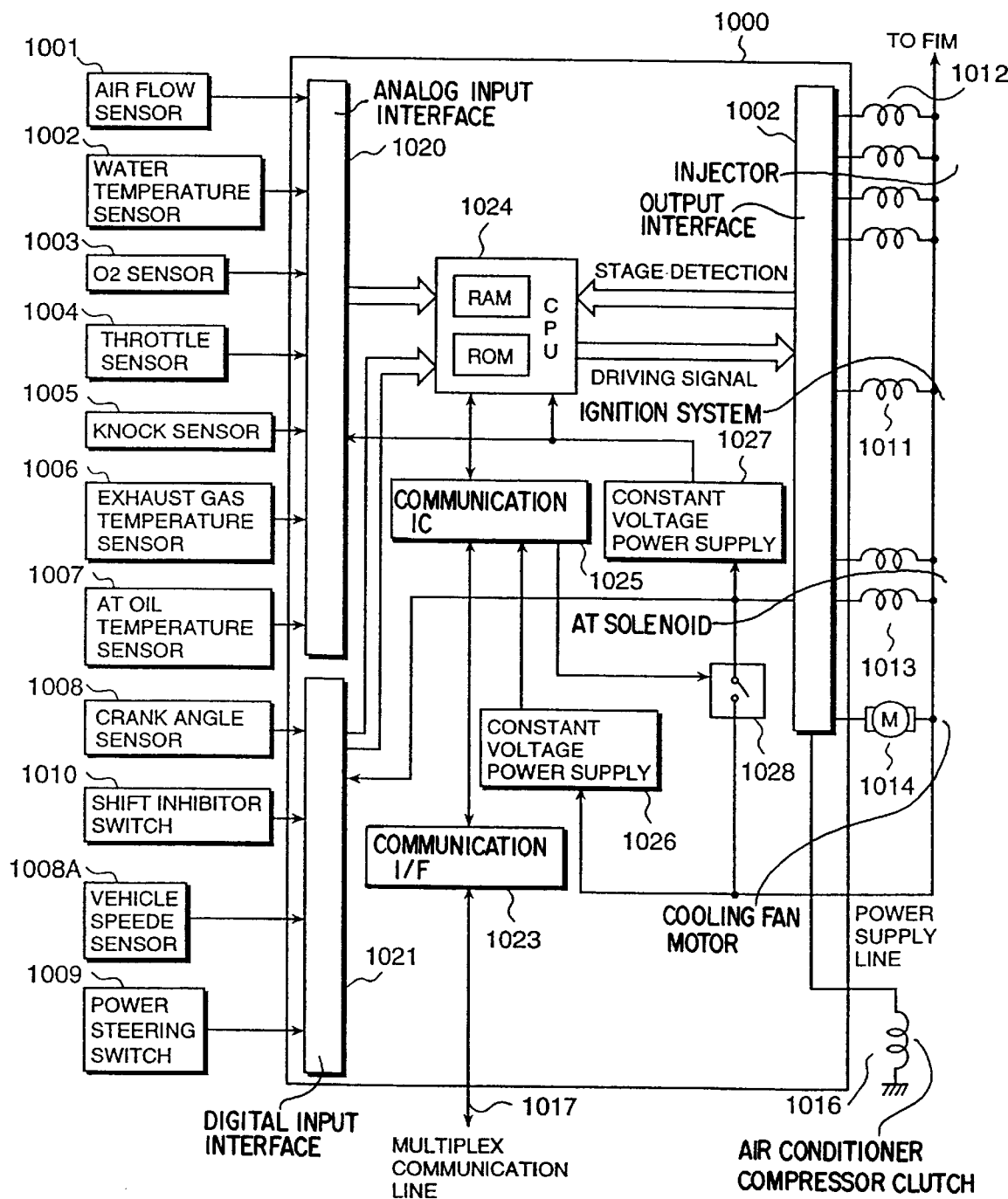
FIG. 62 is a detailed diagram illustrating an internal configration of the PCM.

FIG. 62 shows a detailed diagram of an internal construction of the PCM 1000. The sensors 1001 to 1007 described above provide analog input signals, and the analog input signals are inputted to an analog input interface 1020, by which they are converted so that they have a signal level (for example, 5 V of the full scale) with which they can be processed readily by a CPU (Central Processing Unit). Output signals of the switches 1009 and 1010 and the crank angle sensor 1008 described above are digital signals and are converted by a digital input interface 1021 so that they have a signal level (for example, 5 V of the full scale) with which they can be processed readily by a CPU 1024. The CPU 1024 converts the aforementioned analog signals into digital signals by means of A/D converters and fetches the digital signals into the inside of the CPU. Similarly, the digital signals mentioned above are fetched into the inside of the CPU from digital input ports via a digital input interface. Three power supplies are used including power to be supplied to the upstream side of each load, power to be supplied to a constant voltage power supply 1026 for a communication IC 1025 in the PCM and power to be supplied to a constant voltage power supply 1027, the digital input interface 1021 and an output interface 1022 via a power supply cut-off switch 1028. The constant voltage power supply 1026 is a constant voltage power generation circuit for exclusive use for the communication IC and is normally powered unless power supply from the FIM is cut-off. The present circuit can be formed readily from a three-terminal regulator. The constant voltage power supply 1027 supplies power to the CPU 1024 and the analog input interface 1020. The power supply cut-off switch 1028 is controlled directly by the communication IC and is provided in order to cut-off power supply when a trouble occurs with a grounded type load (to which the air conditioner compressor 1016 corresponds in the present embodiment). The circuit has such a detailed construction as described hereinabove with reference to FIG. 11. The communication IC 1025 is connected to the multiplex communication line 1017 via a communication IC interface 1023. Further, the communication IC 1025 is connected to the CPU 1024 and effects transmission and reception of data to and from the power supply network via the multiplex communication line 1017. Detailed description of functions of the communication IC 1025 and the communication IC interface 1023 is such as described hereinabove, and it is omitted here. The CPU 1024 includes a ROM (Read Only Memory) and a RAM (Random Access Memory) provided in the inside thereof, and control software for the PCM and initial constants are stored in the ROM.

In the present embodiment, as loads to the PCM, the injector 1012 (solenoid load), the ignition system 1011 (coil load), the AT solenoid 1013 (solenoid load), the cooling fan motor 1014 (motor load) and an air compressor clutch (solenoid load) are presumed, and signals between the output interface 1022 and the CPU 1024 include driving signals and state detection signals of the individual loads mentioned above. Details of the signals are described below.

Figure 63:
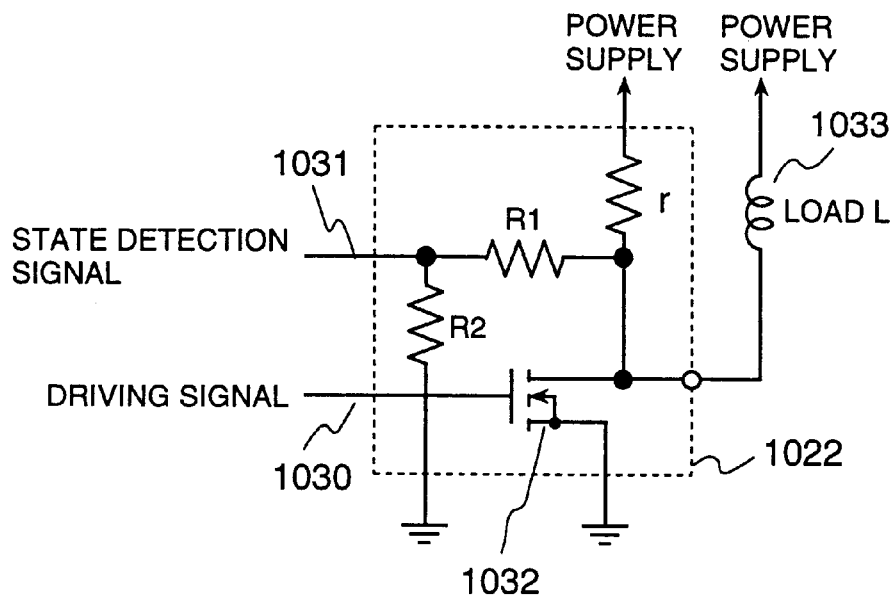
FIG. 63 is a drawing showing a detailed configuration of an output interface.

FIG. 63 shows a detailed construction of the output interface 1022. This figure shows a driving circuit for a power supply connected type load. In the present embodiment, this driving circuit is applied to the injector 1012, ignition system 1011, AT solenoid valve 1013 and cooling fan 1014. A load 1033 is connected to the drain of an N-channel type FET (low side driver) 1032. A driving signal 1030 controlled by the CPU 1024 is connected to the gate of the FET 1032 so that the FET 1032 effects control of the load in response to on/off of the driving signal. A state detection signal 1031 monitors the voltage of the drain to which the load 1033 is connected. The state detection signal exhibits, based on the state of the load driving signal, such values as indicated in the following table (in this table, VB is the battery voltage, VDS is the voltage between the drain and the source of the FET, and RL is the dc resistance of the load (where r>>RL)).

TABLE 11

|  | Not driven (FET off) | Driven (FET on) |
| --- | --- | --- |
| Normal | R2*VB/(RL + R1 + R2) | R2*VDS/(R1 + R2) |
| Load opened | R2*VB/(r + R1 + R2) | R2*VDS/(R1 + R2) |
| Load short-circuited | R2*VB/(R1 + R2) | R2*VD /(R1 + R2) |
| Load grounded | 0 | 0 |

From this table, a failure state can be detected based on a combination of state detection signals corresponding to a driven state of the load.

Figure 64:
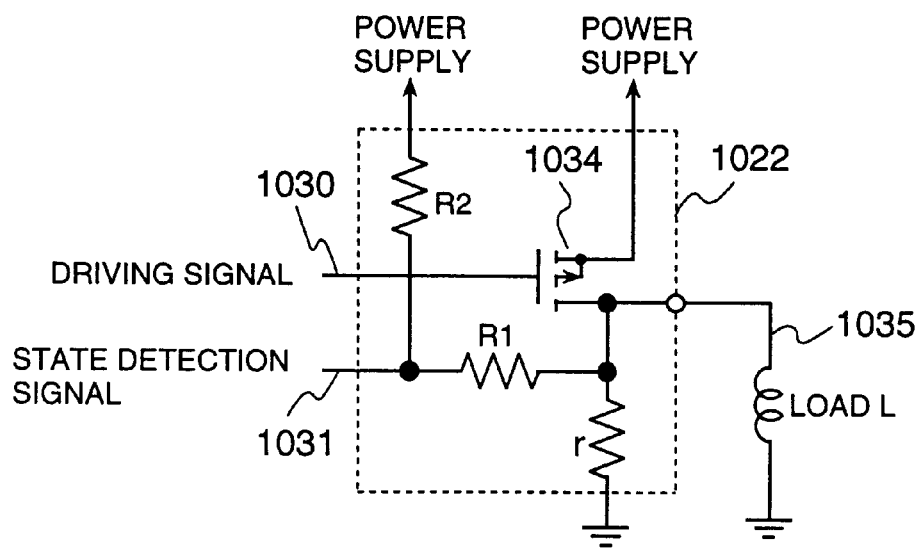
FIG. 64 is a drawing showing a detailed configuration of another output interface.

FIG. 64 shows a detailed construction of the output interface 1022 similarly. This figure shows a driving circuit for a grounded type load, and in the present embodiment, the air conditioner compressor clutch 1016 corresponds to this circuit. A load 1035 is connected to the source of a P-channel type FET (high side driver) 1034. The driving signal 1030 controlled by the CPU 1024 is connected to the gate of the FET 1034 so that the FET 1034 effects control of the load in response to on/off of the driving signal. The state detection signal 1031 monitors the voltage of the source to which the load 1033 is connected. The state detection signal exhibits, based on the state of the load driving signal, such values as indicated in the following table (in this table, VB is the battery voltage, and VDS is the voltage between the drain and the source of the FET).

TABLE 12

|  | Not driven (FET off) | Driven (FET on) |
| --- | --- | --- |
| Normal | (R1 + RL) *VB/(RL + R1 + R2) | VB-R2*VDS/(R1 + R2) |
| Load opened | (R1 + r) *VB/(r + R1 + R2) | VB-R2*VDS/(R1 + R2) |
| Load short-circuited | VB | VB |
| Load grounded | R1*VB/(R1 + R2) | R1*VB/(R1 + R2) |

Similarly, a failure state can be detected from this table based on a combination of state detection signals corresponding to a driven state of the load.

Figure 65:
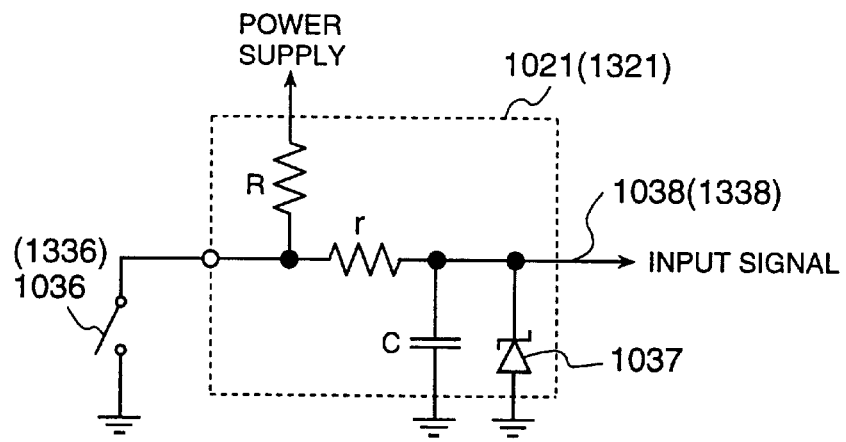
FIG. 65 is a detailed diagram illustrating a digital input interface.

FIG. 65 shows an example of the digital input interface. When a switch 1036 is off, a voltage is clipped by a Zener diode 1037 and an input signal 1038 exhibits a high level. When the switch 1036 is on, the input signal 1038 exhibits a low level. A capacitor C in FIG. 65 is provided in order to remove noise. Those signals are fetched by the CPU 1024.

Figure 66:
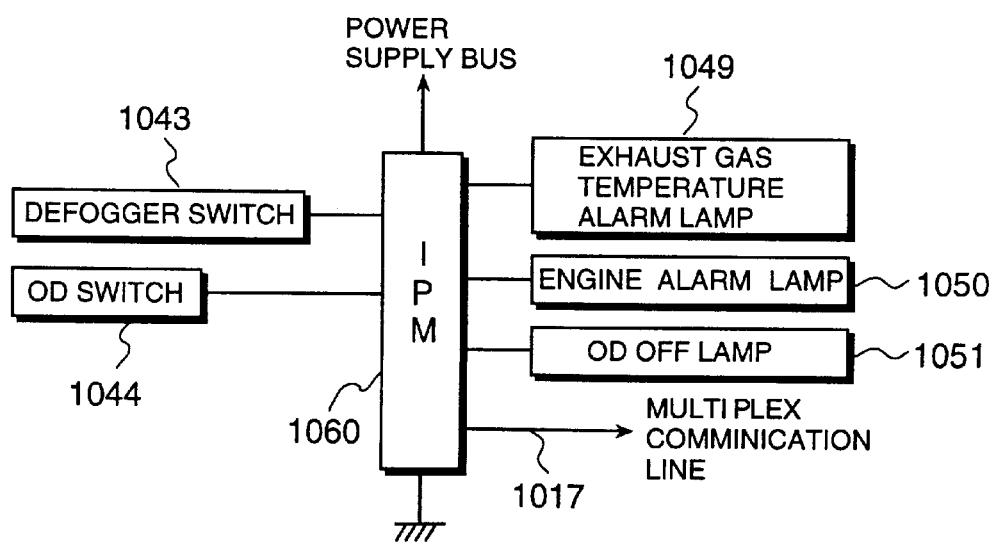
FIG. 66 is a drawing showing a connection condition of IPM loads.

FIG. 66 shows a distributed situation of loads regarding the PCM to an IPM 1060 described above. Since the IPM is provided to control elements relating to the instrument panel, switches and alarm lamps around the driver are distributed. A defogger switch 1043 and an OD (Over Drive) switch 1044 provide input signals relating to the PCM. In order to raise the idling speed of the engine when the rear defogger is turned on, a state the defogger switch is transferred from the IPM to the PCM via the BCM. The OD switch 1044 is used to turn on or off of the over drive of the automatic transmission, a state of it is transferred similarly to the PCM. An exhaust gas temperature alarm lamp 1049, an engine alarm lamp 1050 and an OD off lamp 1051 are incorporated in the meter panel, and driving data thereof are transferred individually from the PCM to the IPM via the BCM.

Figure 67:
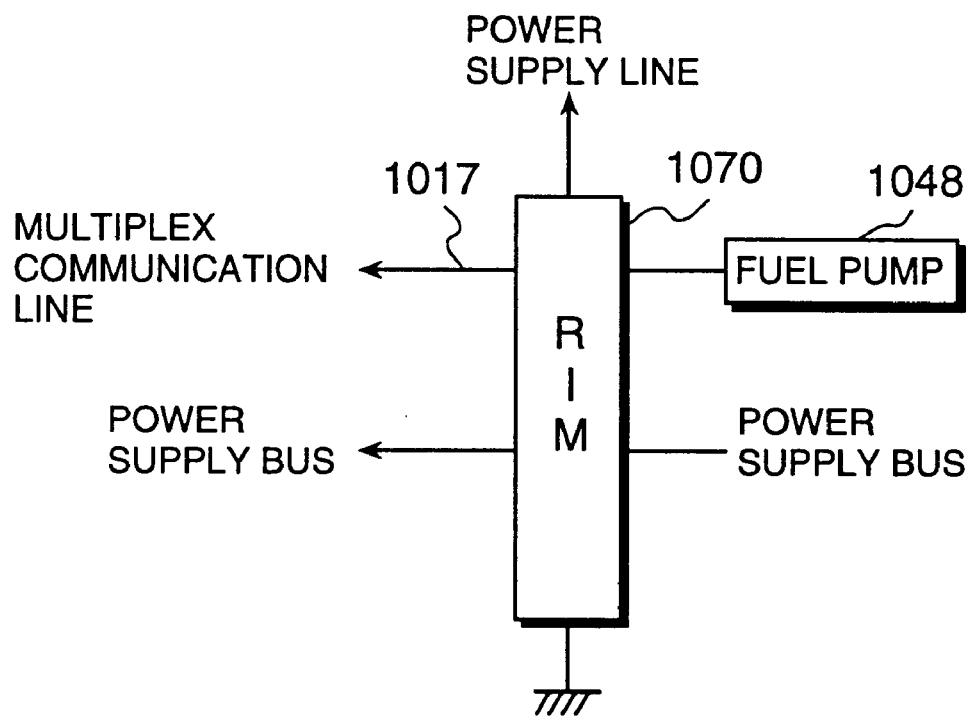
FIG. 67 is a drawing showing a connection condition of RIM loads.

FIG. 67 shows a distributed situation of loads relating to the PCM to an RIM 1070 described above. In the present embodiment, a fuel pump 1048 built normally in a fuel tank and positioned farthest from the PCM is controlled by the RIM 1070. A control signal of the fuel pump 1048 is sent from the PCM to the RIM via the BCM.

Figure 68:
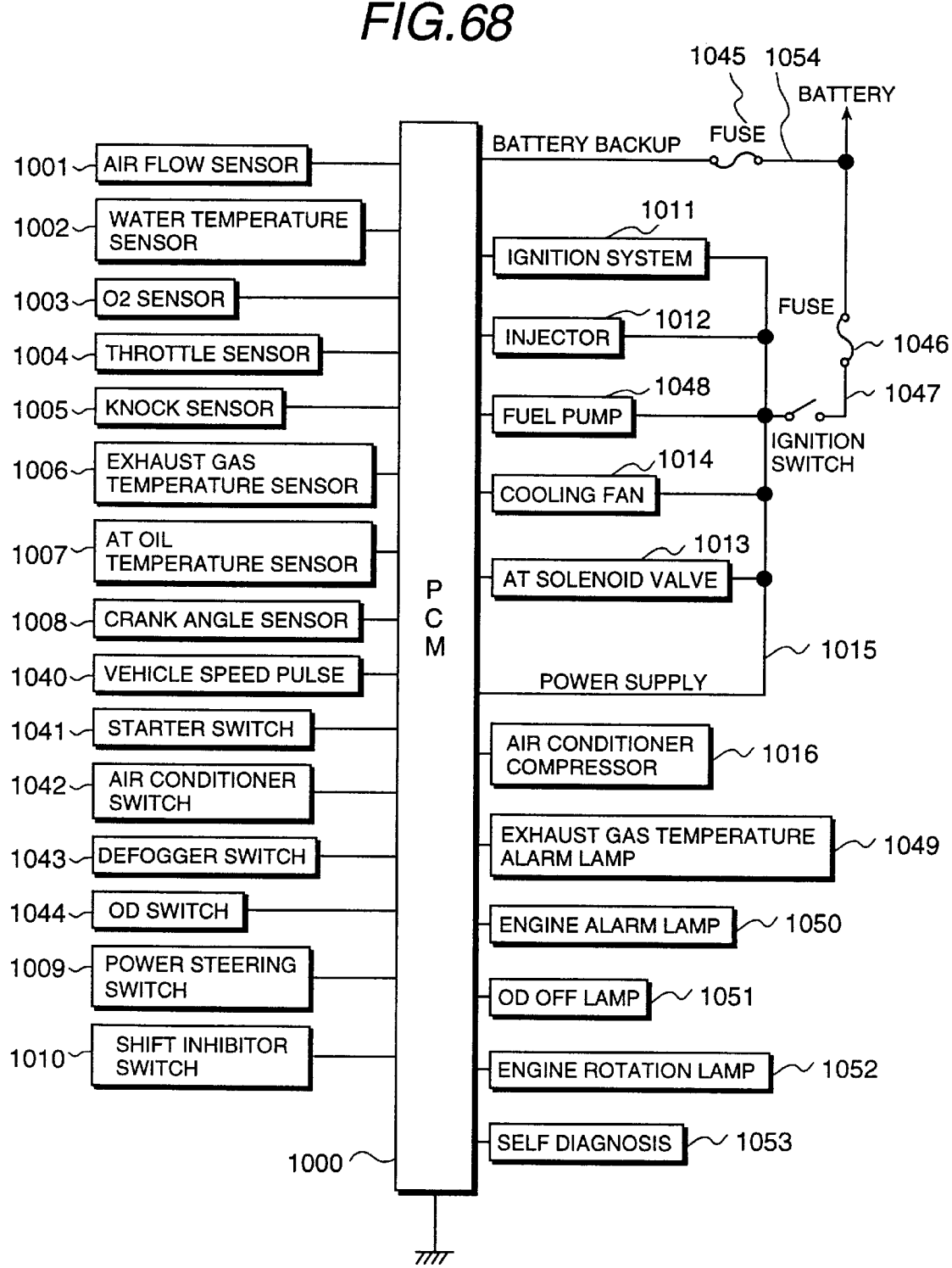
FIG. 68 is a diagram of a conventional system configration of a PCM.

FIG. 68 shows a conventional example of a PCM system construction and illustrates a wiring line reduction effect by the present invention. Since an ignition switch signal is fetched by the BCM and transmitted by multiplex communication, wiring lines for a starter switch 1041 and an ignition switch 1047 can be reduced. Since power is supplied from the FIM to the PCM and an over-current state of the PCM is supervised by the FIM, fuses 1045 and 1046 on the upstream can be reduced. Simultaneously, the necessity for wiring a power supply line from the battery to the PCM via the fuse box in the compartment is eliminated, and the wiring line can be reduced as much. The power supply line for backing up the battery is eliminated by transferring data necessary for backing up when power supply to the PCM is cut-off to the BCM by multiplex communication as hereinafter described. Since signals of the exhaust gas temperature alarm lamp 1049, engine alarm lamp 1050, OD off lamp 1051, defogger switch 1043 and OD switch 1044 are transferred by multiplex communication via the IPM as described hereinabove, the necessity for wiring individual lines to them is eliminated, and the wiring lines can be reduced. Since a signal of an air conditioner switch 1042 is transferred from an air conditioner control unit which is hereinafter described to the PCM by multiplex communication, the wiring line for it can be reduced similarly. An engine rotation pulse signal 1052 is produced by the PCM and transmitted to the other control units by multiplex communication. The vehicle speed pulse signal is produced by the ABS control unit and transmitted to the other control units by multiplex communication. Since also a self diagnosis 1053 is executed by multiplex communication, wiring lines for it can be reduced similarly.

Figure 69:
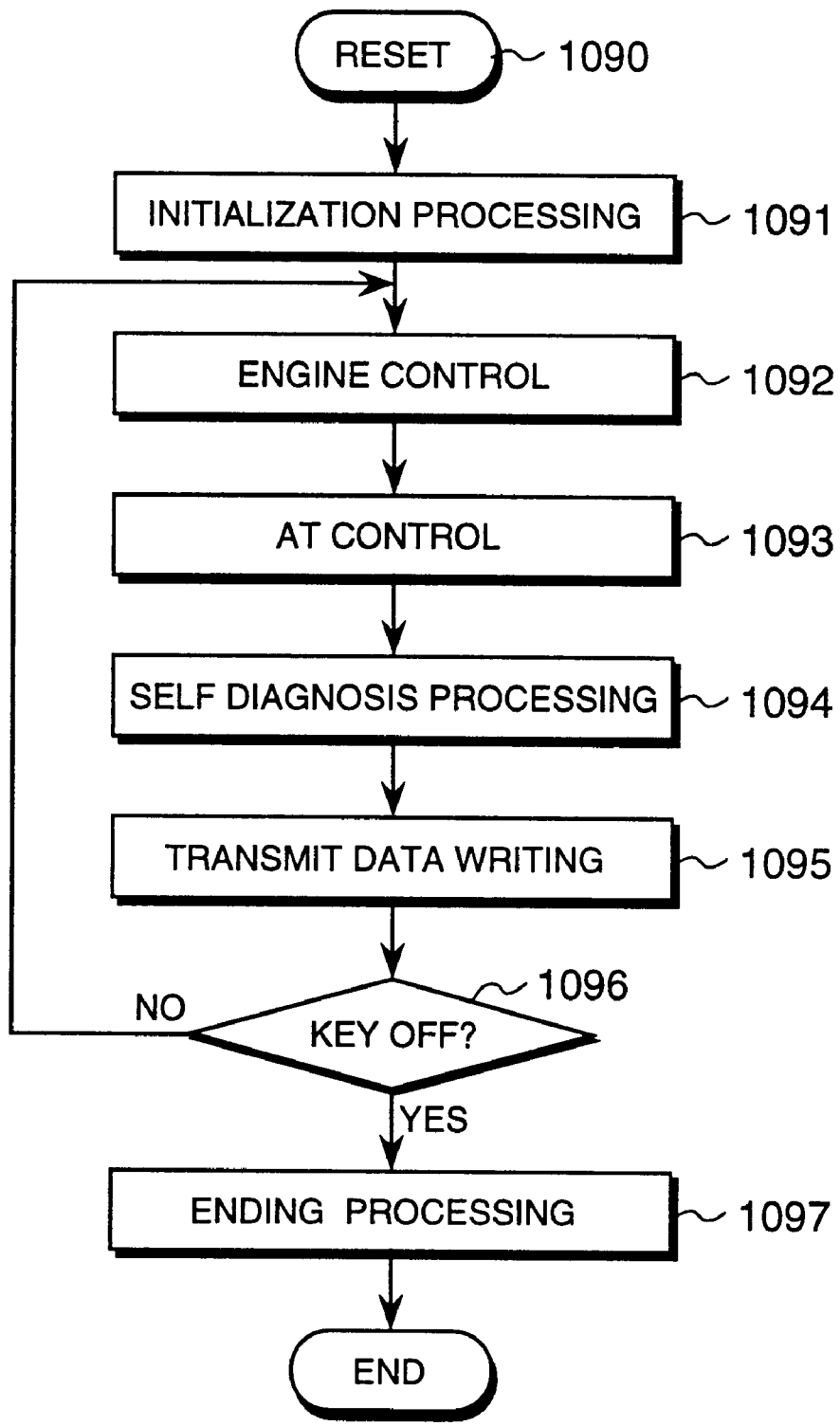
FIG. 69 is a basic control flow chart of the PCM.

FIG. 69 illustrates a basic control flow of the PCM of the present invention. After power supply is made available by the FIM, processing is started from a reset state 1090. After such resetting, the processing advances to initialization processing 1091, by which initialization of the entire system is performed. Then, the processing advances to engine control processing 1092, in which engine control such as fuel injection and ignition is performed based on input information of the various sensors. Thereafter, the processing advances to AT control processing 1093, in which speed changing control is performed based on the input signals from the sensors similarly. Then, the processing advances to self diagnosis processing 1094, in which self diagnosis of the sensors and actuators in the system is performed. Then, the processing advances to transmit data writing processing 1095, in which data to be transmitted from the PCM to another control unit are written into the communication IC. In discrimination processing 1096, it is discriminated whether or not the ignition key switch is in an off-state, and if the ignition key switch is in an off-state, then the processing advances to ending processing 1097, but if the ignition key switch is in an on-state, then the processing advances to the engine control processing 1092. In the ending processing 1097, transfer processing of backup data is performed. After the data transfer is completed, the processing advances to an end state 1098, in which the PCM makes preparations for power supply interruption by the FIM.

Figure 70:
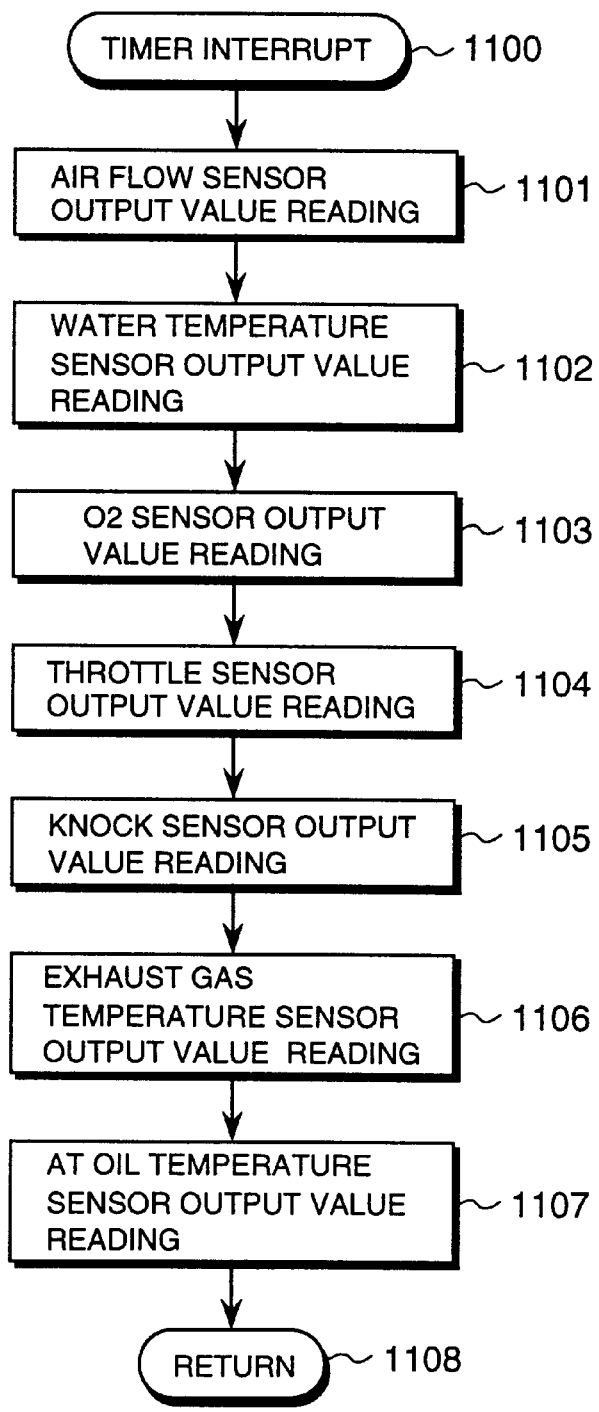
FIG. 70 is a flow chart of analog signal input processing.

FIG. 70 shows an analog signal input processing flow. The present processing is started by a timer interrupt and successively performs air flow sensor output value reading processing 1101, coolant temperature sensor output value reading processing 1102, O2 sensor output value reading processing 1103, throttle sensor output value reading processing 1104, knock sensor output value reading processing 1105, exhaust gas temperature sensor output value reading processing 1106 and AT oil temperature sensor output value reading processing 1107, whereafter the processing returns from the interrupt processing.

Figure 71:
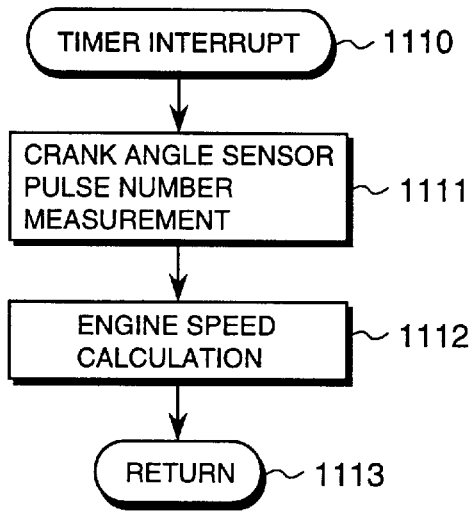
FIG. 71 is a flow chart of engine speed measurement processing.

FIG. 71 illustrates an engine speed measurement processing flow. Also the present processing is started by a timer interrupt. By crank angle sensor pulse count processing 1111, the number of crank angle sensor pulses after the preceding interrupt processing till the current interrupt processing is measured. By engine speed calculation processing, the number of rotation of the engine is calculated from the timer interrupt period and the pulse number mentioned above, and the processing returns from the interrupt by processing 1113.

Figure 72:
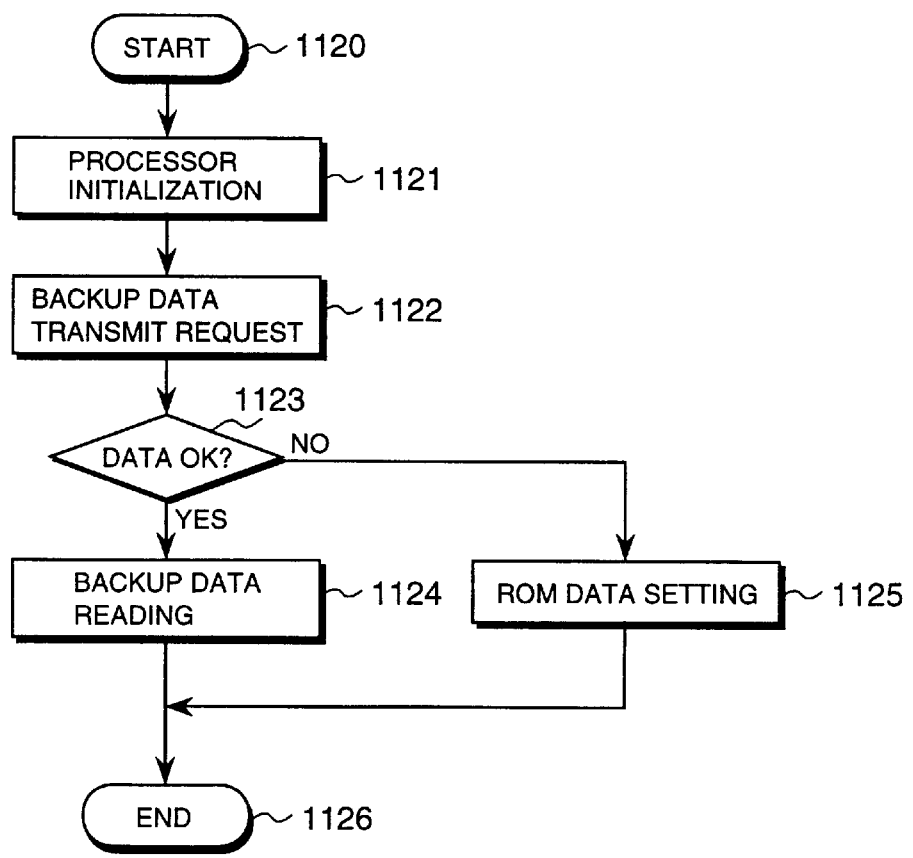
FIG. 72 is a flow chart of initialization processing in the basic control flow chart.

FIG. 72 illustrates details of the initialization processing 1091 in the basic control flow described above. By processor initialization processing 1121, initialization processing of the CPU is performed. By backup data transmit requesting processing 1122, a transfer request for the backup data backed up by the BCH is transmitted. This is performed by setting and transmitting the operation OK bit of the PCM transmission data as described hereinabove. By discrimination processing 1123, contents of the initial value data transferred are discriminated. When the backup data are not normal such as when the BCM itself fails in backing up and stored data are destroyed or when the backup data cannot be transferred because of failure in operation of the BCM, the processing advances to processing 1125, in which the ROM data in the PCM are adopted as initial values. When the transfer data are normal, the backup data are read in by processing 1124. After the data setting is completed, the processing advances to an end state 1126, thereby ending the initialization.

Figure 73:
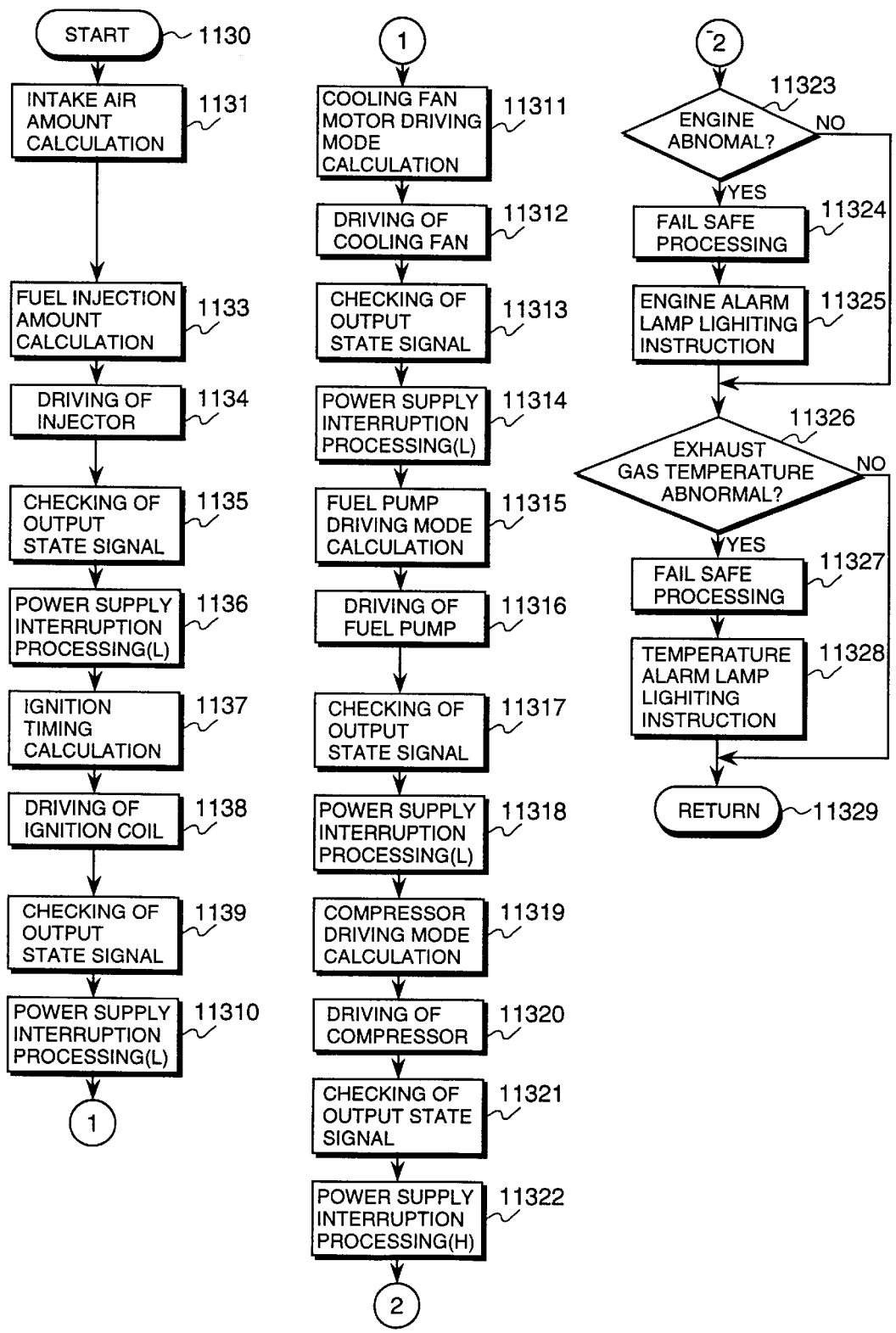
FIG. 73 is a flow chart of engine control processing in the basic control flow chart.

FIG. 73 illustrates details of the engine control processing 1092 in the basic control flow described hereinabove. By processing 1131, the intake air amount is calculated based on data measured by the air flow sensor. By processing 1133, the fuel injection amount is calculated and the injection pulse width of the injector is calculated using the speed calculated by the engine speed calculation processing described above and the intake air amount. By processing 1134, the injector is driven based on the calculated pulse width. By processing 1135, the driving signal of the injector and the output state signal are monitored, and the states of the load and the driving element in the output interface are supervised based on Table 11 given hereinabove. By power supply cut-off processing (L) 1136, failure diagnosis of the high side load (in this instance, the injector) by the low side driving element and incidental cut-off processing are performed based on a result of the supervision mentioned above. By processing 1137, an ignition timing is calculated using the speed of rotation calculated by the engine speed calculation processing described above and data such as a knock sensor signal. By processing 1138, the ignition coil is energized (driven) based on the calculated ignition timing. By processing 1139, the driving signal of the ignition coil and the output state signal are monitored, and the load and the state of the driving element in the output interface are supervised based on Table 11 given hereinabove. By power supply cut-off processing (L) 11310, failure diagnosis of the high side load (in this instance, the ignition coil) by the low side driving element and incidental interruption processing are performed based on a result of the supervision mentioned above. By processing 11311, a cooling fan motor driving mode is calculated using the speed of rotation calculated by the engine speed calculation processing described above and data such as a coolant temperature signal. By processing 11312, the motor is driven based on the calculated driving mode. By processing 11313, the driving signal of the cooling fan motor and the output state signal are monitored, and the load and the state of the driving element in the output interface are supervised based on Table 11 given hereinabove. By power supply cut-off processing (L) 11314, failure diagnosis of the high side load (in this instance, the cooling fan motor) by the low side driving element and incidental interruption processing are performed based on a result of the supervision described above. By processing 11315, a fuel pump driving mode is calculated using data such as the speed of rotation calculated by the engine speed calculation processing described above. By processing 11316, the pump (motor) is driven based on the calculated driving mode. By processing 11317, the driving signal of the fuel pump motor and the output state signal are monitored, and the load and the state of the driving element in the output interface are supervised based on Table 11 given hereinabove. By power supply cut-off processing (L) 11318, failure diagnosis of the high side load (in this instance, the fuel pump motor) by the low side driving element and incidental interruption processing are performed based on a result of the supervision mentioned above. By processing 11319, an air conditioner compressor clutch driving mode is calculated using the speed of rotation calculated by the engine speed calculation processing described above and the coolant temperature sensor signal as well as data such as a state of the air conditioner switch transferred from the air conditioner control unit. By processing 11320, the compressor clutch is driven based on the calculated driving mode. By processing 11321, the driving signal of the compressor clutch and the output state signal are monitored, and the load and the states of the driving elements in the output interface are supervised based on Table 12 given hereinabove. By power supply cut-off processing (H) 11322, failure diagnosis of the low side load (in this instance, the compressor clutch) by the high side driving element and incidental cut-off processing are performed based on a result of the supervision mentioned above. By discrimination processing 11323, an abnormal state of the engine is detected, and if it is discriminated that the engine is in an abnormal state, then the processing advances to fail safe processing 11324, but if it is discriminated that the engine is in a normal state, then the processing advances to abnormal exhaust gas temperature discrimination processing 11326. In the fail safe processing 11324, fail safe processing determined in advance is executed in response to a failure mode, and then the processing advances to engine alarm lamp lighting instruction processing 11325. By the engine alarm lamp lighting instruction processing 11325, the abnormal occurrence bit of the transfer data from the PCM to the BCM is set to provide an alarm lamp lighting instruction. By the abnormal exhaust gas temperature discrimination processing 11326, it is discriminated based on the exhaust gas temperature sensor signal whether or not the exhaust gas temperature is excessively high. If the exhaust gas temperature is higher than a preset value, then it is discriminated that the exhaust gas temperature is abnormal, and the processing advances to fail safe processing 11327. If the exhaust gas temperature is normal, then the processing advances to an end state 11329 in order to end the engine controlling processing. By the fail safe processing 11327, the fail safe processing determined in advance is executed in response to the failure mode, and then the processing advances to exhaust gas temperature alarm lamp lighting instruction processing 11328. By the exhaust gas temperature alarm lamp lighting instruction processing 11328, the abnormal exhaust gas temperature occurrence bit of the data to be transferred from the PCM to the BCM is set to provide an alarm lamp lighting instruction.

Figure 74:
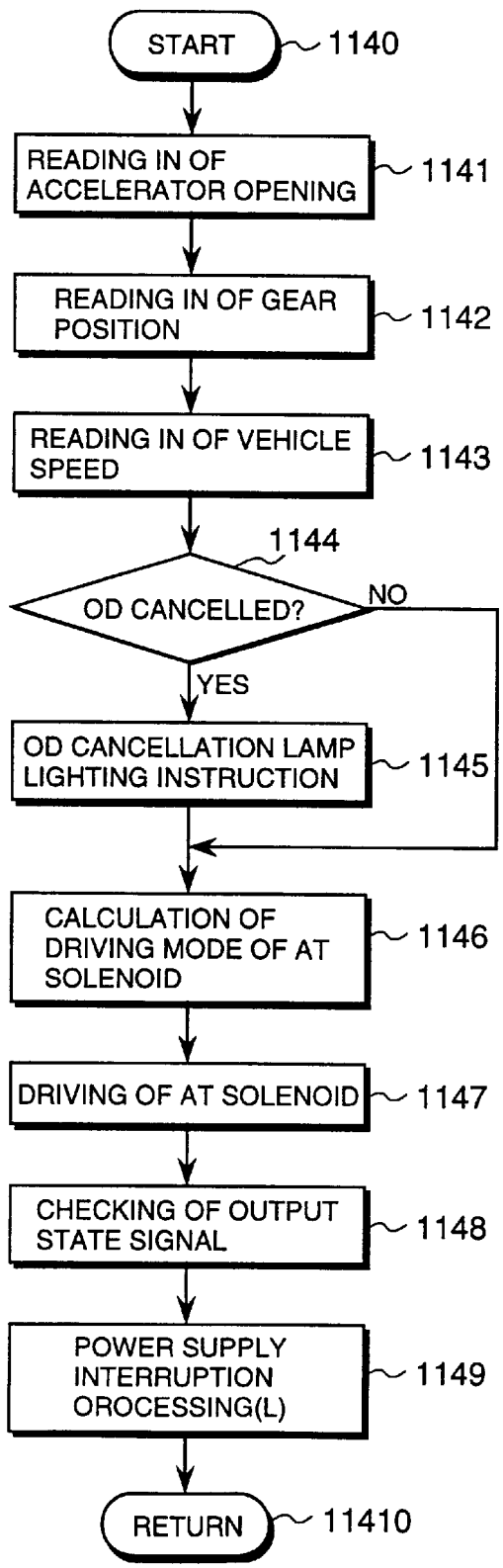
FIG. 74 is a flow chart of AT control processing in the basic control flow chart.

FIG. 74 illustrates details of the AT control processing 1093 in the basic control flow described above. By processing 1140, the accelerator opening is read in from a throttle sensor signal. By processing 1142, the gear position of the transmission is read in from the shift inhibitor switch signal. By processing 1143, the vehicle speed signal transferred from the ABS control unit is read in. By discrimination processing 1144, it is discriminated whether or not the over drive switch has been cancelled. If the over drive switch has been cancelled, then the processing advances to processing 1145, but if the OD is set, then the processing advances to processing 1146. By the OD cancellation lamp lighting instruction processing 1145, the OD cancellation bit of the data to be transferred from the PCM to the BCM is set to provide a cancellation lamp lighting instruction. By processing 1146, the gear position of the AT is set from the engine speed, the throttle opening and so forth, and a driving mode of the corresponding solenoid is calculated. By processing 1147, the driving signal of the AT solenoid and the output state signal are monitored, and the load and the state of the driving element in the output interface are supervised based on Table 1 given hereinabove. By power supply interruption processing (L) 1149, failure diagnosis of the low side load (in this instance, the AT solenoid) by the high side driving element and incidental interruption processing are performed based on a result of the supervision described above, and the processing advances to an end state 11410.

Figure 75:
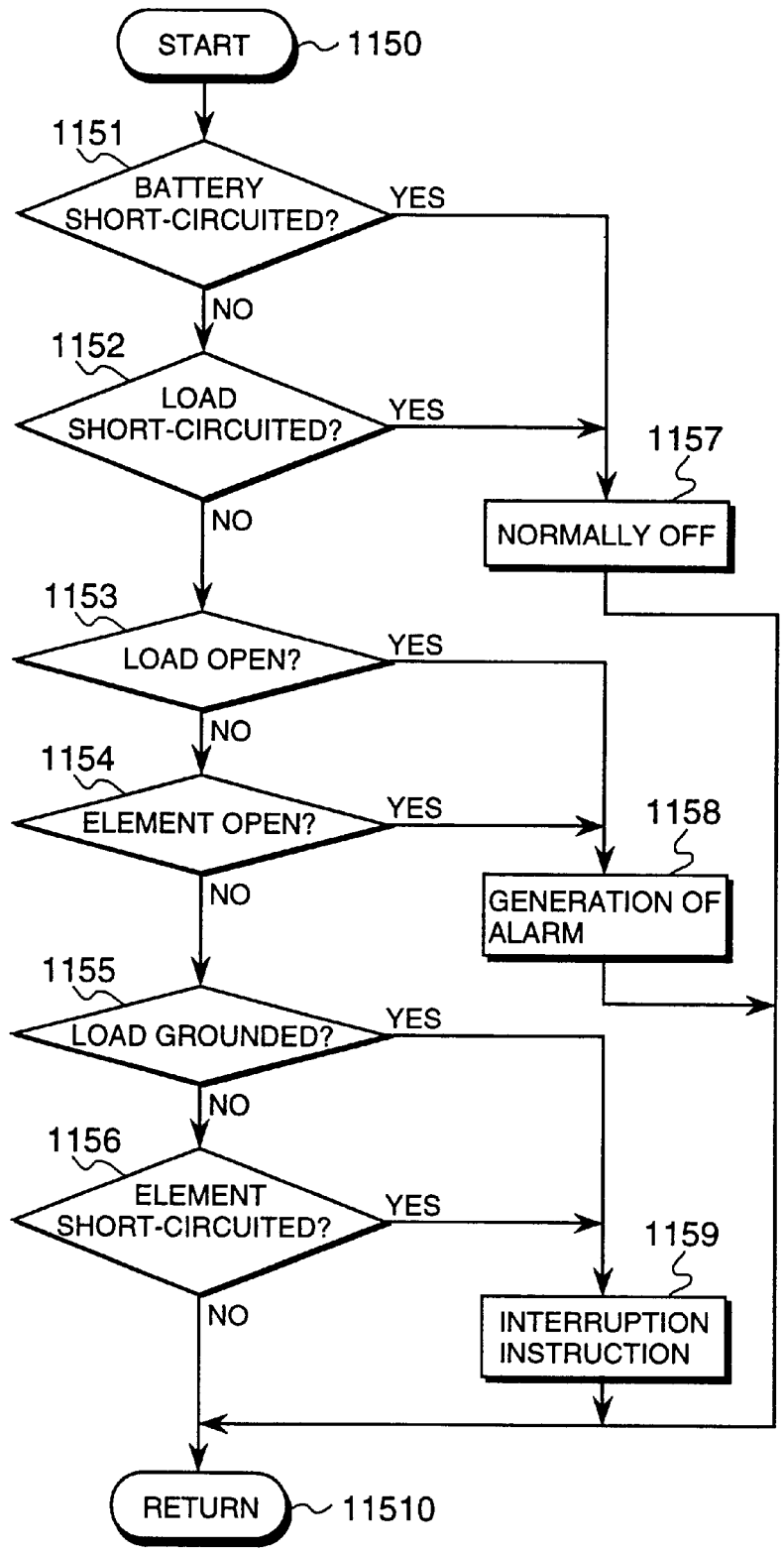
FIG. 75 is a detailed flow chart of power supply cut-off processing upon short-circuiting in the basic control flow chart.

FIG. 75 illustrates details of the power supply cut-off processing (L) 1136. When it is discriminated that the load state is a battery short-circuited state (short-circuiting of the load to power supply) discrimination processing 1151 or load short-circuiting discrimination processing 1152, since this is a state wherein a voltage continues to be normally applied to the driving element in the output stage, normal interruption (off) of the load is selected by processing 1157. If it is discriminated by load open discrimination processing 1153 or driving element open failure (same as the normal load interruption state) discrimination processing 1154 that the load state is a load open or driving element open state, since this is a state in which driving of the load is impossible, an alarm is generated by processing 1158. If it is discriminated by load grounding (ground short-circuiting) discrimination processing 1155 or driving element short-circuit failure discrimination processing 1156 that the load state is a load grounded or driving element short-circuited failure, since the load is in a normally powered state and load control by the PCM side is impossible, a cut-off instruction is generated by processing 1159 to request the cut-off of the PCM power supply for the FIM on the upstream of the PCM.

Figure 76:
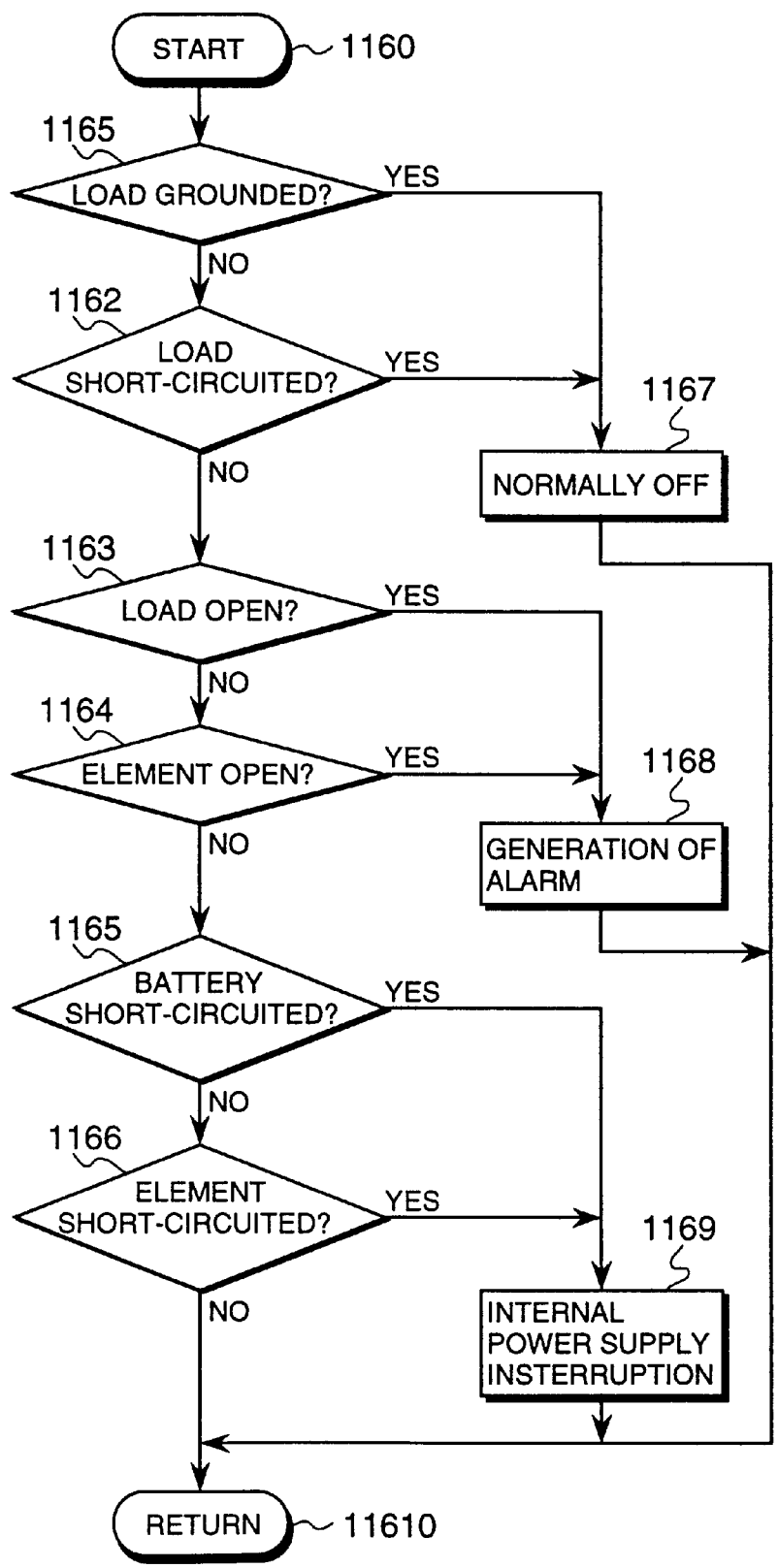
FIG. 76 illustrates power supply cut-off processing upon load grounding in the basic control flow chart.

FIG. 76 illustrates details of the power supply cut-off processing (H) 11322 described hereinabove. When it is discriminated by load grounding discrimination processing 1161 or load short-circuiting discrimination processing 1162 that the load state is a battery short-circuited or short-circuited state, since this is a state wherein a voltage continues to be normally applied to the driving element in the output stage, normal cut-off (off) of the load is selected by processing 1167. If it is discriminated by load open discrimination processing 1163 or driving element open failure (same as the normal load interruption state) discrimination processing 1164 that the load state is a load open or driving element open state, since this is a state wherein the load cannot be driven, an alarm is generated by processing 1168. If it is discriminated by battery short-circuiting discrimination processing 1165 or driving element short-circuit failure discrimination processing 1166 that the load state is a battery short-circuited or load element short-circuited failure state, since the load is in a normally energized state and load control by the PCM is impossible, a cut-off instruction is generated by processing 1169 to request the cut-off of power supply to the PCM by the FIM on the upstream of the PCM.

Figure 77:
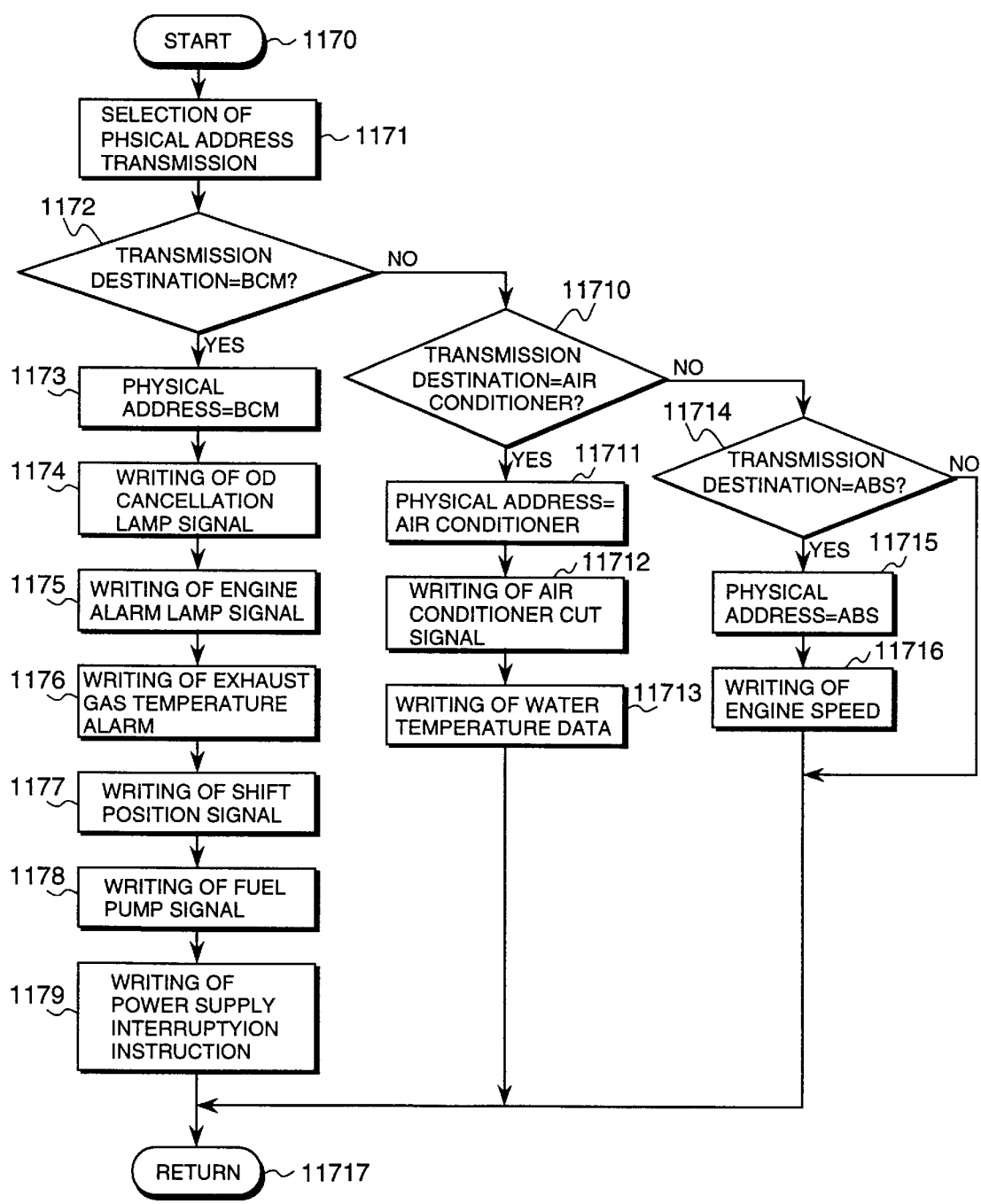
FIG. 77 is a detailed flow chart of transmission data write processing in the basic control flow chart.

FIG. 77 illustrates details of the transmit data writing processing 1095 in the basic control flow described above. By processing 1171, in order to transmit data individually to the different control units, a transmission mode of the communication IC is designated to the physical address. Discrimination of a destination of transmission is performed by discrimination processing 1172, 11710 and 11714. When the destination of transmission is the BCM, the processing advances to processing 1173. When the destination of transmission is the air conditioner control unit, the processing advances to processing 11711. When the destination of transmission is the ABS control unit, the processing advances to processing 11715. By the processing 1173, the transmission destination address is set to the BCM. By the processing 1174, the OD cancellation lamp signal is set; by the processing 1175, the engine alarm lamp is set; by processing 1176, the exhaust gas temperature alarm lamp is set; by processing 1177, the shift position lamp in the meter panel is set; by processing 1178, the fuel pump is set; and by processing 1179, data or a bit of a power supply cut-off of the PCM itself is set, and is written into the communication IC. By the processing 11711, the transmission destination address is set to the air conditioner. By processing 11712, an air conditioner cut signal is set, and by processing 11713, coolant temperature data is set, and written into the communication IC. By the processing 11715, the transmission destination address is set to the ABS. By the processing 11716, the engine speed data is set and written into the communication IC. After the data is written, the communication IC performs data transmission processing to the designated transmission destination.

Figure 78:
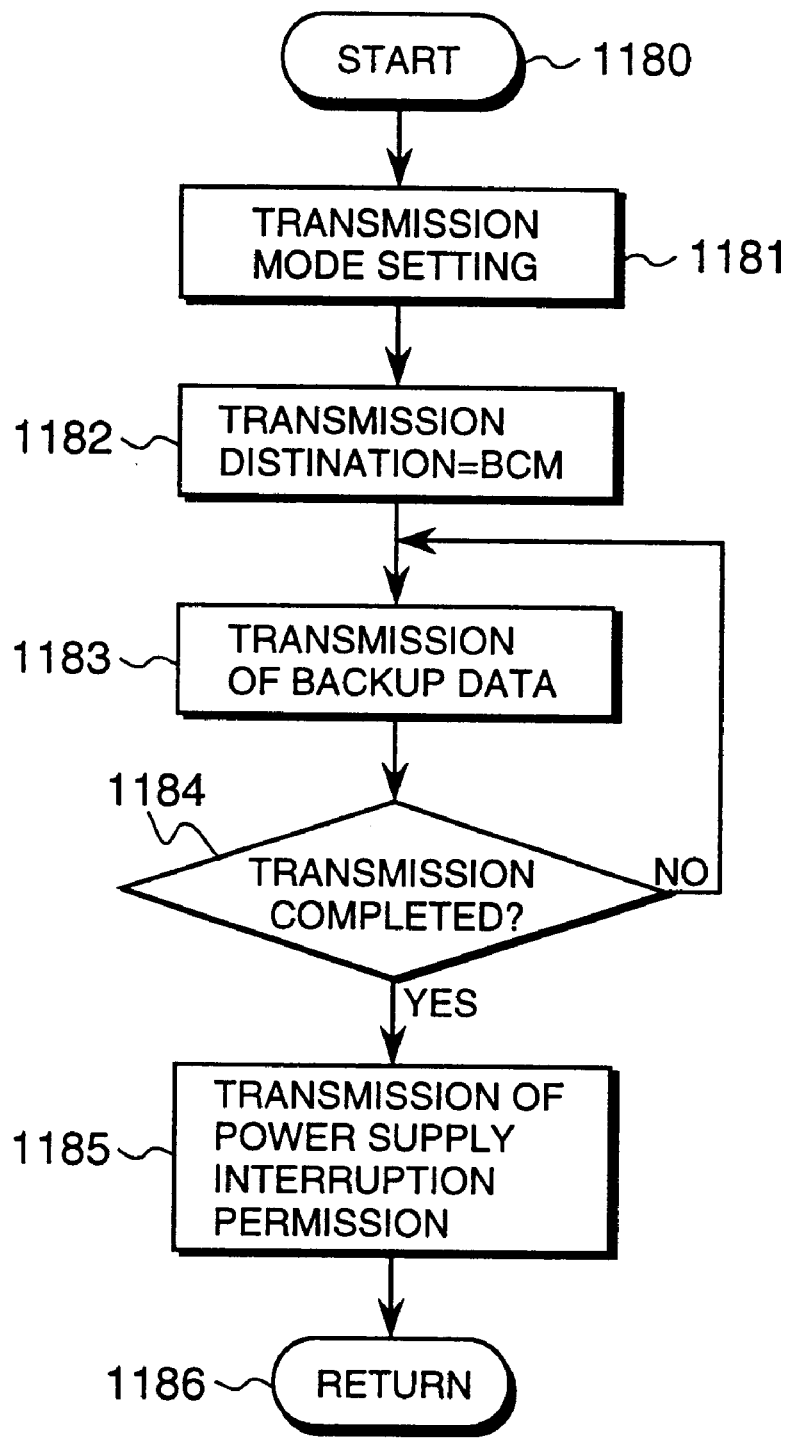
FIG. 78 is a detailed flow chart of ending processing in the basic control flow chart.

FIG. 78 illustrates details of the ending processing 1097 in the basic control flow described above. By processing 1181, the transmission mode is set to the physical address transmission mode. By processing 1182, the transmission destination address is set to the BCM. The backup data is transmitted to the BCM by processing 1183 until it is discriminated by processing 1184 that all of the backup data have been transmitted. After completion of transmission of all of the backup data, the processing advances to processing 1185, by which the power supply interruption permission signal bit of the PCM itself is set and transmitted, thereby ending the ending processing.

Figure 79:
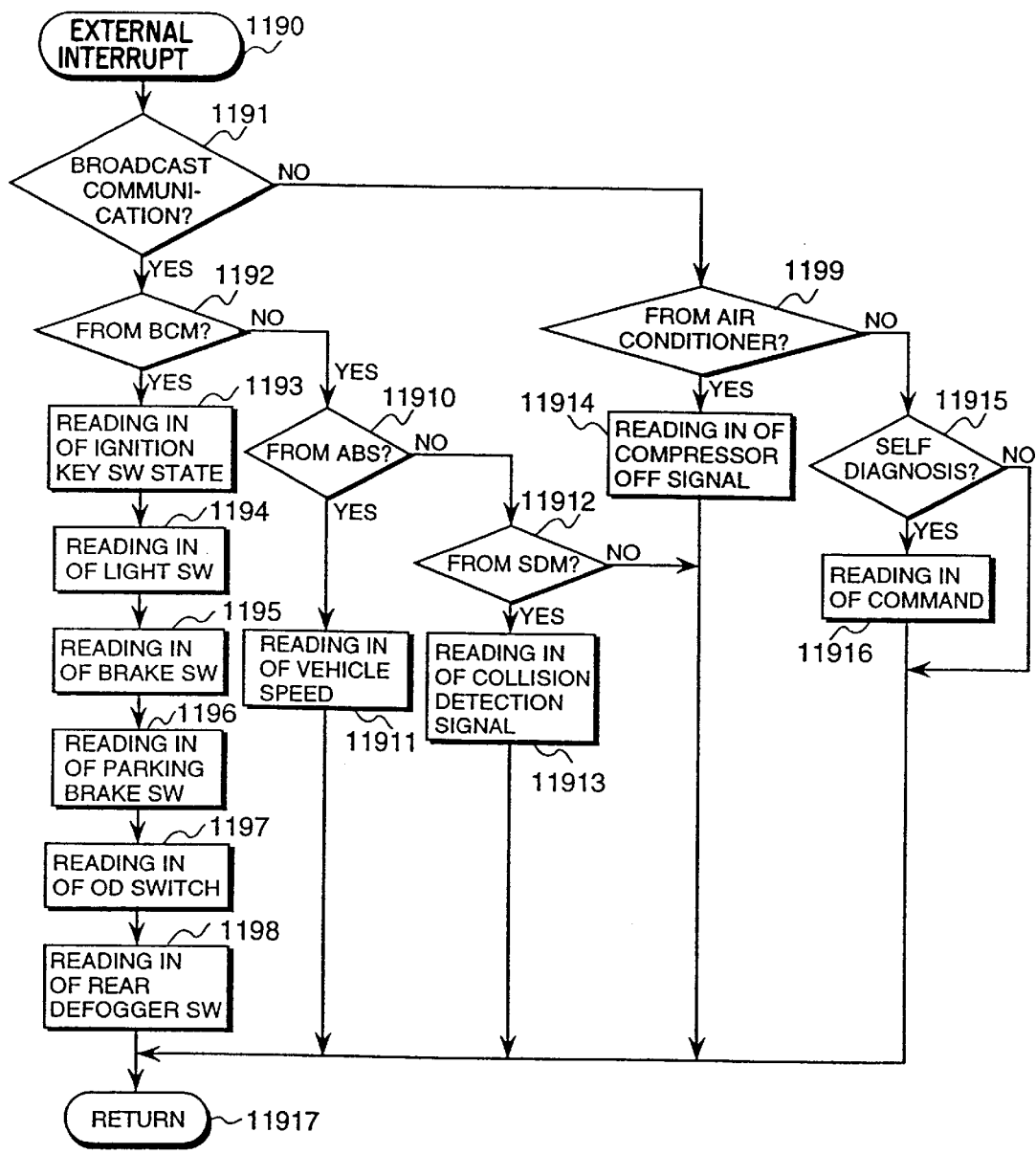
FIG. 79 is a flow chart of multiplexed communication data receive processing.

FIG. 79 illustrates a multiplex communication data reception processing flow. Since the construction wherein external interrupt occurs with the CPU upon reception of data of the communication IC is employed, the present processing is started by external interrupt by processing 1190. By processing 1191, it is discriminated whether or not the receive data has been obtained by broadcast communication or individual communication. When the receive data has been obtained by broadcast communication, it is discriminated by discrimination processing 1192, 11910 and 11912 whether the transmission destination is the BCM, the ABS or the SDM. If the transmission destination is the BCM, then ignition key switch position information is read in by processing 1193; light switch position information is read in by processing 1194; brake lamp switch information is read in by processing 1195; parking brake switch information is read in by processing 1196; OD switch information is read in by processing 1197; and rear defogger switch information is read in by processing 1198, from the communication IC. When the transmission destination is the ABS, the vehicle speed is read in by processing 11911. When the transmission destination is the SDM, a collision detection signal is read in by processing 11931. When the receive data has been obtained by individual communication, it is discriminated by processing 1199 and 11915 whether the transmission destination is the air conditioner or the self diagnosis apparatus. If the transmission destination is the air conditioner, then a compressor off signal is read in by processing 11914. If the transmission destination is the self diagnosis apparatus, then a diagnostic processes command is read in by processing 11916, and corresponding self diagnosis processing is performed by the self diagnostic processes in the main routine.

Figure 80:
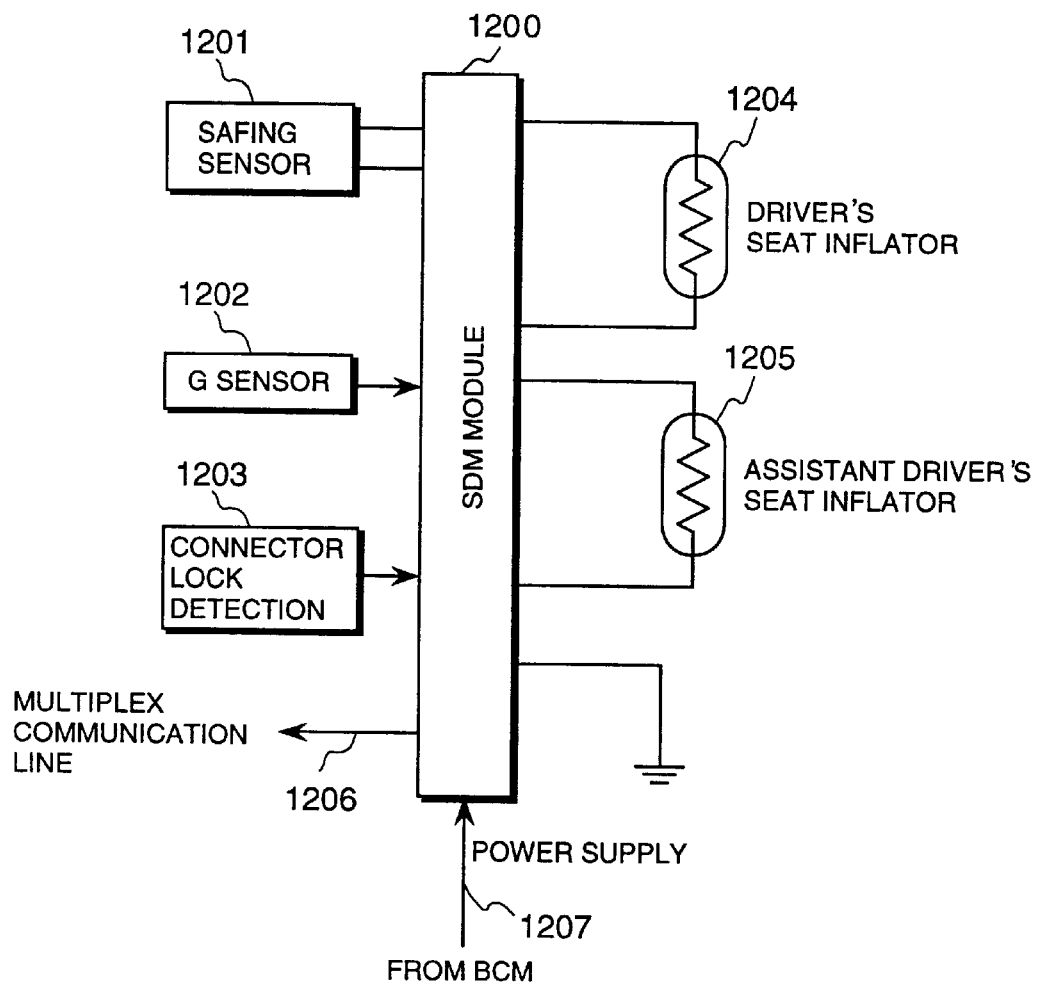
FIG. 80 is a diagram showing a system configuration of an SDM.

FIG. 80 is a system diagram showing a construction of an air bag module (hereinafter referred to as SDM) to which the power supply network of the present invention is applied. A control module 1200 receives various sensor signals necessary for air bag control upon collision and outputs driving signals for various actuators in accordance with a control method determined in advance. A safing sensor 1201 is a double system sensor upon operation of an air bag. A G sensor 1202 detects the G force upon collision, converts it into an electric signal and outputs the electric signal. A connector lock detection sensor 1203 detects a coupled state of a connector. A driver's seat inflator 1204 and a passenger's seat inflator 1205 are bags which are inflated by explosion caused in the insides thereof by a CPU when collision is detected. A power supply line 1207 is part of the power supply network of the present invention and supplies power to the SDM itself and supplies power to the loads 1204 and 1205 mentioned above from a BCM 1221. A multiplex communication line 1206 is part of the power supply network similarly and is provided to effect communication with a control unit such as the BCM 1221.

Figure 81:
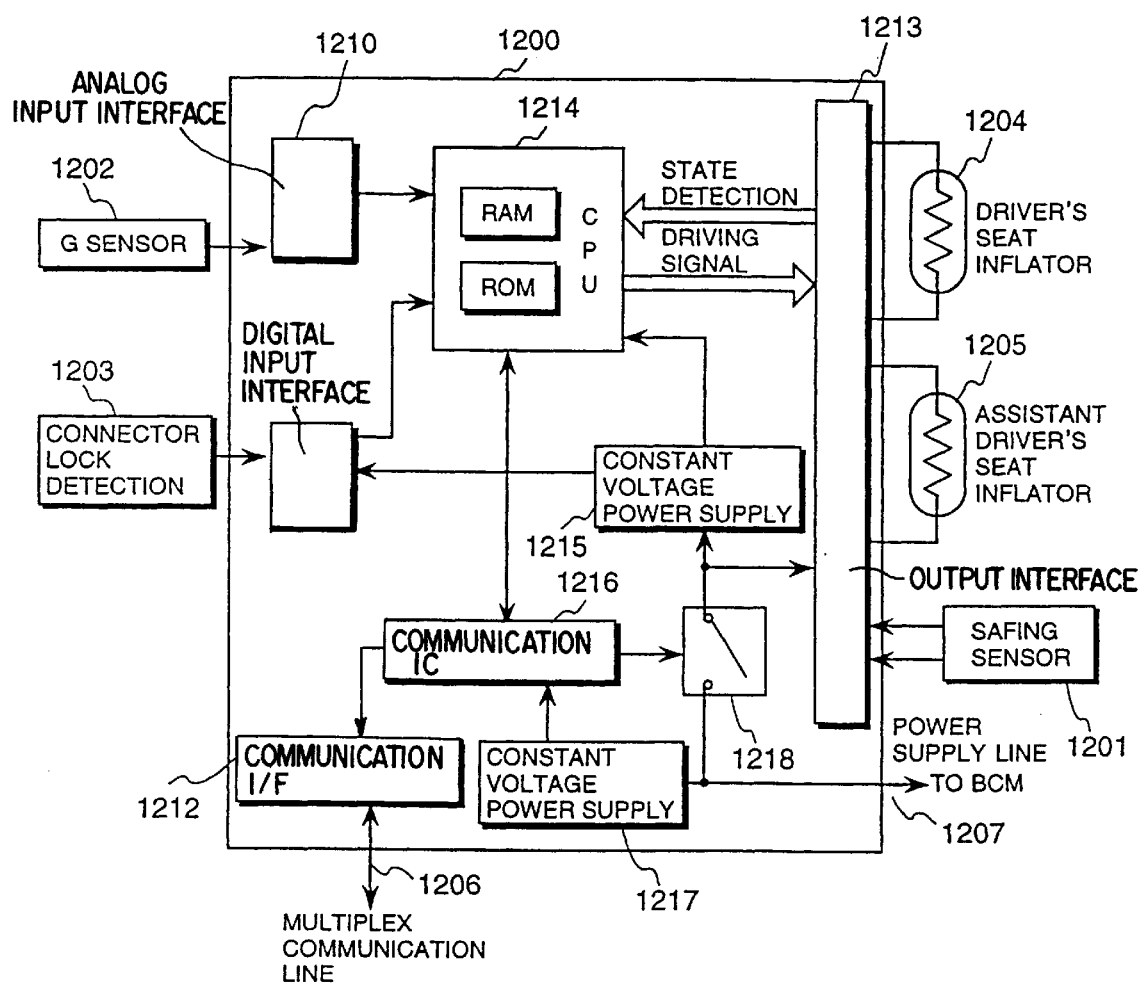
FIG. 81 is a detailed diagram illustrating an internal configuration of an SDM module.

FIG. 81 is a detailed diagram of the internal construction of the SDM module 1200. The G sensor 1202 provides an analog input signal, and the analog input signal is inputted to an analog input interface 1210, by which it is converted so that it has a signal level (for example, 5 V of the full scale) with which the CPU (Central Processing Unit) can process the signal readily. The CPU 1214 converts the analog signal mentioned above into a digital signal by means of an A/D converter and fetches it into the inside of the CPU. Power supplied from the BCM include power to be supplied to a constant voltage power supply 1215 for a communication IC 1216 in the SDM and power to be supplied to the constant voltage power supply 1215 and an output interface 1213 via a power supply cut-off switch 1218. Another constant voltage power supply 1217 is a constant voltage power supply generation circuit for exclusive use for the communication IC and is normally powered unless power supply from the BCM is cut off. The present circuit can be formed from a three-terminal regulator and so forth. The constant voltage power supply 1215 supplies power to the CPU 1214 and the analog input interface 1210. The power supply cut-off switch 1218 is controlled directly by the communication IC and is provided to cut-off power supply when trouble occurs with a grounded type load. The communication IC 1216 is connected to the multiplex communication line 1206 via the communication IC 1212. Further, the communication IC 1216 is connected to the CPU 1214 so that it transmits and receives data necessary for the power supply network via the multiplex communication line 1206. A detailed description of functions of the communication IC 1216 and the communication IC 1212 is omitted here. The CPU 1214 includes a ROM (Read Only Memory) and a RAM (Random Access Memory) provided therein, and control software for the SDM and initial constants are stored in the ROM. Since the air bag driving circuit of the output interface 1213 is basically the same as the door motor driving circuit of the air conditioner control unit, a detailed description of the same is omitted.

Figure 82:
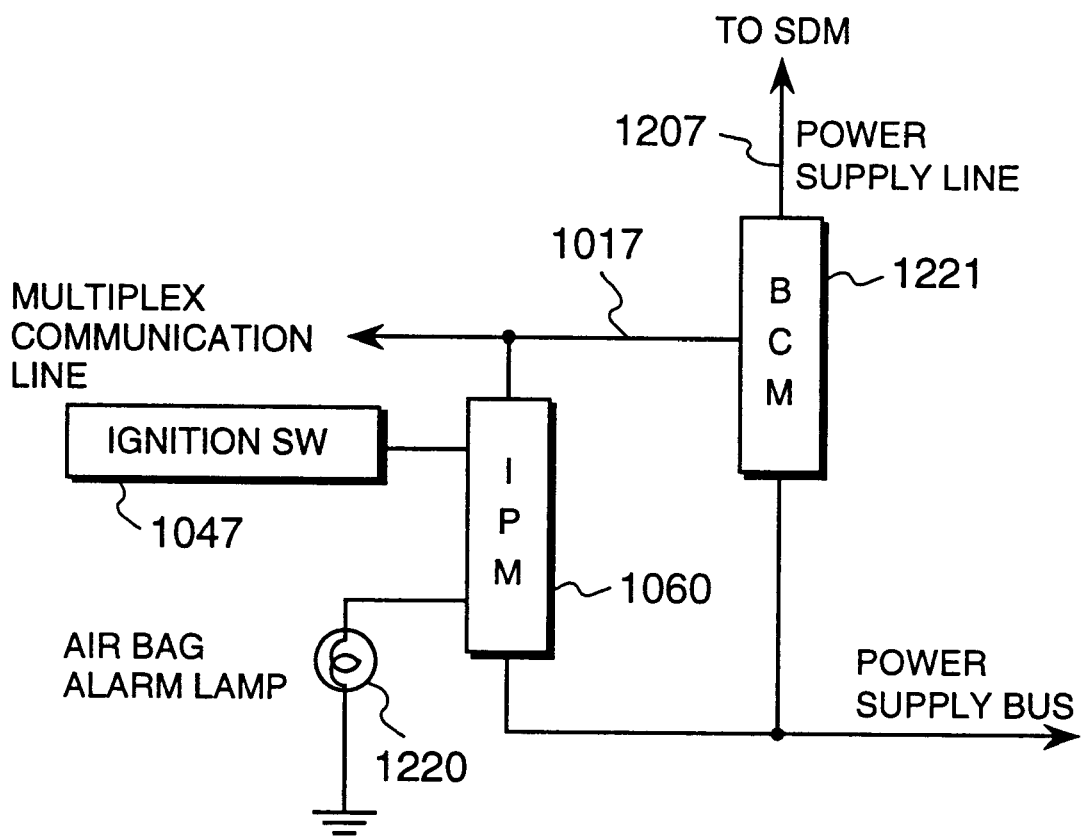
FIG. 82 is a drawing showing a load connection state of a BCM and an IPM.

FIG. 82 illustrates a distribution situation of loads to the BCM 1221 and the IPM 1060 described hereinabove relating to the SDM. In the present embodiment, the BCM supplies power to the SDM. The ignition switch 1047 provides an input signal relating to the SDM. An air bag alarm lamp 1220 is incorporated in the meter panel, and driving data is transferred from the SDM to the IPM via the BCM.

Figure 83:
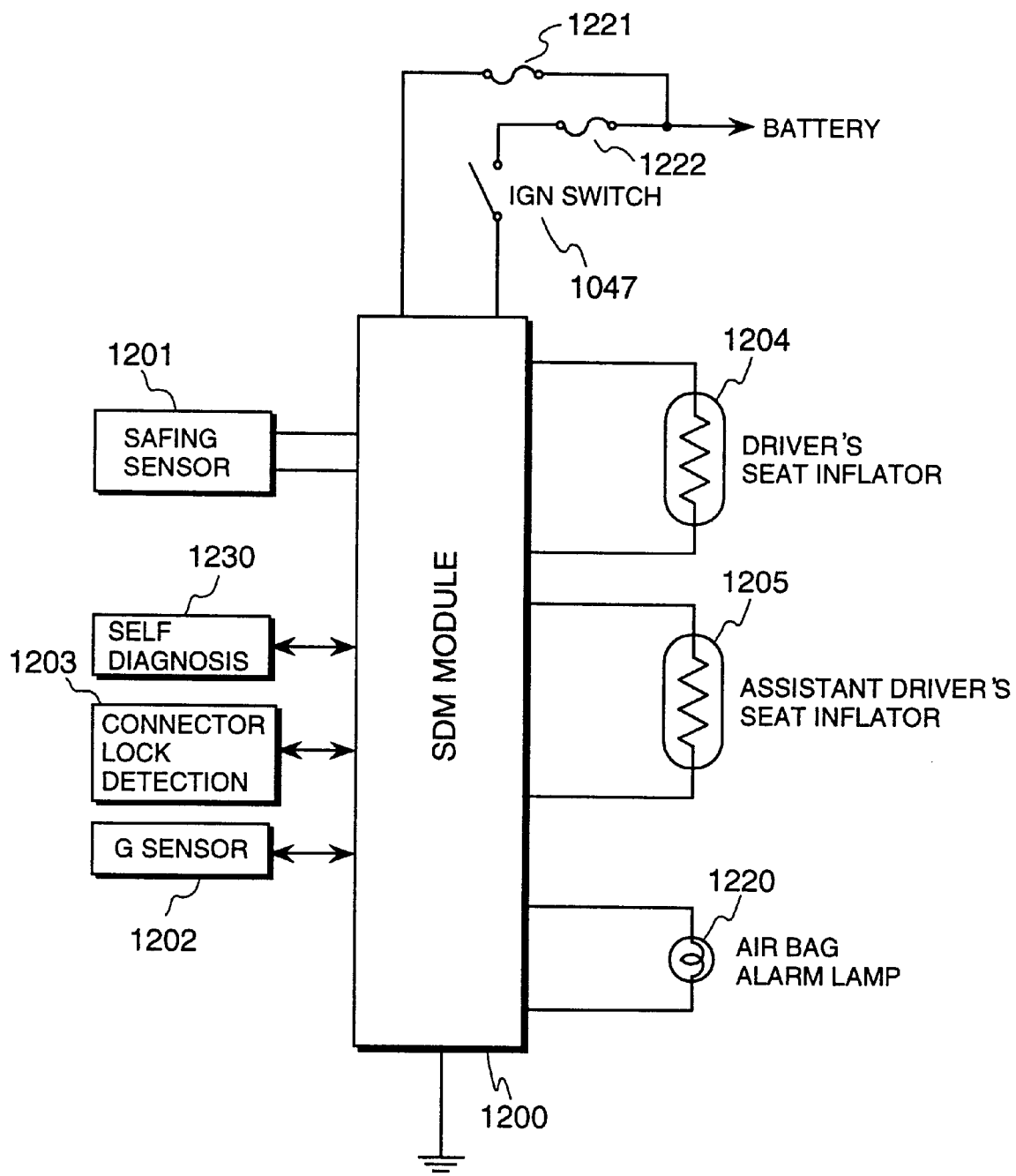
FIG. 83 is a drawing showing a conventional construction of an SDM system.

FIG. 83 shows a conventional example of an SDM system construction and illustrates wiring line reduction effects by the present invention. Since an ignition switch signal is fetched by the BCM and transmitted by multiplex communication, wiring lines relating to the ignition switch 1047 can be reduced. Since the SDM receives supply of power from the BCM and an over-current state of the SDM is supervised by the BCM, fuses 1221 and 1222 on the upstream can be reduced. Simultaneously, the necessity for laying power supply lines from the battery to the SDM via the fuse box in the compartment is eliminated, and wiring lines can be reduced as much. Power supply lines for backing up the battery become unnecessary by transferring, when power supply to the SDM is cut-off, data necessary for the backing up by multiplex communication to the BCM as hereinafter described. Since a signal is transferred by multiplex communication via the IPM as described hereinabove, the necessity for individually laying wiring lines to the air bag alarm lamp 1220 is eliminated, and wiring lines are reduced. Also self diagnosis 1230 is executed by multiplex communication, wiring lines for the same can be reduced similarly.

Figure 84:
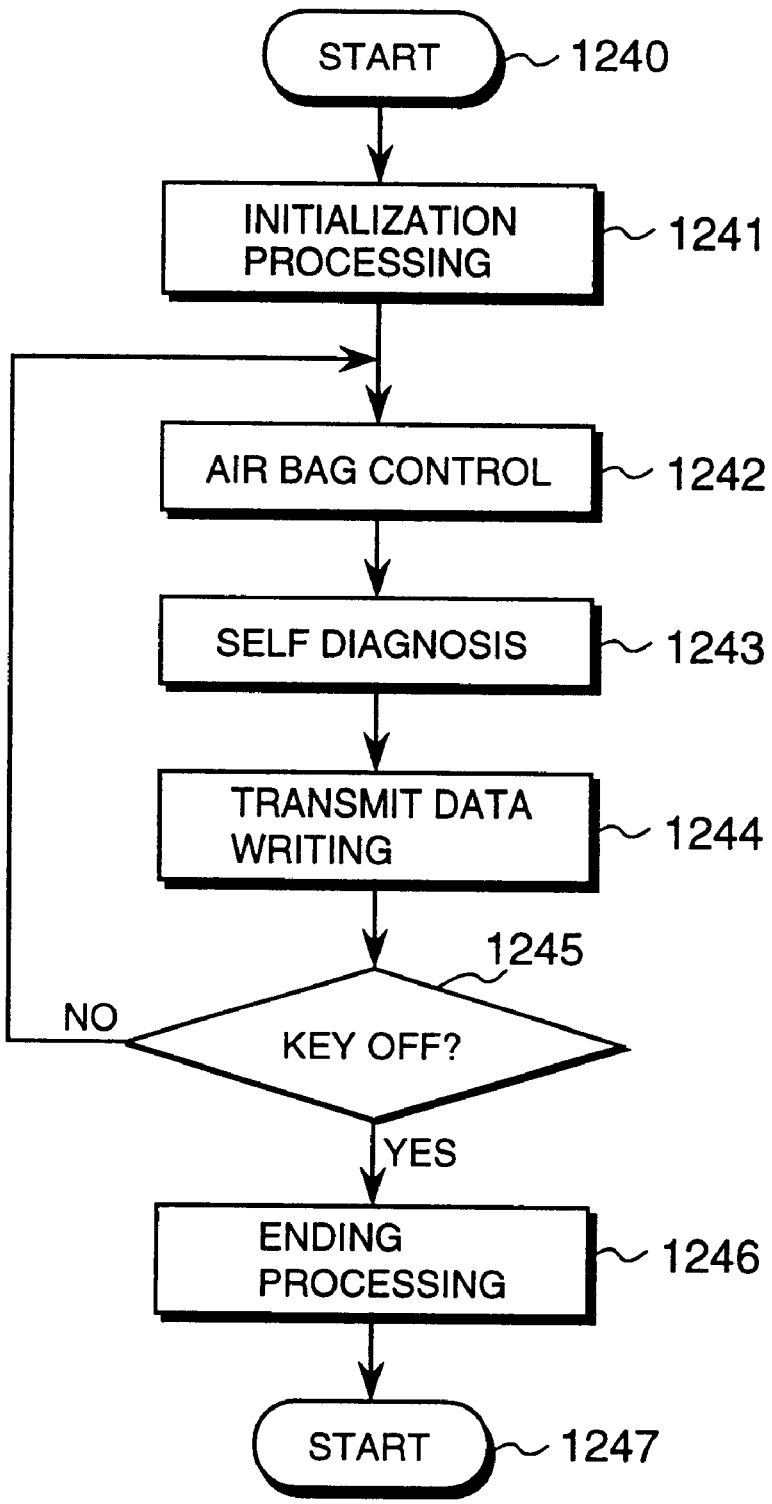
FIG. 84 is a drawing showing a basic control flow chart of an SDM of the present embodiment.

FIG. 84 illustrates a basic control flow of the SDM of the present invention. After power to the BCM is made available, processing starts from a reset state 1240. After the resetting, the processing advances to initialization processing 1241, by which initialization of the entire system is performed. Then, the processing advances to air bag control processing 1242, by which inflator control is performed based on input information of various sensors. Thereafter, the processing advances to self diagnostic processes 1243, by which self diagnosis of the sensors and actuators in the system is performed. Then, the processing advances to transmission data writing processing 1244, by which data to be transmitted from the SDM to another control unit are written into the communication IC. By discrimination processing 1255, it is discriminated whether or not the ignition key switch is in an off state, and if the key switch is in an off state, then the processing advances to ending processing 1256, but if the key switch is in an on state, then the processing advances to brake control processing 1252. By the ending processing 1256, transfer processing of the backup data is performed. After the data transfer is completed, the processing advances to an end state 1257 to make preparations for power supply cut-off by the BCM. Since initialization processing 1251 and ending processing 1256 in the basic control flow chart described above are the same as those in the PCM control described above, a detailed description of the same is omitted.

Figure 85:
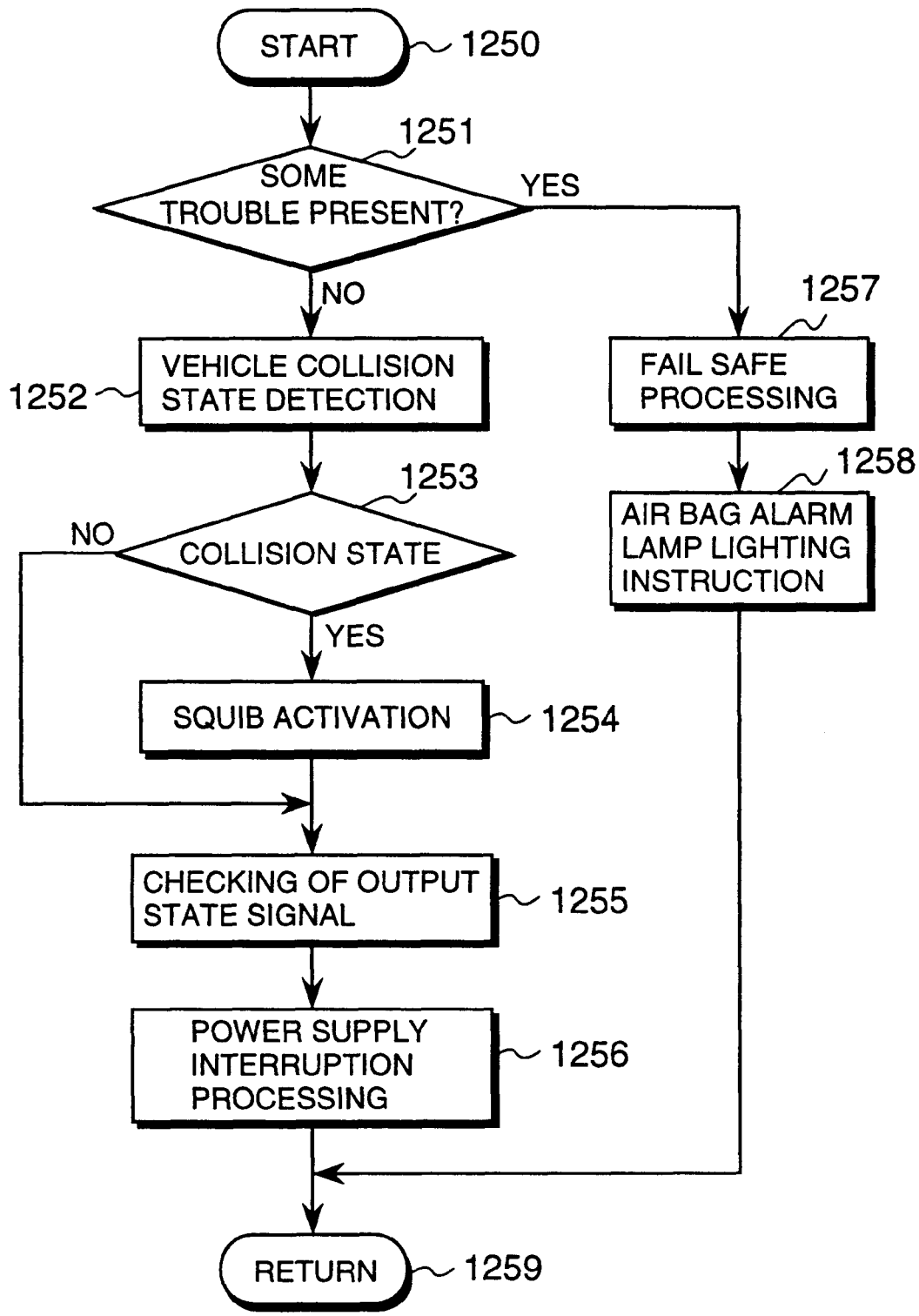
FIG. 85 is a flow chart of air bag control processing in the basic control flow chart.

FIG. 85 illustrates details of the air bag control processing 1242 in the basic control flow described above. In discrimination processing 1251, it is discriminated whether or not the SDM has some trouble. If the SDM has some trouble, then the processing advances to processing 1257, by which fail safe processing is performed. In the fail safe processing 1257, fail safe processing determined in advance is performed in response to a failure mode, and the processing advances to air bag alarm lamp lighting instruction processing 1258. By the air bag alarm lamp lighting instruction processing 1258, the trouble occurrence bit of the data to be transferred from the SDM to the BCM is set to provide an alarm lamp lighting instruction. When the SDM has no trouble, the processing advances to processing 1252. By the processing 1252, a collision state of the vehicle is calculated from an output of the G sensor. By discrimination processing 1253, it is discriminated whether or not the vehicle has collided. If it is discriminated that the vehicle has collided, then the processing advances to processing 1254, by which a squib is activated to inflate the bag. By processing 1255, the driving signal and the output state signal are monitored, and states of the load and the driving element in the output interface are supervised based on Table 3 which will be hereinafter described (in the section of the air conditioner control unit). By power supply cut-off processing 1256, failure diagnosis of the load and incidental cut-off processing are performed based on a result of the supervision described above.

Figure 86:
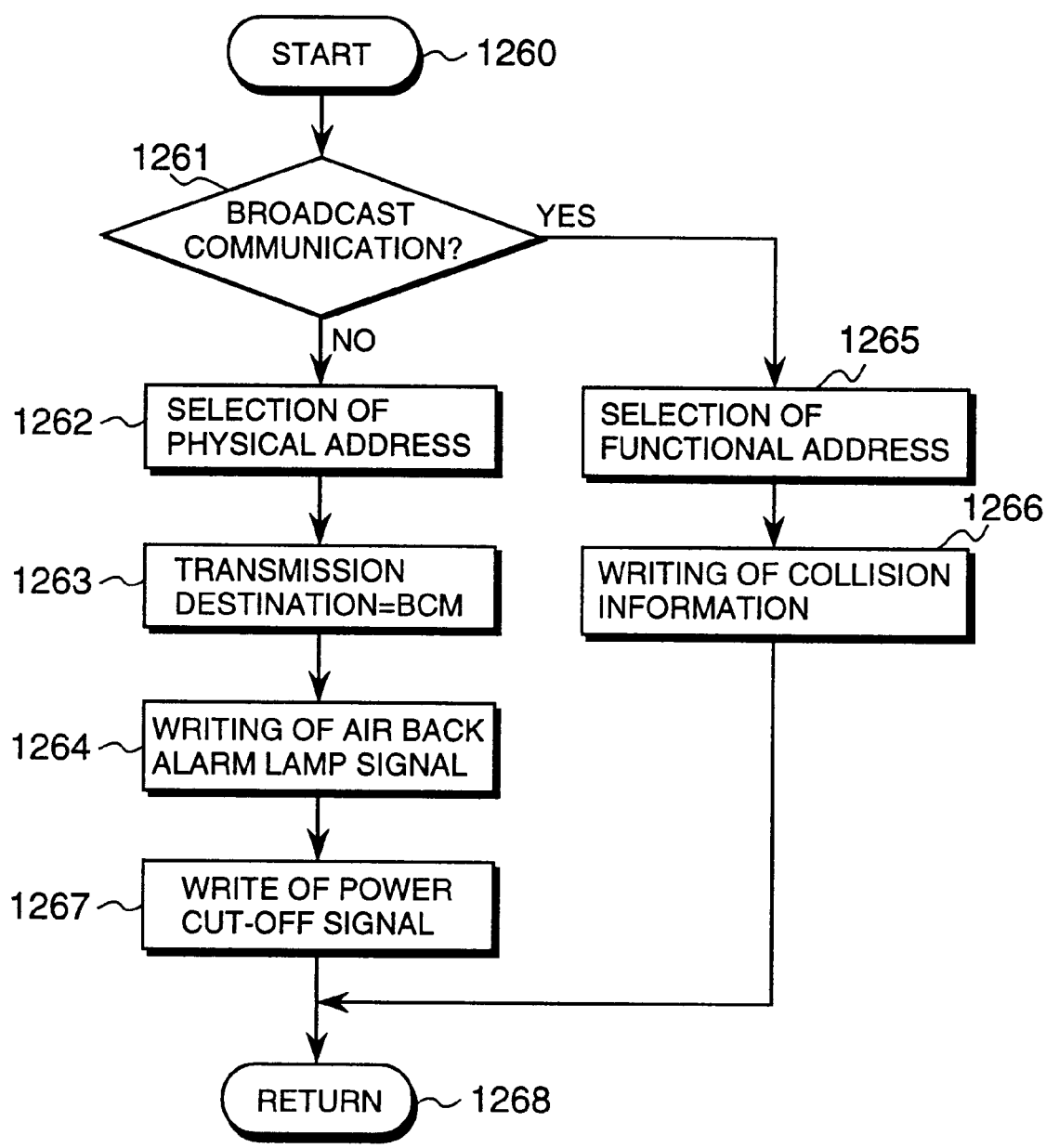
FIG. 86 is a flow chart of transmission data write processing in the basic control flow chart.

FIG. 86 illustrates details of the transmission data writing processing 1244 in the basic control flow described hereinabove. By discrimination processing 1261, a transmission data mode is selected. In the case of broadcast communication, the processing advances to processing 1265, by which a functional address is set to the transmit data. In the case of individual communication, the processing advances to processing 1262, by which a physical address is set. By the processing 1265, in order to transmit collision detection data to the individual control units simultaneously, a transmission mode of the communication IC is designated to the functional address. By processing 1266, the collision information is set to the communication IC. By processing 1263, a transmission destination address is set to the BCM. By processing 1264, setting of the air bag alarm lamp is written into the communication IC. By processing 1267, the power supply cut-off designation bit of the SDM itself is set and written into the communication IC. After the data is written in, the communication IC effects data transmission processing to the designated transmission destination.

Figure 87:
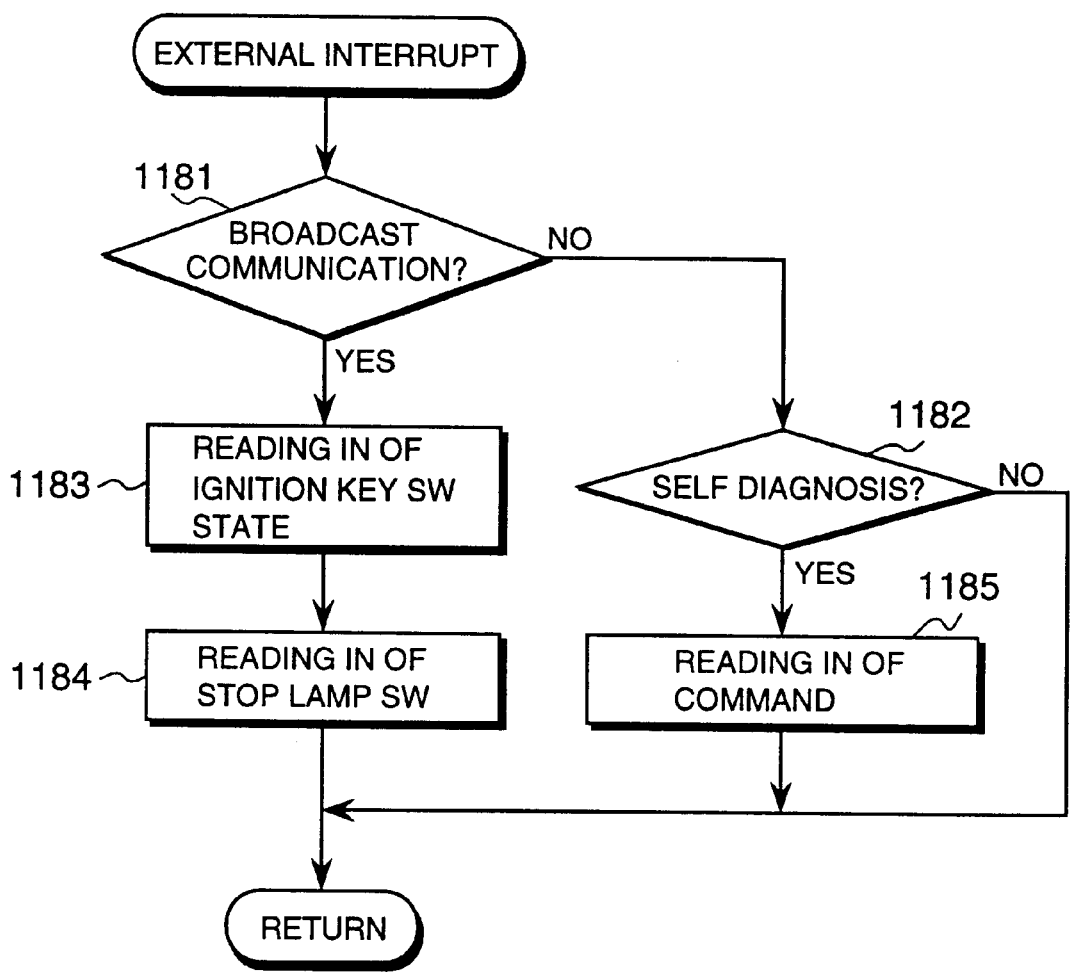
FIG. 87 is a flow chart of multiplexed communication data receive processing.

FIG. 87 illustrates a multiplex communication data receive processing flow. Upon reception of data of the communication IC, external interrupt occurs with the CPU, and the present processing is started by the interrupt. By discrimination processing 1181, it is discriminated whether or not the receive data is broadcast communication data. If the receive data is obtained by broadcast communication, then the processing advances to processing 1183, by which ignition key switch position information is read in. Then, by processing 1184, a stop lamp switch state is read in. If the receive data is not obtained by broadcast communication, then the processing advances to discrimination processing 1182. When the transmission destination is the self diagnosis apparatus, a diagnoses processing command is read in by processing 1185, and corresponding self diagnostic processes are performed in the self diagnostic processes in the main routine.

Figure 88:
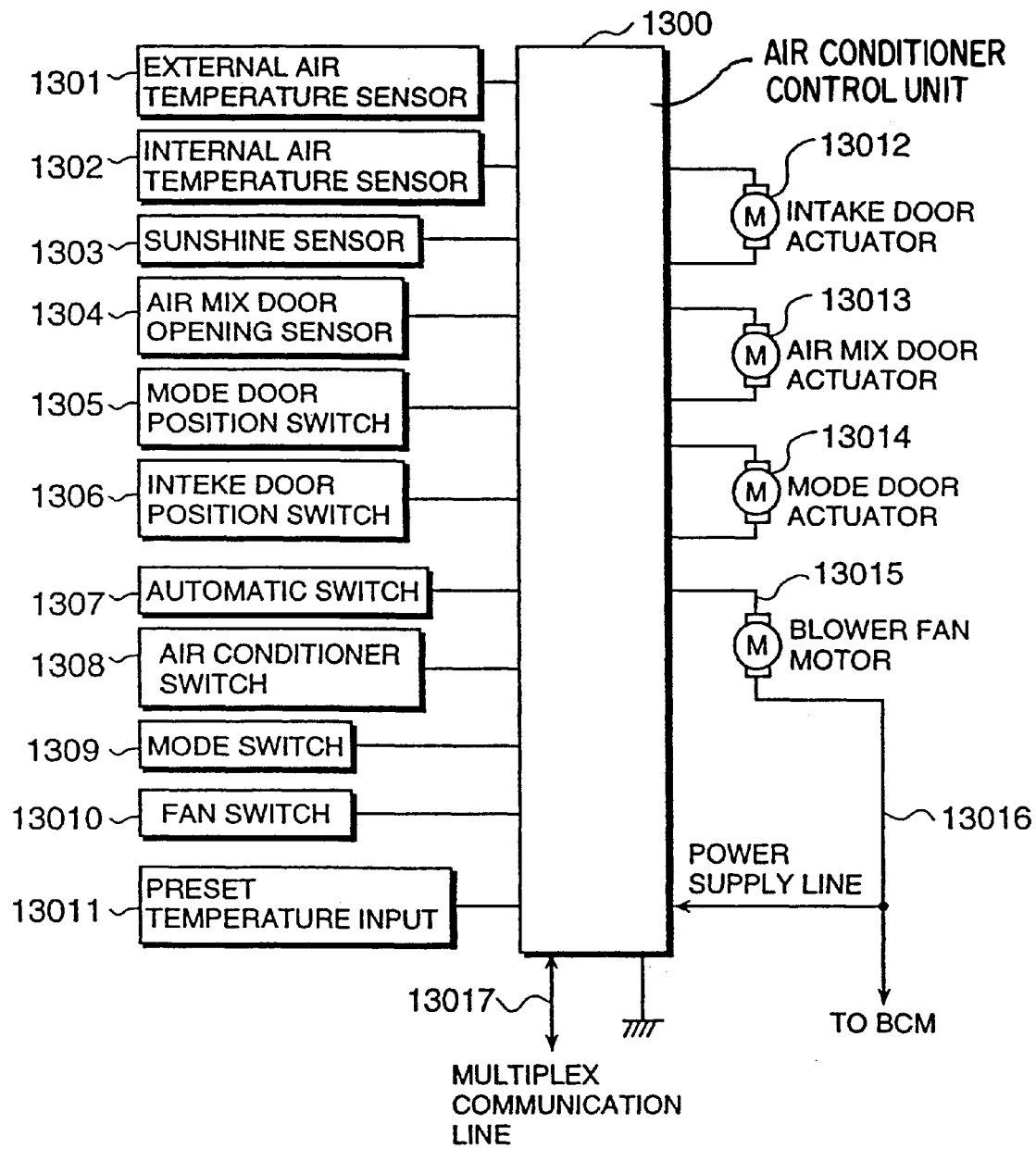
FIG. 88 is a diagram showing a system configuration of an A/C control unit.

FIG. 88 is a system diagram showing a construction of the air conditioner control unit for a vehicle to which the power supply network of the present invention is applied. A control unit 1300 receives various sensor signals necessary for control of the air conditioner and outputs driving signals for various actuators in accordance with a control method determined in advance. An external air temperature sensor 1301 measures the temperature outside the compartment, converts it into an electric signal and outputs the electric signal. An internal air temperature sensor 1302 measures the temperature in the inside of the compartment, converts it into an electric signal and outputs the electric signal. A sunshine sensor 1303 measures a sunshine amount, converts it into an electric signal and outputs the electric signal. An air mix door opening sensor 1304 detects an opening of an air mix door, which mixes warm air and cool air with each other, in the form of an analog value and outputs the analog value. A preset temperature input 13011 outputs a desired preset room temperature in the form of an analog value. A mode door position switch 1305 detects the position of a door which effects mode setting of an air ortlet. An intake door position switch 1306 detects the position of an intake selection door for blown off air. An automatic switch 1307 is a switch for setting the operation mode of the air condition to automatic or manual. An air conditioner switch 1308 is a switch for selecting on or off of operation of the compressor. A mode switch 1309 is a switch for selecting an air outlet. A fan switch 13010 is a switch for selecting an amount of wind of the fan when the air conditioner is in a manual mode. An intake door actuator 13012 is a motor for driving an air intake selection flap and is rotatable in both of the forward and reverse directions. An air mix door actuator 13013 is a motor for driving the air mix door and is rotatable in both of the forward and reverse directions. A mode door actuator 13014 is a motor for driving a mode door and is rotatable in both of the forward and reverse directions. A blower fan motor 13015 is a motor for controlling the amount of wind to be blown out. A power supply line 13016 is part of the power supply network of the present invention and supplies power from the FIM 1420 to the air conditioner control unit itself and supplies power to the loads 13012 to 13015 mentioned above. A multiplex communication line 13017 is part of the power supply network similarly and is provided to effect communication with another control unit such as the BCM 1221.

Figure 89:
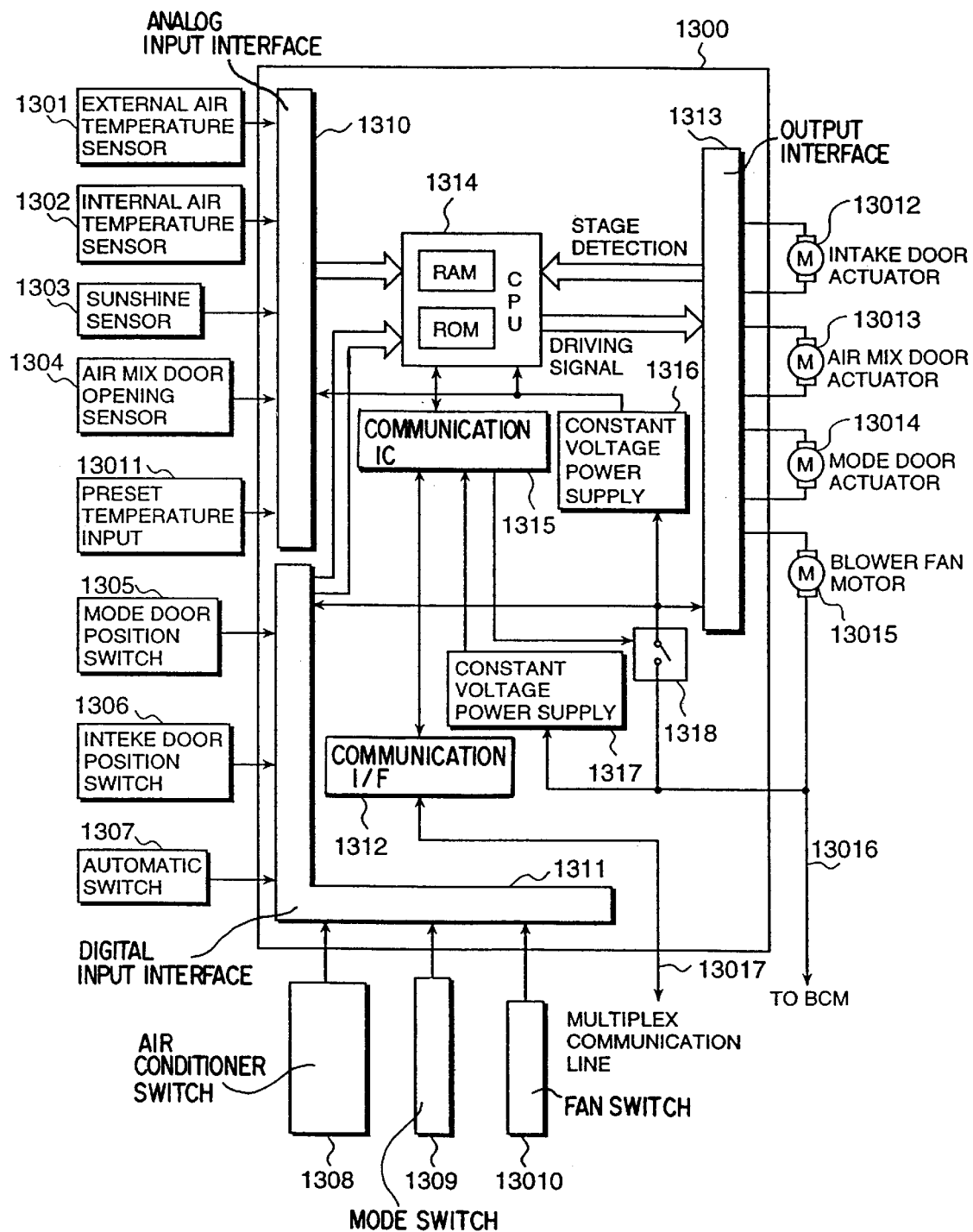
FIG. 89 is a detailed diagram illustrating an internal configuration of the A/C control unit.

FIG. 89 shows a detailed diagram of an internal construction of the air conditioner control unit 1300. The sensors 1301, 1302, 1303, 1304 and 13011 mentioned above provide analog input signals, and the analog input signals are inputted to an analog input interface 1310, by which they are converted so that they have a signal level (for example, 5 V of the full scale) with which they can be processed readily by a CPU (Central Processing Unit) 1314. The output signals of the switches 1305 to 13010 mentioned above are digital signals, and the digital signals are converted by a digital input interface 1311 so that they have a signal level (for example, 5 V of the full level) with which they can be processed readily by the CPU 1314. The CPU 1314 converts the analog signals mentioned above into digital signals by means of A/C converters and fetches the digital signals into the inside of the CPU. Similarly, the CPU 1314 fetches the digital signals mentioned above into the inside of the CPU from the digital input port via the digital input interface. Three powers are supplied from the FIM including power to be supplied to the upstream side of each load, power to be supplied to a constant voltage power supply 1317 for a communication IC 1315 in the air conditioner control unit, and power to be supplied to another constant voltage power supply 1316, the digital input interface 1311 and an output interface 1313 via a power supply cut-off switch 1318. The constant voltage power supply 1317 is a constant voltage power supply generation circuit for exclusive use for the communication IC and is normally energized unless power supply from the FIM is cut-off. The present circuit can be formed readily from a three-terminal regulator and so forth. The constant voltage power supply 1316 supplies power to the CPU 1314 and the analog input interface 1310. The power supply cut-off switch 1318 is controlled directly by the communication IC and is provided in order to cut-off power supply when trouble occurs with the motor loads (intake door actuator 13012, air mix door actuator 13013 and mode door actuator 13014). The communication IC 1315 is connected to the multiplex communication line 13017 via a communication IC interface 1312. Further, the communication IC 1315 is connected to the CPU 1314 and effects transmission and reception of data necessary for the power supply network via the multiplex communication line 13017. Since functions of the communication IC 1315 and the construction of the communication IC interface 1312 are similar to those described hereinabove, detailed description of them is omitted here. The CPU 1314 includes a ROM (Read Only memory) and a RAM (Random Access Memory) provided therein, and control software for the air conditioner control unit and initial constants are stored in the ROM.

Figure 90:
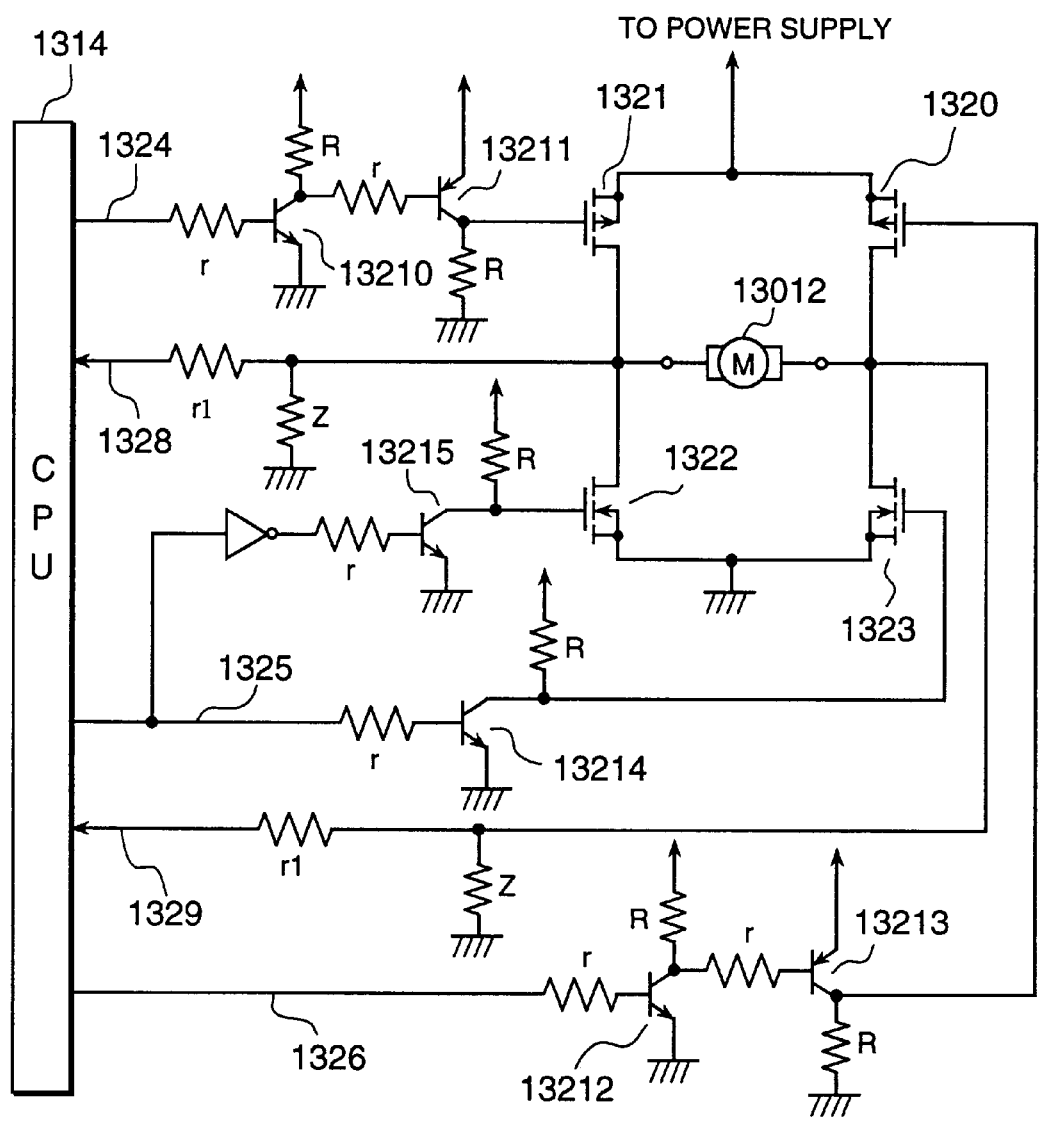
FIG. 90 is a drawing showing a detailed configuration of an output interface.

FIG. 90 shows a detailed construction of the output interface 1313. The load 13012 is connected in an H bridge formed from two sets of N-channel FETs (low side drivers) 1322 and 1323 and P-channel FETs (high side drivers) 1320 and 1321. Driving signals 1324, 1325 and 1326 controlled by the CPU 1314 are converted in level by resisters R and r and transistors 13210, 13211, 13212, 13213, 13214 and 13215 and drive the gates of the individual FETs. State detection signals 1328 and 1329 monitor voltages at the opposite terminals of the load 13012. The state detection signal exhibits, based on the state of the load driving signal, such values as indicated in the following table (in the table, VB is the battery voltage, VDSH is the voltage between the drain and the source of the P-channel FETs, VDSL is the voltage between the drain and the source of the N-channel FETs, RL is the dc resistance of the load, and Z is the level fixing resistance value for the state detection signal).

TABLE 13

|  | Not driven (stopped) Upstream/downstream side of load | | Driven (rotated) Upstream/downstream side of load | |
| --- | --- | --- | --- | --- |
| Normal | 0 | /0 | VB-VDSH/VDSL | |
| Load opened | 0 | /0 | VB-VDSH/0 | |
| Load short-circuited | 0 | /0 | Egual in voltage between upstream and downstream | |
| Battery short-circuit on upstream of load | VB/ | /VB*Z/(RL + Z) | VB | /VDSL |
| Battery short-circuit on downstream of load | VB*Z/ | (RL + Z)/VB | VB-VDSH/VB | |
| Load grounded on upstream of load | 0 | /0 | 0 | /0 |
| Load grounded on downstream of load | 0 | /0 | VB-VDSH/0 | |

From the present table, a failure state can be detected based on a combination of state detection signals corresponding to load driving states.

Since the digital input interface is same as that described hereinabove with reference to FIG. 65, description is given with reference to FIG. 65. When a switch 1336 is off, a voltage is clipped by a Zener diode 1337, and an input signal 1338 exhibits a high level. When the switch 1336 is on, the input signal 1338 exhibits a low level. A capacitor C in FIG. 65 is provided in order to remove noise. Those input signals are fetched by the CPU 1314.

Figure 91:
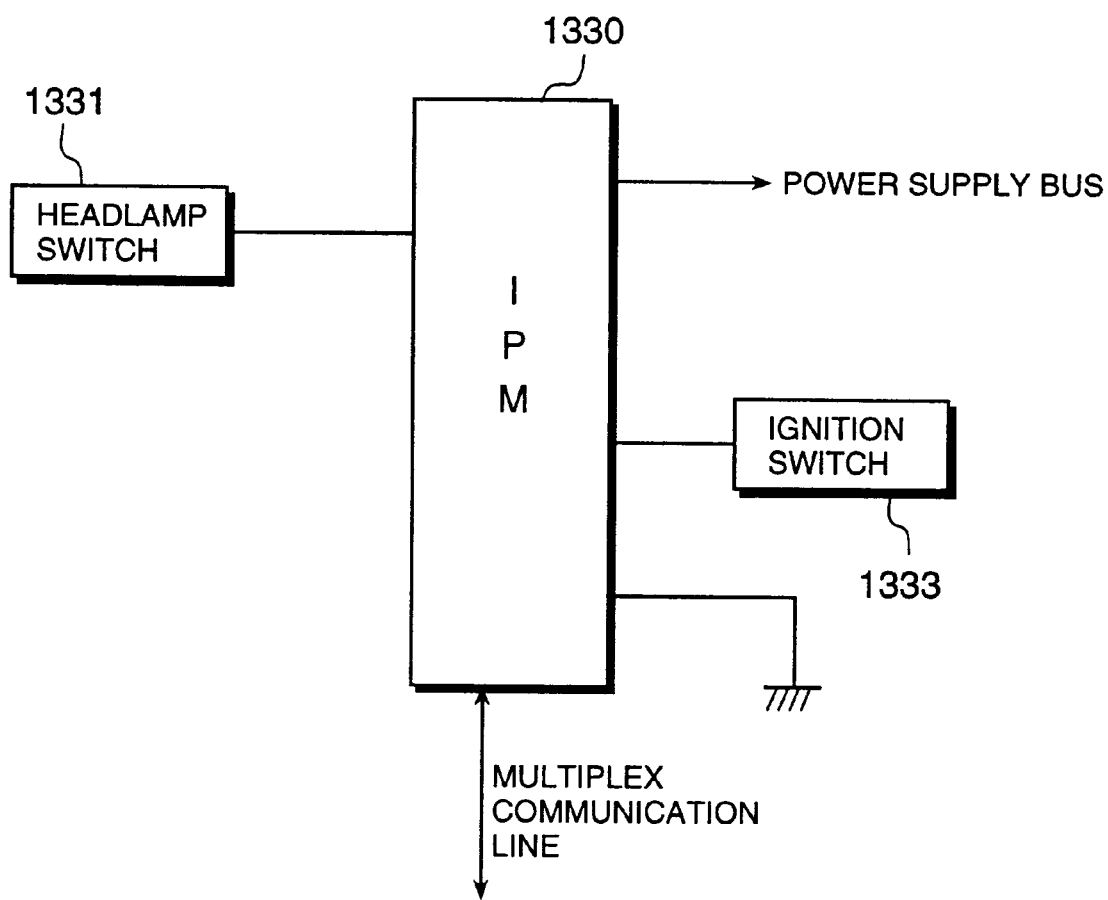
FIG. 91 is a drawing showing a load connection state of an IPM.

FIG. 91 illustrates a distribution situation of loads to an IPM 1330 described above relating to the air conditioner control unit. Since the IPM is provided to control elements relating to the instrument panel, switches and alarm lamps around a driver are disposed for the IPM. A headlamp switch 1331 and an ignition switch 1333 provide input signals relating to the air conditioner control unit. In order to light the illumination for the air conditioner panel when the headlamp are turned on, the state of the headlamp switch is transferred from the IPM to the air conditioner control unit via the BCM.

Figure 92:
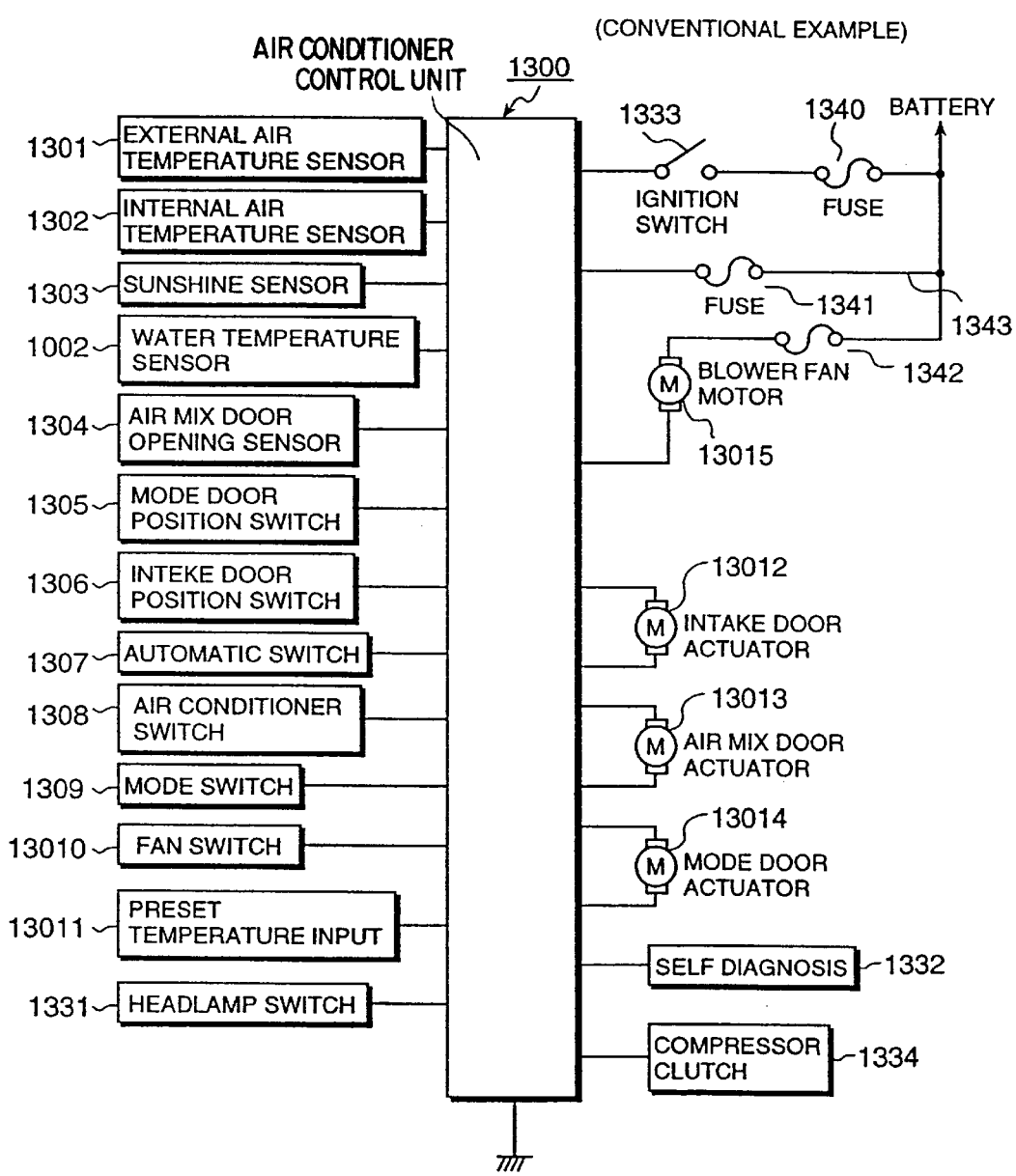
FIG. 92 is a diagram showing a system configuration of a conventional A/C control unit.

FIG. 92 shows a conventional example of a system construction of an air conditioner control unit and illustrates wiring line reduction effects by the present invention. Since an ignition switch signal is fetched by the BCM and transmitted by multiplex communication, wiring lines relating to the ignition switch 1333 can be reduced. Since the air conditioner control unit receives supply of power from the BCM and an over-current state of the air conditioner control unit is supervised by the BCM, fuses 1340 to 1342 on the upstream can be reduced. Simultaneously, the necessity for laying power supply lines from the battery to the air conditioner control unit via the fuse box in the compartment is eliminated, and wiring lines can be reduced as much. A power supply line 1343 for backing up the battery can be eliminated by transferring, when power supply to the air conditioner control unit is cut-off, data necessary for the backing up to the BCM by multiplex communication as hereinafter described. Since a coolant temperature sensor 1002 and a compressor clutch 1344 serve as input and output apparatus of the PCM, the air control unit is controllable by multiplex communication via the PCM, and reduction of wiring lines can be achieved. Since a signal is transferred by multiplex communication via the IPM as described hereinabove, the necessity for laying wiring lines individually to the headlamp switch 1331 is eliminated and wiring lines can be reduced. Also self diagnosis 1353 is executed by multiplex communication, wiring lines for the same can be reduced similarly.

Figure 93:
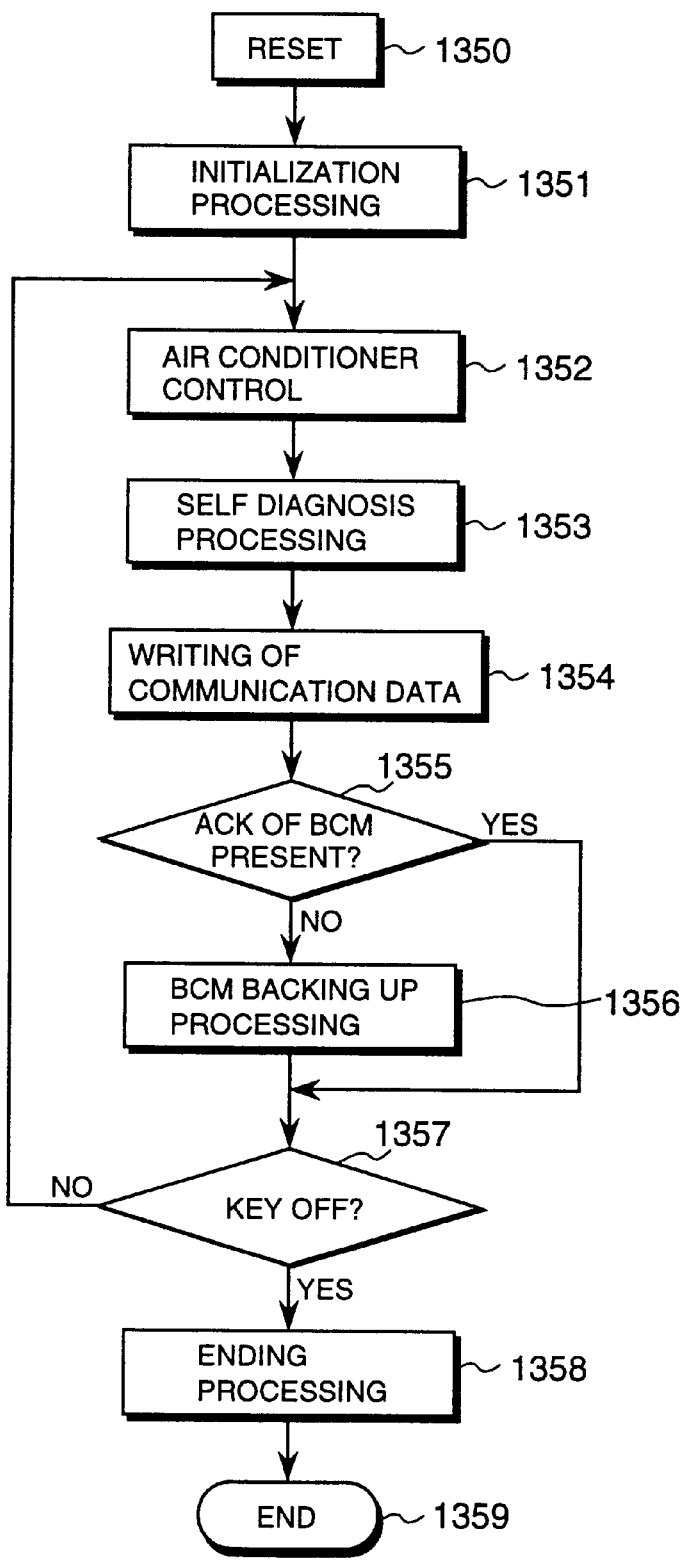
FIG. 93 is a basic control flow chart of the A/C control unit of the present embodiment.

FIG. 93 illustrates a basic control flow of the air conditioner control unit of the present invention. After power supply is made available by the BCM, processing is started from a reset state 1350. After the resetting, the processing advances to initialization processing 1351, by which initialization of the entire system is performed. Then, the processing advances to air conditioner control processing 1352, by which control of the doors and the motors is performed based on input information of various sensors. Thereafter, the processing advances to self diagnostic processes 1353, by which self diagnosis of the sensors and actuators in the system is performed. Then, the processing advances to transmit data writing processing 1354, by which data to be transmitted from the air conditioner control unit to another control unit is written into the communication IC. In the present embodiment, since the air conditioner control unit serves as a back up control unit when the BCM fails, it is discriminated by discrimination processing 1355 whether or not an ACK (acknowledge signal) of the BCM has been sent back thereto. When no ACK signal of the BCM has been received, since it is discriminated that the BCM fails, the processing advances to processing 1356, by which BCM back up processing is performed. In the BCM back up processing of the processing 1356, states of input apparatus connected to the BCM are fixed to predetermined values, and control of such control units as the FIM and the RIM which are controlled by the BCM is performed by the air conditioner control unit in substitution. It is to be noted that, in the present embodiment, since processing in substitution when the BCM fails is performed only by the air conditioner control unit, the apparatus which performs such processing is not limited to this, and naturally it is otherwise possible that some other control unit or units having a CPU perform such processing in substitution exclusively or cooperatively. By discrimination processing 1357, it is discriminated whether or not the ignition key switch is in an off state, and if the ignition key switch is in an off state, then the processing advances to ending processing 1358, but if the ignition key switch is in an on state, the processing advances to the air conditioner control processing 1352. By the ending processing 1358, transfer processing of the backup data is performed. After the data transfer is completed, the processing advances to an end state 1359 to make preparations for cut-off of power supply by the BCM.

Figure 94:
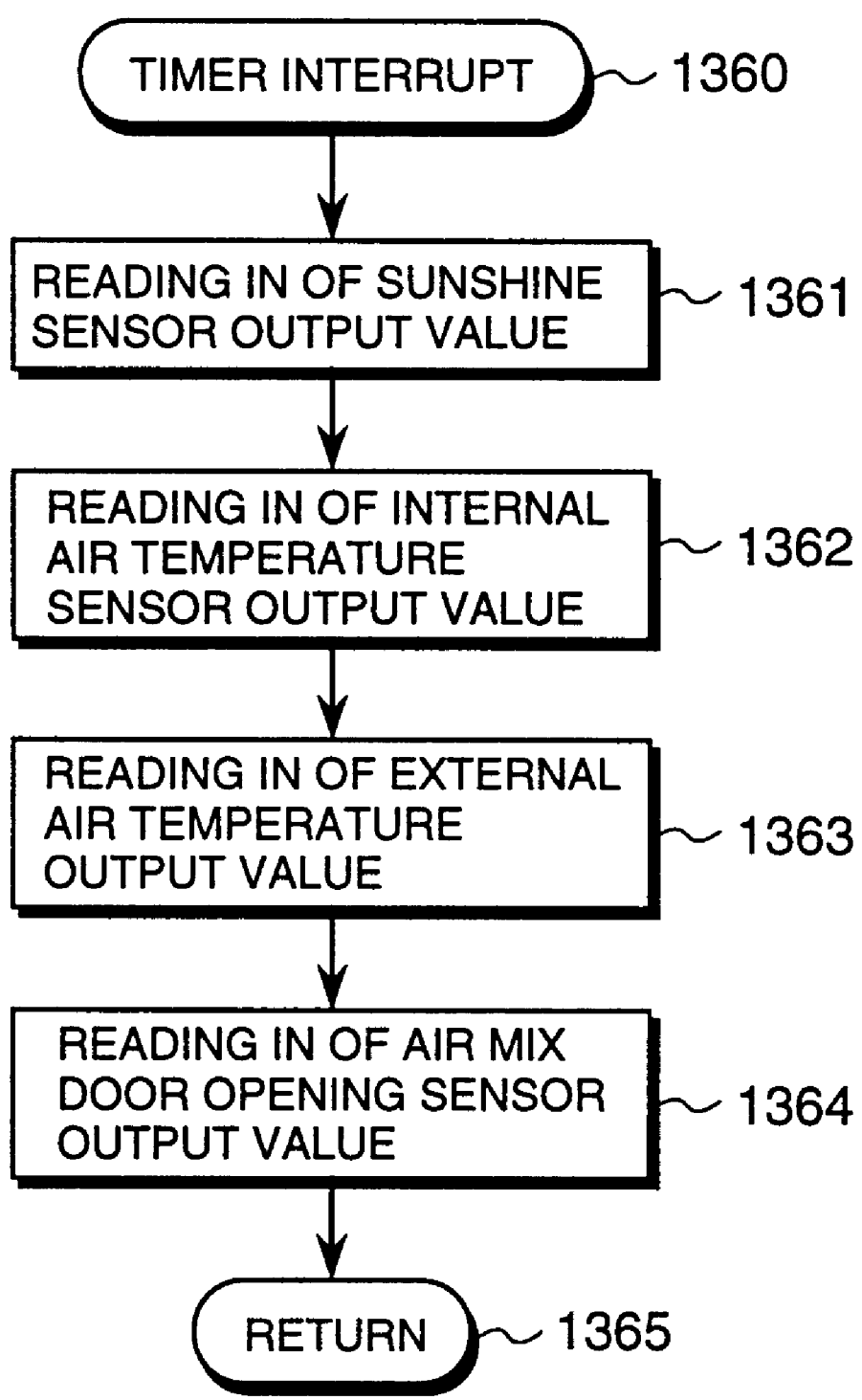
FIG. 94 is a flow chart of analog signal input processing.

FIG. 94 illustrates an analog signal input processing flow. The present processing is started by timer interrupt, and sunshine sensor output value reading processing 1161, internal air temperature sensor output value reading processing 1162, external air temperature output value reading processing 1163 and air mix door opening sensor output value reading processing 1164 are performed in order, whereafter the processing returns from the interrupt processing.

Figure 95:
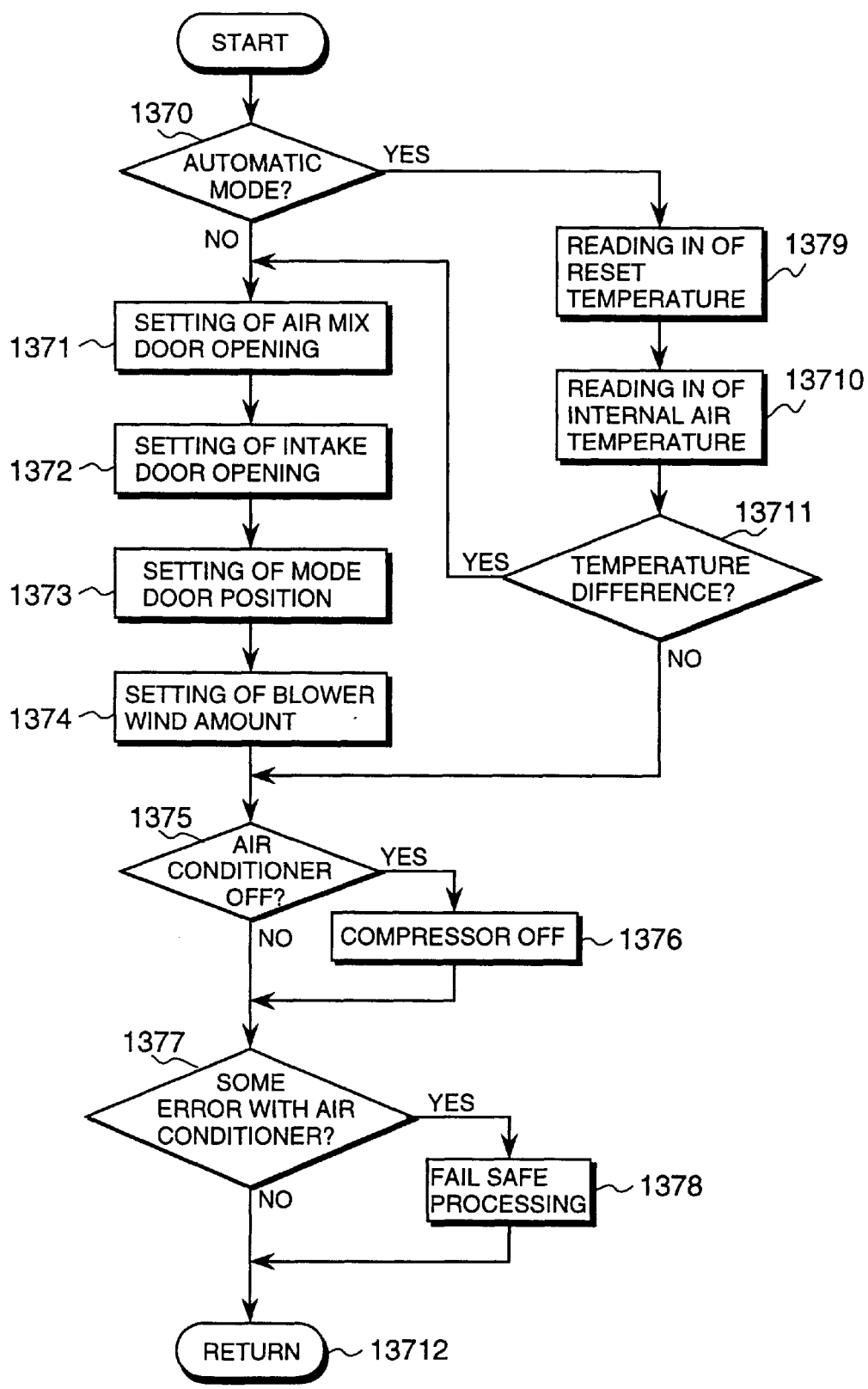
FIG. 95 is a flow chart of A/C control processing in the basic control flow.

FIG. 95 illustrates details of the air conditioner control processing 1352 in the basic control flow described above. By discrimination processing 1370, it is discriminated whether or not the air conditioner is in an automatic mode. If the air conditioner is in the automatic mode, then the processing advances to processing 1379, but if the air conditioner is in a manual mode, then the processing advances to the processing 1371. By the processing 1379, a desired preset temperature is read in. By processing 13710, a current internal air temperature is read in. By discrimination processing 13711, it is discriminated whether or not there is some temperature difference between the preset temperature and the current internal temperature. When some temperature difference is detected, the processing advances to processing 1371, by which temperature adjustment is performed. When no temperature difference is detected, the processing advances to processing 1375. By the processing 1371, an opening of the air mix door is set in accordance with a logic determined in advance. Similarly, by processing 1372, the position of the intake door is set; by processing 1373, the position of the mode door is set; and by processing 1374, the amount of the blower motor is set. By the discrimination processing 1375, it is discriminated whether or not the air conditioner switch is in an off state, and if the air conditioner switch is in an off state, then the processing advances to processing 1376, by which a compressor off signal is set. By processing 1377, it is discriminated whether or not the air conditioner system has some error, and when the air conditioner system has some error, fail safe processing is performed by processing 1378.

Figure 96:
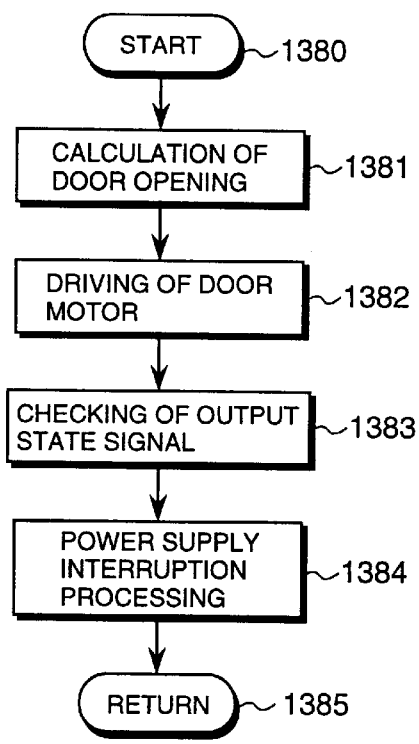
FIG. 96 is a flow chart of door opening setting processing of the A/C control processing.

FIG. 96 illustrates details of the door opening setting processing mentioned hereinabove. By processing 1381, a door opening is calculated based on a predetermined logic. By processing 1382, the door motor is driven based on the calculated opening. By processing 1383, the driving signal of the door motor and the output state signal are monitored, and states of the load and the driving element in the output interface are supervised based on Table 3 given hereinabove. By power supply cut-off processing 1384, failure diagnosis of the element and incidental cut-off processing are performed based on a result of the supervision described above.

Figure 97:
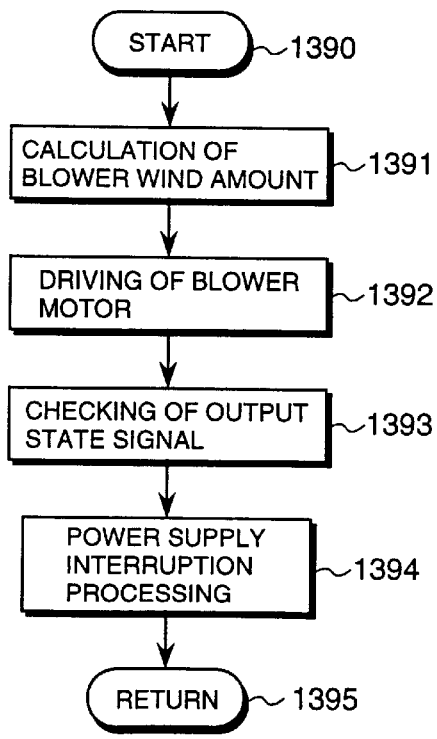
FIG. 97 is a flow chart of blower fan capacity setting processing of the A/C control processing.

FIG. 97 illustrates details of the blower fan wind amount setting processing described above. By processing 1391, a blower wind amount is calculated based on logic determined in advance. By processing 1392, the blower motor is driven based on the calculated wind amount. By processing 1393, the driving signal of the blower motor and the output state signal are monitored, and states of the load and the driving element in the output interface are supervised based on Table 1 (same as that for the PCM control) given hereinabove. By power supply cut-off processing 1394, failure diagnosis of the element and incidental interruption processing are performed based on a result of the supervision described above. The present processing is basically same as the load driving processing of the PCM.

Figure 98:
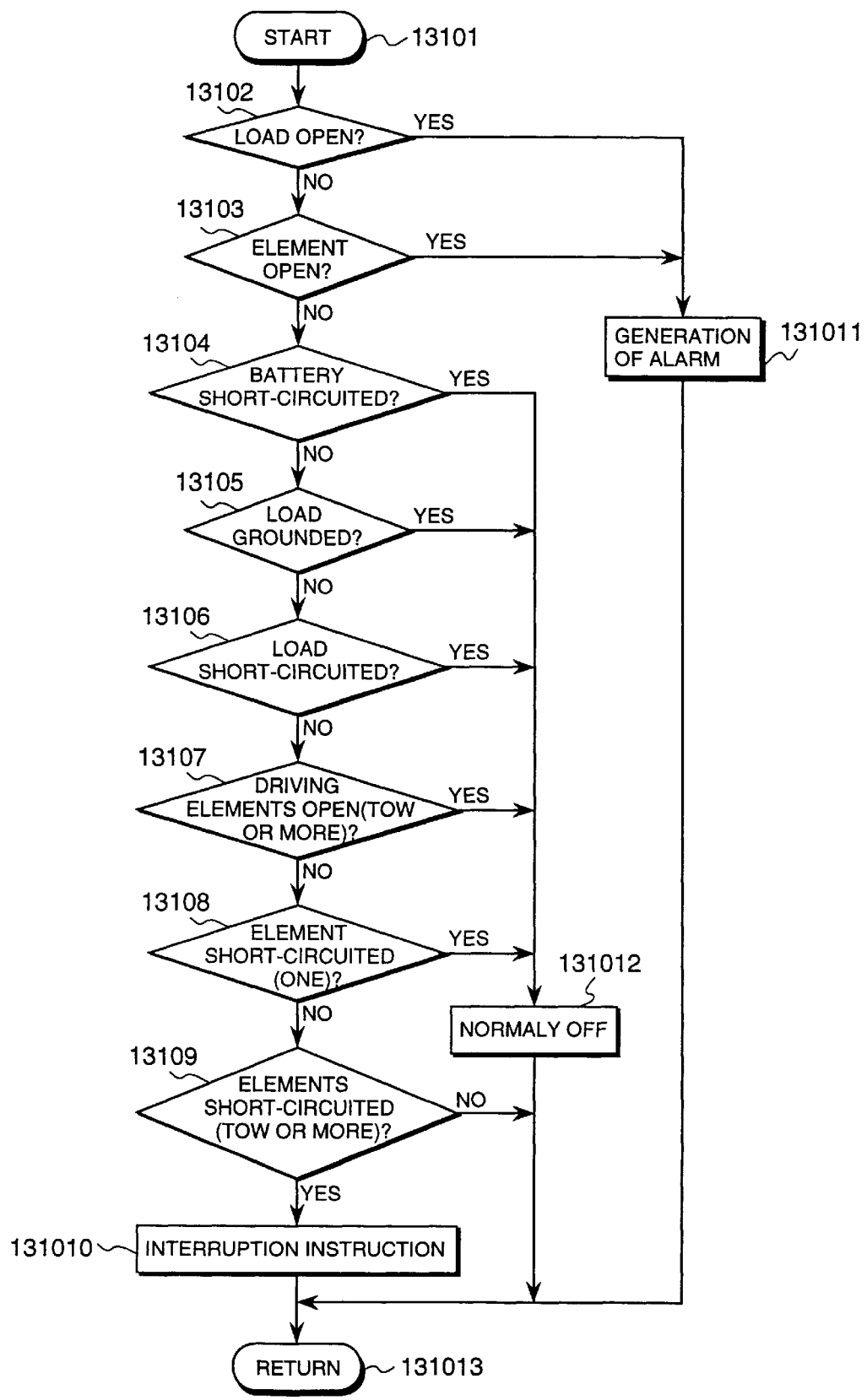
FIG. 98 is a control flow chart of power supply cut-off processing of the A/C control processing.

FIG. 98 illustrates details of the power supply cut-off processing 1384 described hereinabove.

If it is discriminated by load open discrimination processing 13102 or one driving element open failure (same as normal load cut-off state) discrimination processing 13103 that the load is open or one driving element is in an open state, since this is a condition wherein the load cannot be driven, an alarm is generated by processing 131011. If it is discriminated by discrimination processing 13104 that the load state is a battery short-circuit state, by discrimination processing 13105 that the load state is a grounded state, by discrimination processing 13106 that the load state is a short-circuited state, by discrimination processing 13107 that two or more driving elements are in an open failure or by discrimination processing 13108 that one driving element is in a short-circuited failure, since this is a state wherein a voltage continues to be normally applied to the driving element in the output stage, normal cut-off (off) of the load is selected by processing 131012. When it is discriminated by two or more driving element short-circuit failure discrimination processing 13109 that two or more driving elements are in a short-circuit failure, since the load is in a normally energized state and load control from the air conditioner control unit side is impossible, a cut-off instruction is generated by processing 131010 to request the cut-off of power supply to the air conditioner control unit at the BCM on the upstream of the air conditioner control unit.

Figure 99:
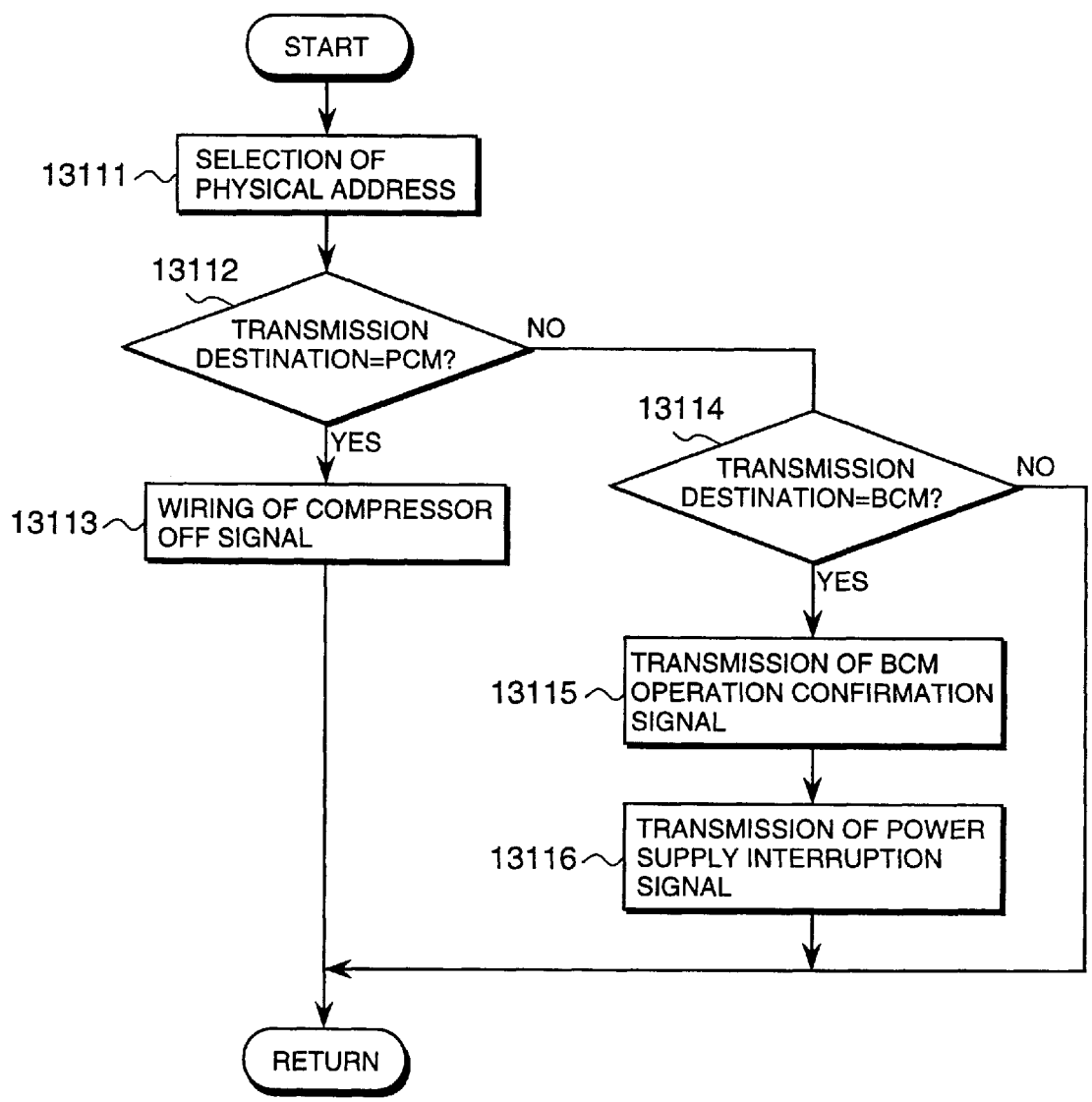
FIG. 99 is a flow chart of transmission data write processing in the basic control flow chart.

FIG. 99 illustrates details of the transmit data writing processing 1354 in the basic flow chart described above. By processing 13111, in order to transmit data individually to the individual control units, a transmission mode of the transmission IC is designated to a physical address. When it is discriminated by discrimination processing 13112 that the transmission destination is the PCM, the processing advances to processing 13113. By the processing 13113, the transmission destination address is set to the PCM and a compressor off signal is set, and they are written into the communication IC. When it is discriminated by discrimination processing 13114 that the transmission destination is the BCM, the processing advances to processing 13115. By the processing 13115, an operation confirmation signal for confirmation of backing up of the BCM described hereinabove is transmitted to the BCM. By processing 13116, in order to cut-off power supply upon ending, a power supply cut-off signal is transmitted to the BCM.

Figure 100:
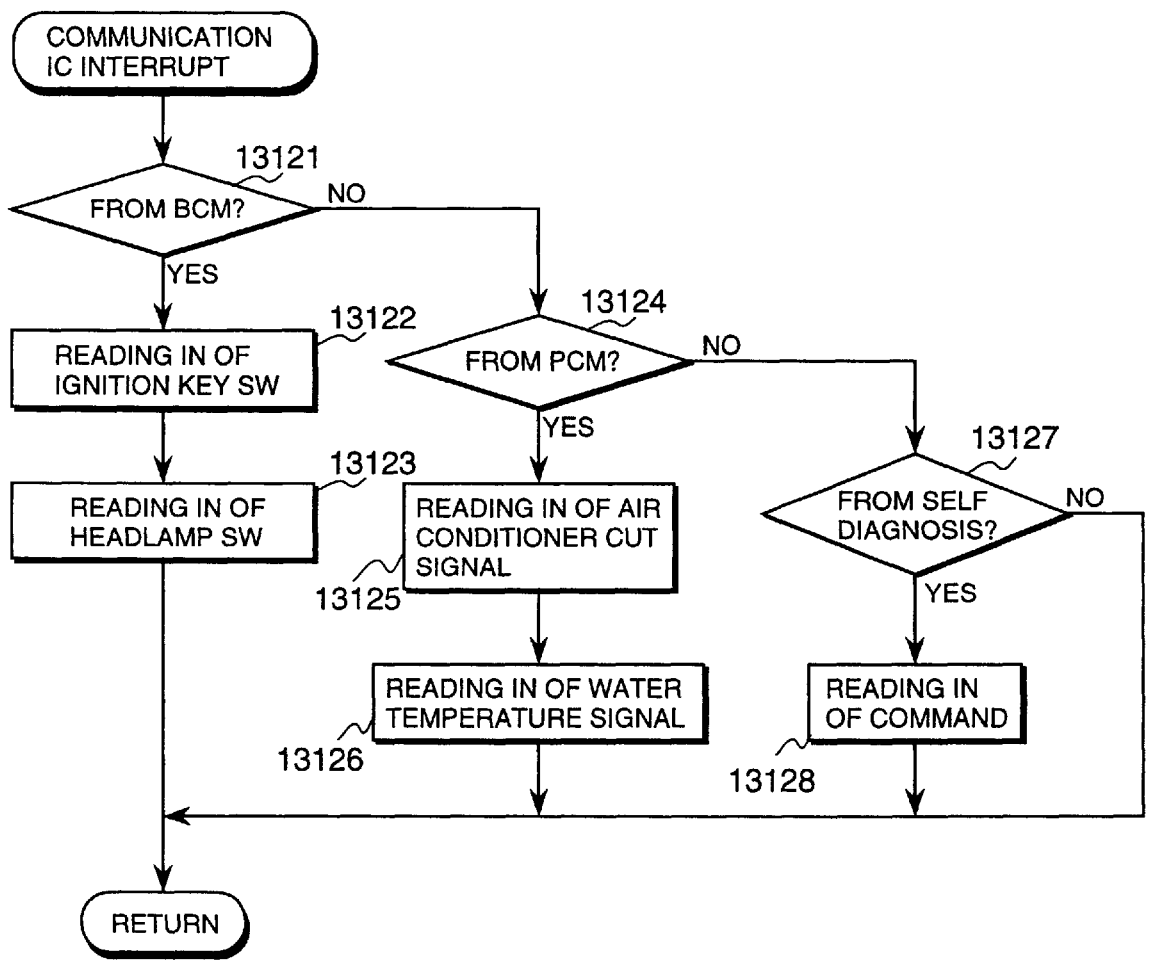
FIG. 100 is a flow chart of multiplexed data receive processing in the basic control flow chart.

FIG. 100 illustrates a multiplex communication data receive processing flow. Since the construction wherein external interrupt occurs with the CPU upon reception of data of the communication IC is adopted, the present processing is started by external interrupt in a state 1190. By discrimination processing 13121, it is discriminated whether or not the transmission destination is the BCM. If the transmission destination is the BCM, ignition key switch position information is read in by processing 13122, and headlamp switch position information is read in by processing 13123, from the communication IC. By discrimination processing 13124, it is discriminated whether or not the transmission destination is the PCM. When the transmission destination is the PCM, an air conditioner cut signal is read in by processing 13125 and a coolant temperature data signal is read in by processing 13126. By discrimination processing 13127, it is discriminated whether or not the transmission destination is the PCM. When the transmission destination is the self diagnosis apparatus, a diagnostic processes command is read in by processing 13128, and corresponding self diagnosis processing is performed in the self diagnostic processes in the main routine.

Figure 101:
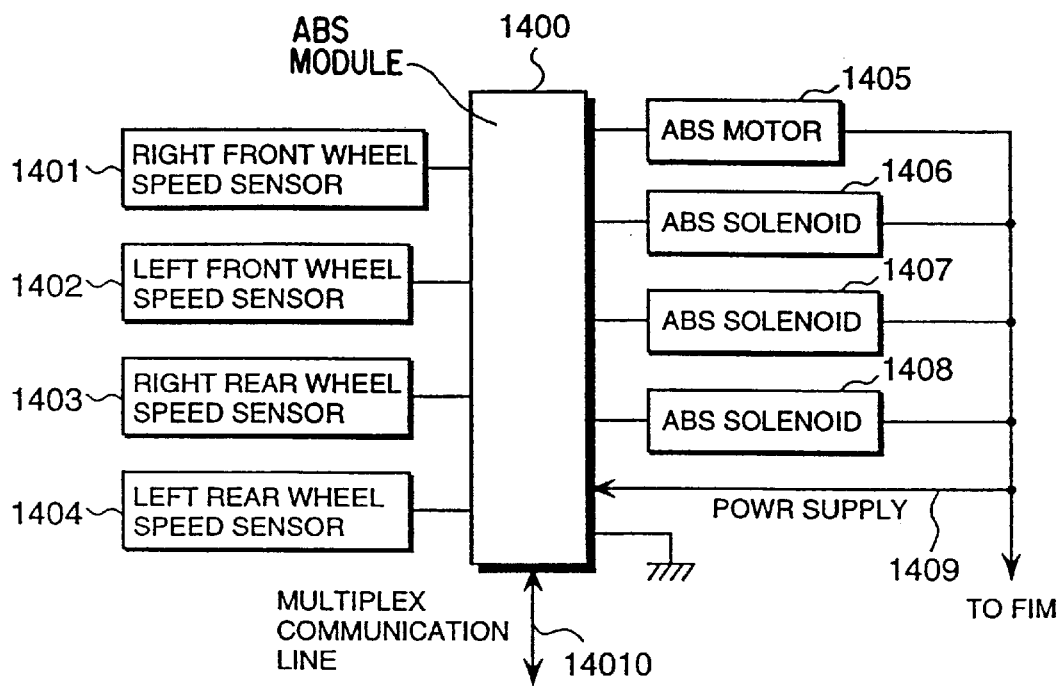
FIG. 101 is a diagram showing a system configuration of an ABS system.

FIG. 101 is a system diagram showing a construction of an Antilock Brake System (hereinafter referred to as ABS) for a vehicle to which the power supply network of the present invention is applied. A control module 1400 receives various sensor signals necessary for brake lock control upon braking and outputs driving signals for various actuators in accordance with a control method determined in advance. A right front wheel speed sensor 1401, a left front wheel speed sensor 1402, a right rear wheel speed sensor 1403 and a left rear wheel speed sensor 1404 detect speeds of rotation of the individual wheels and output them as pulse signals to the ABS module 1400. An ABS motor 1405 intensifies the pressure of brake fluid accumulated upon ABS control. ABS solenoids 1406, 1407 and 1408 control brake hydraulic pressure control valves for the right front wheel, left front wheel and rear wheels, respectively. A power supply line 1409 is part of the power supply network of the present invention and supplies power to the ABS itself and power to the loads 1405 to 1408 described above from the FIM 1420. A multiplex communication line 14010 is part of the power supply network similarly and is provided in order to allow communication with a control unit such as the BCM 1221.

Figure 102:
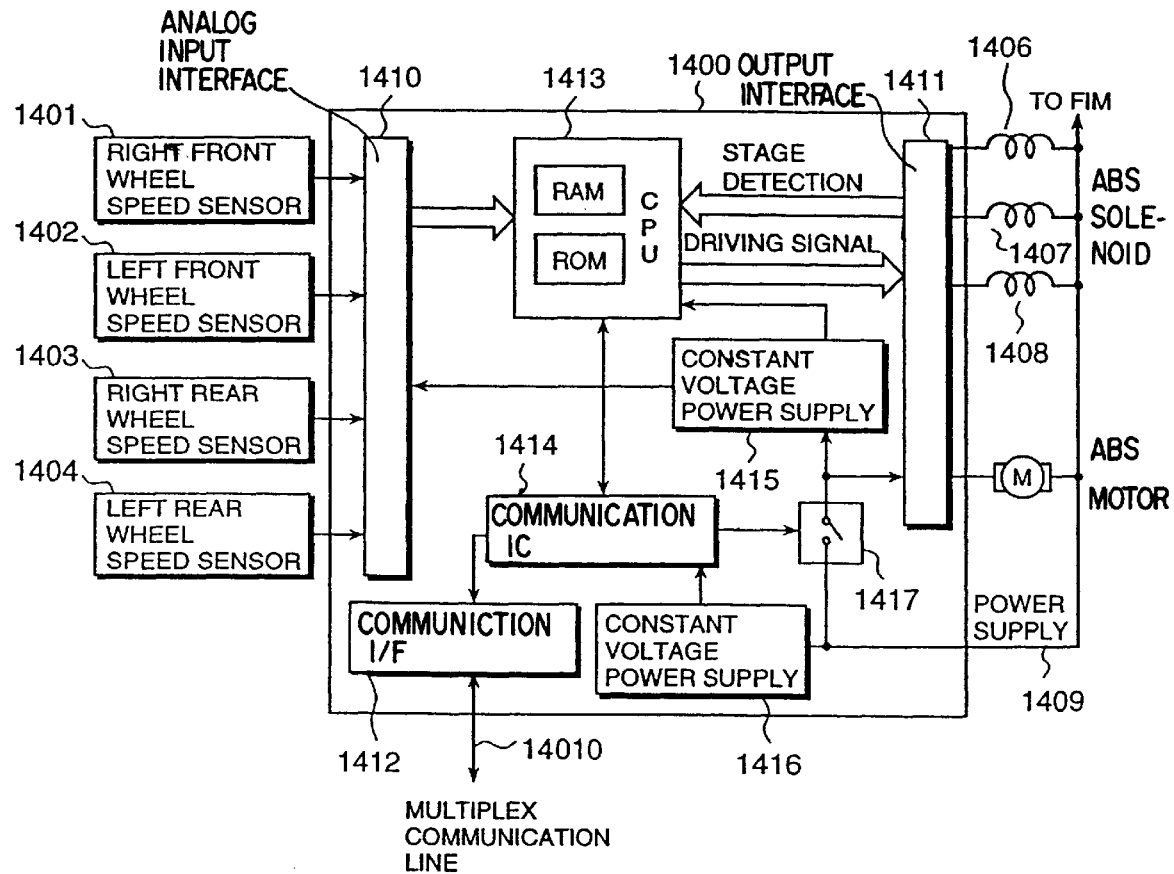
FIG. 102 is a detailed diagram showing an internal configuration of an ABS module.

FIG. 102 is a detailed diagrammatic view showing an internal construction of the ABS module 1400. The sensors

1401 to 1404 described above provide analog input signals, and the analog input signals are inputted to an analog input interface 1410, by which they are converted so that they have a signal level (for example, 5 V of the full scale) with which they can be processed readily by a CPU (Central Processing Unit). The CPU 1413 converts the analog signals mentioned above into digital signals by means of A/D converters and fetches the digital signals into the inside of the CPU. Three different powers are supplied from the FIM including power to be supplied to the upstream side of each load, power to be supplied to a constant voltage power supply 1416 for a communication IC 1414 in the ABS and power to be supplied to another constant voltage power supply 1415 and an output interface 1411 via a power supply cut-off switch 1417. The constant voltage power supply 1416 is a constant voltage power supply generation circuit for exclusive use for the communication IC and is normally energized unless power supply from the FIM is cut off. The present circuit can be formed simply from a three-terminal regulator and so forth. The constant voltage power supply 1415 supplies power to the CPU 1413 and the analog input interface 1410. The power supply cut-off switch 1417 is controlled directly by the communication IC and is provided to cut-off power supply when some trouble occurs with a grounded type load. The communication IC 1414 is connected to a multiplex communication line 14010 via a communication IC interface 1412. Further, the communication IC 1414 is connected to the CPU 1413 so that it transmits and receives data necessary for the power supply network via the multiplex communication line 14010. A detailed description of functions of the communication IC 1414 and the communication IC interface 1412 is omitted here. The CPU 1413 includes a ROM (Read Only Memory) and a RAM (Random Access Memory) provided therein, and control software for the ABS and initial constants are stored in the ROM.

In the present embodiment, as loads of the ABS, the ABS solenoids 1406, 1407 and 1408 (solenoid loads) and the ABS motor (motor load) 14 are presumed, and while signals between the output interface 1411 and the CPU 1413 include driving signals and state detection signals of the individual loads described above, since details of them are described in connection with the PCM hereinabove, a description of them is omitted here.

FIG. 103 illustrates a distribution situation of loads to the FIM 1420 described above relating to the ABS. In the present embodiment, the FIM supplies power to the ABS.

Figure 104:
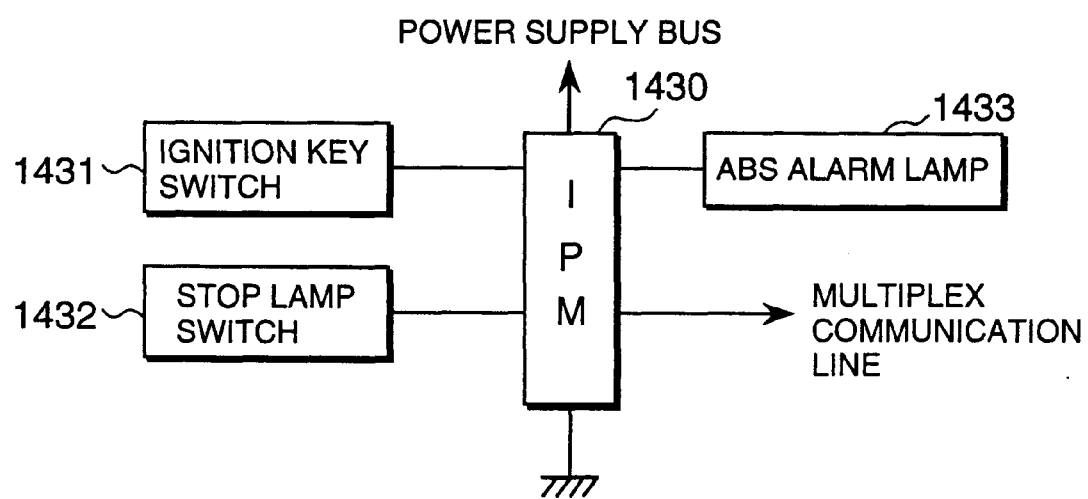
FIG. 104 is a drawing showing a load connection situation of an IPM.

FIG. 104 illustrates a distribution situation of loads to an IPM 1430 described above relating to the ABS. An ignition switch 1431 and a stop lamp switch 1432 provide input signals relating to the ABS. An ABS alarm lamp 1433 is incorporated in the meter panel, and driving data are transferred from the ABS to the IMP via the BCM.

Figure 105:
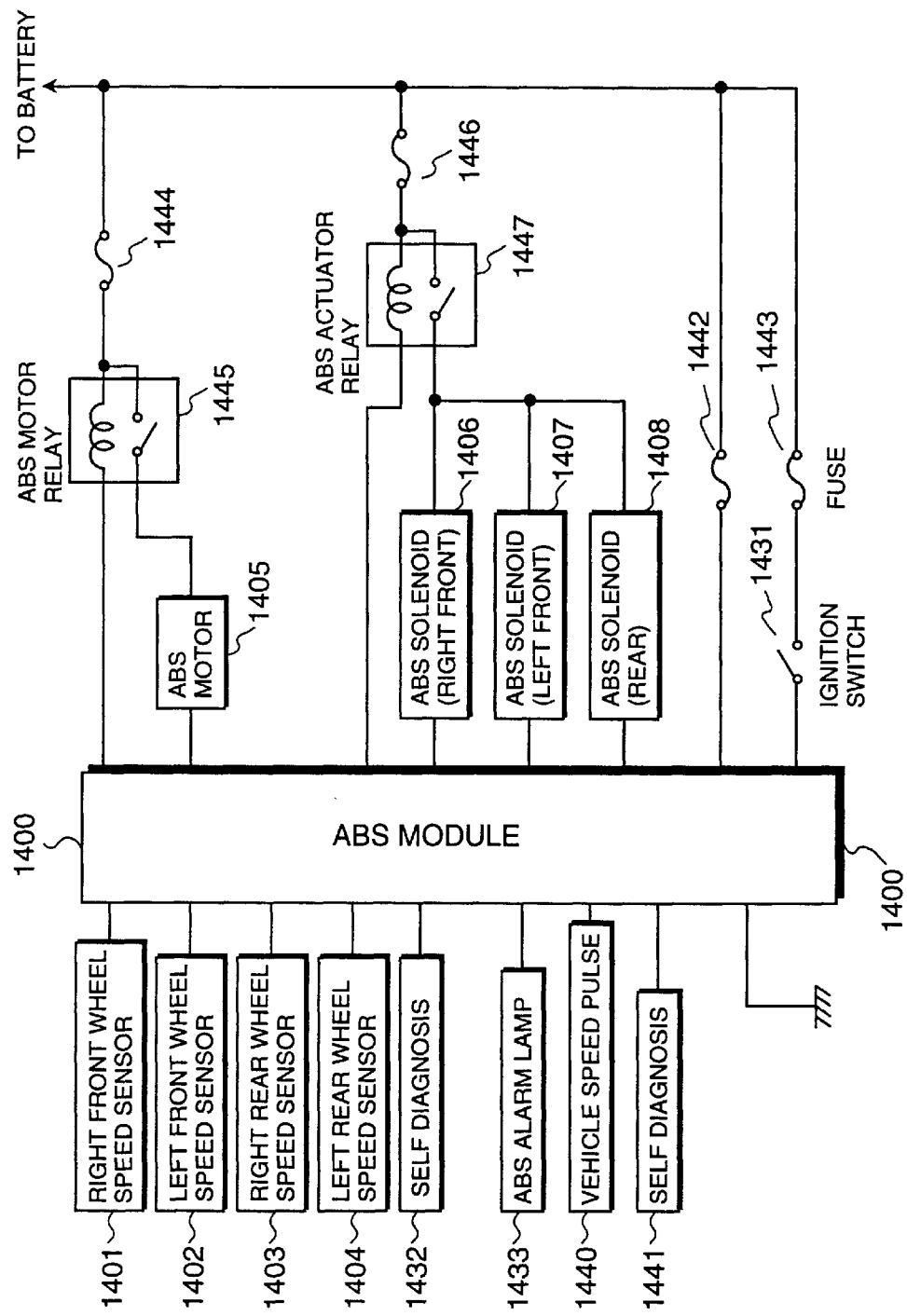
FIG. 105 is a drawing showing a conventional construction of an ABS system.

FIG. 105 shows a conventional example of an ABS system construction and illustrates wiring line reduction effects by the present invention. Since an ignition switch signal is fetched by the BCM and transmitted by multiplex communication, wiring lines relating to the ignition switch 1431 can be reduced. Since the ABS receives supply of power from the FIM and an over-current state of the ABS is supervised by the FIM, fuses 1442, 1443, 1444 and 1446 on the upstream can be reduced. Simultaneously, the necessity for laying supply lines from the battery to the ABS via the fuse box in the compartment is eliminated and wiring lines can be reduced as much. Wiring lines for backing up the battery can be eliminated by transmitting data necessary for backing up when power supply to the ABS is cut-off to the BCM by multiplex communication as hereinafter described. Since the driving element of the output interface can be used in substitution for an ABS motor relay 1445 and an ABS actuator relay 1447, they can be abandoned. Since signals are transferred by multiplex communication via the IPM as hereinafter described, the necessity for laying wiring lines individually for the ABS alarm lamp 1433 and the stop lamp switch 1432 is eliminated, and wiring lines can be reduced. While a vehicle speed pulse signal 1440 is outputted from the vehicle speed sensor mounted on the transmission, since, in the present invention, it is produced by the ABS control module and transmitted to another control unit by multiplex communication, relating wiring lines and sensors are unnecessary. Since also self diagnosis 1441 is executed by multiplex communication, wiring lines for the same can be reduced similarly.

Figure 106:
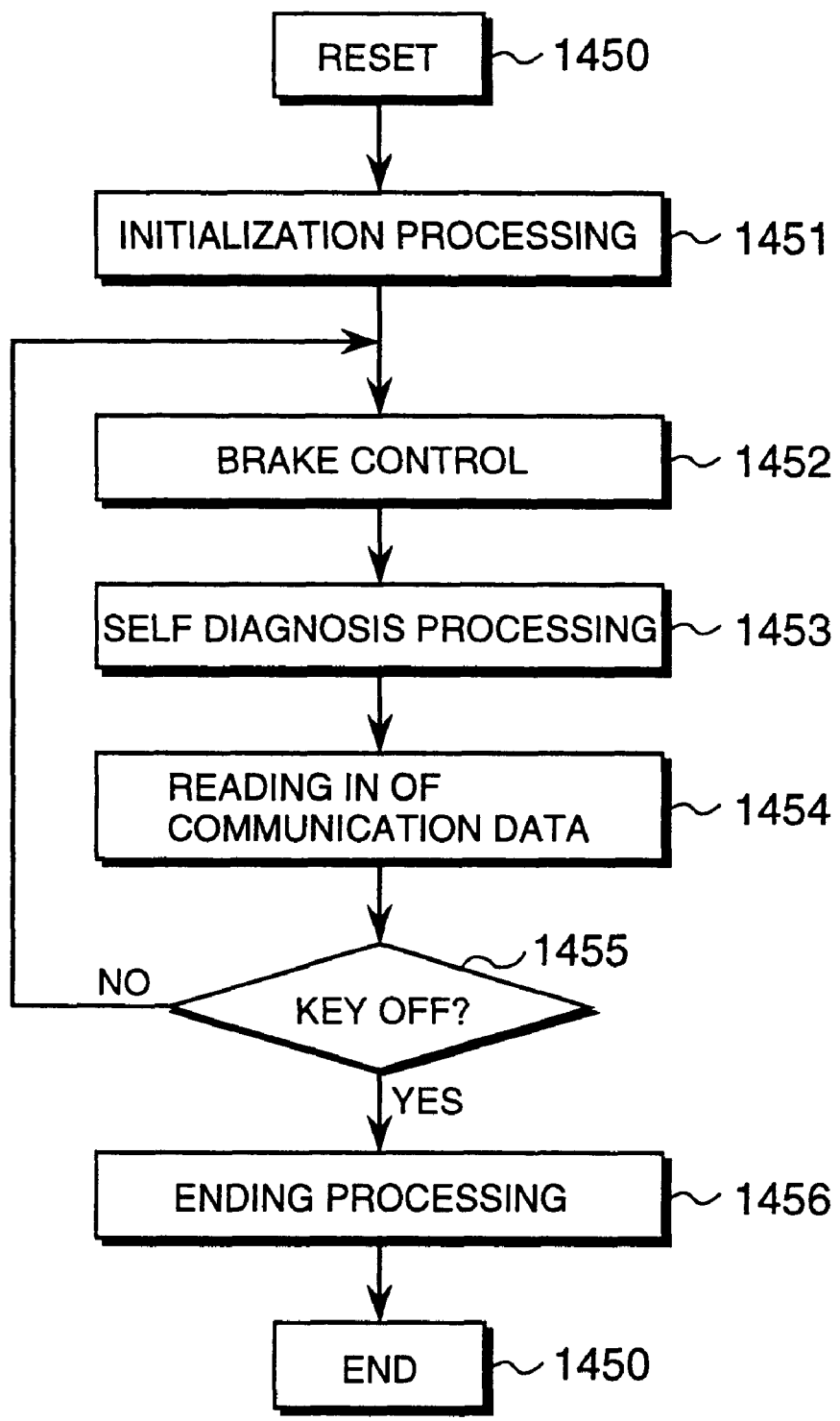
FIG. 106 is a basic control flow chart of an ABS of the present embodiment.

FIG. 106 illustrates a basic control flow of the ABS of the present invention. After power is made available by the FIM, processing is started from a reset state 1450. After the resetting, the processing advances to initialization processing 1451, by which initialization of the entire system is performed. Then, the processing advances to brake control processing 1452, by which brake hydraulic pressure control is performed based on input information of various sensors. Then, the processing advances to self diagnostic processes 1453, by which self diagnosis of sensors and actuators in the system is performed. Thereafter, the processing advances to transmit data writing processing 1454, by which data to be transmitted from the ABS to another control unit is written into the communication IC. By discrimination processing 1455, it is discriminated whether or not the ignition key switch is in an off state, and if the key is in an off state, then the processing advances to ending processing 1456, but if the key switch is an on state, then the processing advances to the brake control processing 1452. By the ending processing 1456, transfer processing of the backup data is performed. After the data transfer is completed, the processing advances to an end state 1457 to make preparations for cut-off of power supply by the FIM. Since the initialization processing 1451 and the ending processing 1456 in the basic control flow described above are same as those in the PCM control described above, a detailed description of them is omitted.

Figure 107:
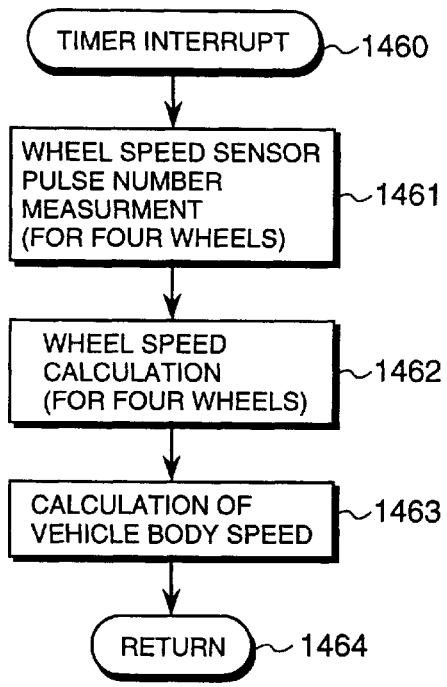
FIG. 107 is a flow chart of wheel speed calculation processing.

FIG. 107 illustrates a wheel speed calculation processing flow. The present processing is started by timer interrupt. By wheel speed sensor pulse count processing 1461, the number of pulses of a wheel speed sensor after the preceding interrupt processing till the current interrupt processing is measured. By a wheel speed calculation processing, the numbers of rotations of the wheels are calculated from the timer interrupt period and the pulse number mentioned above to calculate the speeds of rotation. By processing 1463, a pseudot vehicle body speed is calculated from the wheel speeds for the four wheels thus obtained and is determined as a vehicle speed. The processing returns from the interrupt by processing 1464.

Figure 108:
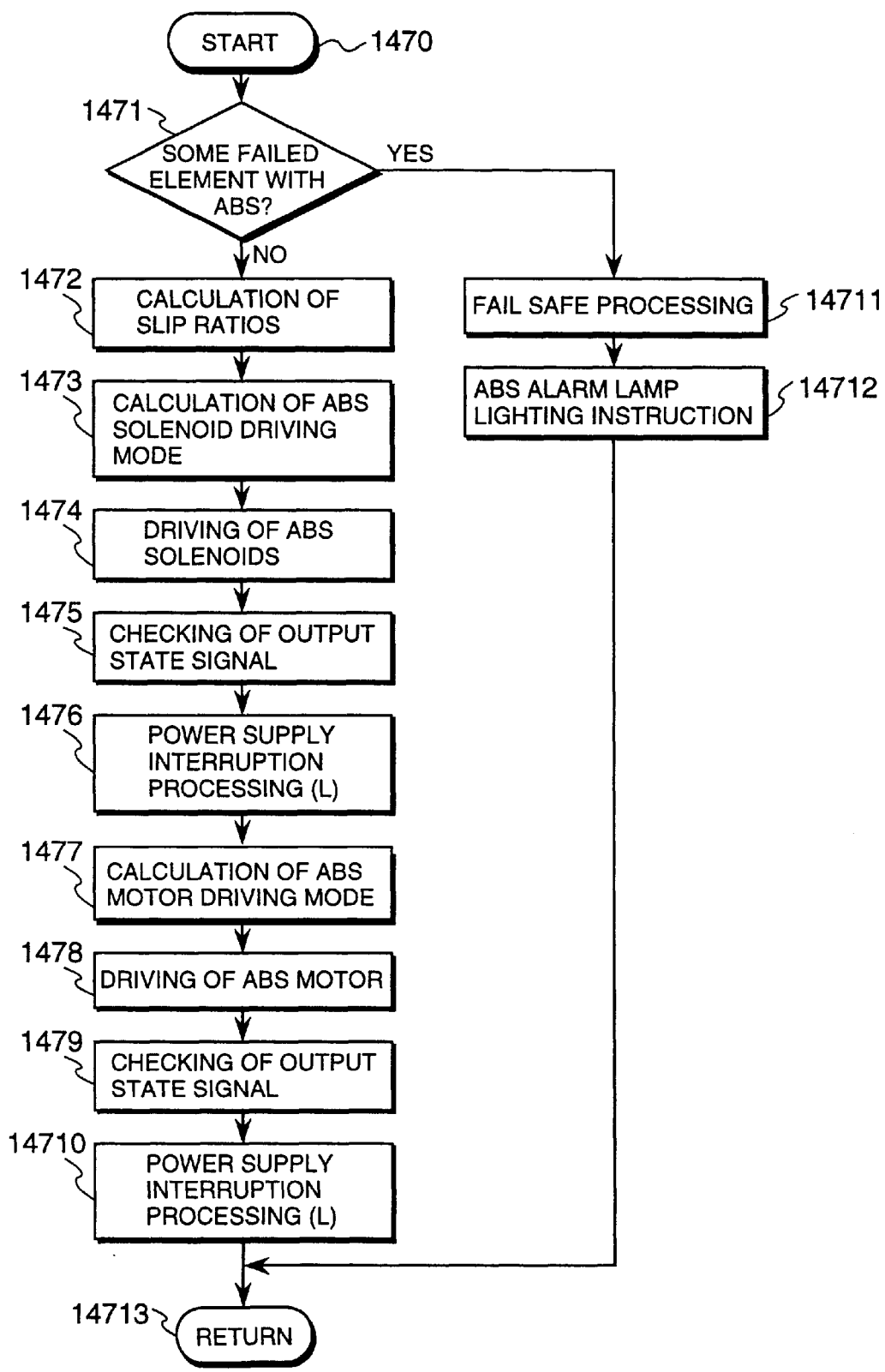
FIG. 108 is a flow chart of brake control processing in the basic control flow chart.

FIG. 108 illustrates details of the brake control processing 1452 in the basic control flow described above. By discrimination processing 1471, it is discriminated whether or not the ABS has some failed element, and if the ABS has some failed element, then the processing advances to processing 14711, by which fail safe processing is performed. In the fail safe processing, fail safe processing determined in advance is executed in response to a failure mode, and then the processing advances to ABS alarm lamp lighting instruction processing 14712. By the ABS alarm lamp lighting instruction processing 14712, the trouble occurrence bit of the data to be transferred from the ABS to the BCM is set to provide an alarm lamp lighting instruction. When the ABS has no failed element, the processing advances to processing 1472. By the processing 1472, slip ratios of the individual wheels are calculated from the wheel speeds of the four wheels and the vehicle body speed.

By processing 1473, in order to control the calculated slip ratios described above to a fixed value, an ABS solenoid driving mode is calculated. By processing 1474, the ABS solenoids are driven based on the calculated solenoid driving mode. By processing 1475, the solenoid driving signals and the output state signal are monitored and states of the load and the driving element in the interface are supervised based on Table 11 given hereinabove. By power supply cut-off processing (L) 1476, failure diagnosis of the high side load (in this instance, the ABS solenoid) by the low side driving element and incidental cut-off processing are performed based on a result of the supervision described above. By processing 1477, an ABS motor driving mode is calculated using such data as the wheel speeds described above. By processing 1478, the motor is energized (driven) based on the calculated motor driving mode. By processing 1479, the driving signals of the ABS motors and the output state signal are monitored and states of the load and the driving element in the output interface are supervised based on Table 11 given hereinabove. By power supply cut-off processing (L) 14710, failure diagnosis of the high side load (in this instance, the ABS motor) by the low side driving element and incidental interruption processing are performed based on a result of the supervision described above.

Figure 109:
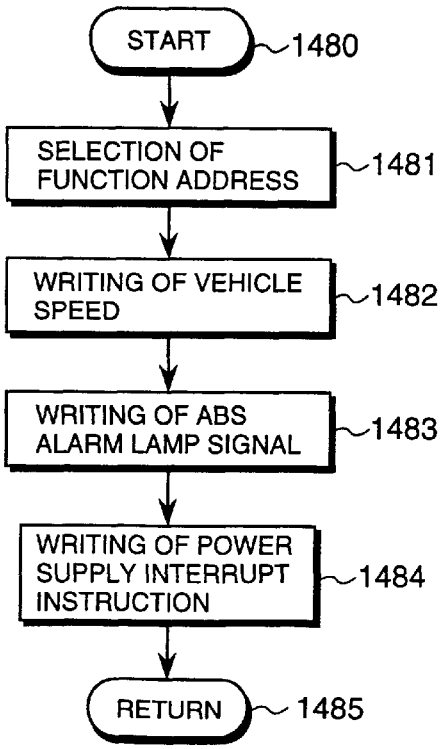
FIG. 109 is a flow chart of transmission data write processing in the basic control flow chart.

FIG. 109 illustrates details of the transmission data writing processing 1454 in the basic control flow described hereinabove. By processing 1481, in order to transmit vehicle speed data to the individual control units simultaneously, a transmission mode of the communication IC is designated to a functional address. By processing 1482, the vehicle speed data for transmission is set to the communication IC. By processing 1483, setting of the ABS alarm lamp is written into the communication IC. By processing 1484, the power supply cut-off instruction bit of the ABS itself is set and written into the communication IC. After the data are written, the communication IC effects data transmission processing to the designated transmission destination.

Figure 110:
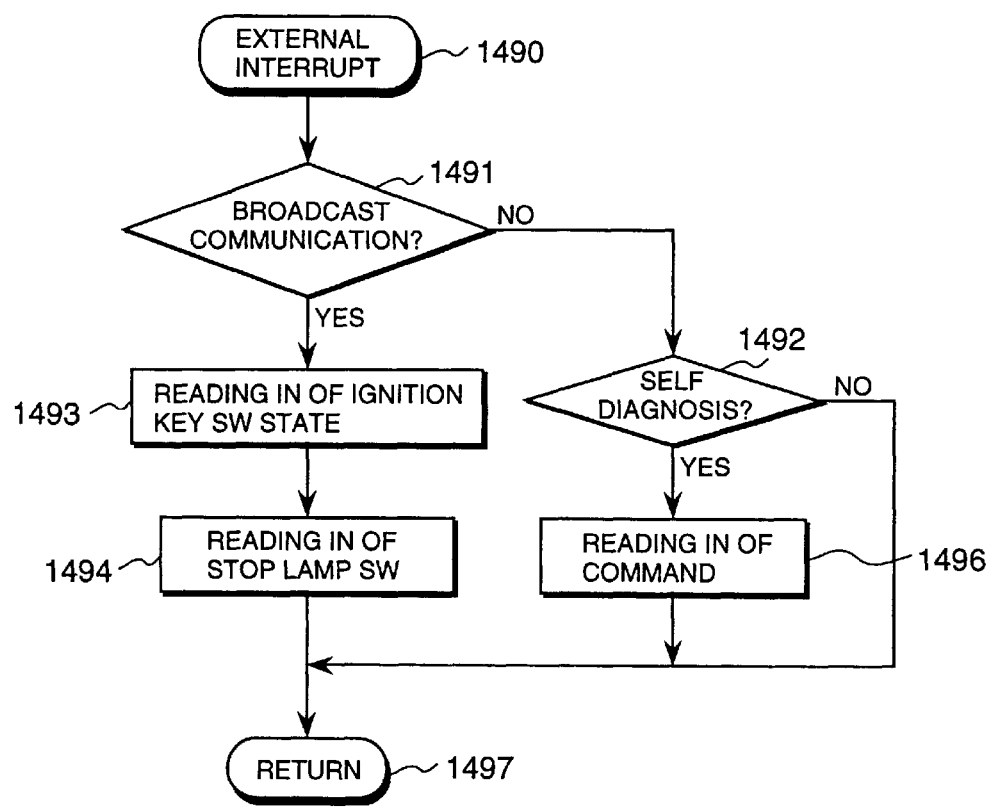
FIG. 110 is a flow chart of multiplexed communication data receive processing in the basic control flow chart.

FIG. 110 illustrates a multiplex communication data receive processing flow. Since the construction wherein external interrupt occurs with the CPU when the communication IC receives data is adopted, the present processing is started by external interrupt in a state 1490. By discrimination processing 1491, it is discriminated whether or not receive data is broadcast communication data. When the receive data is broadcast communication data, the processing advances to processing 1493, by which ignition key switch position information is read in. Then by processing 1494, a stop lamp switch state is read in. When the receive data is not broadcast communication data, the processing advances to discrimination processing 1492. When the transmission destination is the self diagnosis apparatus, a diagnosis processing command is read in by processing 1496, and corresponding self diagnostic processes are performed in the self diagnostic processes in the main routine.

Figure 111:
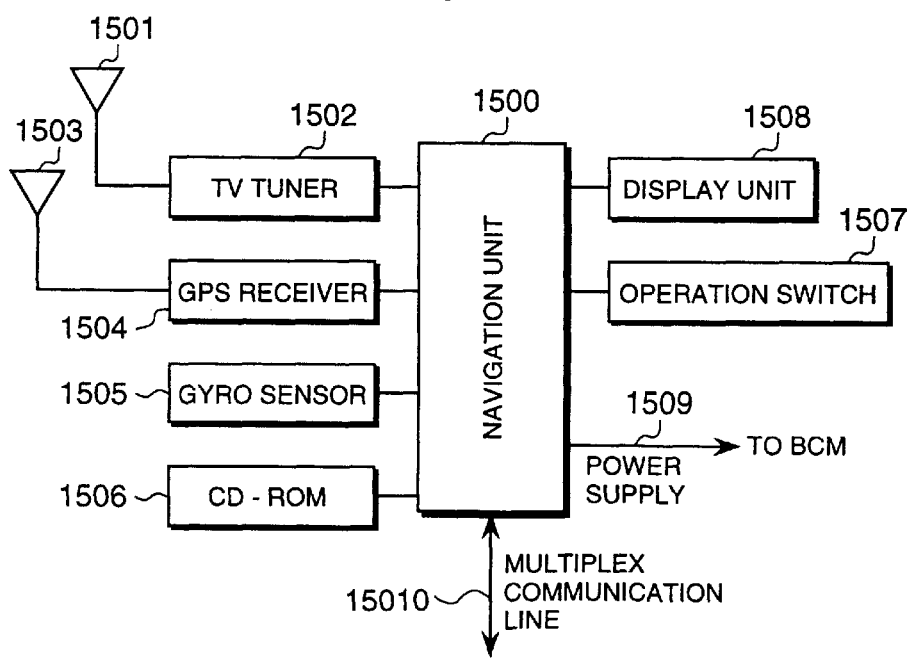
FIG. 111 is a diagram showing a system configuration of a navigation system.

FIG. 111 is a system diagram showing a construction of a navigation system (hereinafter referred to as navig. system) for a vehicle to which the power supply network of the present invention is applied. A navig. unit 1500 receives various sensor signals and displays a TV image or a position of the vehicle on a display unit by a control method determined in advance. A TV tuner 1502 reproduces radio waves received by a TV antenna 1501 and outputs them to the navig. unit 1500. A GPS receiver 1504 demodulates radio waves received by a GPS antenna 1503, calculates the position of the vehicle and outputs a result of the calculation to the navig. unit 1500. A gyro sensor 1505 detects a turning angular velocity of the vehicle body and outputs it to the navig. unit 1500. A CD-ROM unit 1506 outputs map data stored in a CD-ROM in response to an instruction from the navig. unit. A display unit 1508 displays a TV image mentioned above or a map upon navigation. An operation switch 1507 selects an operation mode or the like of the navig. system. A power supply line 1509 is part of the power supply network of the present invention, and supplies power to the navig. system itself and power to the load 1508 from the BCM. A multiplex communication line 15010 is part of the power supply network similarly and is provided to effect communication with a control unit such as the BCM.

Figure 112:
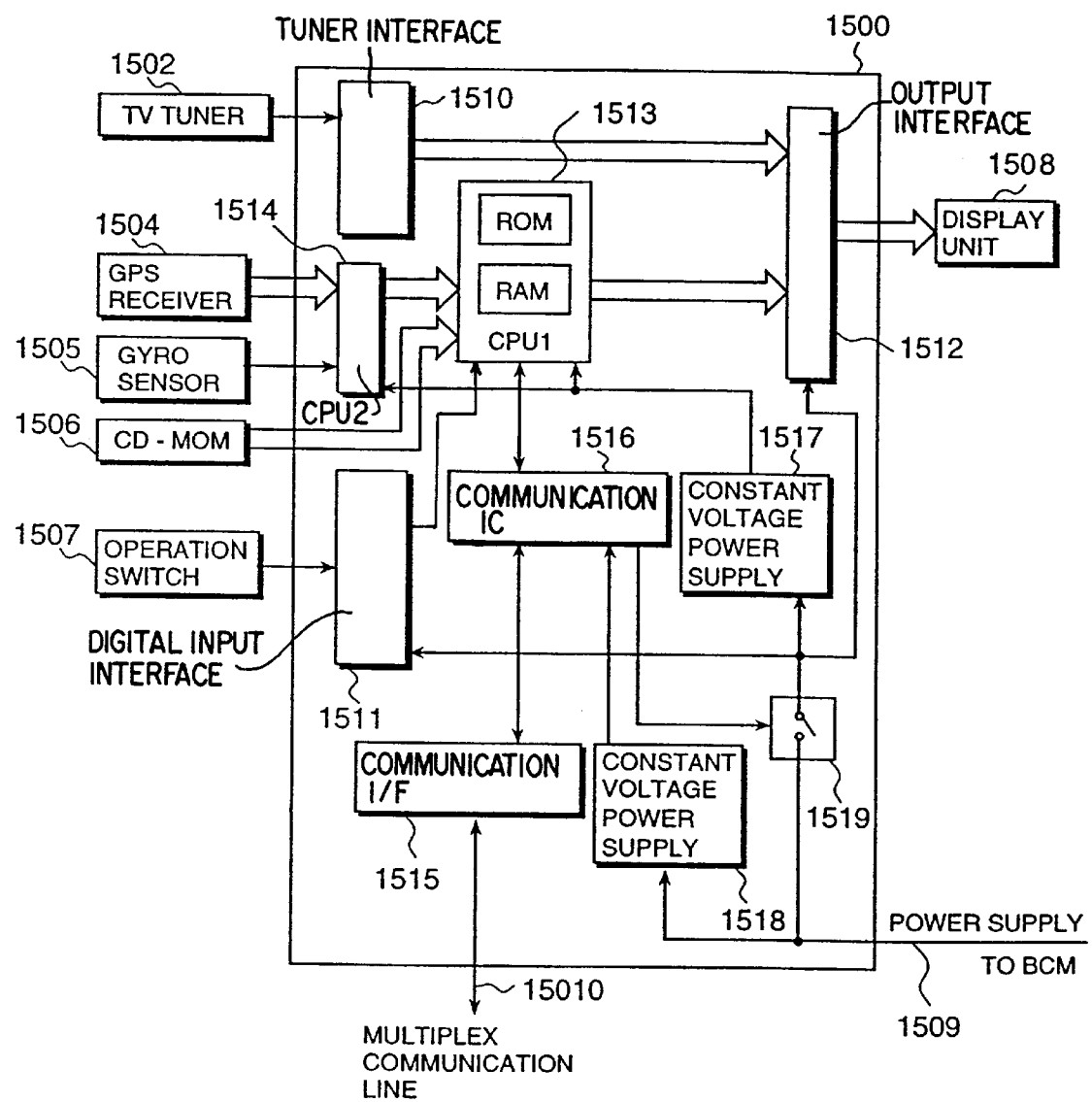
FIG. 112 is a detailed diagram showing an internal configuration of the navigation system.

FIG. 112 shows a detailed diagram of an internal construction of the navig. module 1500. A signal from the TV tuner is sent to an output interface 1512 through a tuner interface 1510. An input signal from the operation switch 1507 is converted by a digital input interface 1511 so that it has a level with which it can be processed readily by a CPU, and is fetched into a CPU 1513. Another CPU 1514 calculates a current position from data of the GPS receiver 1504 and the gyro sensor 1505 and transfers the same to the CPU 1513. The CPU 1513 retrieves, based on the self position data from the CPU 1514, map data stored in the CD-ROM unit 1506 and outputs corresponding map information to the output interface 1512. The output interface 1512 outputs a TV tuner image or a map image to the display unit in response to a control signal of the CPU 1514. Power supplied from the BCM include power to be supplied to a constant voltage power supply 1518 for a communication IC 1516 in the navig. system, and power to be supplied to another constant voltage power supply 1517, the input interface 1511 and the output interface 1512 via a power supply cut-off switch 1519. The constant voltage power supply 1518 is a constant voltage power supply generation circuit for exclusive use of the communication IC and is normally energized unless power supply from the BCM is cut-off. The constant voltage power supply 1517 supplies power to the CPU 1513 and the CPU 1514. The power supply cut-off switch 1519 is controlled directly by the communication IC and is provided in order to cut-off power supply when some trouble occurs with a grounded type load. The communication IC 1516 is connected to the multiplex communication line 15010 via a communication IC interface 1515. Further, the communication IC 1516 is connected to the CPU 1513 so that it transmits and receives data necessary for the power supply network via the multiplex communication line 15010. Detailed description of functions of the communication IC 1516 and the communication IC interface 1515 is omitted here. The CPU 1513 includes a ROM (Read Only Memory) and a RAM (Random Access Memory) provided therein, and control software for the navigation system and initial constants are stored in the ROM.

Figure 113A:
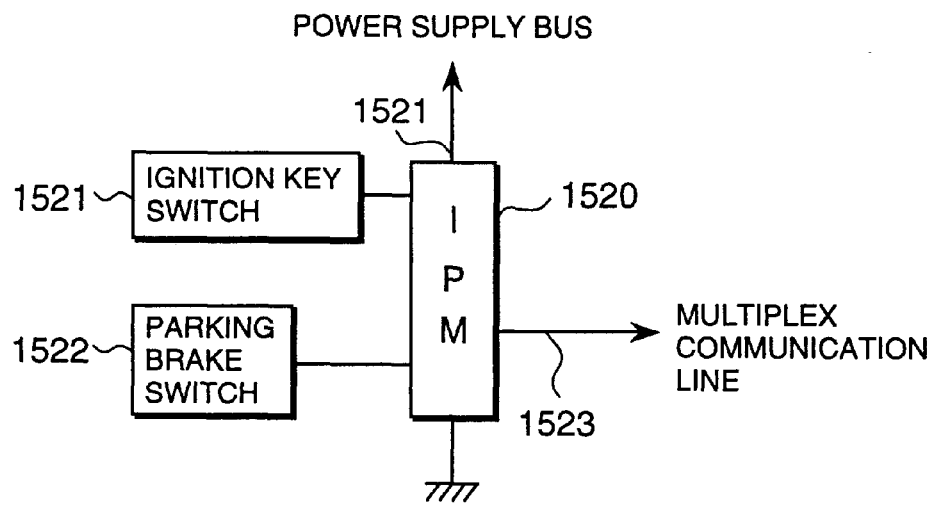
FIG. 113(A) is a diagram illustrating a load connection situation of an IPM.

FIG. 113(A) illustrates a distribution situation of loads to an IPM 1520 described above relating to the navigation system. An ignition switch 1521 and a parking brake switch 1522 provide input signals relating to the navigation system. Driving data for them are transferred from the navig. system to the IPM via the BCM.

Figure 113B:
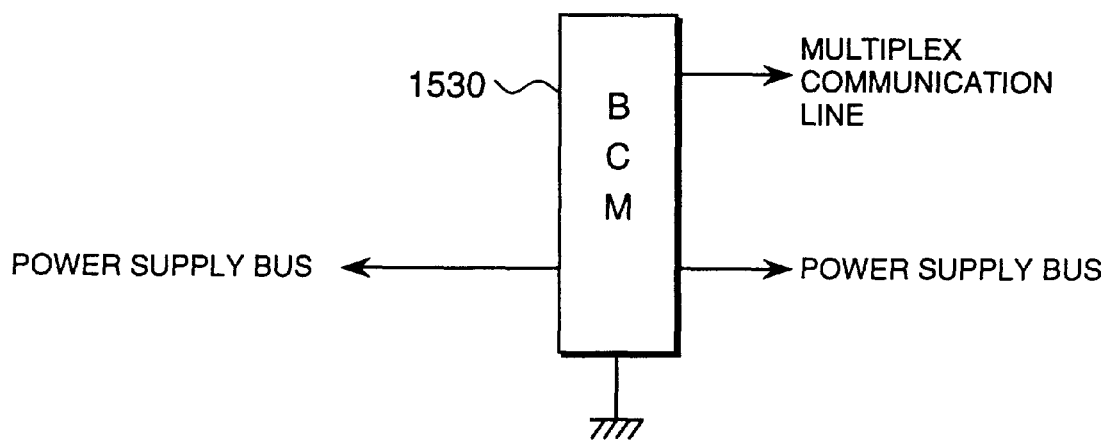
FIG. 113(B) is a diagram illustrating a load connection situation of a BCM.

FIG. 113(B) illustrates a distribution situation of loads to a BCM 1530 described above relating to the navigation system. In the present embodiment, the BCM supplies power to the navigation system.

Figure 114:
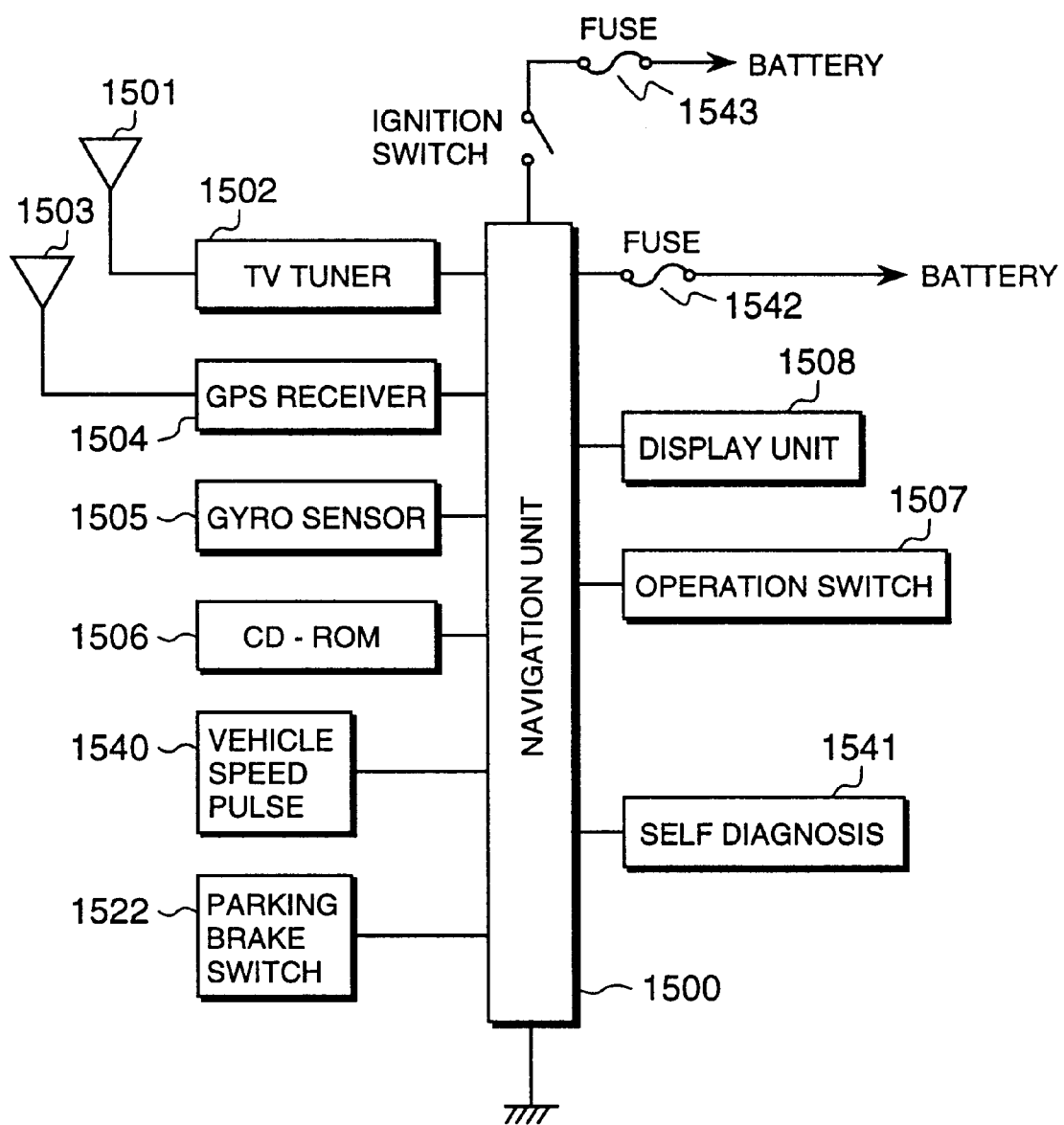
FIG. 114 is a drawing showing a conventional example of a navigation system.

FIG. 114 shows a conventional example of a navigation system construction and illustrates wiring line reduction effects by the present invention. Since an ignition switch signal is fetched by the BCM and transmitted by multiplex communication, wiring lines relating to the ignition switch 1522 can be reduced. Since the navig. system receives supply of power from the BCM and an over-current state is supervised by the BCM, fuses 1542 and 1543 on the upstream can be reduced. Simultaneously, the necessity for laying power supply lines from the battery to the navig. system via the fuse box in the compartment is eliminated, and wiring lines can be reduced as much. The necessity for power supply lines for backing up the battery is eliminated by transferring data necessary for the backing up when power supply to the navigation system is cut-off by multiplex communication to the BCM as hereinafter described. Since signals are transferred by multiplex communication through the IPM as described above, the parking brake switch 1522 need not be wired individually and wiring lines can be reduced. Since a vehicle speed pulse signal 1540 is produced by the ABS and transmitted by multiplex communication and also self diagnosis 1530 is executed by multiplex communication, wiring lines for them can be reduced similarly.

Figure 115:
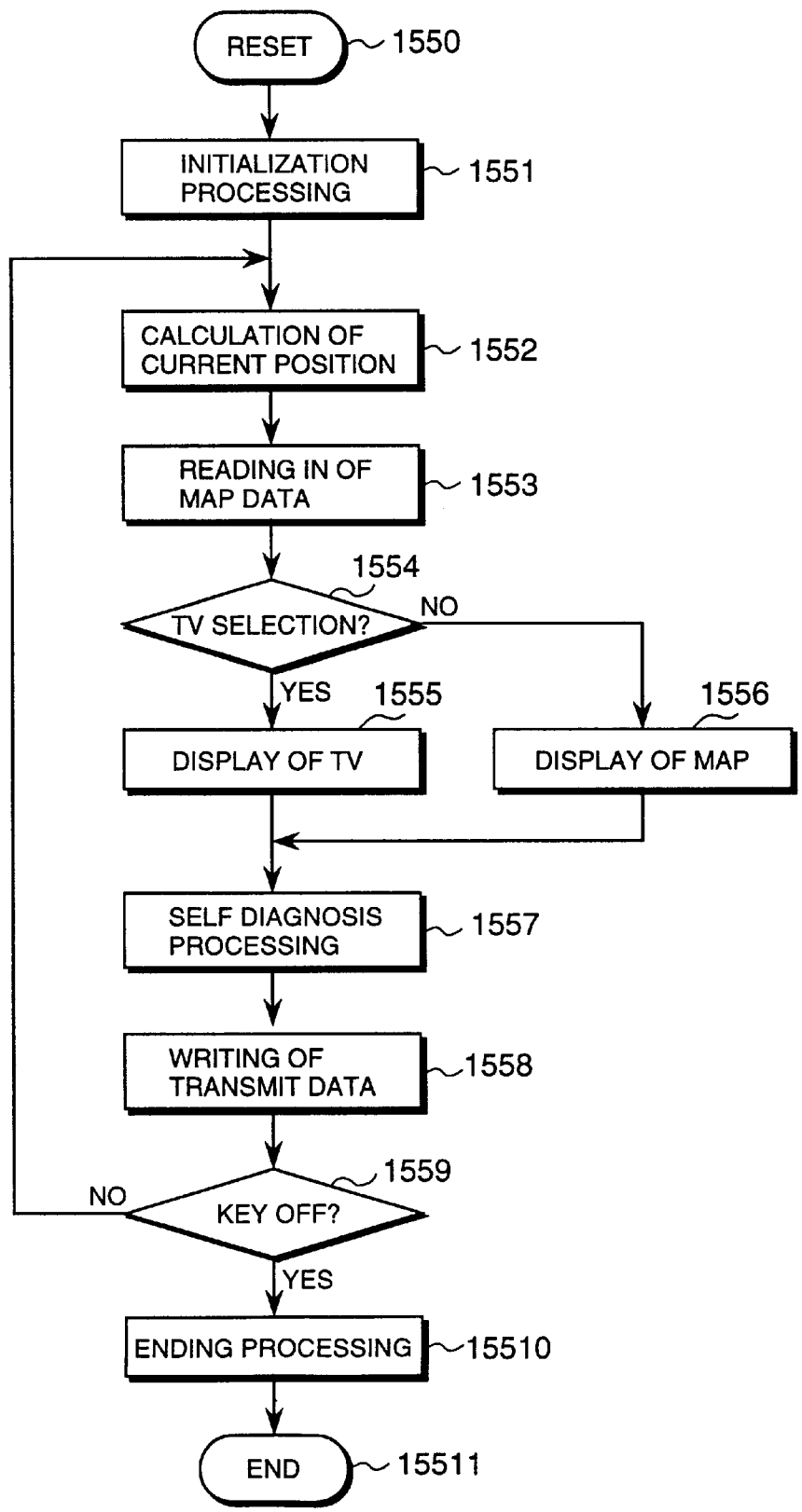
FIG. 115 is a basic control flow chart of a navigator.

FIG. 115 illustrates a basic control flow of the navigation system of the present invention by the CPU 1513. After power is made available by the BCM, processing is started from a reset state 1550. After the resetting, the processing advances to initialization processing 1551, by which initialization of the entire system is performed. Then, the processing advances to processing 1552, by which a current position calculated based on a GPS (Global Positioning System) signal and a gyro signal is converted into data which can be processed readily. By processing 1553, map data corresponding to the current position is read out from the CD-ROM. By discrimination processing 1554, it is selected by means of the operation switch whether a TV image or a navig. image is to be displayed. When a TV image is to be displayed, the processing advances to processing 1555, by which a TV image is displayed. When a navig. image is to be displayed, the processing advances to processing 1556, by which a map is displayed. Thereafter, the processing advances to self diagnostic processes 1557, by which self diagnosis of sensors and actuators in the system is performed. Then, the processing advances to transmit data writing processing 1558, by which data to be transmitted from the navig. system to another control unit is written into the communication IC. By discrimination processing 1559, it is discriminated whether or not the ignition key switch is in an off state, and if the key switch is in an off state, then the processing advances to ending processing 15510, but if the key switch is in an on state, then the processing advances to processing 1552. By the ending processing 15510, transfer processing of the backup data is performed. After the data transfer is completed, the processing advances to an end state 15511 to make preparations for interruption of power by the BCM. Since the initialization processing 1551 and the ending processing 15510 in the basic control flow described above are same as those in the PCM control described above, a detailed description of them is omitted.

Figure 116:
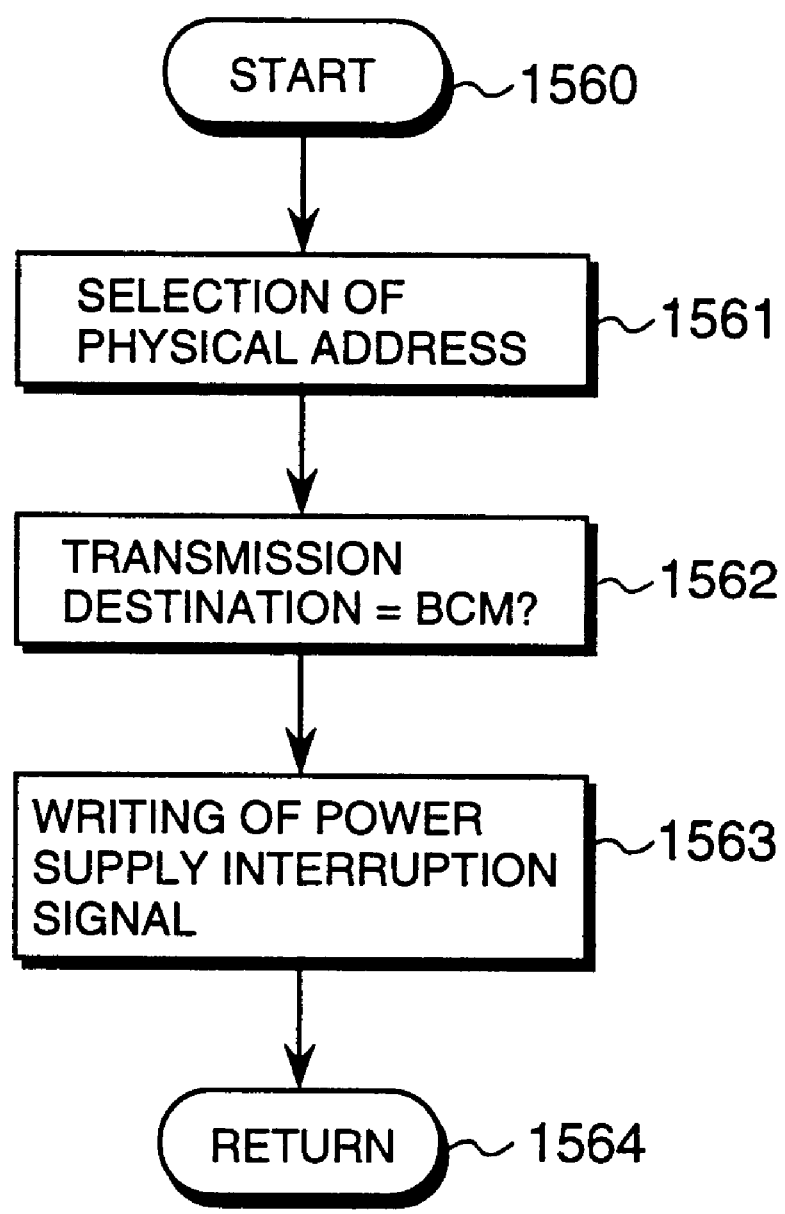
FIG. 116 is a flow chart of transmission data write processing in the basic control flow chart.

FIG. 116 illustrates details of the transmit data writing processing 1558 in the basic control flow described hereinabove.

By processing 1561, a physical address is set, and by processing 1562, a transmission destination address is set to the BCM. By processing 1563, the power supply cut-off instruction bit of the navig. system itself is set and written into the communication IC. After the data is written, the communication IC effects data transmission processing to the designated transmission destination.

Figure 117:
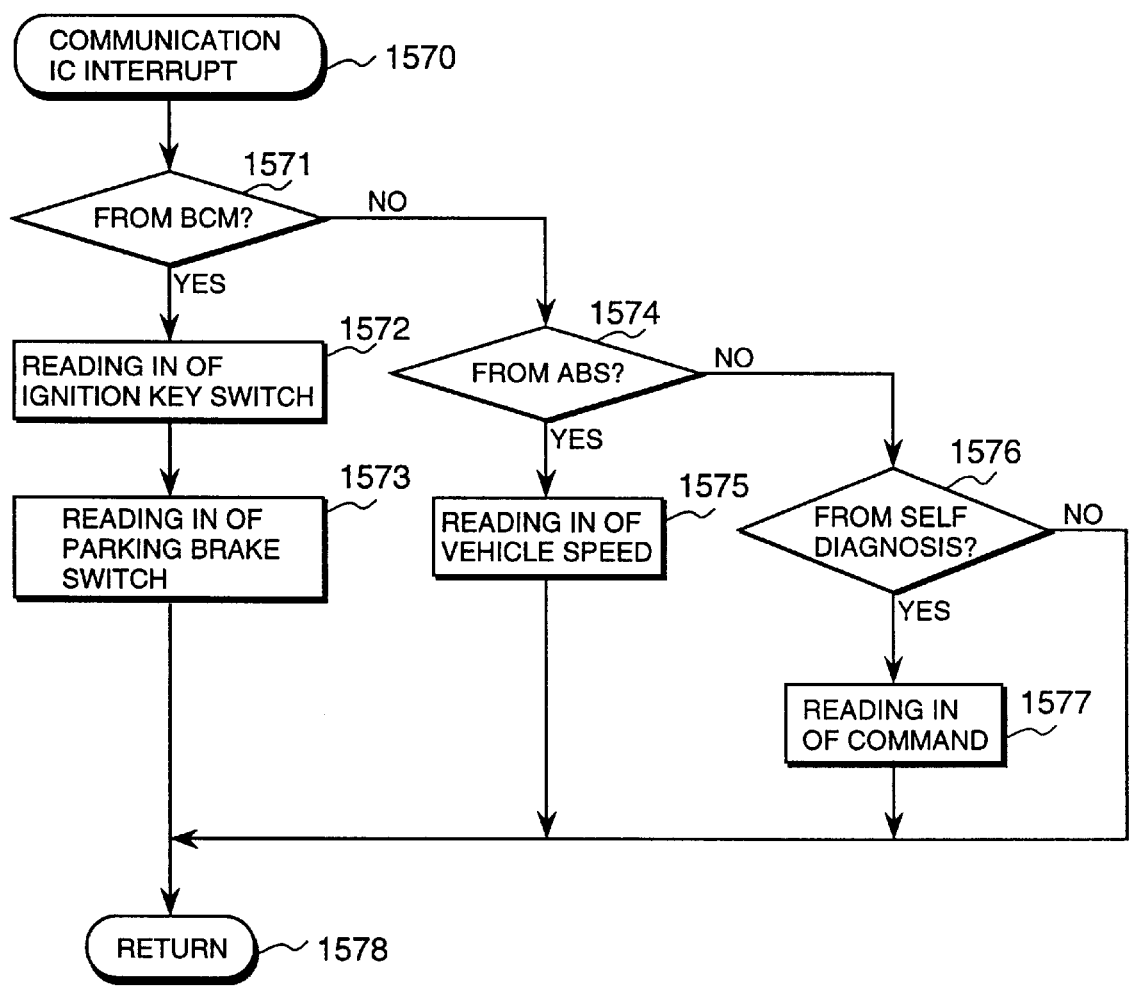
FIG. 117 is a flow chart of multiplex data receive processing in the basic control flow chart.

FIG. 117 illustrates a multiplex communication data receive processing flow. When the communication IC receives data, external interrupt occurs with the CPU, and the present processing is started by the interrupt. By discrimination processing 1571, 1574 and 1576, the transmission origination of the receive data is discriminated. When the transmission origination is the BCM, the processing advances to processing 1572. When the transmission origination is the ABS, the processing advances to processing 1574. When the transmission origination is the self diagnosis apparatus, the processing advances to processing 1577.

By the processing 1572, ignition key switch position information is read in, and by the processing 1573, a parking brake switch state is read in. Further, by the processing 1575, vehicle speed data are read in. By the processing 1577, a diagnostic process command is read in, and corresponding self diagnosis processing is performed in the self diagnostic processes in the main routine.

Industrial Applicability

As described above, while a power supplying apparatus and method and a semiconductor circuit apparatus or an intensive wiring apparatus for use with the power supplying apparatus and method according to the present invention are described above in connection with the embodiments for an automobile, the basic techniques can be applied not only to automobiles, but also widely to, for example, electric cars, airplanes, marine vessels and other vehicles wherein a large number of electric loads are located far from a power supply.

We claim:

1. An intensive wiring apparatus in a vehicle, comprising:
  A. two or more control units for controlling an electric load carried on said vehicle;
  B. a communication line for transmitting information as a digital signal between said control units;
  C. a power supply line for distributing power from a power supply carried on said vehicle to said control units;
  D. a power supply relay circuit for connecting or disconnecting said electric load to or from said power supply line; and
  E. a power supply control apparatus for controlling said power supply relay circuit by said digital signal which is transmitted via said communication line to supply or to stop a supply of power to said electric load.

2. An intensive wiring apparatus for a vehicle according to claim 1, characterized in that said communication line and said power supply line are bundled into a single wire.

3. An intensive wiring apparatus for a vehicle, comprising:
  A. two or more control units for controlling an electric load carried on said vehicle;
  B. a communication line for transmitting information said control units;
  C. a power supply line for distributing power from a power supply carried on said vehicle to said control units;
  D. a power supply relay circuit for connecting or disconnecting said electric load to or from said power supply line;

E. a power supply control apparatus for controlling said power supply relay circuit via said communication line to supply or to stop a supply of power to said electric load;

said communication line and said power supply line being bundled into a single wire;

a braided wire which covers over an outer periphery of said wire into which said communication line and said power supply line are bundled;

a voltage power supply circuit for supplying a predetermined voltage to said braided wire;

a potential detection apparatus for detecting a potential of said braided wire; and an abnormal state detection apparatus for detection an abnormal state of said wire from the detected potential.

* * * * *